United States Patent
Takizawa et al.

(10) Patent No.: US 6,867,831 B2
(45) Date of Patent: Mar. 15, 2005

(54) SUBSTRATE FOR ELECTROOPTICAL DEVICE, METHOD FOR MANUFACTURING THE SUBSTRATE, ELECTROOPTICAL DEVICE, METHOD FOR MANUFACTURING THE ELECTROOPTICAL DEVICE, AND ELECTRONIC APPARATUS

(75) Inventors: Keiji Takizawa, Hotaka-machi (JP); Yoshihiro Otagiri, Matsumoto (JP); Tomoyuki Nakano, Toyoshina-machi (JP); Hideki Kaneko, Shiojiri (JP); Mutsumi Matsuo, Misato mura (JP); Toshihiro Otake, Shiojiri (JP)

(73) Assignee: Seiko Epson Corporation (JP)

( * ) Notice: Subject to any disclaimer, the term of this patent is extended or adjusted under 35 U.S.C. 154(b) by 39 days.

(21) Appl. No.: 10/308,890

(22) Filed: Dec. 3, 2002

(65) Prior Publication Data
US 2003/0147115 A1 Aug. 7, 2003

(30) Foreign Application Priority Data

| Dec. 11, 2001 | (JP) | 2001-377302 |
| May 31, 2002 | (JP) | 2002-159926 |
| Jun. 20, 2002 | (JP) | 2002-180404 |
| Nov. 7, 2002 | (JP) | 2002-323980 |

(51) Int. Cl.$^7$ .................................................. G02F 1/1335
(52) U.S. Cl. ..................................... 349/106; 349/113
(58) Field of Search ............................. 349/113, 106, 349/107

(56) References Cited

U.S. PATENT DOCUMENTS

| 5,085,973 A | * | 2/1992 | Shimizu et al. | 430/271.1 |
| 6,327,009 B1 | * | 12/2001 | Ichimura | 349/113 |
| 6,657,687 B2 | * | 12/2003 | Takizawa | 349/106 |

* cited by examiner

Primary Examiner—James A. Dudek
(74) Attorney, Agent, or Firm—Harness, Dickey & Pierce, P.L.C.

(57) ABSTRACT

A substrate for an electrooptical device includes a base 1 having a plurality of display dots D, an underlayer 4 formed on the base 1, a reflective layer 2 formed on the underlayer 4, and color layers 3r, 3g, and 3b formed on the reflective layer 2. The underlayer 4 is provided at regions corresponding to the display dots D, but is not provided at regions between the display dots D. In addition, concave areas are provided at regions between the display dots D, and a light-shielding layer 3k is provided to fill the concave areas. Accordingly, the light-shielding layer 3k, and the-color layers 3r, 3g, and 3b are level with each other.

35 Claims, 69 Drawing Sheets

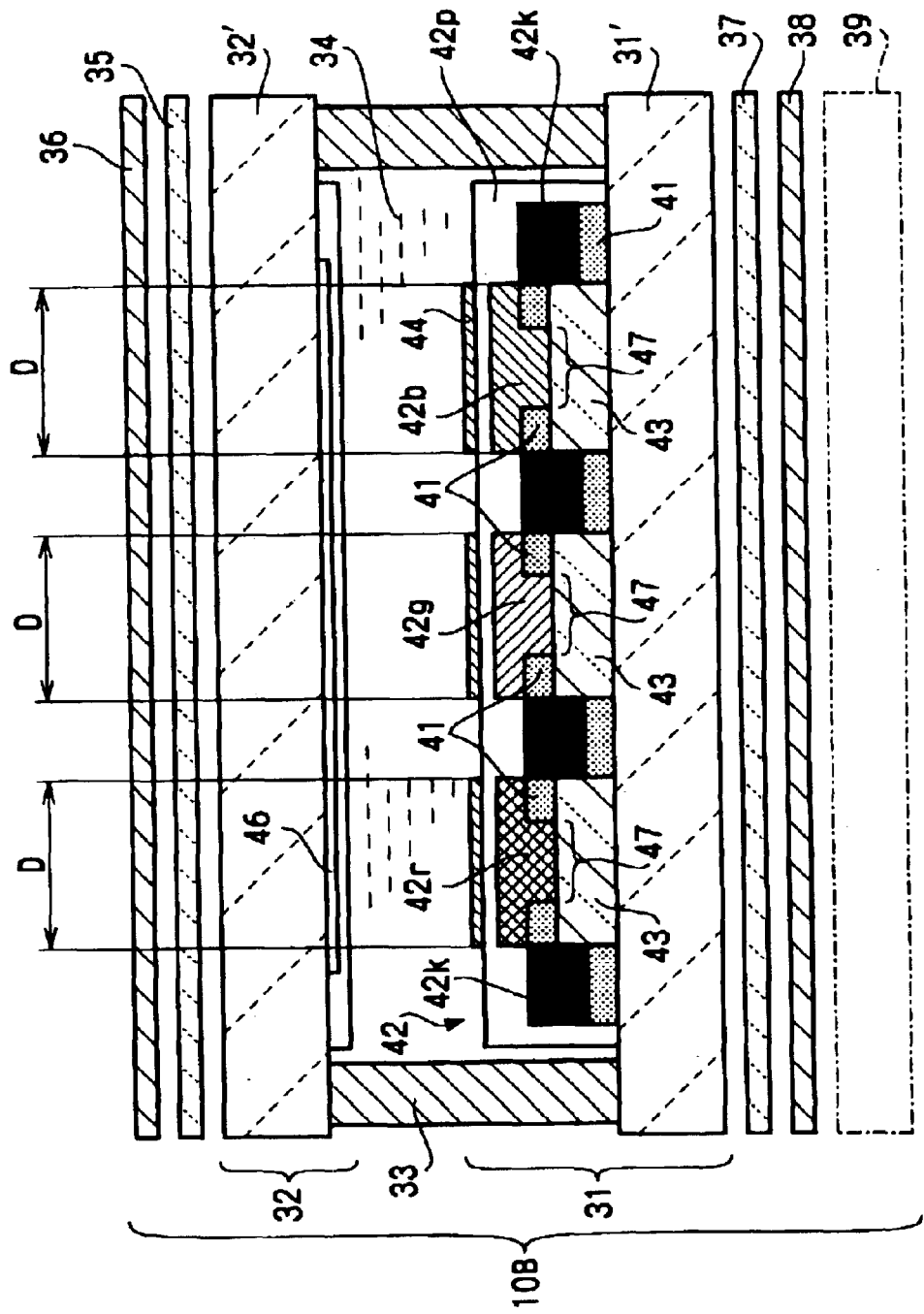

SUBSTRATE FOR ELECTROOPTICAL
DEVICE, METHOD FOR MANUFACTURING
THE SUBSTRATE, ELECTROOPTICAL
DEVICE, METHOD FOR MANUFACTURING
THE ELECTROOPTICAL DEVICE, AND
ELECTRONIC APPARATUS

TECHNICAL FIELD

The present invention relates to a substrate used in an electrooptical device such as a liquid crystal device, a method for manufacturing the substrate, an electrooptical device including the substrate, and an electronic apparatus including the electrooptical device.

BACKGROUND ART

Recently, electrooptical devices have been commonly used in electronic apparatuses such as cellular phones and portable personal computers. Transflective liquid crystal devices, which can perform both reflective display and transmissive display, are known as one of such electrooptical devices.

When a transflective liquid crystal device performs reflective display, external light such as natural light and room light enters the liquid crystal device and is reflected by a reflective layer provided in the liquid crystal device. Thus, an image is displayed when the reflected light is emitted to the outside. The reflective layer must also have a function to transmit light so that the liquid crystal device can also perform transmissive display. Accordingly, when external light is reflected by the reflective layer as described above, only a part of the external light is reflected.

The above-described reflective structure including the reflective layer reflecting external light is similar to that of a liquid crystal device which does not have a function to perform transmissive display, that is, a liquid crystal device which reflects all of the external light with a reflective layer, that is, a reflective liquid crystal device.

Meanwhile, in a liquid crystal device which can perform reflective display, irrespective of whether it is a transflective liquid crystal device or a reflective liquid crystal device, there is a problem in that when the surface of the reflective layer is mirror-finished, a displayed image cannot be seen clearly by a viewer due to the reflection of objects and room lights on the image.

In order to solve the above-described problem, a technique has been proposed in which an underlayer having many small irregularities in the surface thereof is disposed under a reflective layer. Thus, many small convexities are formed in the surface of the reflective layer. Accordingly the surface roughness is increased, so that the reflected light is moderately scattered.

Japanese Laid-Open Patent Application Publication No. 2002-258270.

In liquid crystal devices, many display dots, as a single display dot serves the minimum display unit, are arranged along a plane in, for example, a matrix pattern. A desired image is displayed by selectively illuminating the display dots. In such a case, a light-shielding layer, that is, a layer which prevents light from passing therethrough, is disposed so as to cover the regions between the display dots. This light-shielding layer, called a black mask or a black matrix, is formed so that a high-contrast image can be displayed.

When a light-shielding layer is provided to cover the regions between the display dots, the thickness increases at the regions where the light-shielding layer is provided. Accordingly, there are problems in that a cell gap becomes nonuniform and a rubbing process of an alignment film cannot be performed under satisfactory conditions. Although a substrate surface becomes relatively planar when an alignment layer and an overcoat layer are generally formed on the light-shielding layer, the above-described problems of nonuniform cell gap, etc., cannot be solved.

In view of the above-described situations, an object of the present invention is to reduce the surface roughness over regions where the display dots are arranged and regions between the display dots. In addition, it is also an object of the present invention to ensure the planarity over the regions where the light-shielding layer is formed and regions surrounded by the light-shielding layer, for example, regions where color layers are formed.

SUMMARY OF THE INVENTION

In order to attain the above-described objects according to the present invention, a substrate for an electrooptical device comprises a base in which a plurality of display dots are formed; an underlayer provided on the base; a reflective layer provided on the underlayer; and a color layer provided on the reflective layer. The underlayer is provided at regions corresponding to the display dots, but is not provided at regions between the display dots.

When a liquid crystal device as described above is operated in a reflective display, external light passes through the color layer, is reflected by the reflective layer, and is emitted back toward a viewer. As the underlayer and the reflective layer are disposed under the color layer, the external light is reflected with a moderately scattered condition, and an image can be displayed in a wide viewing angle.

Since the underlayer is not provided at the regions between the display dots, that is, since the underlayer is not provided at the regions where the light-shielding layer is formed, the thickness at a part where the light-shielding layer is formed is reduced by an amount corresponding to the thickness of the underlayer. Accordingly, the light-shielding layer can be prevented from projecting from the surface, so that the roughness of the substrate surface can be reduced. More specifically, the planarity of the substrate surface can be improved.

In the above-described substrate for the electrooptical device, preferably, the planar shape of the underlayer is approximately the same as the planar shape of the display dots. In such a case, in reflective operation, light which is moderately scattered by the underlayer and passes through the color layer can be supplied to a wide area, so that an image can be displayed in a wide viewing angle.

In addition, in the above-described substrate for the electrooptical device the light-shielding layer is preferably formed so as to cover the regions excluding the display dots. In such a case, the light-shielding layer is formed so as to cover the regions where the underlayer is not provided, so that the overall planarity of the substrate improves.

In addition, in the above-described substrate for the electrooptical device, the regions where the underlayer is not provided are preferably the same as the regions where the light-shielding layer is formed. In such a case, an increase in thickness due to the light-shielding layer can be canceled by omitting the underlayer, and the planarity of the substrate surface can be improved.

An electrooptical device according to the present invention includes the above-described substrate for the electrooptical device, and another substrate disposed so as to face the substrate for the electrooptical device, an electrooptical material layer is disposed between the substrate for the electrooptical device and the other substrate. In an electrooptical device that is constructed as above, since the underlayer is not provided at the regions between the display dots, an overall planarity of the substrate is ensured. Accordingly, a thin liquid crystal device can be obtained.

An electronic apparatus according to the present invention includes the electrooptical device which is constructed as described above. Since the thickness of the liquid crystal device can be reduced, the thickness of the electronic apparatus including the liquid crystal device can also be reduced.

A method for manufacturing a substrate for an electrooptical device according to the present invention includes the steps of forming an underlayer on a base in which a plurality of display dots are formed; forming a reflective layer on the underlayer; and forming a color layer on the reflective layer. The color layer is formed at, regions corresponding to the display dots, but is not formed at regions between the display dots.

Since the underlayer is not provided at the regions between the display dots, that is, since the underlayer is not provided at the regions where the light-shielding layer is formed, the thickness at an area where the light-shielding layer is formed is reduced by an amount corresponding to the thickness of the underlayer. Accordingly, the light-shielding layer can be prevented from projecting from the surface, so that the roughness of the substrate surface can be reduced. More specifically, the planarity of the substrate surface can be improved.

Preferably, the above-described method for manufacturing the substrate for the electrooptical device further includes a step of forming a light-shielding layer on the reflective layer at regions where the underlayer is not provided. Since the light-shielding layer is formed so as to cover the regions where the underlayer is not provided, the overall planarity of the substrate can be improved.

A substrate for an electrooptical device according to the present invention includes a base in which a plurality of display dots are formed; an underlayer being provided on the base with recesses or openings at regions between the adjacent display dots, and having irregularly arranged convexities or concavities; a reflective layer provided on the underlayer; and a light-shielding layer disposed to fill the recesses or the openings.

In a prior art substrate for an electrooptical device in which an underlayer is formed uniformly over the base, the height of a light-shielding layer increases and satisfactory planarity cannot be obtained even after laminating an overcoat layer, etc. Accordingly, there is a problem in that the dispersion of a cell gap becomes larger. On the contrary, according to the substrate for the electrooptical device which is constructed in accordance with the present invention, the underlayer includes recesses or openings at regions between the adjacent display dots and the light-shielding layer is disposed to fill the recesses or the openings. Accordingly, the height of the light-shielding layer can be reduced and the planarity over the surfaces of the display dots and the surfaces of the boundary regions between the display dots can be ensured.

In the substrate for the electrooptical device according to the present invention, the bottom of the openings contain regions where the underlayer has been removed. Accordingly, since the underlayer is removed, the height of, for example, the light-shielding layer can be reduced, so that the dispersion of the cell gap becomes smaller.

In addition, in the substrate for the electrooptical device according to the present invention, the thickness of the underlayer at regions under the bottom surfaces of the recesses is preferably smaller than the thickness of the underlayer at other regions. When the underlayer is completely removed at regions under the bottom surfaces of the openings, there is a possibility that the planarity over the surfaces of the display dots and the surfaces of the boundary regions between the adjacent display dots will be degraded instead of improving. In such a case, recesses are preferably formed instead of forming openings so that the thickness of the underlayer at the regions under the bottom surfaces of the recesses is set to a desired value. Accordingly, the surface planarity can be ensured so that the dispersion of the cell gap becomes smaller and the rubbing process can be performed easily.

In addition, in the substrate for the electrooptical device according to the present invention, preferably, the underlayer, at the region under the bottom surface of the recesses, is formed with a first insulating layer provided on the base and the underlayer, and at other regions, is formed with a first insulating layer and a second insulating layer being laminated on the first insulating layer. In such a case, even if the recesses are not formed in the first insulating layer, they may be formed at the time when the second insulating layer is formed. Accordingly, the process of forming the first insulating layer can be made simpler.

The first and the second insulating layers are preferably composed of a resin material. In such a case, the resin material for composing the underlayer diffuses light, so that the brightness of the display can be increased.

In addition, in the substrate for the electrooptical device according to the present invention, the reflective layer may include an aperture. In such a case, a substrate for a transflective electrooptical device can be obtained. Thus, the planarity over the surfaces of the display dots and the surfaces of the boundary regions between the display dots can be ensured not only in a substrate for a reflective electrooptical device but also in a substrate for a transflective electrooptical device. The dispersion of the cell gap therefore, becomes smaller.

In addition, in the substrate for the electrooptical device according to the present invention, the height of the light-shielding layer is preferably and approximately the same as the height of the underlayer. In such a case, the light-shielding layer and the underlayer are leveled with respect to the base plate, so that the planarity over the surfaces of the display dots and the surfaces of the boundary regions between the display dots can be ensured and the dispersion of the cell gap becomes smaller.

An electrooptical device according to another aspect of the present invention includes a first base and a second base which face each other; an electrooptical material disposed between the first base and the second base; first electrodes provided on the first base; second electrodes provided on the second base; a plurality of display dots disposed at regions where the first electrodes and the second electrodes overlap each other; an underlayer provided on the first base with recesses or openings at regions between the adjacent display dots, and having irregularly arranged convexities or concavities; a reflective layer provided on the underlayer; and a light-shielding layer disposed to fill the recesses or the openings.

In a prior art substrate for an electrooptical device in which an underlayer is formed uniformly over the base, the height of a light-shielding layer increases and a satisfactory planarity cannot be obtained even after laminating an overcoat layer, etc. Accordingly, there is a problem in that the dispersion of a cell gap becomes larger. On the contrary, according to the electrooptical device which is constructed as described above, the underlayer includes recesses or openings at regions between the adjacent display dots and the light-shielding layer is disposed to fill the recesses or the openings. Accordingly, the height of the light-shielding layer, for example, can be reduced and the planarity over the surfaces of the display dots and the surfaces of the boundary regions between the display dots can be ensured.

In the above-described electrooptical device, the bottom of the openings contains the region where the underlayer has been removed. Accordingly, since the underlayer is removed, the height of, for example, the light-shielding layer can be reduced, so that the dispersion of the cell gap becomes smaller.

In addition, in the above-described electrooptical device, the thickness of the underlayer at regions under the bottom surfaces of the recesses is preferably smaller than the thickness of the underlayer at other regions. When the underlayer is completely removed at regions under the bottom surfaces of the openings, there is a possibility that the planarity over the surfaces of the display dots and the surfaces of the boundary regions between the adjacent display dots will be degraded instead of improving. In such a case, recesses are preferably formed instead of forming openings such that the thickness of the underlayer at the regions under the bottom surfaces of the recesses is set to a desired value. Accordingly, the surface planarity can be ensured, so that the dispersion of the cell gap becomes smaller and the rubbing process can be performed easily.

In addition, in the above-described electrooptical device, preferably, the underlayer, at regions under the bottom surfaces of the recesses, is formed with a first insulating layer being provided on the base and the underlayer, at other regions, is formed with the first insulating layer and the second insulating layer being laminated on the first insulating layer. In such a case, even if the recesses are not formed in the first insulating layer, they may be formed at the time when the second insulating layer is formed. Accordingly, the process of forming the first insulating layer can be made simpler.

The first and the second insulating layers are preferably composed of a resin material. In such a case, the resin material for composing the underlayer diffuses light so that the brightness of the display can be increased.

In addition, in the above-described electrooptical device, the reflective layer may include an aperture. In such a case, a transflective electrooptical device can be obtained. Thus, according to the present invention, the planarity over the surfaces of the display dots and the surfaces of the boundary regions between the display dots can be ensured not only in a reflective electrooptical device but also in a transflective electrooptical device, and the dispersion of the cell gap becomes smaller.

In addition, in the above-described electrooptical device, the height of the light-shielding layer is preferably and approximately the same as the height of the underlayer. In such a case, the light-shielding layer and the underlayer are leveled with respect to the base plate, so that the planarity over the surfaces of the display dots and the surfaces of the boundary regions between the display dots can be ensured and the dispersion of the cell gap becomes smaller.

An electronic apparatus according to this aspect of the present invention includes the electrooptical device which is constructed as described above. According to the electrooptical device of the present invention, the planarity over the surfaces of the display dots and the surfaces of the boundary regions between the adjacent display dots can be ensured, so that the contrast of a displayed image can be increased and the displayed image can be viewed easily. Therefore, even when the electronic apparatus including the electrooptical device is used outdoors, for example, when the electronic apparatus is a cellular phone or a personal digital assistant, a clear image can be displayed.

A method for manufacturing a substrate for an electrooptical device according to this aspect of the present invention includes the steps of forming an underlayer on a base in which a plurality of display dots is formed; forming a reflective layer on the underlayer; and forming a light-shielding layer on the base. The underlayer is formed such that the underlayer is provided with recesses or openings at regions between the adjacent display dots, and has irregularly arranged convexities or concavities, and the light-shielding layer is formed to fill the recesses or the openings.

In a prior art substrate for an electrooptical device in which an underlayer is formed uniformly over the base, the height of a light-shielding layer increases and satisfactory planarity cannot be obtained even after laminating an overcoat layer, etc. Accordingly, there is a problem in that the dispersion of a cell gap becomes larger. On the contrary, according to the substrate for the electrooptical device which is constructed as described above, the underlayer includes recesses or openings at regions between the adjacent display dots. The light-shielding layer is disposed to fill the recesses or the openings. Accordingly, the height of the light-shielding layer, for example, can be reduced and the planarity over the surfaces of the display dots and the surfaces of the boundary regions between the display dots can be ensured.

In the above-described method for manufacturing the substrate for the electrooptical device, the bottom of the openings contains a region where the underlayer has been removed. Accordingly, since the underlayer is removed, the height of, for example, the light-shielding layer can be reduced, so that the dispersion of the cell gap becomes smaller.

In addition, in the above-described method for manufacturing the substrate for the electrooptical device, the underlayer is preferably formed such that the thickness of the underlayer at regions under the bottom surfaces of the recesses is smaller than the thickness of the underlayer at other regions. When the underlayer is completely removed at regions under the bottom surfaces of the openings, there is a possibility that the planarity over the surfaces of the display dots and the surfaces of the boundary regions between the adjacent display dots will be degraded instead of improving. In such a case, recesses are preferably formed instead of forming openings such that the thickness of the underlayer at the regions under the bottom surfaces of the recesses is set to a desired value. Accordingly, the surface planarity can be ensured, the dispersion of the cell gap becomes smaller, and the rubbing process can be performed easily.

In addition, in the above-described method for manufacturing the substrate for the electrooptical device, the step of forming the underlayer preferably includes the steps of forming a first insulating layer on the base plate and forming a second insulating layer on the first insulating layer at regions excluding the boundary regions between the adjacent display dots.

In such a case, even if the recesses are not formed in the first insulating layer, they may be formed at the time when the second insulating layer is formed. Accordingly, the process of forming the first insulating layer can be made simpler.

The first and the second insulating layer are preferably composed of a resin material. In such a case, the resin material of the underlayer diffuses light so that the brightness of the display can be increased.

In addition, in the above-described method for manufacturing the substrate for the electrooptical device, the reflective layer may be formed such that the reflective layer includes an aperture. In such a case, a substrate for a transflective electrooptical device can be obtained. Thus, the planarity over the surfaces of the display dots and the surfaces of the boundary regions between the display dots can be ensured not only in a substrate for a reflective electrooptical device, but also in a substrate for a transflective electrooptical device. The dispersion of the cell gap, therefore, also becomes smaller.

In addition, in the above-described method for manufacturing the substrate for the electrooptical device, the light-shielding layer is preferably formed such that the height of the light-shielding layer is approximately the same as the height of the underlayer. In such a case, the light-shielding layer and the underlayer are leveled with respect to the base plate, so that the planarity over the surfaces of the display dots and the surfaces of the boundary regions between the display dots can be ensured and the dispersion of the cell gap becomes smaller.

A method for manufacturing an electrooptical device according to the present invention includes the steps of forming an underlayer on a first base in which a plurality of display dots are formed; forming a reflective layer on the underlayer; forming a light-shielding layer on the base; forming first electrodes on the first base; forming second electrodes on a second base which faces the first base; and forming an electrooptical material layer between the first base and the second base. The underlayer is formed such that the underlayer is provided with recesses or openings at regions between the adjacent display dots. The underlayer also has irregularly arranged convexities or concavities and the light-shielding layer is formed so as to fill the recesses or the openings.

In a prior art substrate for an electrooptical device in which an underlayer is formed uniformly over the base, the height of a light-shielding layer increases and satisfactory planarity cannot be obtained even after laminating an overcoat layer, etc. Accordingly, there is a problem in that the dispersion of a cell gap becomes larger. On the contrary, according to the substrate for the electrooptical device which is constructed as described above, the underlayer includes recesses or openings at regions between the adjacent display dots and the light-shielding layer is disposed so as to fill the recesses or the openings. Accordingly, the height of the light-shielding layer, for example, can be reduced and the planarity ever the surfaces of the display dots and the surfaces of the boundary regions between the display dots can be ensured. As a result, the dispersion of the cell gap becomes smaller and the contrast of a displayed image can be increased.

In the above-described method for manufacturing the electrooptical device, the bottom of the openings contain a region where the underlayer has been removed. Accordingly, since the underlayer is removed, the height of, for example, the light-shielding layer can be reduced. As such, the pla-narity over the surfaces of the display dots and the surfaces of the boundary regions between the display dots can be ensured and the dispersion of the cell gap becomes smaller.

In addition, in the above-described method for manufacturing the electrooptical device, the underlayer is formed such that the thickness of the underlayer at regions under the bottom surfaces of the recesses is preferably smaller than the thickness of the underlayer at other regions. When the underlayer is completely removed at regions under the bottom surfaces of the openings, there is a possibility that the planarity over the surfaces of the display dots and the surfaces of the boundary regions between the adjacent display dots will be degraded instead of improved. In such a case, recesses are preferably formed instead of forming openings such that the thickness of the underlayer at the regions under the bottom surfaces of the recesses is set to a desired value. Accordingly, the surface planarity can be ensured, the dispersion of the cell gap becomes smaller, and the rubbing process can be performed easily.

In addition, in the above-described method for manufacturing the electrooptical device, the step of forming the underlayer preferably includes the steps of forming a first insulating layer on the base plate and forming a second insulating layer on the first insulating layer at regions, excluding the boundary regions, between the adjacent display dots. In such a case, even if the recesses are not formed in the first insulating layer, they may be formed at the time when the second insulating layer is formed. Accordingly, the process of forming the first insulating layer can be made simpler.

The first and the second insulating layer are preferably composed of a resin material. In such a case, the resin material diffuses light so that the brightness of the display can be increased.

In addition, in the above-described method for manufacturing the electrooptical device, the reflective layer is preferably formed such that the reflective layer includes an aperture. In such a case, the planarity over the surfaces of the display dots and the surfaces of the boundary regions between the display dots can be ensured not only in a reflective electrooptical device but also in a transflective electrooptical device, and the dispersion of the cell gap becomes smaller.

In addition, in the above-described method for manufacturing the electrooptical device, the light-shielding layer is preferably formed such that the height of the light-shielding layer is approximately the same as the height of the underlayer. In such a case, the light-shielding layer and the underlayer are leveled with respect to the base plate, so that the planarity over the surfaces of the display dots and the surfaces of the boundary regions between the display dots can be ensured and the dispersion of the cell gap becomes smaller.

BRIEF DESCRIPTION OF THE DRAWINGS

FIG. 7 is a sectional view showing another embodiment in which the present invention is applied to a liquid crystal device, which is an example of an electrooptical device;

DETAILED DESCRIPTION OF THE PREFERRED EMBODIMENTS

Figure 1A:
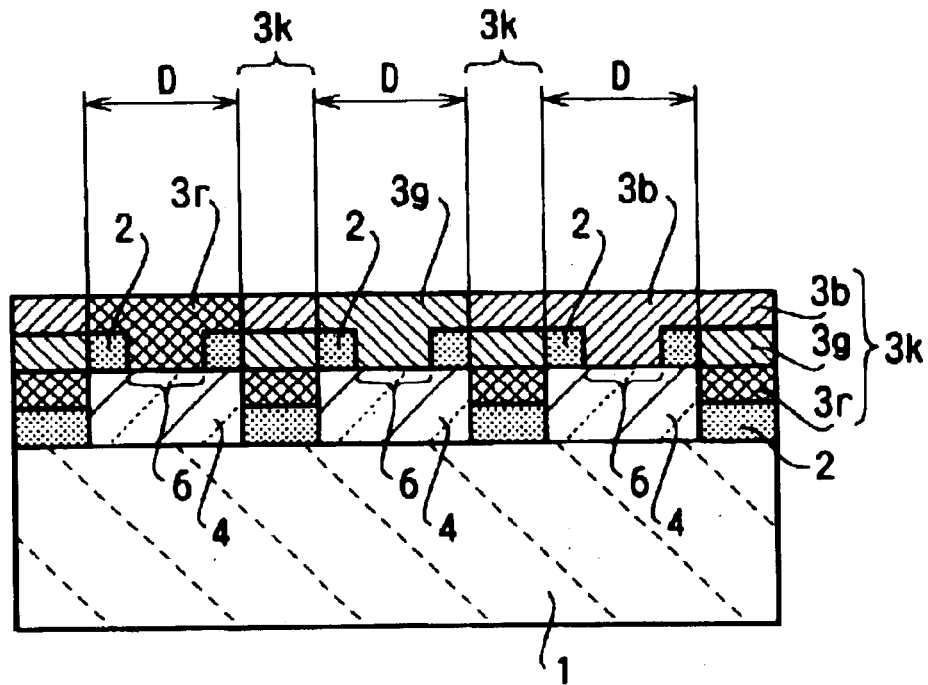
FIG. 1(a) is a diagram showing an embodiment of a substrate for an electrooptical device according to the present invention.

The principle of a substrate for an electrooptical device and an electrooptical device including the substrate in accordance with the present invention will now be described by a liquid crystal device as an embodiment. FIG. 1(a) shows a cross-sectional structure of a portion including several display dots in an exemplary substrate for a liquid crystal device, particularly of a reflective type according to the present invention.

In a typical liquid crystal device, a pair of substrates is bonded to each other with a gap therebetween. More specifically a cell gap with a sealant, and the cell gap is filled with a liquid crystal to form a liquid crystal layer. FIG. 1(a) shows a portion including several display dots of one substrate provided with a reflective layer and color layers, in other words, a color filter substrate.

In FIG. 1(a), an underlying resin scattering layer 4 is formed on a transparent substrate 1 composed of glass, plastic, or the like, and a reflective layer 2 of an aluminum alloy, a silver alloy, or the like is formed thereon. Furthermore, color layers 3r, 3g, and 3b are formed thereon. The color layer 3r transmits red (R) color, the color layer 3g transmits green (G) color, and the color layer 3b transmits blue (B) color. The reflective layer 2 has apertures or slits 6 that allow light from an illuminating unit, namely, a backlight (not shown) disposed below the substrate 1 to pass through.

In a liquid crystal device, generally, a region in which a pair of electrodes faces each other with a liquid crystal layer therebetween defines a display dot or display dots as a minimum display unit. In a color display using R, G, and B primary colors, three display dots corresponding to these colors define one pixel. In a monochromatic display using black and white, one display dot defines one pixel. In FIG. 1(a), display dots are represented by the letter D. A light-shielding layer 3k is often provided between two adjacent display dots D to enhance the display contrast.

In the present invention, the resin scattering layer 4 is provided at regions corresponding to the display dots D but is not provided between the display dots D. In other words, the resin scattering layer 4 is not provided at regions for forming the light-shielding layer 3k. In the structure shown in FIG. 1(a), the light-shielding layer 3k is formed by stacking the three color layers 3r, 3g, and 3b. In this case, the thickness of the stack of the three color layers is considerably larger than that of a region for providing one color layer.

In the present invention, the resin scattering layer 4 is not formed below the reflective layer 2 at regions for forming the light-shielding layer 3k, namely at regions other than the display dots D. The resin scattering layer 4 is formed to cause adequate scattering of the external light reflected by the reflective layer 2. Since the external light is absorbed in the light-shielding layer 3k and does not reach the reflective layer 2, the resin scattering layer 4 is not necessary at the regions for forming the light-shielding layer 3k. The regions for forming the light-shielding layer 3k are not provided with the resin scattering layer 4 and has a reduced thickness; hence, a difference in thickness between the light-shielding layer 3k and the single color layers is decreased, resulting in improved planarity on the surface of the substrate.

In FIG. 1(a), the light-shielding layer 3k is composed of a stack of the three color layers 3r, 3g, and 3b. Alternatively, the light-shielding layer 3k may be formed of a resin black. In case of use of the resin black, the thickness of the layer depends on the type of the liquid crystal device. In general, the thickness of the resin scattering layer 4 is about 2 $\mu$m, the thickness of the color layers is about 1 $\mu$m, and the thickness of the light-shielding layer 3k of the resin black is about 1.0 to 1.5 $\mu$m. Thus, if no resin scattering layer 4 is formed at a position of the light-shielding layer 3k, the thickness of the light-shielding layer 3k decreases about 2 $\mu$m.

Figure 1B:
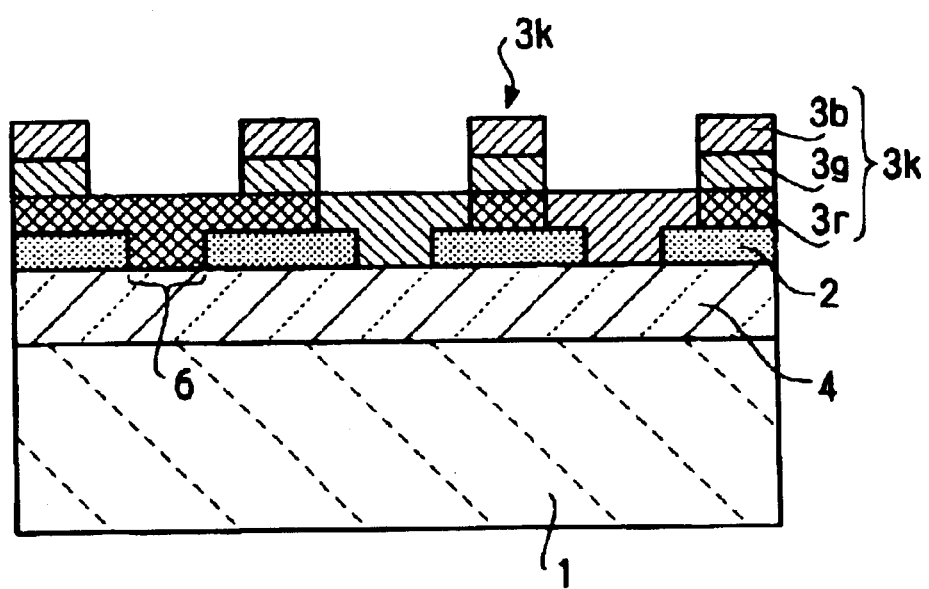
FIG. 1(b) is a diagram showing a comparative example.

For comparison, FIG. 1(b) shows a cross-sectional structure of a color filter substrate provided with a resin scattering layer over its entire surface. In this substrate, a resin scattering layer 4 is formed on an entire surface of the substrate 1. A reflective layer 2 having apertures 6 is formed on the resin scattering layer 4. Furthermore, color layers 3r, 3g, and 3b of R, G, and B colors are stacked on the reflective layer 2 to form a light-shielding layer 3k. As a result, the regions of the light-shielding layer 3k are considerably thicker than the region of each color layer.

In contrast, in the present invention shown in FIG. 1(a), the resin scattering layer 4 is not formed at the position for forming the light-shielding layer 3k; hence, the three color layers 3r, 3g, and 3b constituting the light-shielding layer 3k are formed at a lower position corresponding to the thickness of the resin scattering layer 4. As a result, the thickness of the light-shielding layer 3k decreases so that the light-shielding layer 3k has a slight or substantially no difference in thickness to the adjoining color layers.

In FIGS. 1(a) and 1(b), the thickness of the three color layers 3r, 3g, and 3b and the thickness of the reflective layer 2 are the same, whereas the thickness of the resin scattering layer 4 is the same as two times the thickness of the color layers 3r, 3g, and 3b, for simplicity of description. In actual cases, however, the thickness of the reflective layer 2 is not so large, and the relationship of the thicknesses between the color layers 3r, 3g, and 3b, and the resin scattering layer 4 depends on a particular design. Irrespective of these facts, omission of the resin scattering layer 4 can surely decrease the thickness of the light-shielding layer 3k due to a decrease in the thickness of the resin scattering layer 4.

Figure 2:
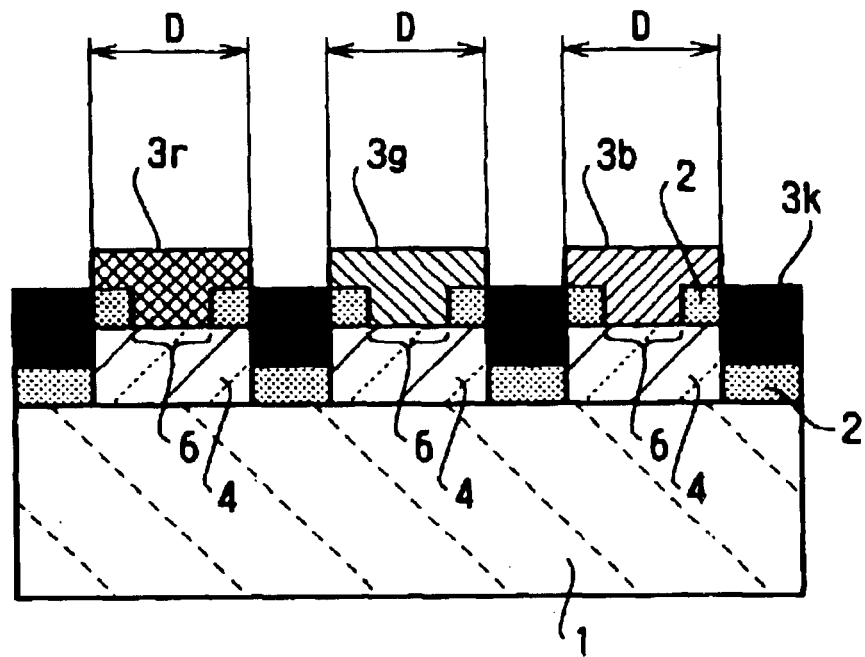
FIG. 2(a) is a diagram showing another embodiment of a substrate for an electrooptical device according to the present invention.
FIG. 2(b) is a diagram showing a comparative example.
Figure 2:
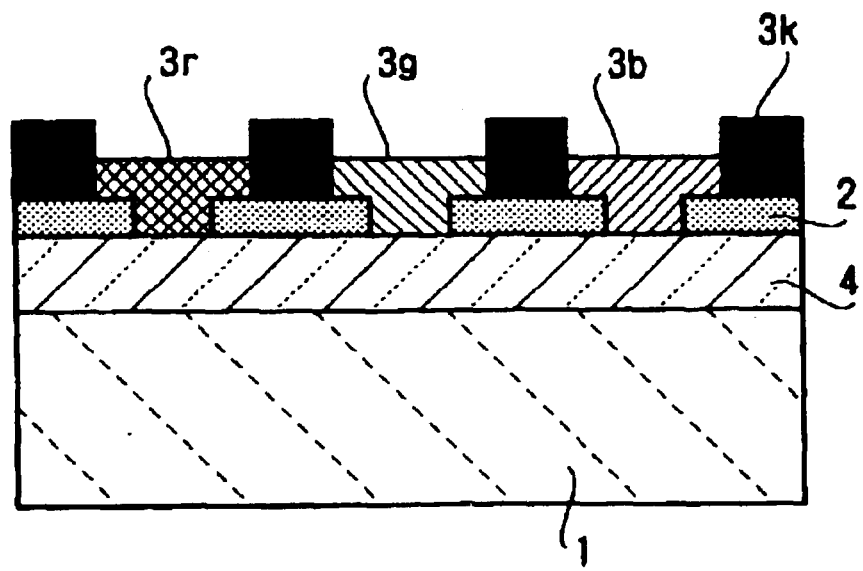

FIG. 2(a) shows an embodiment utilizing a resin black matrix, namely a light-shielding layer composed of resin black. This embodiment is the same as that shown in FIG. 1(a) except that the light-shielding layer 3k is formed of the resin black versus R, G, and B color layers. Resin scattering layer 4 is formed on a substrate 1, but is not formed in regions for forming the light-shielding layer 3k. A reflective layer 2 is formed on the resin scattering layer 4 in regions other than apertures 6, and color layers 3r, 3g, and 3b are formed thereon.

For comparison, FIG. 2(b) shows a cross-sectional structure of a color filter substrate provided with a resin scattering layer 4 over an entire surface of a substrate 1. As shown in the drawing, a resin scattering layer 4 is formed below the light-shielding layer 3k. As a result, the regions of the light-shielding layer 3k are considerably thicker than the region of the color layers 3r, 3g, and 3b.

In contrast, in the present invention shown in FIG. 2(a), the resin scattering layer 4 is not formed below the light-shielding layer 3k. As a result, the thickness at the regions for the light-shielding layer 3k decreases by a thickness corresponding to the thickness of the resin scattering layers 4. In FIG. 2(a), the light-shielding layer 3k is recessed from the adjoining color layers by the reduction in the thickness. However, the thickness of the light-shielding layer 3k, the thickness of the color layers 3r, 3g, and 3b, and the thickness of the reflective layer 2 can be adjusted to further planarize the surface.

The present invention is characterized in that the resin scattering layer 4 is not formed in regions other than display dots D, namely regions for forming the light-shielding layer 3k to smooth the overall thickness of the color filter substrate as much as possible, but does not have an intention that these thicknesses are completely smoothed between the regions for the light-shielding layer 3k and the adjoining color layers.

In practice, the thicknesses of the color layers, the reflective layer, the light-shielding layer, and the resin scattering layer are determined by various factors, and there is no guarantee that the thickness is the same between the region for the light-shielding layer 3k and the color layers. Since the regions for the light-shielding layer 3k are generally thicker than the color layers, omission of the resin scattering layer at the regions for the light-shielding layer 3k ensures a reduced difference in the thickness between the regions for the light-shielding layer 3k and the regions of the color layers. An object of the present invention is to provide a color filter substrate having high planarity by this means.

First Embodiment

Figure 3:
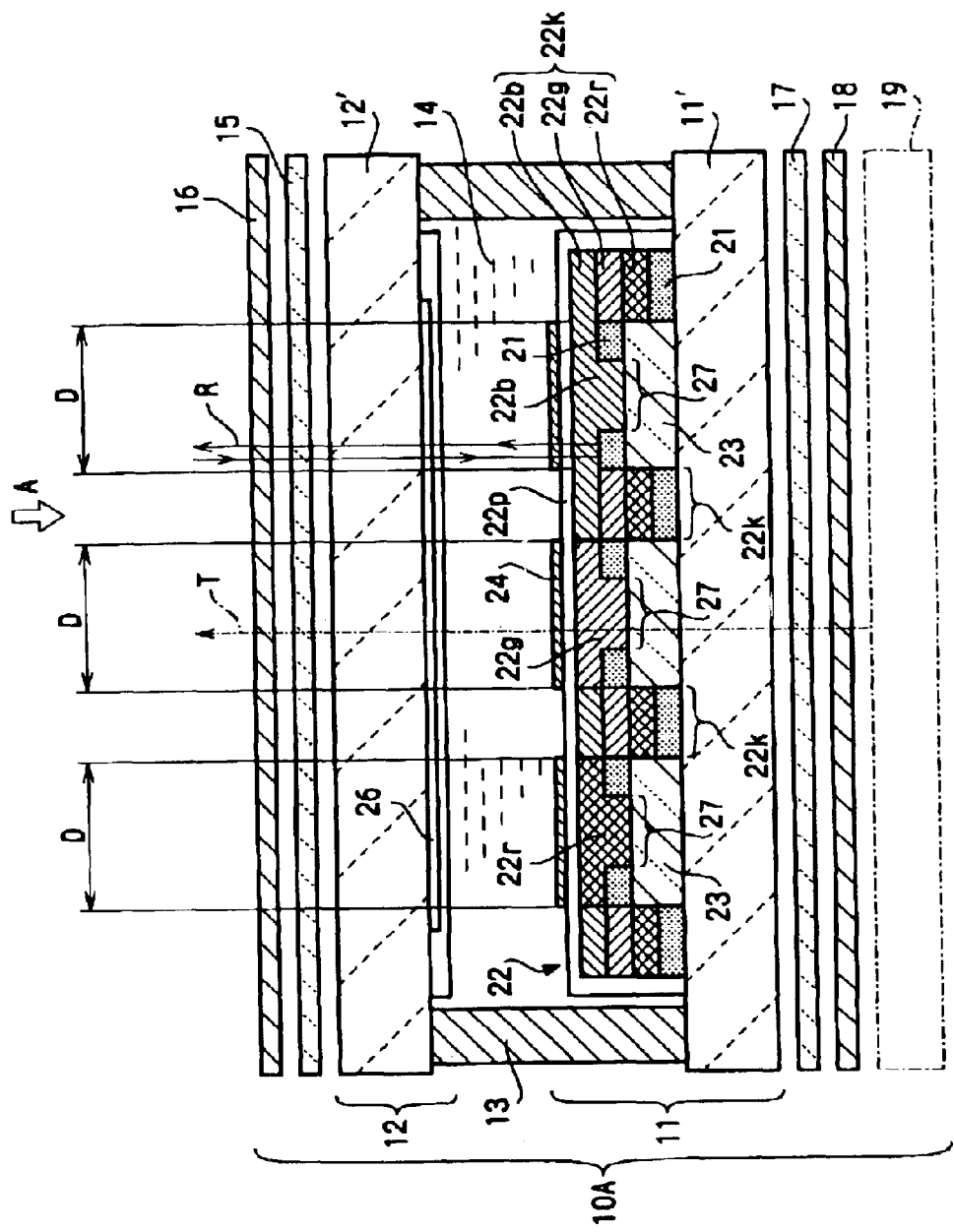
FIG. 3 is a sectional view of an embodiment in which the present invention is applied to a liquid crystal device, which is an example of an electrooptical device.

An embodiment of the color filter substrate shown in FIG. 1(a) that is applied to a transflective liquid crystal device will now be described. Referring to FIG. 3, a liquid crystal device 10A has a substrate 11 and a substrate 12 that are bonded to each other with a sealant 13. These substrates 11 and 12 are produced by forming various elements on base plates 11' and 12' composed of glass, plastic or the like. A liquid crystal is injected between the substrates 11 and 12. The liquid crystal defines a liquid crystal layer 14.

A retardation film 15 and a polarizer 16 are arranged in that order, on the outer face of the substrate 12, whereas a retardation film 17 and a polarizer 18 are arranged on the outer face of the substrate 11. An illumination unit 19 for emitting light for transmissive display as a backlight is disposed below the polarizer 18. A panel assembly formed by bonding the substrate 11 and the substrate 12 has a plurality of display dots D, each being a minimum display unit. These display dots D are arranged in a matrix, when viewed along arrow A, in other words, from a viewer.

On the base plate 11', a transparent resin scattering layer 23 of, for example, acrylic resin or the like is formed as an underlying layer in regions for forming R, G, and B color layers, namely, regions for not forming the light-shielding layer, namely, regions corresponding to the display dots D. A reflective layer 21 is formed thereon. Thus, the reflective layer 21 is formed on the resin scattering layer 23 in the region for forming the color layers and directly on the base plate 11' in the regions for forming the light-shielding layer. On the resin scattering layer 23, the reflective layer 21 has apertures 27 that allow illuminating light from the bottom to pass through.

Color layers 22r, 22g, and 22b are formed on the reflective layer 21 in regions provided with the resin scattering layer 23. A stack of the R, G, and B color layers is formed in regions not provided with the resin scattering layer 23 to form a light-shielding layer 22k. A protective layer 22p is formed over the color layers 22r, 22g, and 22b and the light-shielding layer 22k to protect these layers. The color layers 22r, 22g, and 22b, the light-shielding layer 22k, and the protective layer 22p define a color filter 22. Furthermore, transparent electrodes 24 are formed on the surface of the protective layer 22p of the color filter 22.

As described above, the light-shielding layer 22k is composed of a stack of three color layers and is not provided with the resin scattering layer 23; hence, there is not a large difference in thickness between the light-shielding layer 22k and the color layers, enhancing the planarity of the color filter 22. Furthermore, the protective layer 22p has a reduced thickness, and thus the liquid crystal device 10A also has a reduced thickness.

Transparent electrodes 26 are formed on the inner face of the base plate 12'. The transparent electrodes 26 are perpendicular to the transparent electrodes 24 on the counter substrate 11. Alignment films and other optical elements may be provided on the transparent electrodes 24 of the substrate 11 and the transparent electrodes 26 of the substrate 12, if necessary.

Figure 4:
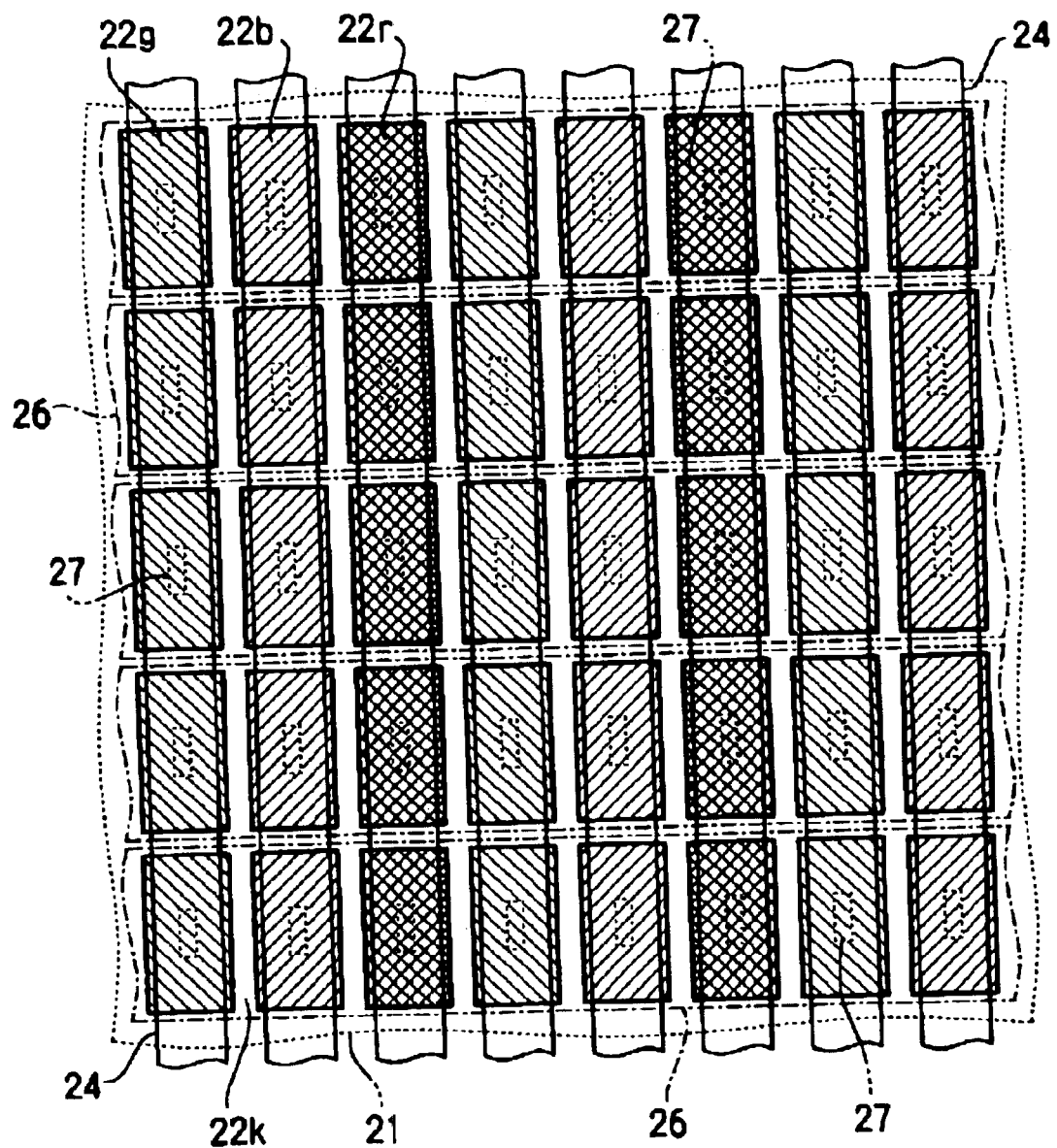
FIG. 4 is a plan view showing the main part of a color filter substrate, which is the main component of the liquid crystal device shown in FIG. 3.

Referring to FIGS. 3 and 4, a structure of the substrate 11 provided with the color filter 22 will now be described in further detail. As shown in FIGS. 3 and 4, a reflective layer 21 with a thickness of about 50 nm to 250 nm is formed in regions corresponding to the color layers 22r, 22g, and 22b of the color filter 22. The reflective layer 21 is a thin film preferably composed of aluminum, an aluminum alloy, or a silver alloy. In the plan view shown in FIG. 4, the reflective layer 21 is formed in regions other than apertures 27 in the color layers 22r, 22g, and 22b.

For example, in a color filter of primary colors, red (R), green (G), and blue (B) color layers 22r, 22g, and 22b each have a thickness of about 0.5 µm to 2.0 µm. These color layers may be arranged in any known arrangement, such as a stripe arrangement, a delta (triangle) arrangement, or a diagonal arrangement for each display dot. The planar structure shown in FIG. 4 represents a color filter with a stripe arrangement.

The protective layer 22p composed of a transparent resin or the like is formed over the color layers 22r, 22g, and 22b. The protective layer 22p protects the color layers from corrosion and contamination by reagents or chemicals during production steps of the color filter substrate and planarizes the surface of the color filter 22. Since a difference in thickness between the regions for the color layers 22r, 22g, and 22b and the regions for the light-shielding layer 22k is small before the formation of the protective layer 22p, the formation of the protective layer 22p with a small thickness ensures planarization of the color filter 22.

A plurality of transparent electrodes 24 composed a transparent conductor material such as indium tin oxide (ITO) is formed on the color filter 22. These transparent electrodes 24 are disposed parallel to each other when viewed from the direction of arrow A, into a stripe pattern. These transparent electrodes 24 are perpendicular to striped transparent electrodes 26 on the base plate 12'. A portion lying at each of the intersections between the transparent electrodes 24 and the transparent electrodes 26 (shown by dotted lines in FIG. 4) of the liquid crystal device 10A, in other words, part of each of the intersections of the reflective layer 21, the color filter 22, the transparent electrode 24, the liquid crystal layer 14, and the transparent electrode 26, constitute one display dot D.

In a reflective display mode of the liquid crystal device 10A, external light incident on a region provided with the reflective layer 21 passes through the device 10A along the reflective path R shown in FIG. 3, is reflected by the reflective layer 21, and is observed by a viewer. In contrast, in a transmissive display mode, illuminating light emerging from an illumination unit 19 passes through the aperture 27 provided in the reflective layer 21 along a path T and is observed by the viewer.

In this embodiment, the arrangement of the color layers 22r, 22g, and 22b of the color filter 22 is not limited to a specific arrangement and may be a stripe arrangement, a delta arrangement, a diagonal arrangement, or the like.

Figure 5:
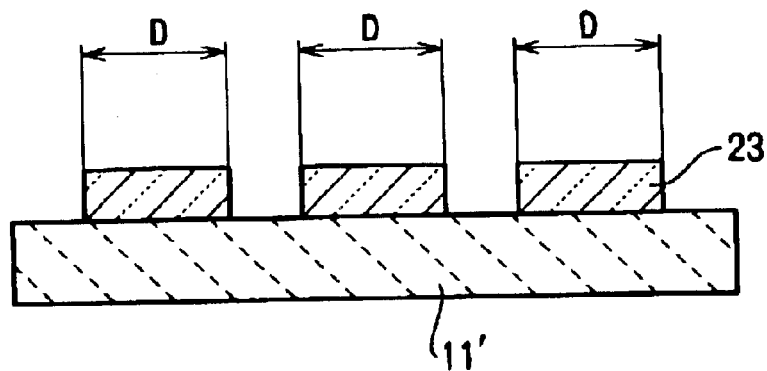
FIG. 5 is a diagram showing an embodiment of a manufacturing method of a substrate for an electrooptical device according to the present invention.
Figure 5:
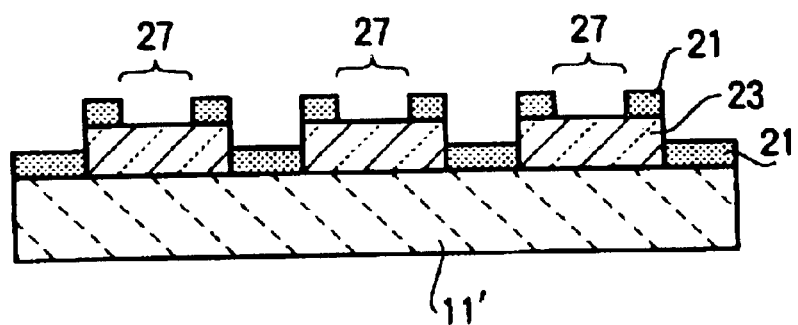
Figure 5:
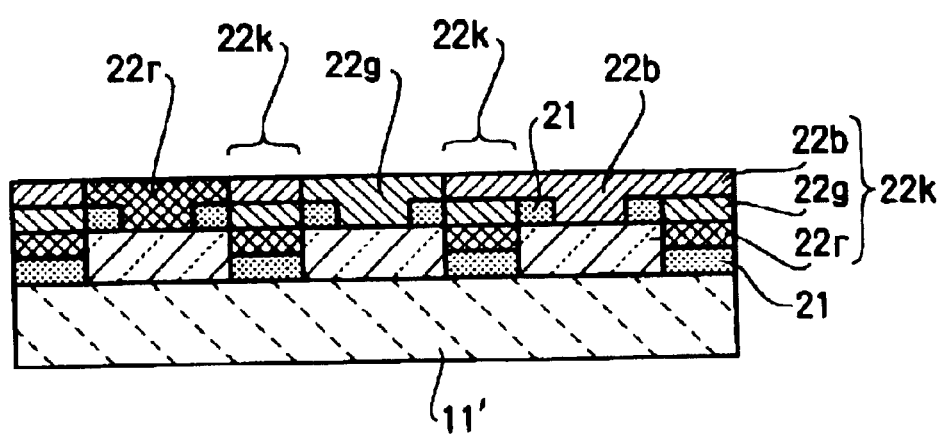

A method for making the liquid crystal device 10A having the above structure will now be described. A method for making the substrate assembly having the resin scattering layer 23, the reflective layer 21, and the color filter 22 as shown in FIG.; 3 will now be described with reference to FIG. 5.

In FIG. 5(a), the resin scattering layer 23 is formed on a surface of the base plate 11'. The resin scattering layer 23 is formed only in regions for forming the color layers, namely in regions corresponding to display dots D. In other words, the resin scattering layer 23 is not formed in regions for forming the light-shielding layer 22k.

The formation of the resin scattering layer 23 will now be described. A resist layer with a given thickness is formed by spin coating and is prebaked. A photomask with a predetermined pattern is then placed upon the resist layer, followed by exposure and development to form a fine profile pattern on the surface of the glass substrate. The base plate 11' is then annealed to smooth irregularities on the base plate 11' by deformation of the corners of the irregularities. It should be understood that the resin scattering layer 23 may be formed by any other method known to one skilled in the art.

Next, a preferable metal such as aluminum, an aluminum alloy, a silver alloy, or the like is deposited into a thin film by a deposition process, a sputtering process, or the like. The thin film is patterned by known photolithography to form a reflective layer 21 with a thickness of about 50 nm to 250 nm as shown in FIG. 5(b). The reflective layer 21 is formed on regions provided with the resin scattering layer 23 (corresponding to the color layers) and on regions not provided with the resin scattering layer 23 (corresponding to the light-shielding layer 22k). On the resin scattering layer 23, the reflective layer 21 is formed in regions other than the apertures 27 (see FIG. 4).

Next, a color photosensitive resin such as a photoresist containing a dispersed pigment or dye of a predetermined color is applied. This is exposed and developed into a predetermined pattern to form color layers 22r, 22g, and 22b with a thickness of about 0.5 µm to 2.0 µm in sequence. After the color layers 22r, 22g, and 22b are formed, stacks of these three layers define the light-shielding layer 22k.

In the step for forming the color layers, a material having a high-leveling property is used as the photosensitive resin and is applied by a method for facilitating planarity, such as a spin coating process. As a result, the surfaces of these color layers are substantially planarized in the display dots D.

As described above, in the liquid crystal device 10A of the present invention, the resin scattering layer 23 is not in regions for the light-shielding layer 22k; hence, the thickness of the light-shielding layer 22k decreases to reduce a difference in thickness to the adjoining color layers. Accordingly, the color filter 22 has improved planarity.

Figure 6:
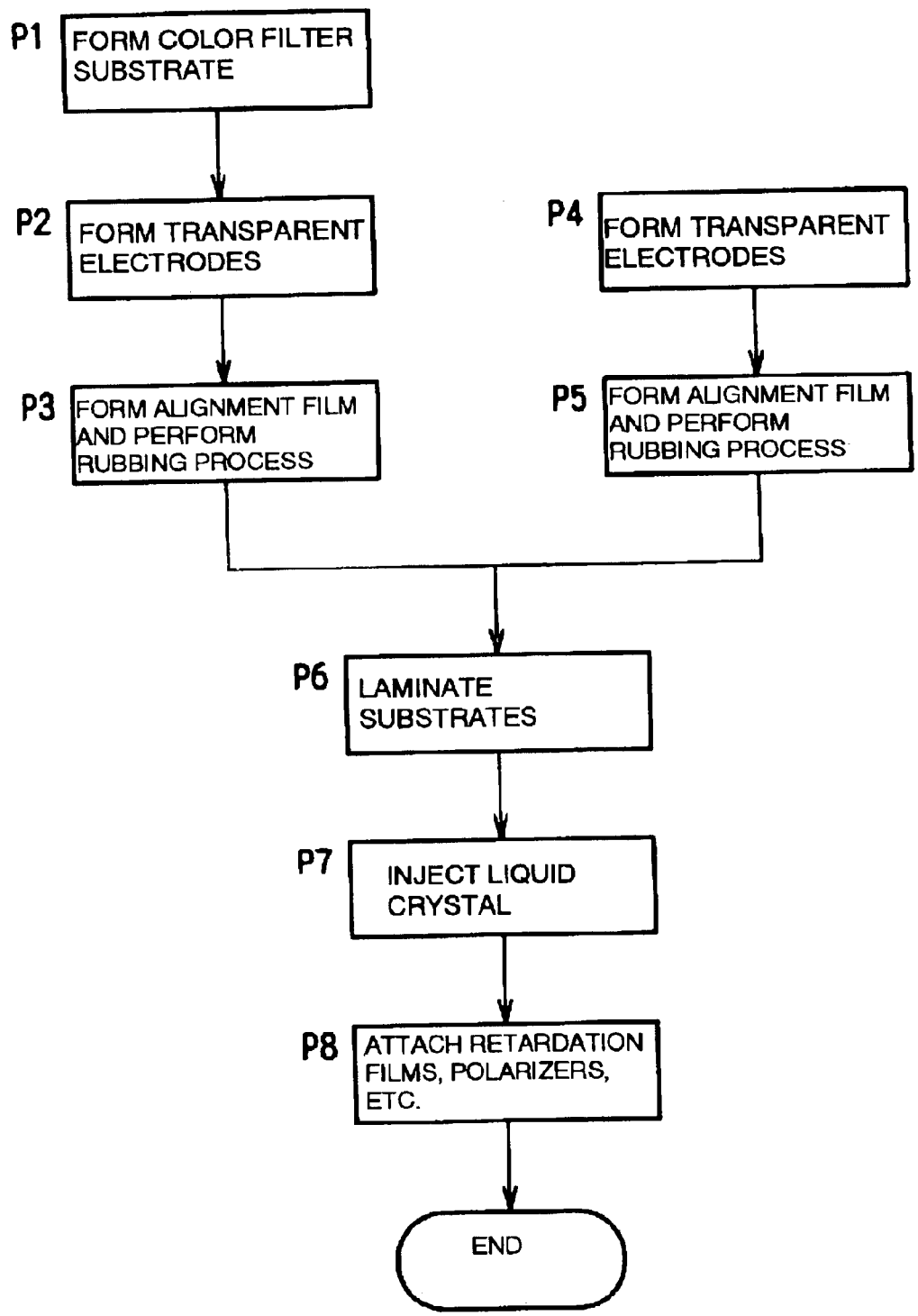
FIG. 6 is a flow chart showing an embodiment of a manufacturing method of a liquid crystal device according to the present invention.

A method for making the liquid crystal device 10A shown in FIG.3 using the resultant color filter substrate will now be described with reference to FIG. 6. FIG. 6 is a flow chart illustrating production steps of the liquid crystal device 10A.

In Step P1, the color filter substrate with the resin scattering layer 23, the reflective layer 21, and the color filter 22 is produced. Next, in Step P2, a transparent conductor is deposited on the color filter 22 of the color filter substrate and is patterned by known photolithography to form the transparent electrodes 24. Next, in Step P3, an alignment film composed of a polyimide resin is formed on the transparent electrodes 24 and subjected to a rubbing process. The substrate 11 is thereby formed.

In order to produce the counter substrate 12, in Step P4, transparent electrodes 26 are formed on the base plate 12'. In Step P5, an alignment film is formed on the transparent electrodes 26 and subjected to a rubbing process. The substrate 12 is thereby formed.

Next, in Step P6, the substrate 11 and the substrate 12 are bonded to each other with, the sealant 13 to form a panel assembly. The substrate 11 and the substrate 12 are bonded to form a given gap by spacers (not shown in the drawing) distributed between the substrates.

Next, in Step P7, a liquid crystal is injected through an opening (not shown) of the sealant 13 to form the liquid crystal layer 14. The opening of the sealant 13 is then sealed with a sealant such as a UV-curable resin. After the main panel assembly is completed in such a manner, in Step P8, retardation films and polarizers are fixed on the outer faces of the panel assembly by a fixing method such as bonding, if necessary. The liquid crystal device 10A shown in FIG. 3 is thereby completed.

Second Embodiment

Another embodiment of the present invention will now be described. As shown in FIG. 2(a), in this embodiment, a color filter substrate having a light-shielding layer composed of resin black is used in a transflective liquid crystal device having a structure shown in FIG. 7.

In FIG. 7, the liquid crystal device 10B has a substrate 31 and a substrate 32 bonded to each other with a sealant 33. These substrates 31 and 32 are produced by forming various elements on base plates 31' and 32' respectively, composed of glass, plastic, or the like. A liquid crystal is injected between the substrates 31 and 32. The liquid crystal defines a liquid crystal layer 34.

A retardation film 35 and a polarizer 36 are arranged in that order on the outer face of the substrate 32, whereas a retardation film 37 and a polarizer 38 are arranged in that order on the outer face of the substrate 31. An illumination unit 39 for emitting light such as a backlight is disposed below the polarizer 38. A panel assembly formed by bonding the substrate 11 and the substrate 12 has a plurality of display dots D; each being a minimum display unit. These display dots D are arranged in a matrix, when viewed along arrow A, in other words, from a viewer.

On the base plate 31', a transparent resin scattering layer 43 formed of, for example, an acrylic resin or the like is formed as an underlying layer in regions for forming R, G, and B color layers, namely, regions for not forming the light-shielding layer, namely, regions corresponding to the display dots D. A reflective layer 41 is formed thereon. Thus, the reflective layer 41 is formed on the resin scattering layer 43 in the region for forming the color layers and directly on the base plate 31' in the regions for forming the light-shielding layer. On the resin scattering layer 43, the reflective layer 41 has apertures 47 that allow illuminating light from the bottom to pass through.

Color layers 42r, 42g, and 42b are formed on the reflective layer 41 in regions provided with the resin scattering layer 43. A light-shielding layer 42k composed of resin black or the like is formed in regions where there is no resin scattering layer 43. A protective layer 42p is formed over the color layers 42r, 42g, and 42b and the light-shielding layer 42k to protect these layers. The color layers 42r, 42g, and 42b, the light-shielding layer 42k, and the protective layer 42p define a color filter 42. Furthermore, transparent electrodes 44 are formed on the surface of the protective layer 42p of the color filter 42.

As described above, the light-shielding layer 42k is not provided in regions that include the resin scattering layer 43; hence, there is not a large difference in thickness between the light-shielding layer 42k and the color layers, enhancing the planarity of the color filter 42. Furthermore, the protective layer 42p has a reduced thickness, and thus the liquid crystal device 10B has a reduced thickness.

Transparent electrodes 46 are formed on the inner face of the base plate 32'. The transparent electrodes 46 are perpendicular to the transparent electrodes 44 on the counter base plate 31'. Alignment films and other optical elements may be provided on the transparent electrodes 44 on the substrate 31 and the transparent electrodes 46 on the substrate 32, if necessary.

Since the planar structure of the liquid crystal device 10B shown in FIG. 7 is substantially the same as that of the liquid crystal device 10A shown in FIG. 4, the description thereof will be omitted. Also in this embodiment, the arrangement of the color layers in the color filter is not limited to a specific arrangement and may be a stripe arrangement, a delta arrangement, a diagonal arrangement, or the like.

A method for making the liquid crystal device 10B will now be described. A method for making the substrate assembly having the resin scattering layer 43, the reflective layer 41, and the color filter 42 as shown in FIG. 7 will now be described with reference to FIG. 8.

Figure 8A:
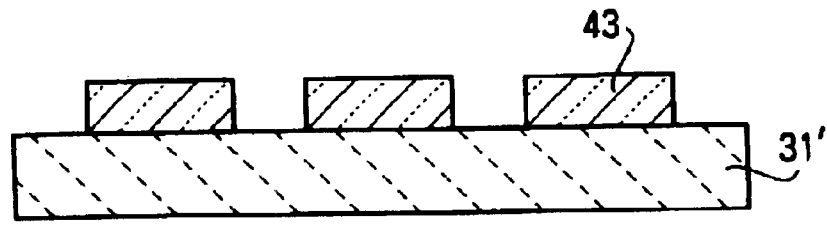
FIG. 8 is a diagram showing another embodiment of a manufacturing method of a substrate for an electrooptical device according to the present invention.

In FIG. 8(a), the resin scattering layer 43 is formed on a surface of the base plate 31'. The resin scattering layer 43 is formed only in regions for forming color layers, namely in regions corresponding to display dots D. In other words, the resin scattering layer 43 is not formed in regions for forming the light-shielding layer 42k. The resin scattering layer 43 is formed by the same method shown in FIG. 5.

Figure 8B:
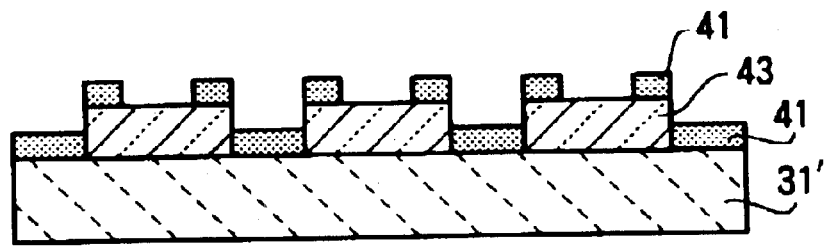

Next, a preferable metal such as aluminum, an aluminum alloy, a silver alloy, or the like is deposited into a thin film by a deposition process, a sputtering process, or the like. The thin film is patterned by known photolithography to form a reflective layer 41 with a thickness of about 50 nm to 250 nm as shown in FIG. 8(b). The reflective layer 41 is formed on regions provided with the resin scattering layer 43 (corresponding to the color layers) and on regions not provided with the resin scattering layer 43 (corresponding to the light-shielding layer 42k). On the resin scattering layer 43, the reflective layer 41 is formed in regions other than the apertures 47.

Figure 8C:
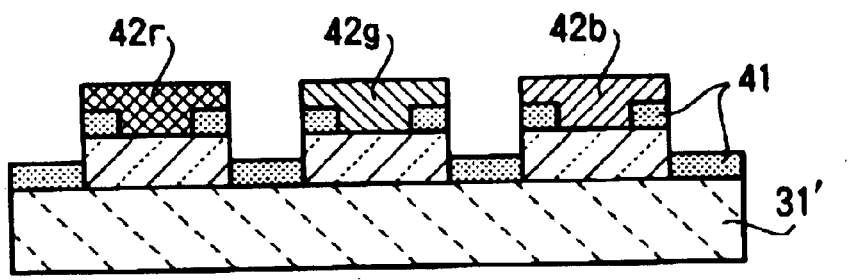
Figure 8D:
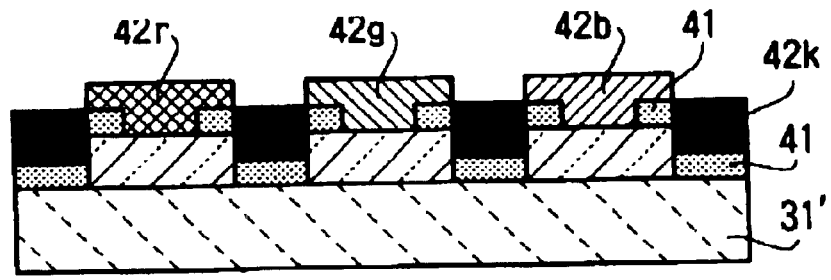

Next, a color photosensitive resin such as a photoresist containing a dispersed pigment or dye having a predetermined color is applied. This is exposed and developed into a predetermined pattern to form color layers 42r, 42g, and 42b with a thickness of about 0.5 μm to 2.0 μm in sequence as shown in FIG. 8(c). Next, the light-shielding layer 42k composed of a resin black or the like is formed as shown in FIG. 8(d). The protective layer 42p is formed thereon.

As described above, the resin scattering layer 43 is not formed in the region for the light-shielding layer 42k in the liquid crystal device 10B according to the present invention; hence, the total thickness of the light-shielding layer 42k decreases to reduce a difference in thickness to the adjoining color layers. Accordingly the color filter 42 has improved planarity.

Since a method for making the liquid crystal device 10B shown in FIG. 7 using the resultant color filter substrate is the same as that in the embodiment described with reference to FIG. 6, the description thereof is omitted.

Third Embodiment

Figure 9:
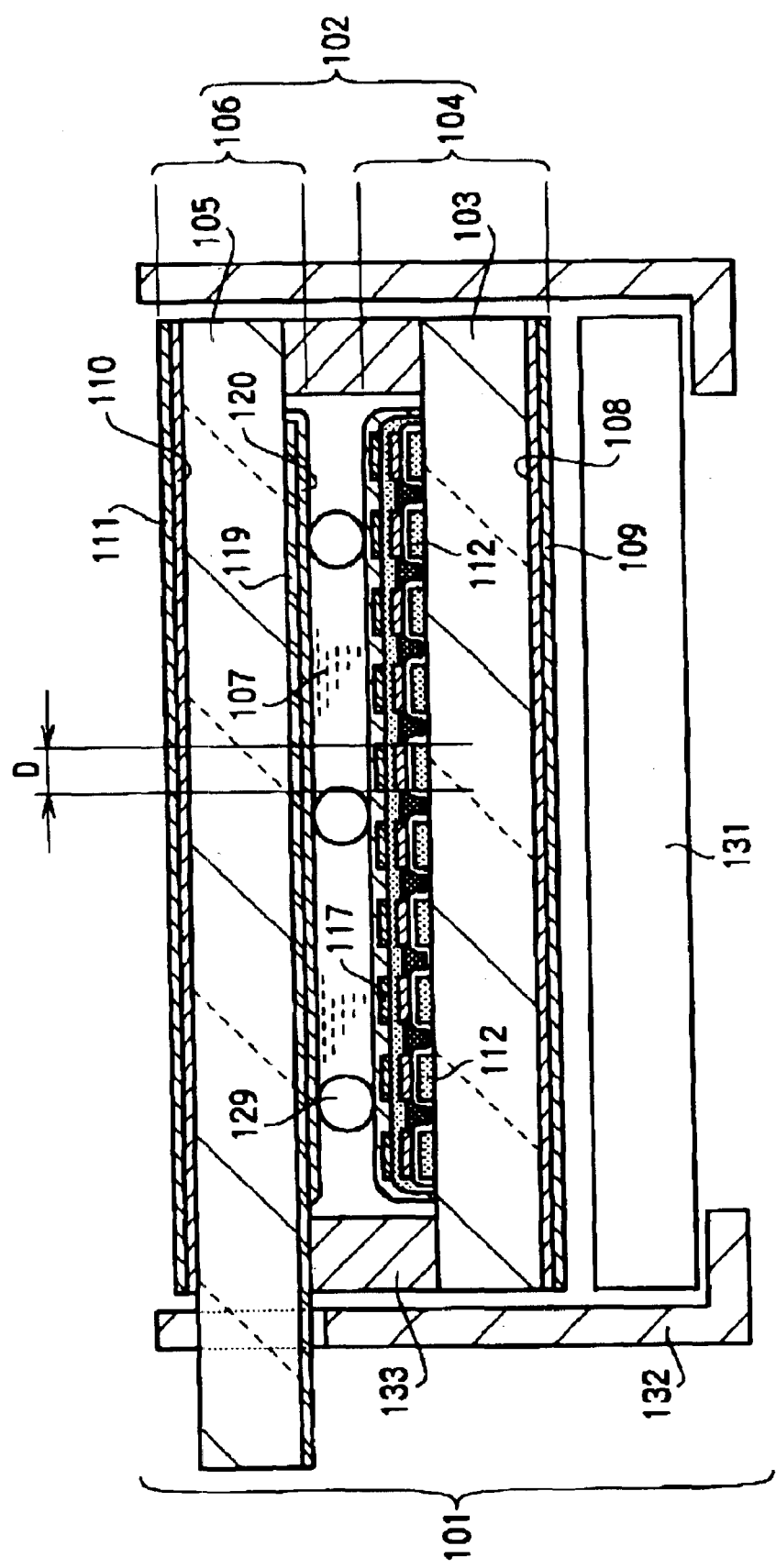
FIG. 9 is a sectional view showing another embodiment in which the present invention is applied to a liquid crystal device, which is an example of an electrooptical device.
Figure 10:
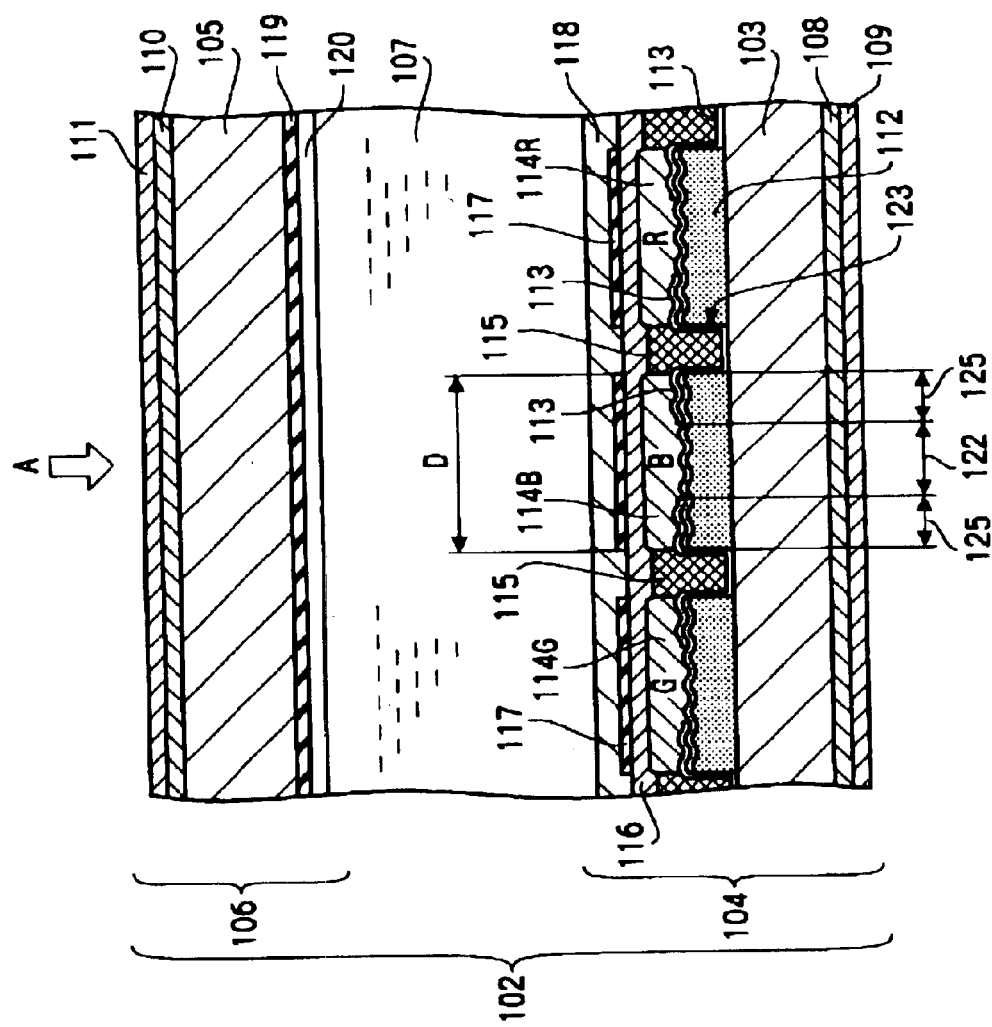
FIG. 10 is a sectional view showing the cross-sectional structure of the main part of a liquid crystal device according to an embodiment of an electrooptical device of the present invention.
Figure 11:
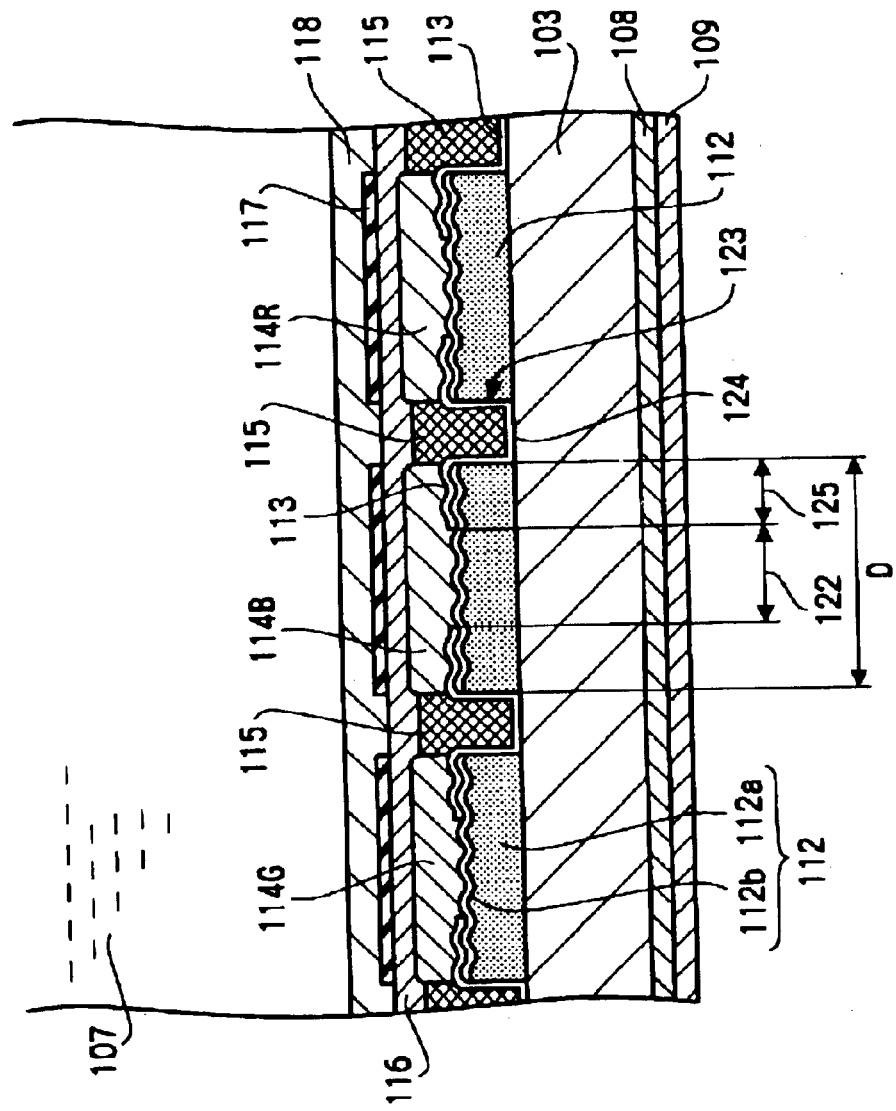
FIG. 11 is a sectional view showing the main part of a color filter substrate included in the liquid crystal device shown in FIG. 10.
Figure 12:
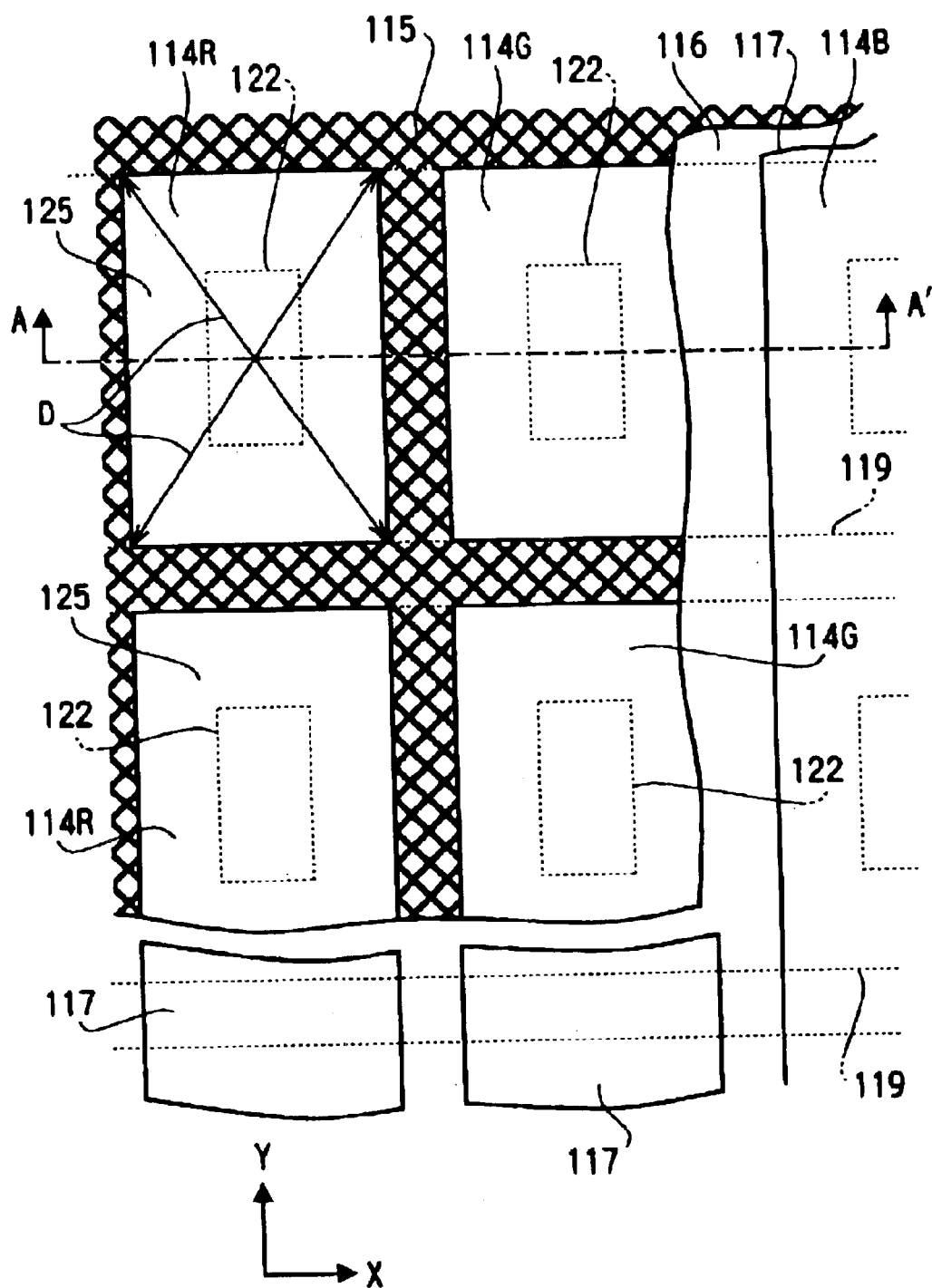
FIG. 12 is a partially broken plan view showing the planar structure of the liquid crystal device shown in FIG. 10.
Figure 13:
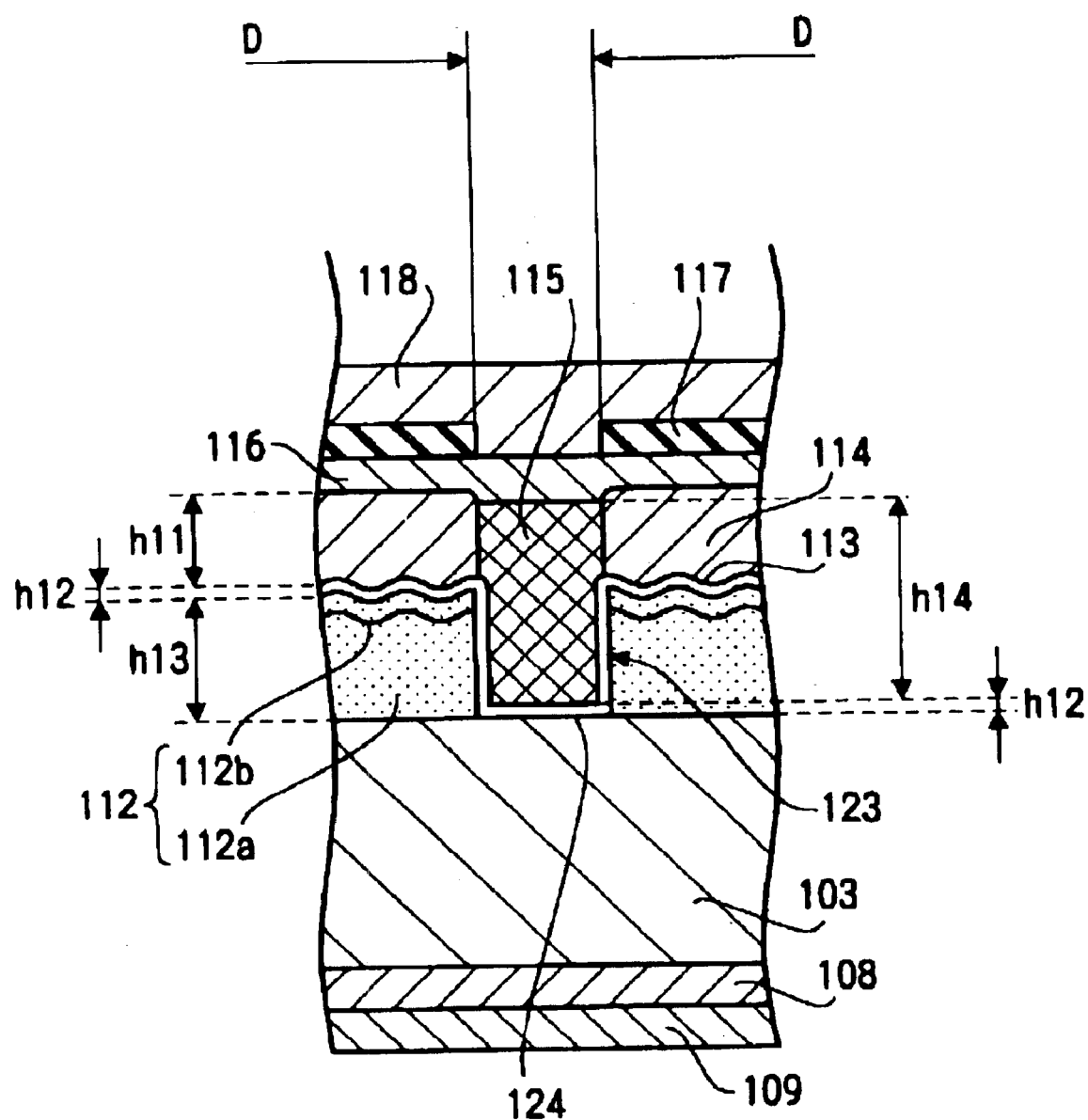
FIG. 13 is a sectional view showing the main part of the color filter substrate shown in FIG. 11.
Figure 14:
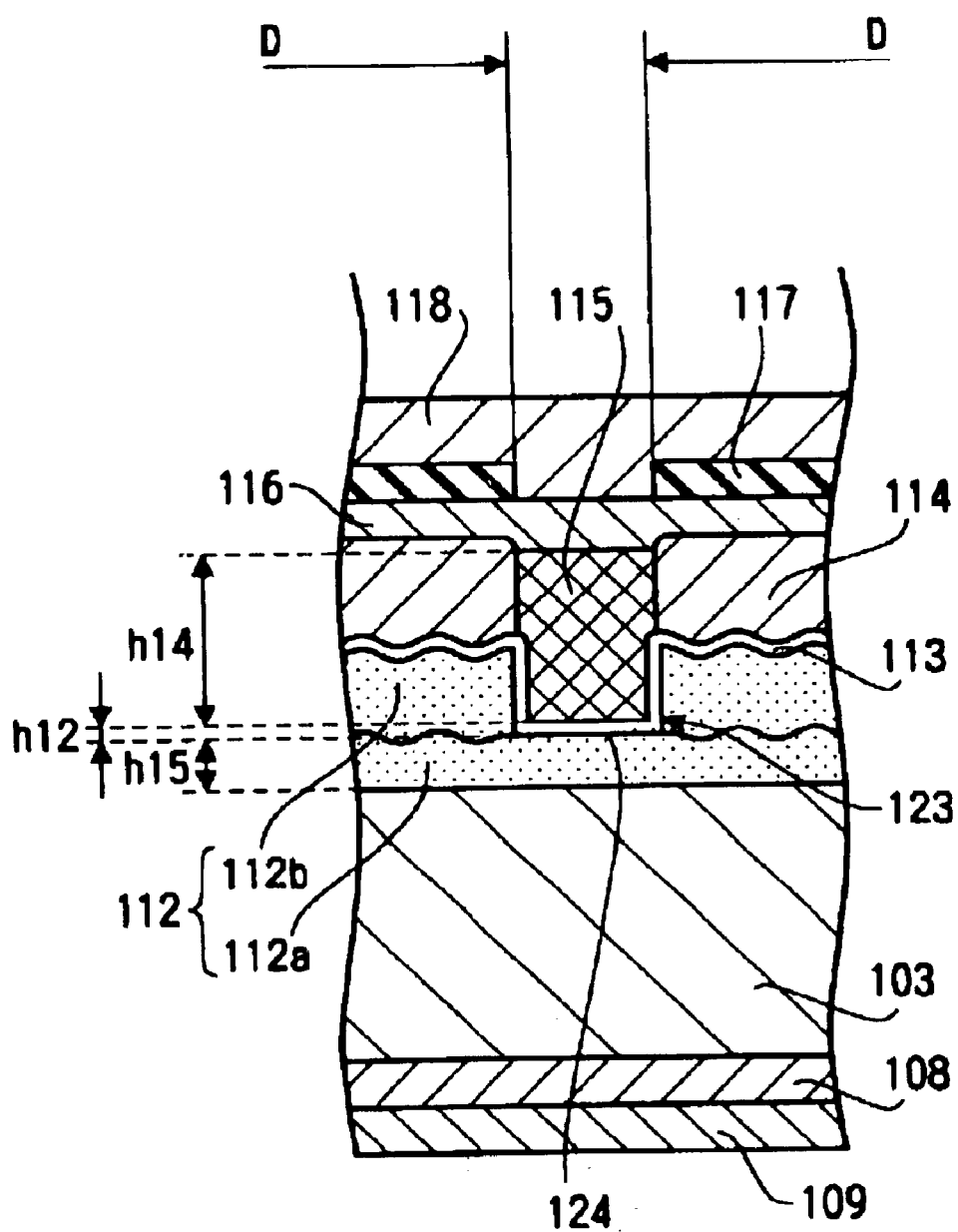
FIG. 14 is a sectional view showing a modification of the structure shown in FIG. 13.
Figure 15:
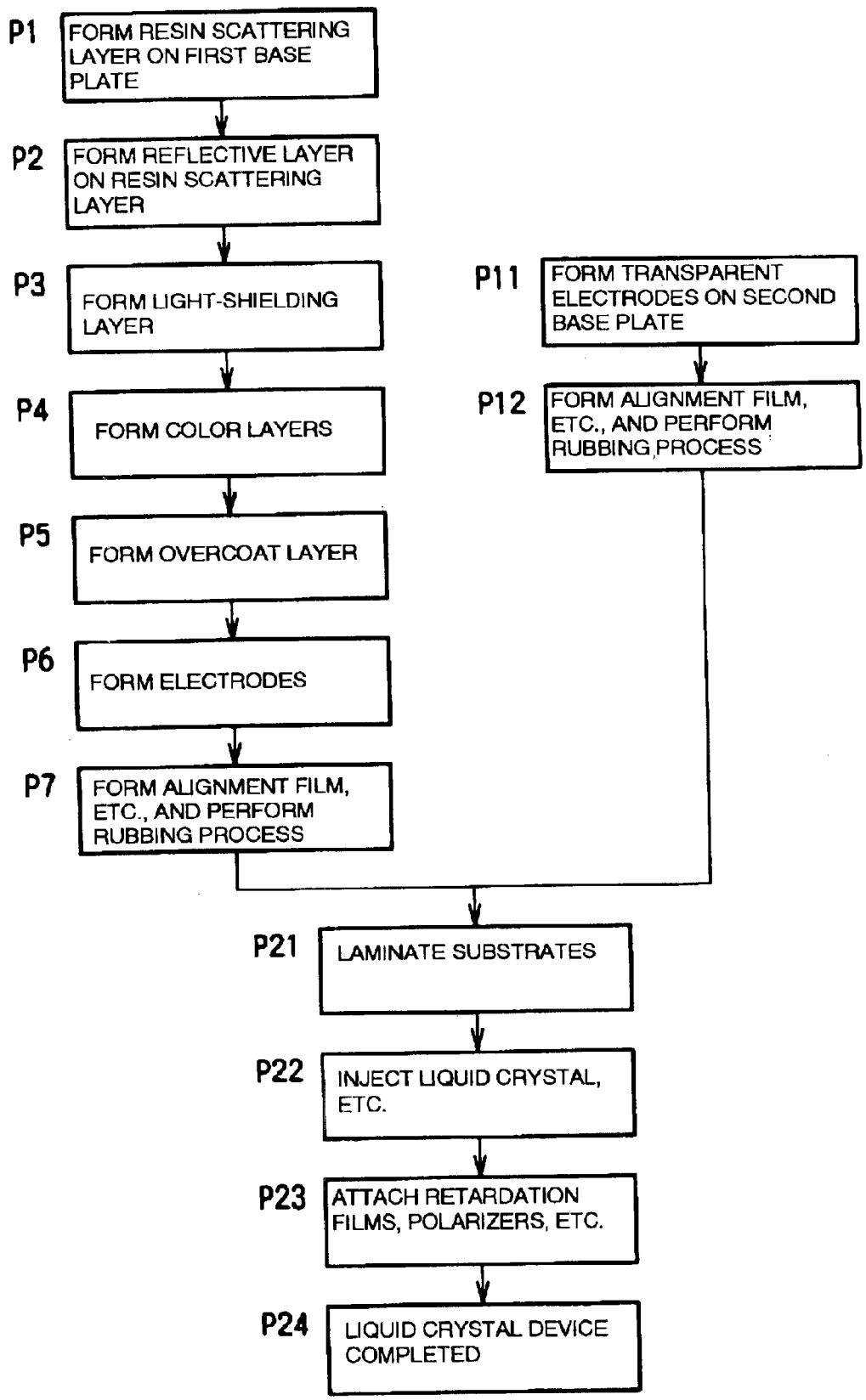
FIG. 15 is a flow chart showing a method for manufacturing the liquid crystal device shown in FIG. 10.

Next, an embodiment in which the present invention is applied to a transflective passive-matrix liquid crystal device will be described. FIG. 9 is a sectional view of the liquid crystal device. FIG. 10 is a sectional view of a liquid crystal panel included in the liquid crystal device. FIG. 11 is a sectional view of a substrate for the liquid crystal device, more specifically, a color filter substrate which is included in the liquid crystal panel shown in FIG. 10. FIG. 12 is an enlarged view of a pan of the liquid crystal panel. FIG. 10 corresponds to a sectional view of FIG. 12 cut along line A–A'. FIG. 13 is an enlarged sectional view of a part of a light-shielding layer from which an underlayer is completely removed. FIG. 14 is an enlarged sectional view of a part of the light-shielding layer from which the underlayer is partially removed. FIG. 15 is a flow chart showing a method for manufacturing the liquid crystal device according to the present embodiment.

Referring to FIG. 9, a liquid crystal device 101 includes a transflective liquid crystal panel 102, an illuminating unit 131 which is provided as necessary, and a housing 132 which retains the liquid crystal panel 102 and the illuminating unit 131.

As shown in FIG. 10, the liquid crystal panel 102 includes a color filter substrate 104 and an opposing substrate 106 which oppose each other and which are laminated with a sealing member 133 (see FIG. 9) therebetween. The color filter substrate 104 includes a first base plate 103 which is a transparent plate composed of glass, synthetic resin, etc., and the opposing substrate 106 includes a second base plate 105. In addition, a liquid crystal layer 107 is formed by injecting liquid crystal into a gap between the color filter substrate 104 and the opposing substrate 106. A retardation film 108 and a polarizer 109 are disposed on the outer surface of the first base plate 103, and a retardation film 110 and a polarizer 111 are disposed on the outer surface of the second base plate 105.

As shown in FIGS. 10, 11, and 12, in the color filter substrate 104, an underlayer 112 is formed on the surface of the first base plate 103 which faces the liquid crystal layer 107 and a reflective layer 113 is formed on the surface of the underlayer 112. In addition, regions where the reflective layer 113 is formed on the surface of the underlayer 112 serve as reflective portions 125, and apertures 122 formed in the reflective layer 113 serve as transmissive portions.

A green layer 114G, a blue layer 114B, and a red layer 114R are formed on the reflective layer 113 in a predetermined configuration pattern. In the following descriptions, these color layers may be generically denoted by reference numeral "114". A light-shielding layer 115 is formed so as to cover the boundary regions between the adjacent color layers 114. In addition, an overcoat layer 116 is provided on the color layers 114 and the light-shielding layer 115 to protect them. In addition, transparent electrodes 117 composed of a transparent conductive material such as indium tin oxide (ITO) are formed on the overcoat layer 116, and an alignment film 118 composed of a polyimide resin, etc., is formed on the transparent electrodes 117.

As shown in FIGS. 10 and 12, in the opposing substrate, 106, transparent electrodes 119 are formed on the surface of the second base plate 105 which faces the liquid crystal layer 107 in such a manner that the transparent electrodes 119 are perpendicular to the transparent electrodes 117 on the first base plate 103 (that is, in the X direction in FIG. 12). In addition, an alignment film 120 is formed on the transparent electrodes 119. The transparent electrodes 117 are arranged parallel to each other in a striped pattern as viewed from a direction shown by A, and the transparent electrodes 119 are arranged parallel to each other in a striped pattern as viewed from the direction shown by A such that the transparent electrodes 119 are perpendicular to the transparent electrodes 117. Areas where the transparent electrodes 117 on the first base plate 103 and the transparent electrodes 119 on the second base plate 105 intersect serve as display dots D, and a single display dot D serves as a minimum display unit.

The underlayer 112 in the color filter substrate 104 is composed of a resin material and includes a lower layer 112a and an upper layer 112b, as shown in FIG. 13. In the underlayer 112, small irregularities are formed in the surface of the lower layer 112a, and the upper layer 112b is formed by covering the lower layer 112a with a thin layer composed of the same material as the lower layer 112a. Accordingly, smooth irregularities are formed in the surface of the underlayer 112. The underlayer 112 serves to scatter light which passes therethrough, so that the problem in that the displayed image cannot be viewed clearly can be solved.

The reflective layer 113 is preferably composed of an elemental metal such as aluminum and silver or is formed on the underlayer 112. The surface of the reflective layer 113 also has small irregularities corresponding to those in the surface of the underlayer 112. Therefore, light reflected by the reflective layer 113 is also scattered, so that the problem in that the displayed image cannot be viewed clearly can be solved.

As shown in FIG. 12, for example, the reflective layer 113 has the apertures 122 having an approximately rectangular shape at the central regions of the display dots D, and the apertures 122 serve as transmissive portions for transmitting light. Planar light emitted from the illuminating unit 131 shown in FIG. 9 passes through the apertures 122 and is supplied to the liquid crystal layer 107. The shape of the apertures 122 is not limited to this example, and the apertures 122 may have other shapes such as a circle. In addition, the number of apertures 122 is not limited to one, and a plurality of apertures 122 may also be formed.

With reference to FIG. 10, the color layers 114 are formed by applying a color resist composed of a photosensitive resin including a colorant such as a pigment and a dye and forming a pattern by using photolithography techniques. In this patterning process, portions for covering the apertures 122, which allow light which is emitted from the illuminating unit 131 and travels through the first base plate 103 to pass therethrough, and portions for covering the reflective layer 113 at regions around the apertures 122 are formed. When the color layers 114 corresponding to three colors (R, G, and B) are provided as in the present embodiment, the above-described patterning process is performed for each color.

Although the color layers 114 are arranged in an oblique mosaic pattern in FIG. 12, they may also be arranged in other various patterns including a striped pattern, a digital pattern, etc.

With reference to FIG. 10, the light-shielding layer 115 is formed so as to cover the boundary regions between the display dots D, and serves to prevent light from passing through the boundary regions. The light-shielding layer 115 includes band-shaped portions which extend along the longitudinal direction of the transparent electrodes 117 formed on the first base plate 103 (that is, the Y direction in FIG. 12), and band-shaped portions which extend and intersect along the direction perpendicular to this direction (that is, the X direction in FIG. 12).

The light-shielding layer 115 is composed of a resin black obtained by dispersing chromium metal, carbon, titanium, etc., in a photoresist, or are formed of a metallic material such as nickel. The light-shielding layer 115 may also be referred to as a black matrix or a black mask.

In addition, as shown in FIG. 13, the light-shielding layer 115 is formed so as to fill openings 123 formed in the underlayer 112 at the boundary regions between adjacent display dots D. The height of the light-shielding layer 115 from the surface of the first base plate 103 which faces the liquid crystal layer 107 is set such that the surfaces of the color layers 114 and the light-shielding layer 115 are level with each other.

For example, with reference to FIG. 13, when (1) h11 is the thickness of the adjacent color layers 114, h12 is the thickness of the reflective layer 113, and h13 is the thickness of the underlayer 112, if (2) the sum of the thickness h14 of the light-shielding layer 115 and the thickness h12 of the reflective layer 113 is approximately the same as the sum of h11, h12, and h13, the planarity over the surfaces of the display dots D and the surface of the light-shielding layer 115 is ensured. Accordingly, the dispersion of the cell gap becomes small and a rubbing process can be performed easily. As a result, the contrast of an image displayed by the liquid crystal device increases.

The concave areas in the underlayer 112 in which the light-shielding layer 115 is formed is not limited to the openings 123 shown in FIG. 13. Recesses 123 shown in FIG. 14 may be provided instead. In such a case, the underlayer 112 is not completely removed at regions under bottom surfaces 124 of the recesses 123. Also in this case, the height of the light-shielding layer 115 is reduced by the amount corresponding to the depth of the recesses 123.

For example, with reference to FIG. 14, when h15 is the thickness of the underlayer 112 at regions under the bottom surfaces 124 of the recesses 123, if the light-shielding layer 115 is formed such that the sum of the thickness h14 of the light-shielding layer 115 and the thickness h12 of the reflective layer is approximately the same as the sum of the thickness h11 of the color layers 114, the thickness h12 of the reflective layer, and the thickness h13 of the underlayer 112, the planarity over the surfaces of the display dots D and the surface of the light-shielding layer 115 is ensured. Accordingly, the dispersion of the cell gap becomes small and a rubbing process can be performed easily. As a result, the contrast of an image displayed by the liquid crystal device increases.

The display dots D are regions surrounded by the light-shielding layer 115, and each display dot D includes one of the color layers 114 corresponding to R, G, and B, the reflective layer 113, and the aperture 122. A single pixel is constructed of three display dots D including the color layers 114 corresponding to R, G, and B.

In the present embodiment, with reference to FIG. 9, one of a scan signal and a data signal is supplied to the transparent electrodes 119 formed on the second base plate 105, and the other of the scan signal and the data signal is supplied to the transparent electrodes 117 formed on the first base plate 103. Accordingly, the liquid crystal is driven only at regions corresponding to the display dots D where the transparent electrodes 119 and the transparent electrodes 117 intersect.

With reference to FIG. 10, in reflective display, external light enters the liquid crystal layer 107 from the side where the opposing substrate 106 is disposed, passes through the color layers 114, and is reflected by the reflective layer 113. The reflected light is modulated by the liquid crystal layer 107 in units of a display dot D, passes through the opposing substrate 106, and is emitted to the outside. According to the present embodiment, since the overcoat layer 116 is planar, a high-contrast image can be displayed by the light emitted to the outside through, the opposing substrate 106.

In transmissive display, light emitted from the illuminating unit 131 (see FIG. 9) passes through the first base plate 103 and the transmissive portions 122, and enters the liquid crystal layer 107. The light is modulated by the liquid crystal layer 107 in units of a display dot D, passes through the transparent electrodes 119 and the second base plate 105, and is emitted to the outside. Accordingly, a high-contrast image can be displayed by the emitted light. The emitted light is colored in corresponding colors by the color layers 114 which cover the reflective layer 113 and the transmissive portion 122.

In the present embodiment, the underlayer 112 is formed such that the openings 123 (FIG. 13) or the recesses 123 (FIG. 14) are provided at the boundary regions between the adjacent display dots D. Accordingly, the height of the light-shielding layer 115 can be reduced by the amount corresponding to the depth of the openings 123 or the recesses 123. Therefore, the planarity over the surfaces of the display dots D and the surfaces of the boundary regions between the display dots D can be ensured.

In the case in which the underlayer 112 is not completely removed at regions under the bottom surfaces 124 of the recesses 123, as shown in FIG. 14, the underlayer 112 may be constructed of a first insulating layer 112a and a second insulating layer 112b which is formed on the first insulating layer 112a such that recesses 123 are formed. Also in this case, the roughness of the top surface of the overcoat layer 116 can be reduced, so that the dispersion of the cell gap becomes small and the rubbing process can be performed easily. As a result, the contrast of an image displayed by the liquid crystal device can be increased.

Manufacturing Method of the Liquid Crystal Device

Next, a manufacturing method of the liquid crystal device according to the present embodiment will be described with reference to a flow chart shown in FIG. 15. First, in Step P1 in FIG. 15, the underlayer 112, which serves as a resin scattering layer, is formed on the first base plate 103. The underlayer 112 is etched by using a photoresist in order to form a pattern such that the openings 123 are formed in the underlayer 112, as shown in FIG. 13, or the recesses 123 are formed in the underlayer 112, as shown in FIG. 14, at the boundary regions between the display dots D in which the light-shielding layer 115 is to be formed.

This will be described in more detail below. A resin material is uniformly applied to the first base plate 103 by spin coating, and then a resist is applied. Then, the resist is exposed to light through a photomask having a predetermined pattern, and is developed. Then, a plurality of holes are formed in the underlayer 112 by etching.

Next, heat is applied to the underlayer 112 so that the holes deform and become smooth, and the lower layer 112a of the underlayer 112 having irregularities in the surface thereof is thus obtained. Then, the upper layer 112b of the underlayer 112 is formed by applying the resin material such that smooth irregularities are formed in the surface of the underlayer 112.

Then, a resist is applied to the underlayer 112, is exposed to light through a photomask having a predetermined pattern, and is developed. Then, the recesses 123 are formed in the underlayer 112 by an etching process at regions where the light-shielding layer 115 is to be formed.

Next, in Step P2, a thin film of aluminum, etc., is formed on the underlayer 112 by using deposition techniques or sputtering techniques, and a pattern is formed by using photolithography techniques such that the approximately rectangular apertures 122 are formed at the central regions of the display dots D, as shown in FIG. 12, and the reflective layer 113 is formed at regions surrounding the apertures 122.

Next, in Step P3, a light-shielding material is applied to the underlayer 112 having the recesses 123 and the reflective layer 113. The light-shielding material can be obtained by, for example, dispersing carbon black, etc., in a resin. Then, a pattern is formed by using photo-etching techniques such that the light-shielding layer 115 is formed so as to fill the recesses 123 of the underlayer 112.

Next, in Step P4, a coloring material for one of the colors is applied to the reflective layer 113 and the apertures 122 by spin-coating, and then a resist is applied. The resist is exposed to light through a photomask having a predetermined pattern, and is developed. Then, etching is performed so as to form the color layers 114. The above-described process is repeated for each color of R, G, and B, so that the color layers corresponding to R, G, and B are formed in a desired configuration pattern.

Next, in Step P5, the overcoat layer 116 is formed on the color layers 114. In the present embodiment, since the light-shielding layer 115 is formed so as to fill the recesses 123 in the underlayer 112, the height of the light-shielding layer 115 can be reduced by the amount corresponding to the depth of the recesses 123. Therefore, when the overcoat layer 116 is formed in this process, the planarity of the surface of the overcoat layer 116 can be ensured. Accordingly, the dispersion of the cell gap becomes small and the rubbing process can be performed easily. As a result, the contrast of an image displayed by the liquid crystal device can be increased.

Next, in Step P6, a material of the transparent electrodes 117, such as ITO, is applied to the overcoat layer 116 by using sputtering techniques, and a pattern is formed by using photolithography techniques such that the transparent electrodes 117 having a predetermined width are formed in a striped pattern along the Y direction, as shown in FIG. 12.

Next, in Step P7, the alignment film 118 is formed on the transparent electrodes 117 and the rubbing process is performed. Accordingly, the color filter substrate 104 is completed. Thus, the planarity of the surface of the alignment film 118 facing the liquid crystal layer 107 is also ensured and the dispersion of the cell gap is solved, so that a high-quality image can be displayed.

With regard to the opposing substrate 106 shown in FIG. 10, a material of the transparent electrodes 119, such as ITO, is applied to the second base plate 105 by using sputtering techniques in Step P11 shown in FIG. 15. Then, a pattern is formed by using photolithography techniques such that the transparent electrodes 119 are formed in a striped pattern along the X direction, as shown in FIG. 12. Then, in Step P12, the alignment film 120 is formed on the transparent electrodes 119 and the rubbing process is performed. Accordingly, the opposing substrate 106 is completed.

Next, in Step P21, spacers 129 (see FIG. 9) are dispersed over the opposing substrate 106 by dry dispersion, etc., and the color filter substrate 104 and the opposing substrate 106 are laminated with the sealing member 133. Then, in Step P22, liquid crystal is injected through an opening formed in the sealing member 133. Then, the opening is sealed with a sealant such as an ultraviolet curing resin.

Next, in Step P23, the retardation films 108 and 110, and the polarizers 109 and 111 are laminated on the outer surfaces of the first base plate 103 and the second base plate 105, respectively. Next, in Step P24, electric wiring is arranged as necessary and the illuminating unit 131, the housing 132, etc., are attached. Accordingly, the liquid crystal device 101 shown in FIG. 9 is completed.

With reference to FIG. 13, in the manufacturing method of the liquid crystal device 101 according to the present embodiment, the openings 123 are formed in the underlayer 112 and the light-shielding layer 115 is formed so as to fill the openings 123. Therefore, the height of the light-shielding layer 115 can be reduced and the planarity of the surface of the overcoat layer 116 can be ensured. Accordingly, the dispersion of the cell gap becomes small and the rubbing process can be performed easily, and as a result, the contrast of an image displayed by the liquid crystal device can be increased.

In FIG. 13, the openings 123 are formed in the underlayer 112 such that the underlayer 112 is completely removed at regions where the light-shielding layer 115 is formed. Alternatively, however, the underlayer 12 may be constructed in two steps by forming the first insulating layer 112a in the first step and the second insulating layer 112b in the second step, and the recesses 123 having the depth corresponding to the thickness of the upper layer 112b may be provided, as shown in FIG. 14.

In this case, the underlayer 112 can be constructed by the following method. That is, in the first step, the first insulating layer 112a is formed over the entire region of the base plate 103 including the boundary regions between the display dots D in which the light-shielding layer 115 is to be formed, and irregularities are formed similarly to the lower layer 112a of the underlayer 112 shown in FIG. 13. In the second step, the second insulating layer 112b is formed so as to cover the regions excluding the boundary regions between the display dots D in which the light-shielding layer 115 is to be formed, that is, the regions corresponding to the display dots D, by an etching process using a photoresist.

When the underlayer 112 is completely removed at regions corresponding to the openings 123, as shown in FIG. 13, there is a possibility that the planarity over the surfaces of the boundary regions between the adjacent display dots D and the surfaces of the display dots D will be degraded instead of improved. In such a case, the thickness of the underlayer 112 can be set to a desired value and the planarity can be ensured by applying the structure including the recesses 123 which is shown in FIG. 14. Accordingly, the dispersion of the cell gap becomes small and the rubbing process can be performed easily.

The recesses 123 may also be formed by using a halftone.

Fourth Embodiment

Next, an embodiment in which the present invention is applied to a transflective liquid crystal device using Thin Film Diodes (TFD), which are two-terminal switching devices, as switching devices will be described below.

Figure 16:
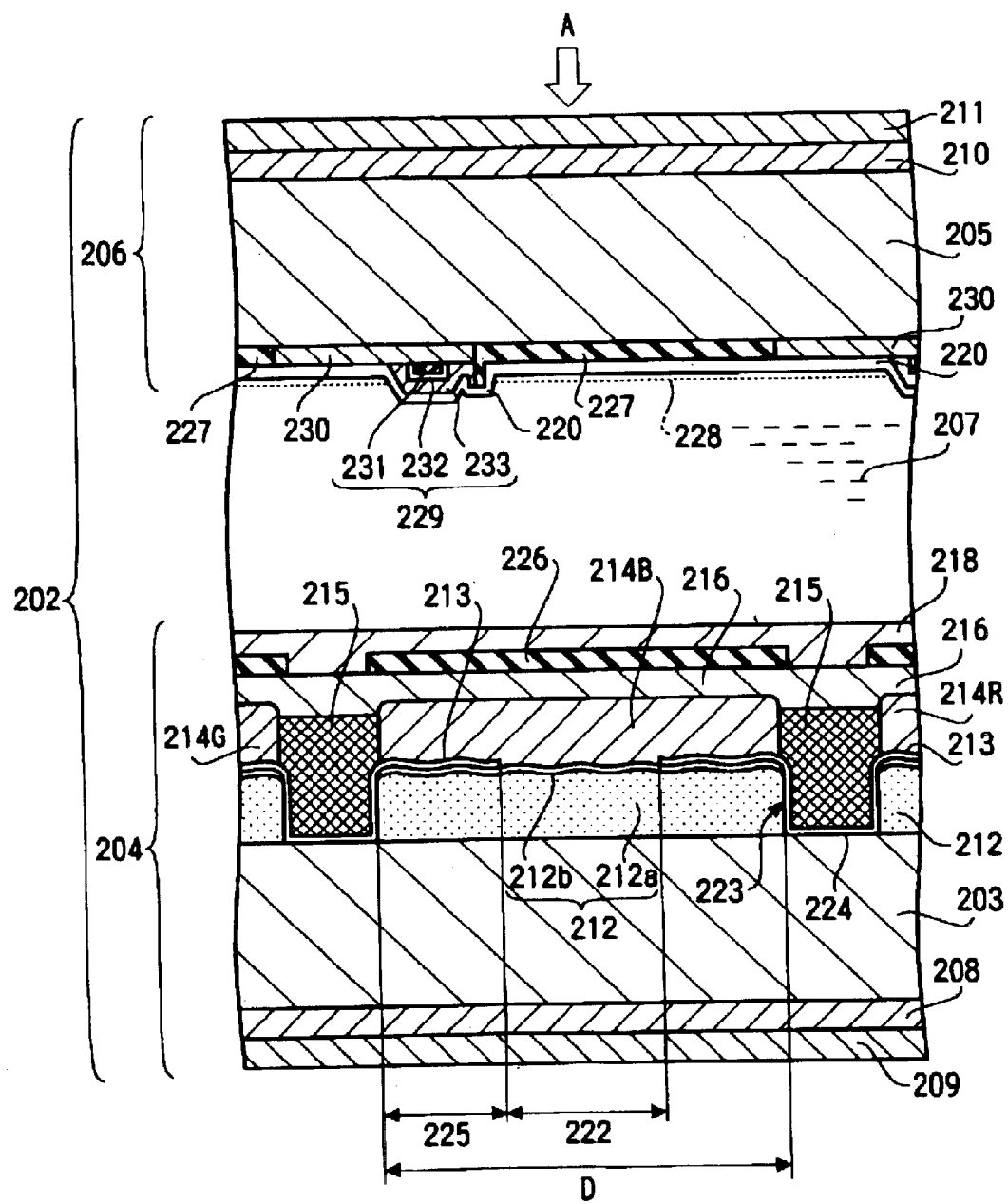
FIG. 16 is a sectional view showing the cross-sectional structure of the main part of a liquid crystal device according to another embodiment of the electrooptical device of the present invention.
Figure 17:
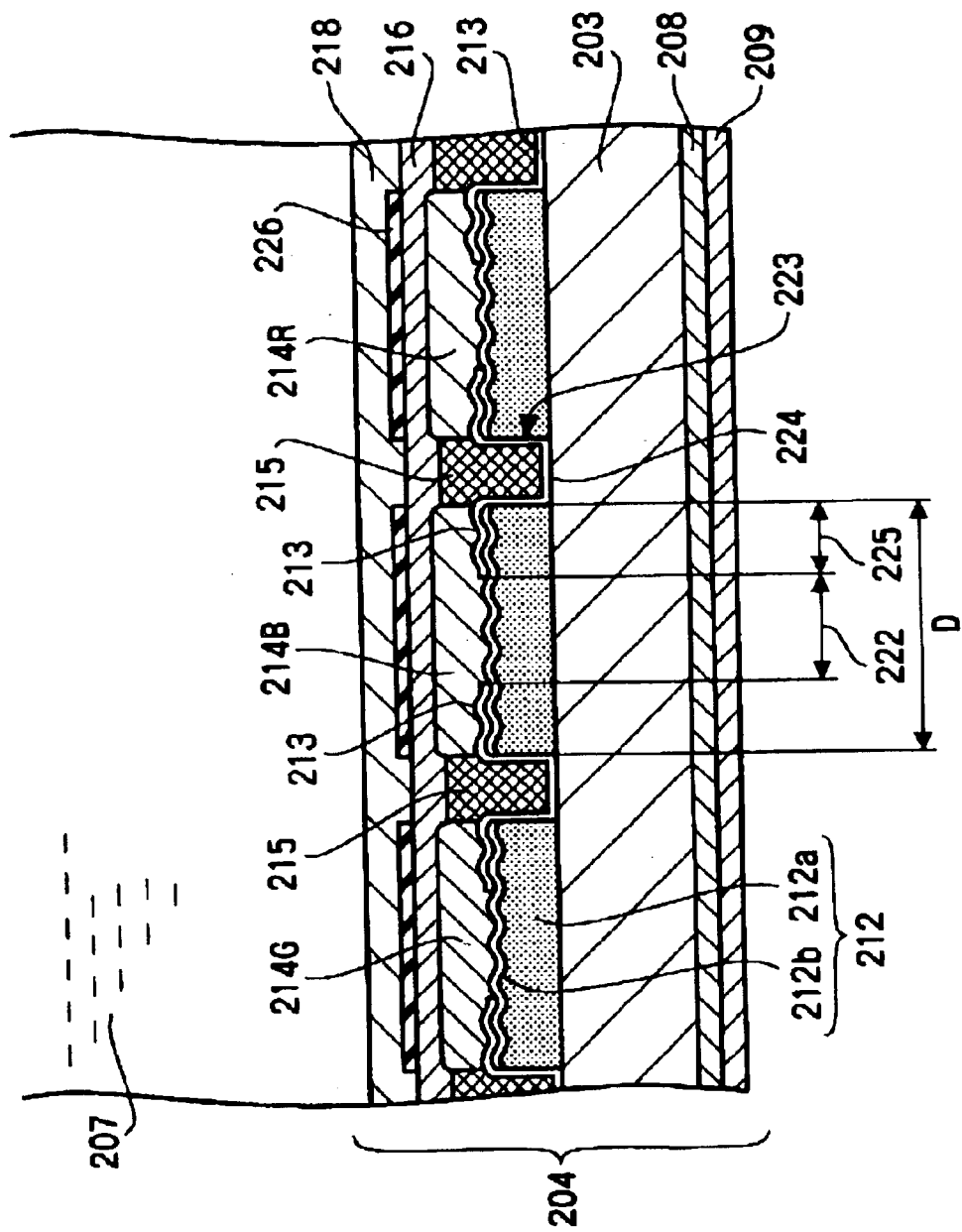
FIG. 17 is a sectional view showing the main part of a color filter substrate included in the liquid crystal device shown in FIG. 16.
Figure 18:
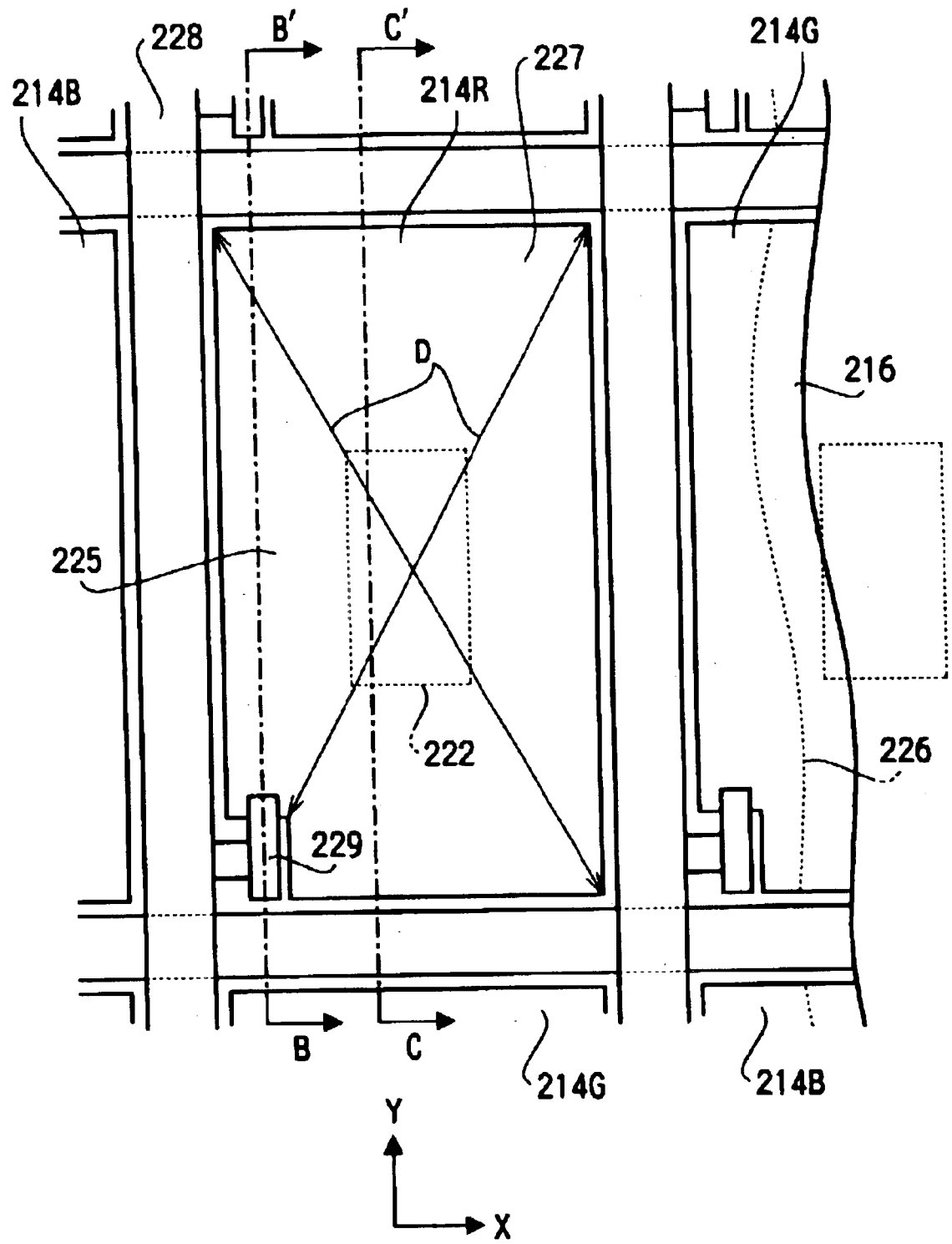
FIG. 18 is a partially broken plan view showing the planar structure of the liquid crystal device shown in FIG. 16.
Figure 19:
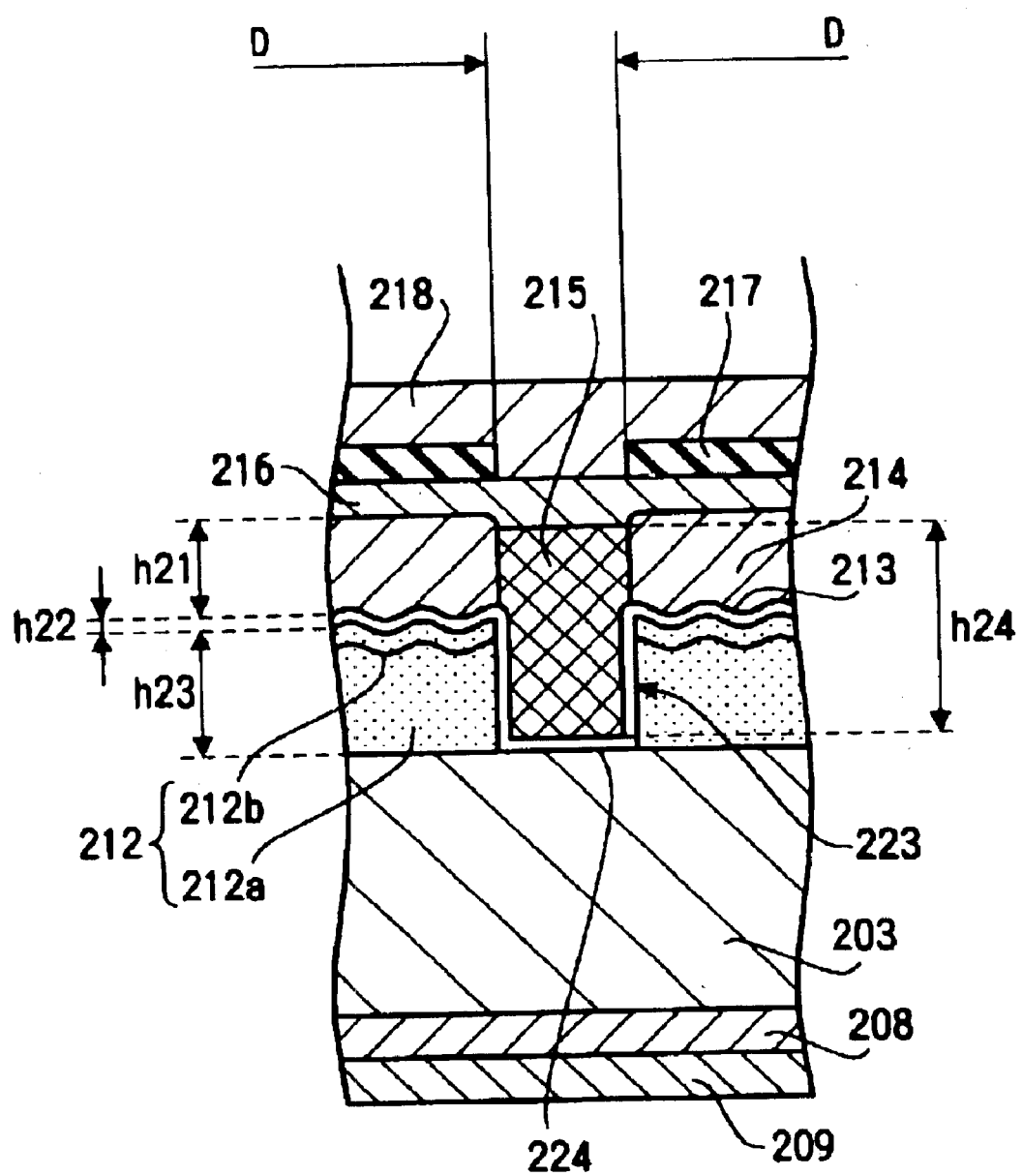
FIG. 19 is a sectional view showing the main part of the color filter substrate shown in FIG. 17.
Figure 20:
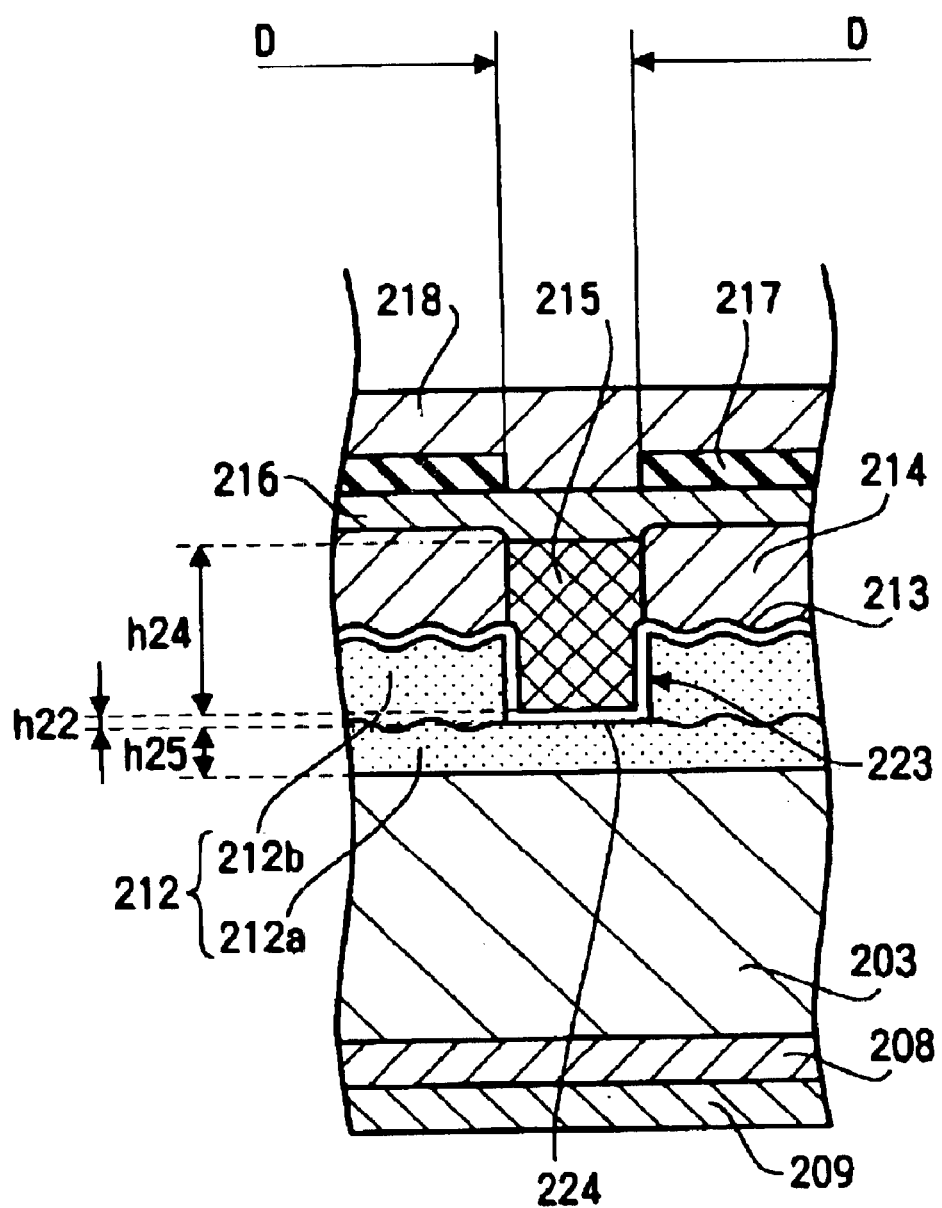
FIG. 20 is a sectional view showing the modification of the structure shown in FIG. 19.
Figure 21:
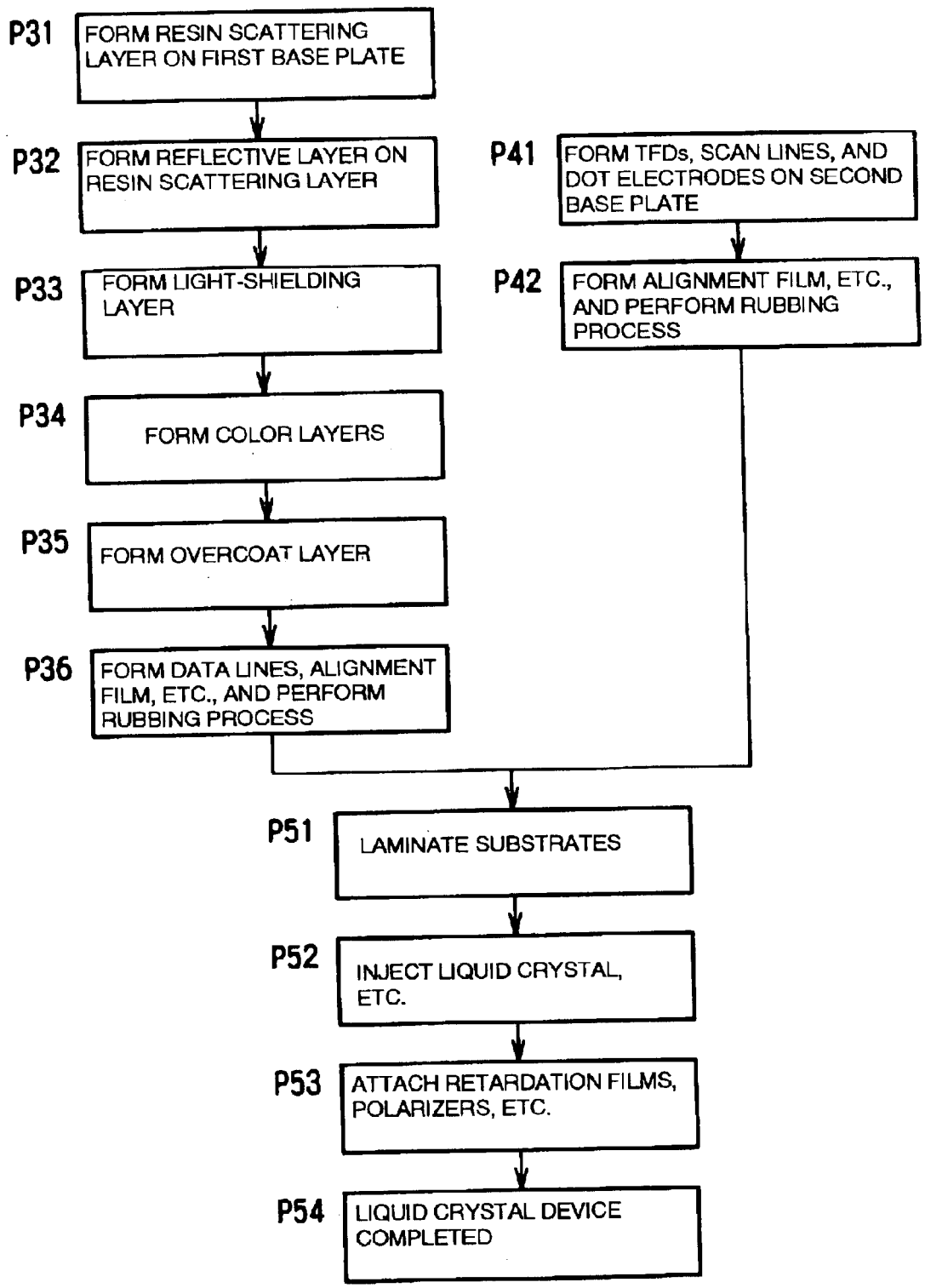
FIG. 21 is a flow chart showing a method for manufacturing the liquid crystal device shown in FIG. 16.

FIG. 16 is a sectional view of a liquid crystal panel included in a liquid crystal device according to another embodiment of the present invention. FIG. 17 is a sectional view of a substrate for the liquid crystal device included in the liquid crystal panel shown in FIG. 16. FIG. 18 is an enlarged view of a part of the liquid crystal panel. FIG. 16 corresponds to a sectional view of FIG. 18 cut along lines B–B' and C–C'. FIG. 19 is an enlarged sectional view of a part of a light-shielding layer from which a resin scattering layer is completely removed. FIG. 20 is an enlarged sectional view of a part of the light-shielding layer from which the resin, scattering layer is partially removed. FIG. 21 is a flow chart showing a method for manufacturing the liquid crystal device according to the present embodiment.

A liquid crystal panel 202 shown in FIG. 16 is a transflective liquid crystal panel, and a liquid crystal device including the liquid crystal panel 202 is constructed similarly to the liquid crystal device 101 shown in FIG. 9. More specifically, the liquid crystal device is constructed by attaching the illuminating unit 131, which is provided as necessary, and the housing 132 to the liquid crystal panel 202.

With reference to FIG. 16, the liquid crystal panel 202 includes a first base plate 203 and a second base plate 205 which are laminated with the sealing member 133 (see FIG. 9). A liquid crystal layer 207 is formed by injecting liquid crystal into a gap between these base plates. A retardation film 208 and a polarizer 209 are disposed on the outer surface of the first base plate 203, and a retardation film 210 and a polarizer 211 are disposed on the outer surface of the second base plate 205.

An underlayer 212 is formed on the surface of the first base plate 203 which faces the liquid crystal layer 207 and a reflective layer 213 is formed on the surface of the underlayer 212. In addition, regions where the reflective layer 213 is formed on the surface of the underlayer 212 serve as reflective portions 225, and apertures 222 formed in the reflective layer 213 serve as transmissive portions.

As shown in FIG. 17, a green layer 214G, a blue layer 214B, and a red layer 214R are formed on the reflective layer 213 in a predetermined configuration pattern. In the following descriptions, these color layers may be generically denoted by reference numeral "214". A light-shielding layer 215 is formed so as to cover the boundary regions between the adjacent color layers 214.

In addition, an overcoat layer 216 is provided on the color layers 214 and the light-shielding layer 215 to protect them. In addition, data lines 226 composed of a transparent conductive material such as indium tin oxide (ITO) are formed on the overcoat layer 116, and an alignment film 218 composed of a polyimide resin, etc., is formed on the data lines 226.

In addition, dot electrodes 227 which are arranged in a matrix pattern as viewed from the direction shown by the arrow A, scan lines 229 which extend along the boundary regions between the dot electrodes 227, and TFDs 729 which are connected to the dot electrodes 227 and the scan lines 228 are formed on the surface of the second base plate 205 which faces the liquid crystal layer 207, and an alignment film 220 is formed on top of them. The scan lines 228 are band-shaped and extend along the boundary regions between the dot electrodes 227 in a direction such that the scan lines 228 intersect the data lines 226 on the first base plate 203 (that is, in the Y direction in FIG. 18).

The data lines 226 are band-shaped and extend in the direction perpendicular to the page in FIG. 16 (that is, in the X direction in FIG. 18), and are arranged parallel to each other along the left-right direction in FIG. 16 at a constant interval so as to form a striped pattern as viewed from the direction shown by the arrow A. Areas where the data lines 226 and the dot electrodes 227 overlap as viewed from the direction shown by the arrow A serve as display dots D.

With reference to FIG. 16, the underlayer 212 in the color filter substrate 204 is composed of a resin material and includes a lower layer 212a and an upper layer 212b. In the underlayer 212, small irregularities are formed in the surface of the lower layer 212a, and the upper layer 212b is formed by covering the lower layer 212a with a thin layer composed of the same material as the lower layer 212a. Accordingly, smooth irregularities are formed in the surface of the underlayer 212. Due to these irregularities, light which passes through the underlayer 212 can be scattered, so that the problem in that the imaged displayed by the liquid crystal device cannot be viewed clearly can be solved.

The reflective layer 213 is preferably composed of an elemental metal such as aluminum or silver and is formed on the underlayer 212. The surface of the reflective layer 213 also has small irregularities corresponding to those in the surface of the underlayer 212. Therefore, light reflected by the reflective layer 213 is also scattered, so that the problem in that the imaged displayed by the liquid crystal device cannot be viewed clearly can be solved.

As shown in FIG. 18, for example, the reflective layer 213 has the apertures 222 having an approximately rectangular shape at the central regions of the display dots D, and the apertures 222 serve as the transmissive portions. Light emitted from the illuminating unit 131 (see FIG. 9) passes through the apertures 222 and is supplied to the liquid crystal layer 207. The shape of the apertures 222 is not limited to this example, and the apertures 222 may have other shapes such as circle. In addition, the number of apertures 222 formed in a single display dot D is not limited to one, and a plurality of apertures 222 may also be formed.

The color layers 214 are formed by applying a color resist composed of a photosensitive resin including a colorant such as a pigment and a dye and forming a pattern by using photolithography techniques. In this patterning process, portions for covering the apertures 222, which allow light which is emitted from the illuminating unit 131 and travels through the first base plate 203 to pass therethrough, and portions for covering the reflective layer 213 at regions around the apertures 222 are formed. When the color layers 214 corresponding to three colors (R, G, and B) are provided as in the present embodiment, the above-described patterning process is performed for each color.

The light-shielding layer 215 is formed so as to cover the boundary regions between the display dots D, and serves to prevent light from passing through the boundary regions. The light-shielding layer 215 includes band-shaped portions which extend along the longitudinal direction of the scan lines 228 on the second base plate 205 (that is, the Y direction in FIG. 18), and band-shaped portions which extend along the direction orthogonal to this direction (that is, the X direction in FIG. 18).

In addition, as shown in FIG. 19, the light-shielding layer 215 is formed so as to fill openings 223 formed in the underlayer 212 at the boundary regions between the adjacent display dots D. Bottom surfaces 224 of the openings 223 are positioned on the first base plate 203 with the reflective layer 213 therebetween. The light-shielding layer 215 is formed on the reflective layer 213 at regions corresponding to the openings 223 in such a manner that the height of the light-shielding layer 215 is approximately the same as that of the color layers 214.

For example, with reference to FIG. 19, when h21 is the thickness of the adjacent color layers 214, h22 is the thickness of the reflective layer 213, and h23 is the thickness of the underlayer 212, if the sum of the thickness h24 of the light-shielding layer 215 and the thickness h22 of the reflective layer 213 is approximately the same as the sum of h21, h22, and h23, the planarity over the surfaces of the display dots D and the surface of the light-shielding layer 215 is ensured. Accordingly, the dispersion of the cell gap becomes small and the rubbing process can be performed easily. As a result, the contrast of an image displayed by the liquid crystal device increases.

The concave areas in the underlayer 212 in which the light-shielding layer 215 is formed is not limited to the openings 223 shown in FIG. 19, and recesses 223 shown in FIG. 20 may be provided instead. In such a case, the underlayer 212 is not completely removed at regions under the bottom surfaces 224 of the recesses 223. Also in this case, the height of the light-shielding layer 215 is reduced by the amount corresponding to the depth of the recesses 223.

For example, with reference to FIG. 20, when h25 is the thickness of the underlayer 212 at regions under the bottom surfaces 224 of the recesses 223, if the light-shielding layer 215 is formed such that the sum of the thickness h24 of the light-shielding layer 215 and the thickness h22 of the reflective layer is approximately the same as the sum of the thickness h21 of the color layers 214, the thickness h22 of the reflective layer, and the thickness h23 of the underlayer 212, the planarity over the surfaces of the display dots D and the surface of the light-shielding layer 215 is ensured. Accordingly, the dispersion of the cell gap becomes small and the rubbing process can be performed easily. As a result, the contrast of an image displayed by the liquid crystal device increases.

The display dots D are regions surrounded by the light-shielding layer 215, and each display dot D includes one of the color layers 214 corresponding to R, G, and B, the reflective layer 213, and the aperture 222. A single pixel is constructed of three display dots D including the color layers 214 corresponding to R, G, and B.

The dot electrodes 227 are composed of a transparent conductive material such as ITO, and are connected to the scan lines 228 through the TFDs 229. As shown in FIG. 16, the TFDs 229 are disposed on an underlayer 230 which is formed on the surface of the second base plate 205. In addition, the TFDs 729 are constructed of a first metal layer 231, an insulating film 232 formed on the surface of the first metal layer 231, and a second metal layer 233 formed on the insulating film 232.

The first metal layer 231 is constructed of, for example, a tantalum (Ta) film, a tantalum alloy film, etc., whose thickness is about 100 to 500 nm, and is connected to the scan lines 228. The insulating film 232 is constructed of, for example, a tantalum oxide film whose thickness is about 10 to 35 nm. In addition, the second metal layer 233 is constructed of, for example, a metal film composed of chromium (Cr), etc., whose thickness is about 50 to 300 nm, and is connected to the dot electrodes 227.

In the present embodiment, a scan signal is supplied to each of the scan lines 228 formed on the second base plate 205 and a data signal is supplied to each of the data lines 226 formed on the first base plate 203. Accordingly, the liquid crystal is driven only at regions where the dot electrodes 227 and the data lines 226 oppose each other.

In reflective display, external light passes through the second base plate 205 and the dot electrodes 227, enters the liquid crystal layer. 207, and is reflected by the reflective layer 213. The reflected light enters the liquid crystal layer 207 again, is modulated in units of a display dot D, passes through the dot electrodes 227 and the second base plate 205, and is emitted to the outside. Accordingly, an image is displayed by the emitted light. In the present embodiment, since the overcoat layer 216 is planar, a high-contrast image can be displayed.

In transmissive display, light emitted from the illuminating unit 131 (see FIG. 9) passes through the first base plate 203 and the apertures 222, and is supplied to the liquid crystal layer 207. The light is modulated by the liquid crystal layer 207 in units of a display dot D, passes through the dot electrodes 227 and the second base plate 205, and is emitted to the outside. Accordingly, an image is displayed by the emitted light. Also in this case, since the overcoat layer 216 is planar, a high-contrast image can be displayed. The emitted light is colored in corresponding colors by the color layers 214 which cover the reflective layer 213 and the transmissive portions 222.

In the present embodiment, since the underlayer 212 is formed such that the openings 223 (FIG. 19) or the recesses 223 (FIG. 20) are provided at the boundary regions between the adjacent display dots D, the height of the light-shielding layer 215 can be reduced. Accordingly, the height of the surface of the color layers 214 and the height of the surface of the light-shielding layer 215 can be set approximately the same.

In the case in which the underlayer 212 is not completely removed at regions under the recesses 223, as shown in FIG. 20, the underlayer 212 can be constructed of a first insulating layer 212a and a second insulating layer 212b which is formed on the first insulating layer 212a. In this case, the recesses 223 having the depth corresponding to the thickness of the second insulating layer 212b are provided. Also in this case, the roughness of the top surface of the overcoat layer 216 can be reduced, so that the dispersion of the cell gap becomes small and the rubbing process can be performed easily. As a result, the contrast of an image displayed by the liquid crystal device can be increased.

In addition, since the liquid crystal device of the present embodiment is a TFD active matrix liquid crystal device, the display is bright and is easy to view, and power consumption and manufacturing cost can be reduced.

Manufacturing Method of the Liquid Crystal Device

Next, a manufacturing method of the liquid crystal device according to the present embodiment will be described with reference to a flow chart shown in FIG. 21. First, in Step P31, the resin scattering layer 212, which serves as an underlayer, is formed on the first base plate 203. With reference to FIG. 16, the underlayer 212 is etched by using a photoresist such that the openings 223 are formed in the underlayer 212, as shown in FIG. 19, at the boundary regions between the display dots D in which the light-shielding layer 215 is to be formed.

This will be described in more detail below. A resin material is uniformly applied to the first base plate 203 by spin coating, and then a resist is applied. Then, the resist is exposed to light through a photomask having a predetermined pattern, and is developed. Then, a plurality of holes are formed in the underlayer 212 by etching the resist. Next, heat is applied to the underlayer 212 so that the holes deform and become smooth, and the lower layer 212a of the underlayer 212 having irregularities in the surface thereof is thus obtained.

Next, the upper layer 212b of the underlayer 212 is formed by applying the resin material such that smooth irregularities are formed in the surface of the underlayer 212. Then, a resist is applied to the underlayer 212, is exposed to light through a photomask having a predetermined pattern, and is developed. Then, the openings 223 are formed in the underlayer 212 by etching, so that the underlayer 212 is removed at regions where the light-shielding layer 215 is to be formed.

Next, in Step P32, a thin film of aluminum, etc., is formed on the underlayer 212 by using deposition techniques or sputtering techniques, and a pattern is formed by using photolithography techniques such that the approximately rectangular apertures 222 are formed at the central regions of the display dots D; as shown in FIG. 18, and the reflective layer 213 is formed at regions surrounding the apertures 222.

Next, in Step P33, a light-shielding material is applied to the underlayer 212 having the openings 223 and the reflective layer 213. Then, a pattern is formed by using photo-etching techniques such that the light-shielding layer 215 is formed so as to fill the openings 223 of the underlayer 212. The light-shielding material can be obtained by, for example, dispersing carbon black, etc., in a resin.

Next, in Step P34, a coloring material for one of the colors is applied to the reflective layer 213 and the apertures 222 shown in FIG. 17 by spin-coating, and then a resist is applied. The resist is exposed to light through a photomask having a predetermined pattern, and is developed. Then, etching is performed so as to form the color layers 214 corresponding to that color. The above-described process is repeated for the other two colors, so that the color layers 214 corresponding to R, G, and B are formed in a desired configuration pattern.

Next, in Step P35, the overcoat layer 216 is formed on the color layers 214. In the present embodiment, since the light-shielding layer 215 is formed so as to fill the openings 223 in the underlayer 212, the height of the light-shielding layer 215 can be reduced by the amount corresponding to the depth of the openings 223. Therefore, when the overcoat layer 216 is formed in this process, the planarity of the surface of the overcoat layer 216 is ensured. Accordingly, the dispersion of the cell gap becomes small and the rubbing process can be performed easily. As a result, the contrast of an image displayed by the liquid crystal device can be increased.

Next, in Step P36, a material of the data lines 226, such as ITO, is applied to the overcoat layer 216 by using sputtering techniques, and a pattern is formed by using photolithography techniques such that the data lines 226 having a predetermined width are formed in a striped pattern along the X direction, as shown in FIG. 18. Then, the alignment film 218 is formed on the data lines 226, and is subjected to the rubbing process. Accordingly, the color filter substrate 204 is completed.

In addition, in Step P41, the TFDs 229, the scan lines 228, and the dot electrodes 227 are formed on the second base plate 205 shown in FIG. 16. The process of forming the TFDs 229 will be described in detail below. First, the underlayer 230 is formed by applying tantalum oxide, etc., to the second base plate 205 at a uniform thickness. Then, tantalum, etc., is applied to the underlayer 230 at a uniform thickness by sputtering, and the scan lines 228 and the first metal layer 231 are formed at the same time by using photolithography techniques. The scan lines 228 are connected to the first metal layer 231 with bridges.

Then, the insulating film 232 is formed by applying tantalum oxide, etc., to the first metal layer 231 at a uniform thickness. Then, chromium is applied to the insulating film 232 at a uniform thickness by sputtering, etc., and the second metal layer 233 is formed by using photolithography techniques.

Next, the underlayer 230 is removed at the regions where the dot electrodes 227 are to be formed. Then, an ITO film having a uniform thickness is formed by sputtering, etc., and the dot electrodes 227 having a predetermined shape corresponding to the size of a single display dot are formed by using photolithography techniques such that portions of the dot electrodes 227 overlap the second metal layer 233. Accordingly, the TFDs 229 and the dot electrodes 227 are formed.

Next, in Step P42, the alignment film 220 is formed on the dot electrodes 227, etc., and is subjected to the rubbing process. Accordingly, the opposing substrate 206 is completed.

Next, in Step P51, the spacers 129 (see FIG. 9) are dispersed over the alignment film 220 of the opposing substrate 206 by dry dispersion, etc., and the color filter substrate 204 and the opposing substrate 206 are laminated with the sealing member 133.

Next, in Step P52, liquid crystal is injected into the cell gap, that is, a gap between the substrates, through an opening formed in the sealing member 133. Then, the opening formed in the sealing member 133 is sealed with a sealant such as an ultraviolet curing resin. Next, in Step P53, the retardation films 208 and 210 and the polarizers 209 and 211 shown in FIG. 16 are laminated on the outer surfaces of the first base plate 203 and the second base plate 205, respectively.

Next, in Step P54, electric wirings are arranged as necessary and the illuminating unit 131, the housing 132, etc., are attached to the liquid crystal panel 202 shown in FIG. 16. Accordingly, the liquid crystal device 101 shown in FIG. 9 is completed.

In the above-described manufacturing method of the liquid crystal device, the openings 223 are formed in the underlayer 212 by completely removing the underlayer 212 at regions where the light-shielding layer 215 is be to formed, as shown in FIG. 19. Alternatively, however, the underlayer 212 may be constructed in two steps by forming the first insulating layer 212a in the first step and the second insulating layer 212b in the second step, and the recesses 223 having the depth corresponding to the thickness of the upper layer 212b may be provided, as shown in FIG. 20.

In this case, in the first step, the first insulating layer 212a is formed over the entire region of the base plate 203 including the boundary regions between the display dots D in which the light-shielding layer 215 is to be formed, and irregularities are formed similarly to the lower layer 212a of the underlayer 212 shown in FIG. 19. In the second step, the second insulating layer 212b is formed so as to cover the regions excluding the boundary regions between the display dots D in which the light-shielding layer 215 is to be formed, that is, the regions corresponding to the display dots D, by an etching process using a photoresist. Accordingly, the recesses 223 are formed.

When the underlayer 212 is completely removed at regions corresponding to the openings 223, as shown in FIG. 19, there is a possibility that the planarity over the surfaces of the boundary regions between the adjacent display dots D and the surfaces of the display dots D will be degraded instead of improved. In such a case, the planarity can be ensured by setting the thickness of the underlayer 212 at regions where the recesses 223 are provided to a desired value, as shown in FIG. 20. Accordingly, the dispersion of the cell gap becomes small and the rubbing process can be performed easily.

The recesses 223 may also be formed by using a halftone.

Fifth Embodiment

Next, an embodiment in which the present invention is applied to a transflective liquid crystal device using Thin Film Transistors (TFT), which are three-terminal switching devices, as switching devices will be described below.

Figure 22:
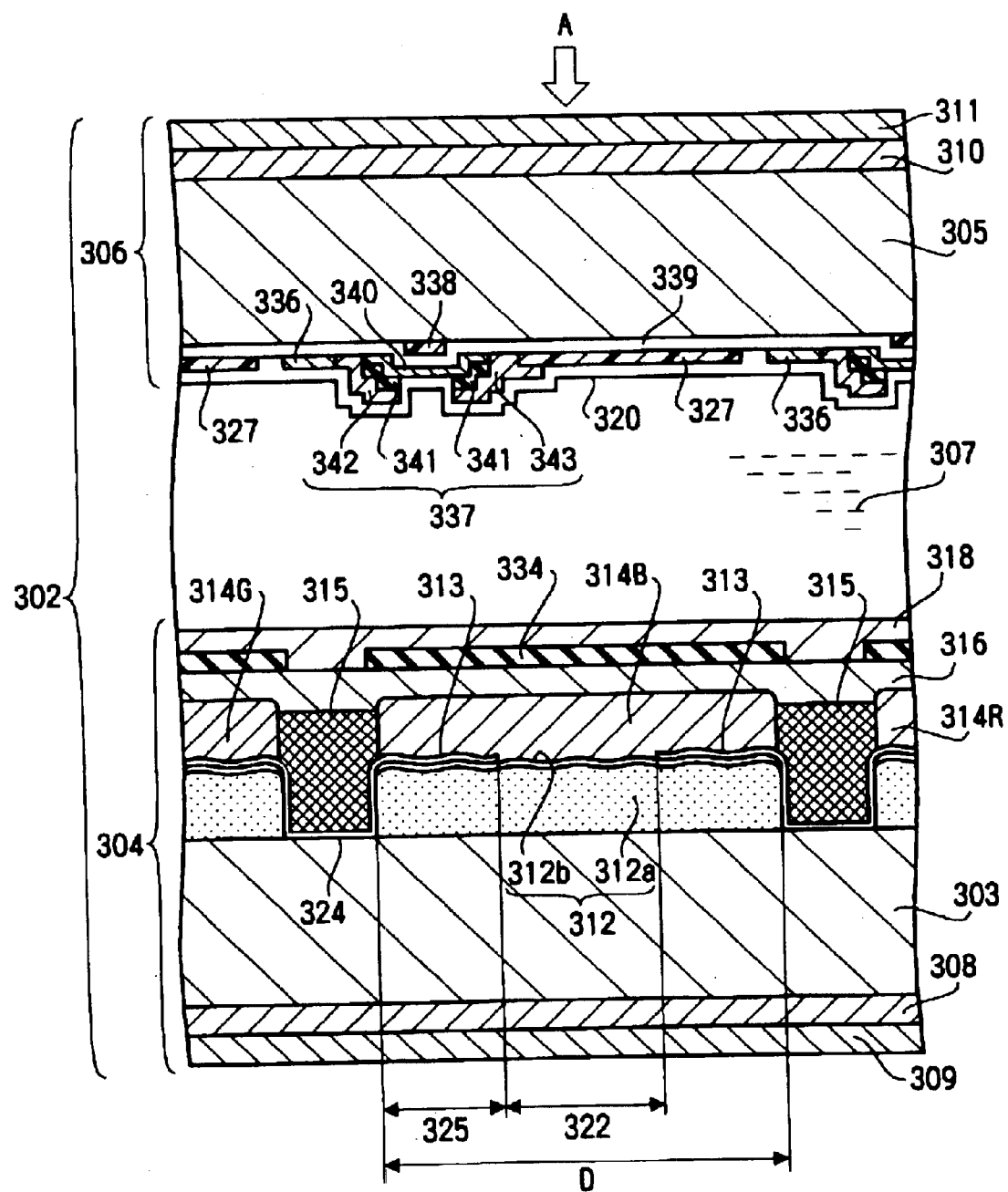
FIG. 22 is a sectional view showing the cross-sectional structure of the main part of a liquid crystal device according to another embodiment of the electrooptical device of the present invention.
Figure 23:
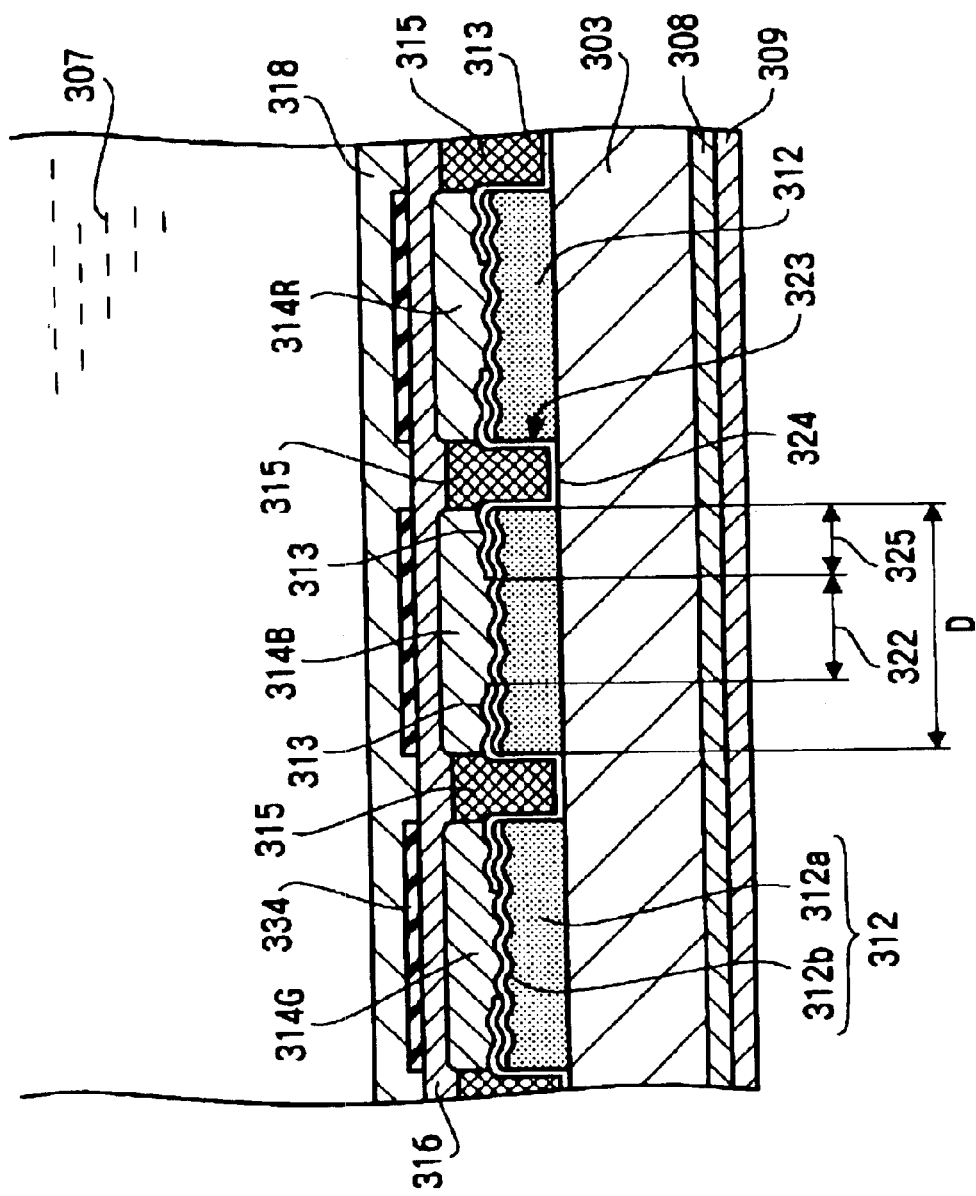
FIG. 23 is a sectional view showing the main part of a color filter substrate included in the liquid crystal device shown in FIG. 22.
Figure 24:
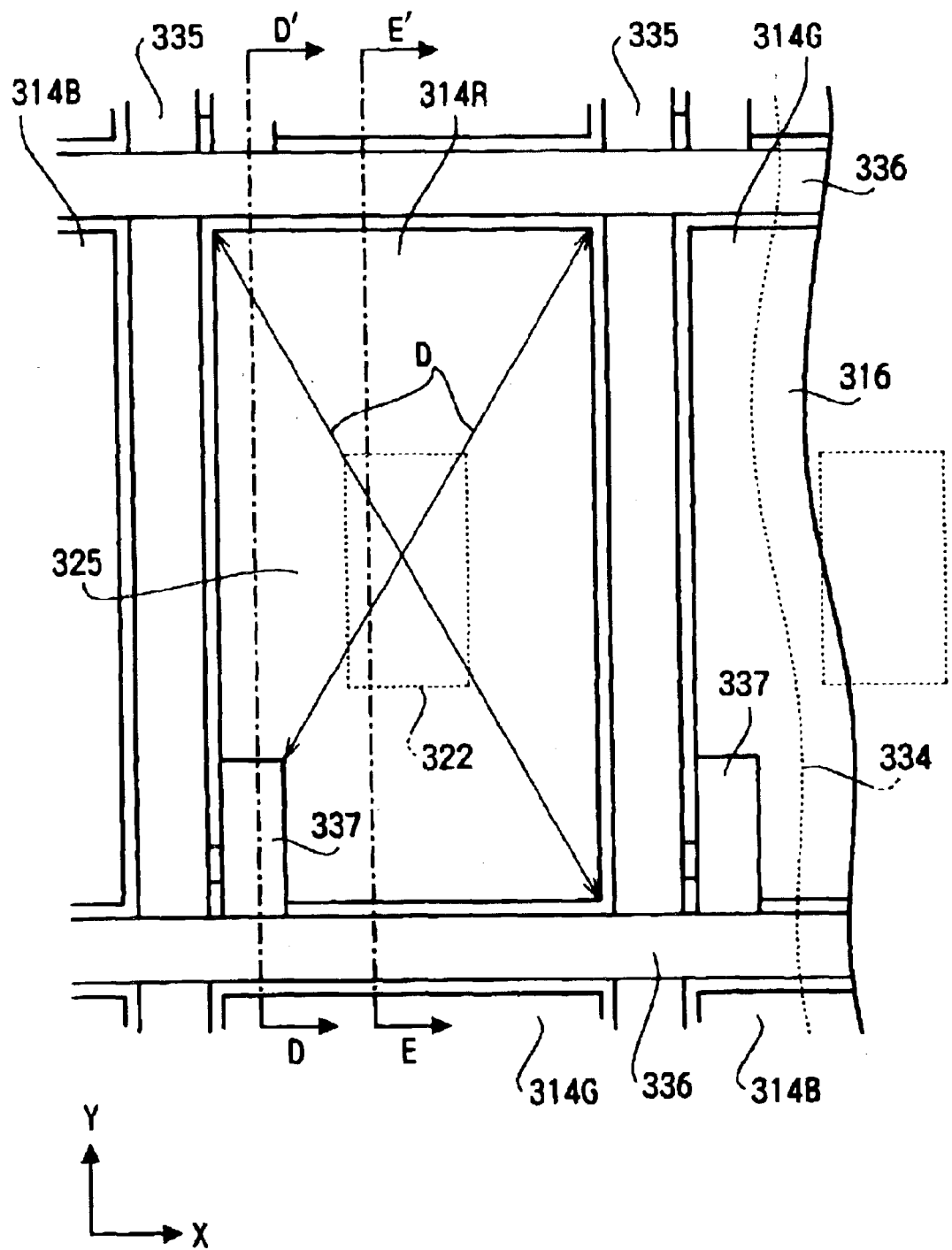
FIG. 24 is a partially broken plan view showing, the planar structure of the liquid crystal device shown in FIG. 22.
Figure 25:
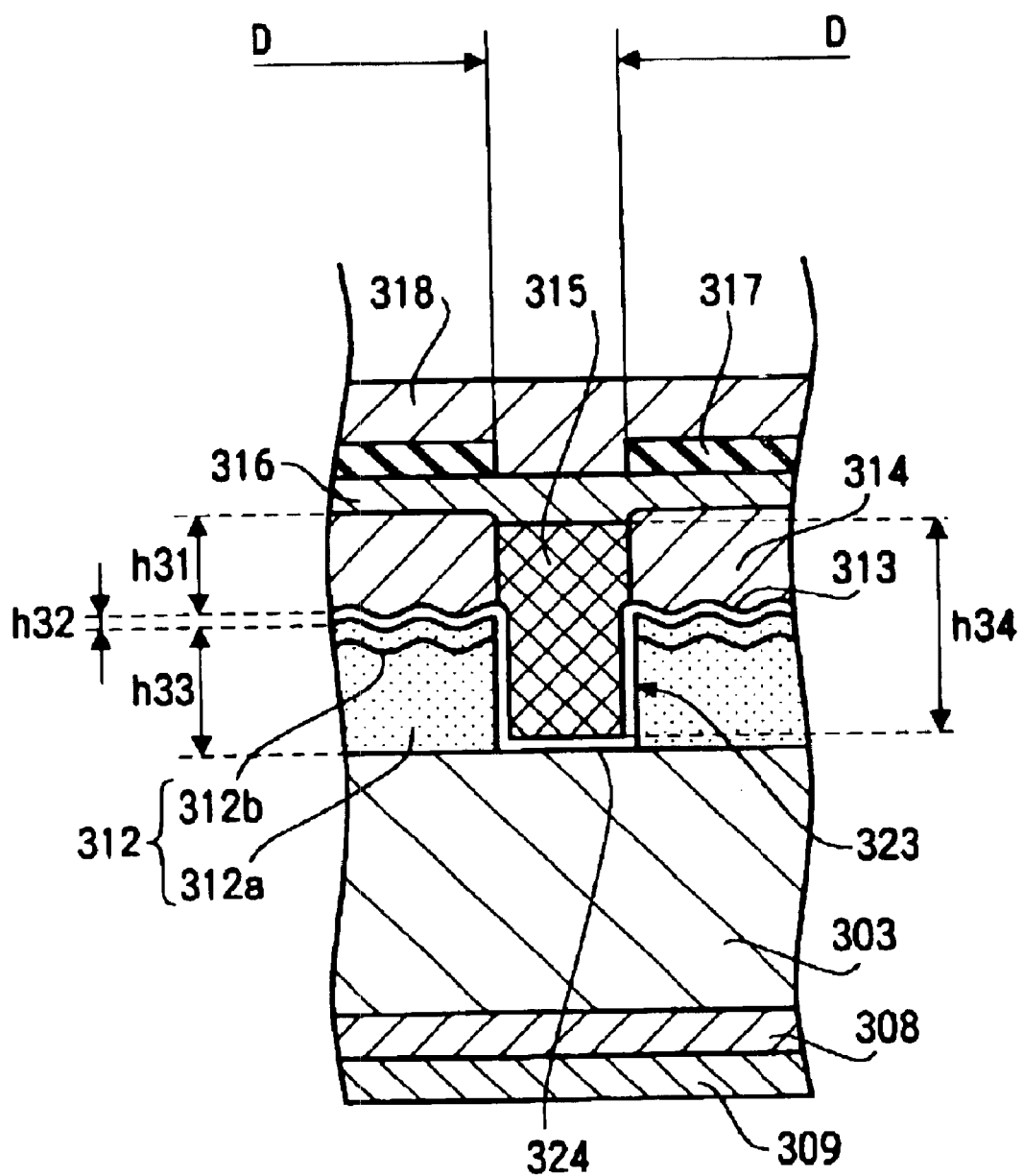
FIG. 25 is a sectional view showing the main part of the color filter substrate shown in FIG. 23.
Figure 26:
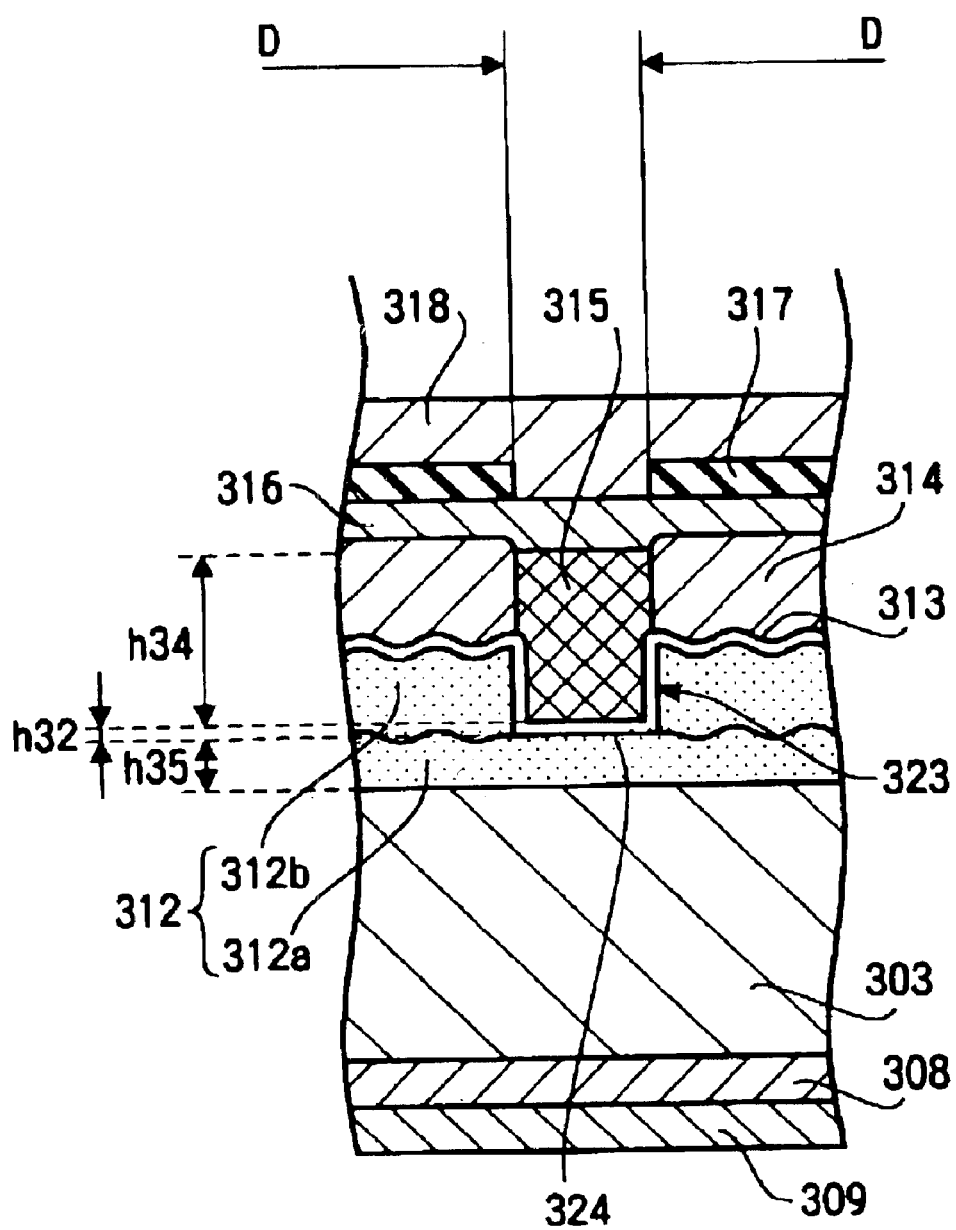
FIG. 26 is a sectional view showing the modification of the structure shown in FIG. 25.
Figure 27:
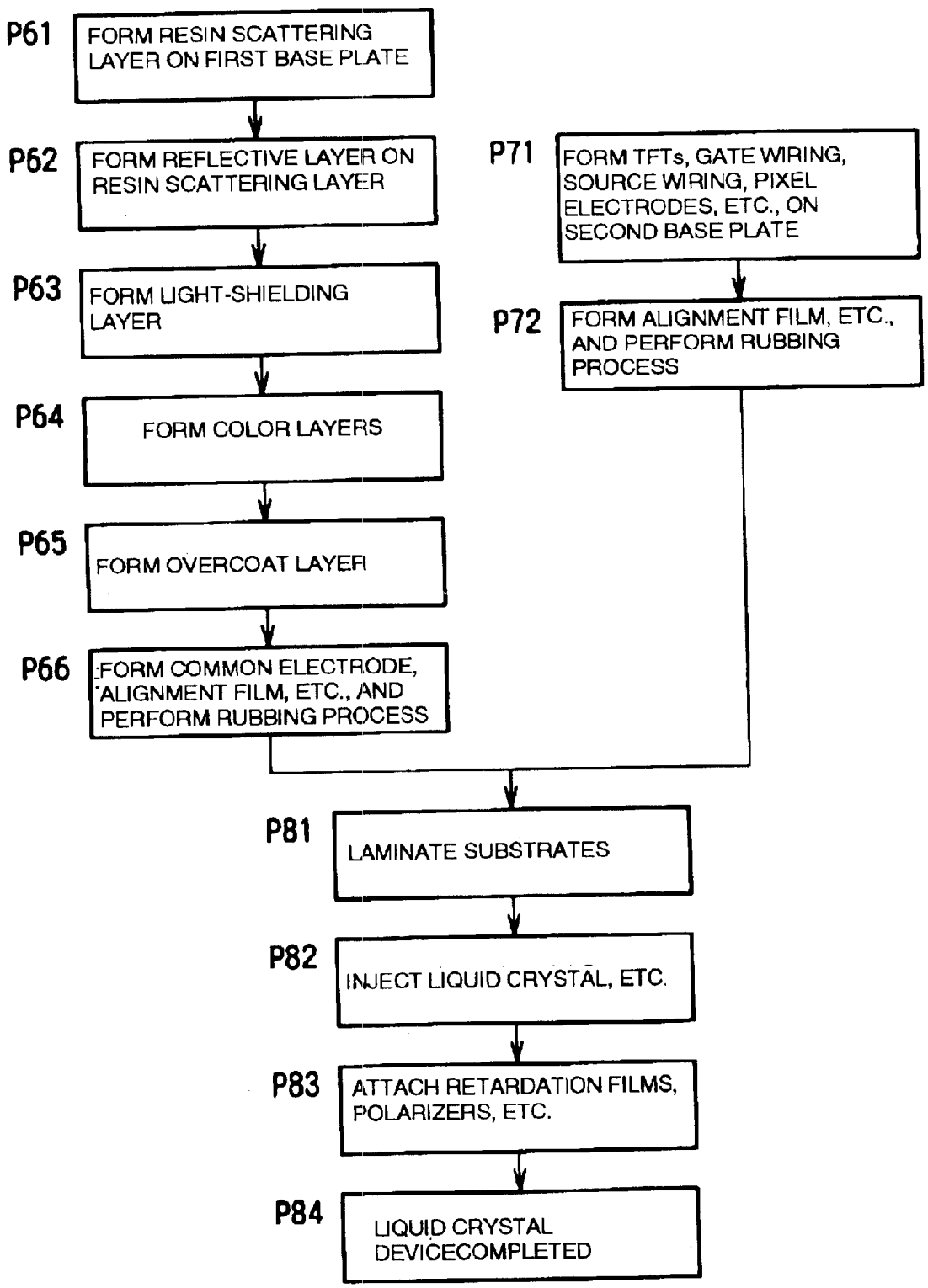
FIG. 27 is a flow chart showing a method for manufacturing the liquid crystal device shown in FIG. 22.

FIG. 22 is a sectional view of a liquid crystal panel included in a liquid crystal device according to another embodiment of the present invention. FIG. 23 is a sectional view of a color filter substrate included in the liquid crystal panel shown in FIG. 22. FIG. 24 is an enlarged view of a part of the liquid crystal panel. FIG. 22 corresponds to a sectional view of FIG. 24 cut along lines D–D' and E–E'. FIG. 25 is an enlarged sectional view of a part of a light-shielding layer from which a resin scattering layer, which serves as an underlayer, is completely removed. FIG. 26 is an enlarged sectional view of a part of the light-shielding layer from which the resin scattering layer, which serves as an underlayer, is partially removed. FIG. 27 is a flow chart showing a method for manufacturing the liquid crystal device according to the present embodiment.

A liquid crystal panel 302 shown in FIG. 22 is a transflective liquid crystal panel, and a liquid crystal device including the liquid crystal panel 302 is constructed similarly to the liquid crystal device 101 shown in FIG. 9. More specifically, the liquid crystal device is constructed by attaching the illuminating unit 131, which is provided as necessary, and the housing 132 to the liquid crystal panel 302.

With reference to FIG. 22, the liquid crystal panel 302 includes a first base plate 303 and a second base plate 305 which are laminated with the sealing member 133 (see FIG. 9). A liquid crystal layer 307 is formed by injecting liquid crystal into a gap between these base plates. A retardation film 308 and a polarizer 309 are disposed on the outer surface of the first base plate 303, and a retardation film 310 and a polarizer 311 are disposed on the outer surface of the second base plate 305.

An underlayer 312 is formed on the surface of the first base plate 303 which faces the liquid crystal layer 307 and a reflective layer 313 is formed on the surface of the underlayer 312. In addition, regions where the reflective layer 313 is formed on the surface of the underlayer 312 serve as reflective portions 325, and apertures 322 formed in the reflective layer 313 serve as transmissive portions.

As shown in FIG. 23, a green layer 314G, a blue layer 314B, and a red layer 314R are formed on the reflective layer 313 in a predetermined configuration pattern. In the following descriptions, these color layers may be generically denoted by reference numeral "314". A light-shielding layer 315 is formed so as to cover the boundary regions between the adjacent color layers 314.

In addition, an overcoat layer 316 is provided on the color layers 314 and the light-shielding layer 315 to protect them. In addition, a common electrode 334 composed of a transparent conductive material such as ITO are formed on the overcoat layer 316, and an alignment film 318 composed of polyimide resin, etc., is formed on the common electrode 334.

In addition, with reference of FIG. 22, dot electrodes 327 which are arranged in a matrix pattern as viewed from the direction shown by the arrow A and gate wiring 335 and source wiring 336 which perpendicularly intersect each other at the boundary regions between the dot electrodes 327 (the gate wiring 335 extend in the Y direction and the source wiring 336 extend in the X direction in FIG. 24) are formed on the surface of the second base plate 305 which faces the liquid crystal layer 307. In addition, TFTs 337 are disposed near the intersecting points of the gate wiring 335 and the source wiring 336, and an alignment film 320 is formed on top of them.

The common electrode 334 is a planar electrode formed on the overcoat layer 316 over the entire region thereof, and areas surrounded by the gate wiring 335 and the source wiring 336 serve as display dots D.

The underlayer 312 in the color filter substrate 304 is composed of a resin material and includes a lower layer 312a and an upper layer 312b. In the underlayer 312, small irregularities are formed in the surface of the lower layer 312a, and the upper layer 312b is formed by covering the lower layer 312a with a thin layer composed of the same material as the lower layer 312a. Accordingly, smooth irregularities are formed in the surface of the underlayer 312. These irregularities serve to scatter light which passes through the underlayer 312, so that the problem in that the imaged displayed by the liquid crystal device cannot be viewed clearly can be solved.

The reflective layer 313 is preferably composed of an elemental metal such as aluminum or silver and is formed on the top surface of the underlayer 312. The surface of the reflective layer 313 also has small irregularities corresponding to those in the surface of the underlayer 312. Therefore, light reflected by the reflective layer 313 is also scattered, so that the problem in that the imaged displayed by the liquid crystal device cannot be viewed clearly can be solved.

As shown in FIG. 24, for example, the reflective layer 313 has the apertures 322 having an approximately rectangular shape at the central regions of the display dots D, and the apertures 322 serve as the transmissive portions. Light emitted from the illuminating unit 131 passes through the apertures 322 and is supplied to the liquid crystal layer 307. The shape of the apertures 322 is not limited to this example, and the apertures 322 may have other shapes such as a circle. In addition, the number of apertures 322 formed in the display dot D is not limited to one, and a plurality of apertures 322 may also be formed.

The color layers 314 are formed by applying a color resist composed of a photosensitive resin including a colorant such as a pigment and a dye and forming a pattern by using photolithography techniques. In this patterning process, portions for covering the apertures 322, which allow light which is emitted from the illuminating unit 131 and travels through the first base plate 303 to pass therethrough, and portions for covering the reflective layer 313 at regions around the apertures 322 are formed. When the color layers 314 corresponding to three colors (R, G, and B) are provided as in the present embodiment, the above-described patterning process is performed for each color.

The light-shielding layer 315 is formed so as to cover the boundary regions between the display dots D, and serves to prevent light from passing through the boundary regions. The light-shielding layer 315 includes band-shaped portions which extend along the longitudinal direction of the gate wiring 335 on the second base plate 305 (that is, the Y direction in FIG. 24), and band-shaped portions which extend along the direction perpendicular to this direction (that is, the X direction in FIG. 24).

In addition, as shown in FIG. 25, the light-shielding layer 315 is formed so as to fill openings 323 formed in the underlayer 312 at the boundary regions between the adjacent display dots D. Bottom surface 324 of the openings 323 are positioned on the first base plate 303 with the reflective layer 313 therebetween. The light-shielding layer 315 is formed on the reflective layer 313 at regions corresponding to the openings 323 in such a manner that the height of the light-shielding layer 315 is approximately the same as that of the color layers 314.

For example, with reference to FIG. 25, when h31 is the thickness of the adjacent color layers 314, h32 is the thickness of the reflective layer 313, and h33 is the thickness of the underlayer 312, if the sum of the thickness h34 of the light-shielding layer 315 and the thickness h32 of the reflective layer 313 is approximately the same as the sum of h31, h32, and h33, the planarity over the surfaces of the display dots D and the surface of the light-shielding layer 315 is ensured. Accordingly, the dispersion of the cell gap becomes small and the rubbing process can be performed easily. As a result, the contrast of an image displayed by the liquid crystal device increases.

The concave areas in the underlayer 312 in which the light-shielding layer 315 is formed is not limited to the openings 323 shown in FIG. 25, and recesses 323 shown in FIG. 26 may be provided instead. In such a case, the underlayer 312 is not completely removed at regions under bottom surfaces 324 of the recesses 323. Also in this case, the height of the light-shielding layer 315 is reduced by the amount corresponding to the depth of the recesses 223.

For example, with reference to FIG. 26, when h35 is the thickness of the underlayer 312 at regions under the bottom surfaces 324 of the recesses 323, if the light-shielding layer 315 is formed such that the sum of the thickness h34 of the light-shielding layer 315 and the thickness h32 of the reflective layer is approximately the same as the sum of the thickness h31 of the color layers 314, the thickness h32 of the reflective layer, and the thickness h33 of the underlayer 312, the planarity over the surfaces of the display dots D and the surface of the light-shielding layer 315 is ensured. Accordingly, the dispersion of the cell gap becomes small and the rubbing process can be performed easily. As a result, the contrast of an image displayed by the liquid crystal device increases.

The display dots D are regions surrounded by the light-shielding layer 315, and each display dot D includes one of the color layers 314 corresponding to R, G, and B, the reflective layer 313, and the aperture 322. A single pixel is constructed of three display dots D including the color layers 314 corresponding to R, G, and B.

With reference to FIG. 22, each of the TFTs 337 is constructed of a gate electrode 338 formed on the second base plate 305, a gate insulating film 339 which is formed on the gate electrode 338 and extends over the entire surface of the second base plate 305, a semiconductor layer 340 which faces the gate electrode 338 with the gate insulating film 339 therebetween, a source electrode 342 which is connected to one side of the semiconductor layer 340 with a contact electrode 341, and a drain electrode 343 which is connected to the other side of the semiconductor layer 340 with another contact electrode 341.

The gate electrodes 338 are connected to the gate wiring 335, and the source electrodes 342 are connected to the source wiring 336. The gate wiring 335 extend along the second base plate 305 in the vertical direction (that is, the Y direction in FIG. 24), and are arranged parallel to each other with a constant interval. In addition, the source wiring 336 extend along the second base plate 305 in the horizontal (that is, the X direction in FIG. 24) so as to intersect the gate wiring 335 with the gate insulating film 339 being disposed between the source wiring 336 and the gate wiring 335, and are arranged parallel to each other with a constant interval.

The dot electrodes 327 are formed so as to cover the rectangular areas sectioned by the gate wiring 335 and the source wiring 336 excluding the regions corresponding to the TFTs 337, and are composed of, for example, a transparent conductive material such as ITO.

The gate wiring 335 and the gate electrodes 338 are preferably composed of, for example, chromium, or tantalum, etc., and the gate insulating film 339 is preferably composed of, for example, silicon nitride (SiNX), silicon oxide (SiOX), etc. The source electrodes 342 and the source wiring 336 which are formed integrally with each other, and the drain electrodes 343 are preferably composed of, for example, titanium, molybdenum, or aluminum, etc.

In the present embodiment, a signal is supplied to the common electrode 334 formed on the first base plate 303 and another signal is supplied to the gate wiring 335 and the source wiring 336 formed on the second base plate 305. Accordingly, the dot electrodes 327 are selected in units of a display dot D, and a voltage is applied to the liquid crystal only at regions between the selected dot electrodes 327 and the common electrode 334, so that the orientation of the liquid crystal is controlled so as to modulate the reflected light and the transmitted light.

In reflective display, external light passes through the second base plate 305 and the dot electrodes 327, enters the liquid crystal layer 307, is modulated by the liquid crystal layer 307 in units of a display dot D, and is reflected by the reflective layer 313. The reflected light passes through the dot electrodes 327 and the second base plate 305 again, and is emitted to the outside. Accordingly, an image is displayed by the emitted light. In the present embodiment, since the overcoat layer 316 is planar, a high-contrast image can be displayed.

In transmissive display, light emitted from the illuminating unit 131 (see FIG. 9) passes through the first base plate 303 and the transmissive portions, that is, the apertures 322, and enters the liquid crystal layer 307. The light is modulated by the liquid crystal layer 307 in units of a display dot D, passes through the dot electrodes 327 and the second base plate 305, and is emitted to the outside. Accordingly, an image is displayed. In the present embodiment, since the overcoat layer 316 is planar, a high-contrast image can be displayed. The emitted light is colored in corresponding colors by the color layers 314 which cover the reflective layer 313 and the transmissive portions 322.

As shown in FIG. 25, in the present embodiment, the underlayer 312 is formed such that the openings 323 are provided at the boundary regions between the adjacent display dots D. Accordingly, the height of the light-shielding layer 315 can be reduced by the amount corresponding to the depth of the openings 323. Therefore, the planarity over the surfaces of the display dots D and the surfaces of the boundary regions between the display dots D can be ensured.

In the case in which the underlayer 312 is not completely removed at regions under the recesses 323, as shown in FIG. 26, the underlayer 312 can be constructed of a first insulating layer 312a and a second insulating layer 312b which is formed on the first insulating layer 312a. In this case, the recesses 323 having the depth corresponding to the thickness of the second insulating layer 312b are provided. Also in this case, the roughness of the top surface of the overcoat layer 316 can be reduced, so that the dispersion of the cell gap becomes small and the rubbing process can be performed easily. As a result, the contrast of an image displayed by the liquid crystal device can be increased.

In addition, since the liquid crystal device of the present embodiment is a TFT active matrix liquid crystal device, the display is bright and is easy to view, and power consumption and manufacturing cost can be reduced.

Manufacturing Method of the Liquid Crystal Device

Next, a manufacturing method of the liquid crystal device according to the present embodiment will be described with reference to a flow chart shown in FIG. 27. First, in Step P61, the resin scattering layer 312, which serves as an underlayer, is formed on the first base plate 303. The underlayer 312 is etched by using a photoresist such that the openings 323 are formed in the underlayer 312, as shown in FIG. 25, at the boundary regions between the display dots D in which the light-shielding layer 315 is to be formed.

This will be described in more detail below. A resin material is uniformly applied to the first base plate 303 by spin coating, and then a resist is applied. Then, the resist is exposed to light through a photomask having a predetermined pattern, and is developed. Then, a plurality of holes are formed in the underlayer 312 by etching.

Next, heat is applied to the underlayer 312 so that the holes deform and become smooth, and the lower layer 312a of the underlayer 312 having irregularities in the surface thereof is thus obtained. Then, the upper layer 312b of the underlayer 312 is formed by applying the resin material such that smooth irregularities are formed in the surface of the underlayer 312.

Then, a resist is applied to the underlayer 312, is exposed to light through a photomask having a predetermined pattern, and is developed. Then, the openings 323 are formed in the underlayer 312 by etching, so that the underlayer 312 is removed at regions where the light-shielding layer 315 is to be formed.

Next, in Step P62, a thin film of aluminum, etc., is formed on the underlayer 312 by using deposition techniques or sputtering techniques, and a pattern is formed by using photolithography techniques such that the approximately rectangular apertures 322 are formed at the central regions of the display dots D, as shown in FIG. 24, and the reflective layer 313 is formed at regions surrounding the apertures 322.

Next, in Step P63, a light-shielding material is applied to the underlayer 312 having the openings 323 and the reflective layer 313. Then, a pattern is formed by using photo-etching techniques such that the light-shielding layer 315 is formed so as to fill the openings 323 of the underlayer 312. The light-shielding material can be obtained by, for example, dispersing carbon black, etc., in a resin.

Next, in Step P64, a coloring material for one of the colors is applied to the reflective layer 313 and the apertures 322 shown in FIG. 23 by spin-coating, and then a resist is applied. The resist is exposed to light through a photomask having a predetermined pattern, and is developed. Then, etching is performed so as to form the color layers 314 corresponding to that color. The above-described process is repeated for the other two colors, so that the color layers 314 corresponding to R, G, and B are formed in a desired configuration pattern.

Next, in Step P65, the overcoat layer 316 is formed on the color layers 314. In the present embodiment, since the light-shielding layer 315 is formed so as to fill the openings 323 in the underlayer 312, the height of the light-shielding layer 315 can be reduced by the amount corresponding to the depth of the openings 323. Therefore, when the overcoat layer 316 is formed in this process, the planarity of the surface of the overcoat layer 316 is ensured. Accordingly, the dispersion of the cell gap becomes small and the rubbing process can be performed easily. As a result, the contrast of an image displayed by the liquid crystal device can be increased.

Next, in Step P66, a material of the common electrode 334, such as ITO, is applied to the overcoat layer 316 by using sputtering techniques, and a patterning process is performed by using photolithography techniques so as to form the common electrode 334. Then, the alignment film 318 is formed on the common electrode 334, and is subjected to the rubbing process. Accordingly, the color filter substrate 304 is completed.

With respect to the opposing substrate 306 shown in FIG. 22, the TFTs 337, the gate wiring 335, the source wiring 336, and the dot electrodes 327 are formed on the second base plate 305 in Step P71 shown in FIG. 27.

The process of forming the TFTs 337 will be described in detail below. First, the gate wiring 335 and the gate electrodes 338, which are integral with each other, are formed by applying chromium, or tantalum, etc., on the second base plate 305 at a uniform thickness by sputtering and performing a patterning process by using photolithography techniques. Then, the gate insulating film 339 composed of silicon nitride is formed by, for example, plasma Chemical vapor deposition (CVD) method.

Next, an a-Si layer for forming the semiconductor layer 340 and an n+-type a-Si layer for forming the contact electrodes 341 are formed in that order. Then, the n+-type a-Si layer and the a-Si layer are subjected to a patterning process so as to form the semiconductor layer 340 and the contact electrodes 341. In addition, ITO, etc., is applied to the gate insulating film 339 by sputtering at regions where the dot electrodes 327 are to be formed, and a patterning process is performed by using photolithography techniques so as to form the dot electrodes 327.

In addition, titanium, molybdenum, or aluminum, etc., is applied to the second base plate 305 over the entire surface thereof by sputtering, and a patterning process is performed so as to form the source electrodes 342, the drain electrodes 343, and the source wiring 336. Accordingly, the TFTs 337 and the dot electrodes 327 are formed. Next, in Step P72, the alignment film 320 is formed on the TFTs 337 and the dot electrodes 327, and is subjected to a rubbing process. Accordingly, the opposing substrate 306 is completed.

Next, in Step P81, the spacers 129 (see FIG. 9) are dispersed over the alignment film 320 on the second base plate 305 by dry dispersion, etc., and the color filter substrate 304 and the opposing substrate 306 are laminated with the sealing member 133. Then, in Step P82, liquid crystal is injected into the cell gap, that is, a gap between the substrates, through an opening formed in the sealing member 133. Then, the opening formed in the sealing member 133 is sealed with, for example, an ultraviolet curing resin. Next, in Step P83, the retardation films 308 and 310, and the polarizers 309 and 311 are laminated on the outer surfaces of the first base plate 303 and the second base plate 305, respectively.

Next, in Step P84, electric wirings are arranged as necessary and the illuminating unit 131, the housing 132, etc., are attached. Accordingly, the liquid crystal device 101 shown in FIG. 9 which includes the liquid crystal panel 302 shown in FIG. 22 is completed.

In the manufacturing method shown in FIG. 27, the openings 323 shown in FIG. 25 are formed in the underlayer 312 by completely removing the underlayer 312 at regions where the light-shielding layer 315 is to be formed. Alternatively, however, the underlayer 312 may be constructed in two steps by forming the first insulating layer 312a in the first step and the second insulating layer 312b in the second step, and the recesses 323 may be provided, as shown in FIG. 26.

In this case, in the first step, the first insulating layer 312a is formed over the entire region of the base plate including the boundary regions between the display dots D in which the light-shielding layer 315 is to be formed, and irregularities are formed similarly to the lower layer 312a of the underlayer 312 shown in FIG. 25. In the second step, the second insulating layer 312b is formed so as to cover the regions excluding the boundary regions between the display dots D in which the light-shielding layer 315 is to be formed, that is, the regions corresponding to the display dots D, by an etching process using a photoresist.

When the underlayer 312 is completely removed at regions corresponding to the openings 323, as shown in FIG. 25, there is a possibility that the planarity over the surfaces of the boundary regions between the adjacent display dots D and the surfaces of display dots D will be degraded instead of improving. In such a case, the planarity can be ensured by setting the thickness of the underlayer 312 at regions where the recesses 323 are provided to a desired value, as shown in FIG. 26. Accordingly, the dispersion of the cell gap becomes small and the rubbing process can be performed easily.

The recesses 323 may also be formed by using a halftone.

Sixth Embodiment

Figure 28:
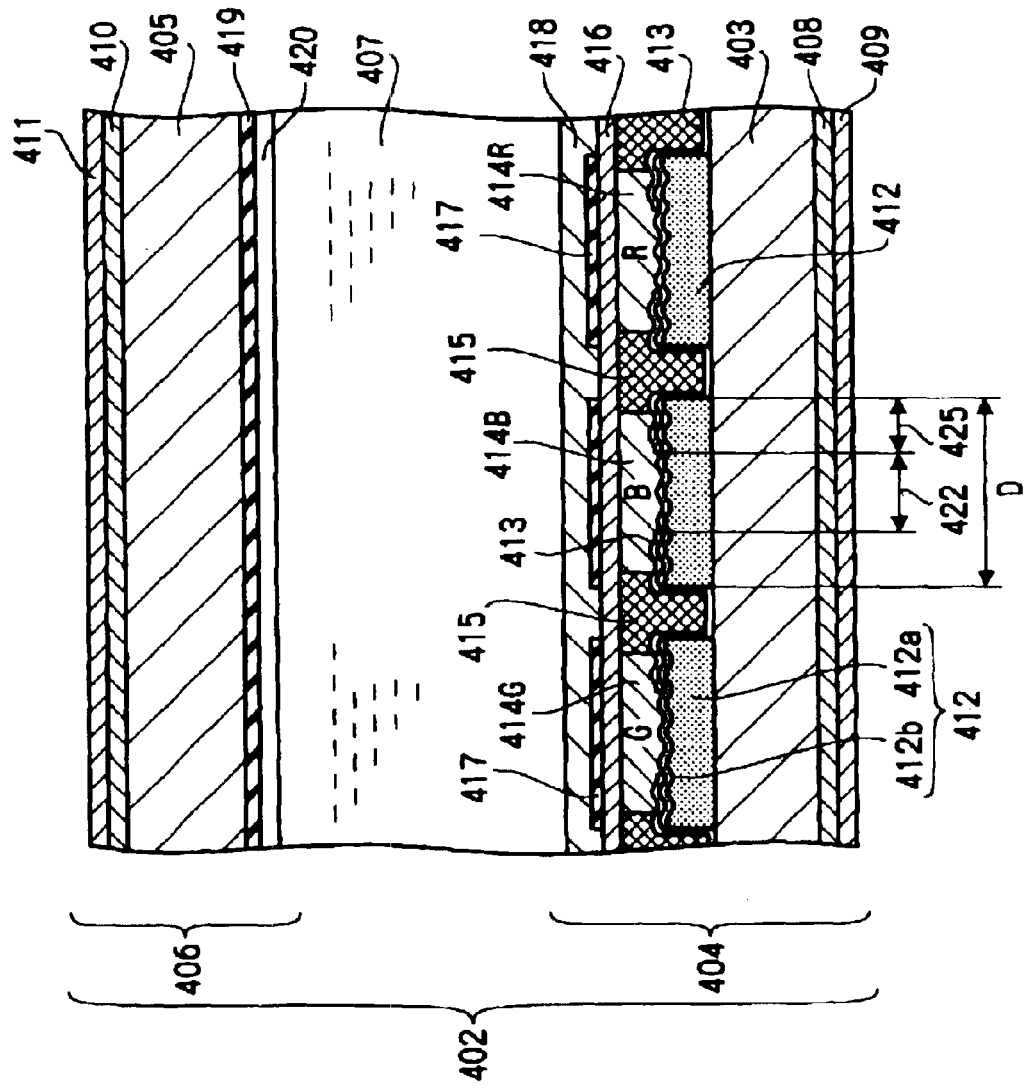
FIG. 28 is a sectional view showing the cross-sectional structure of the main part of a liquid crystal device according to another embodiment of the electrooptical device of the present invention.
Figure 29:
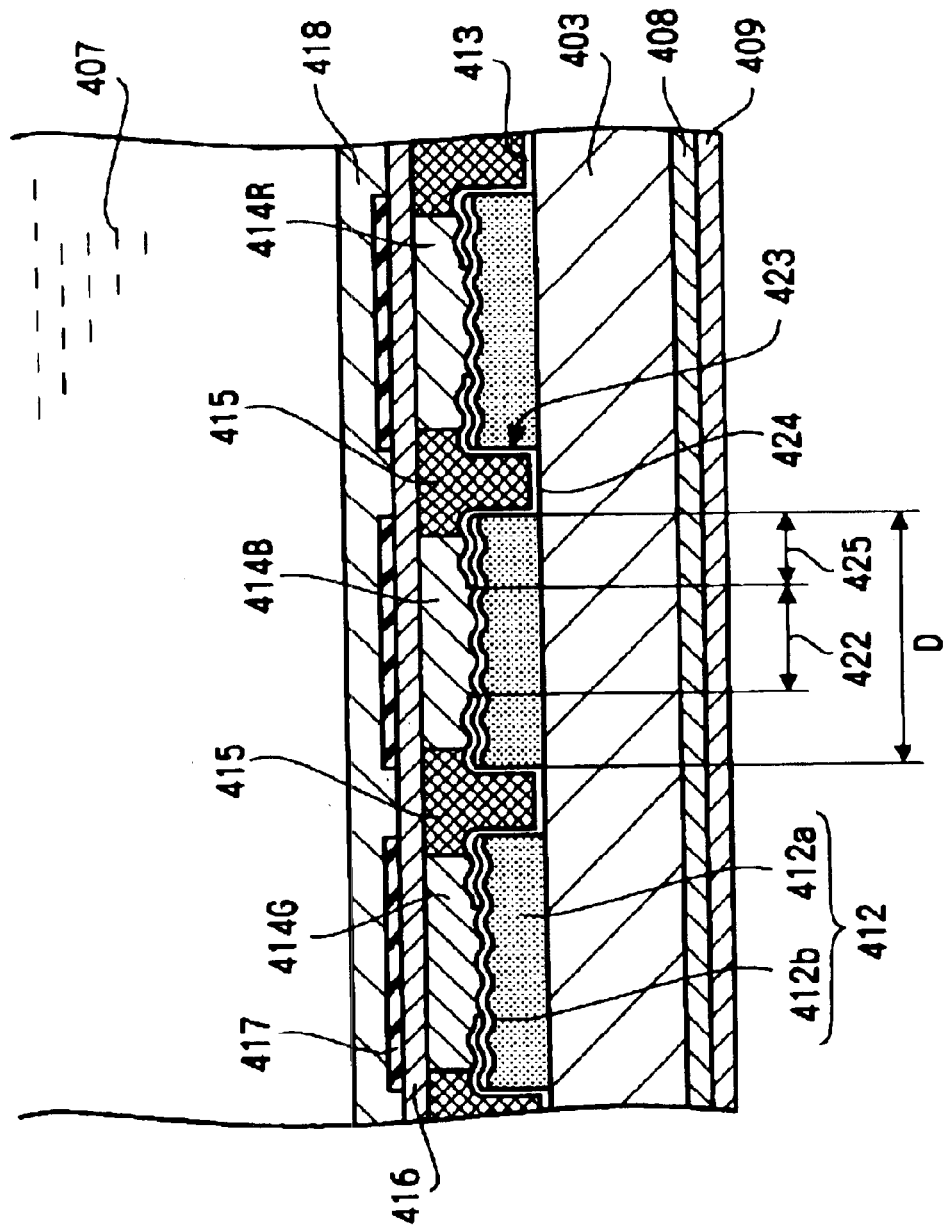
FIG. 29 is a sectional view showing the main part of a color filter substrate secluded in the liquid crystal device shown in FIG. 28.
Figure 30:
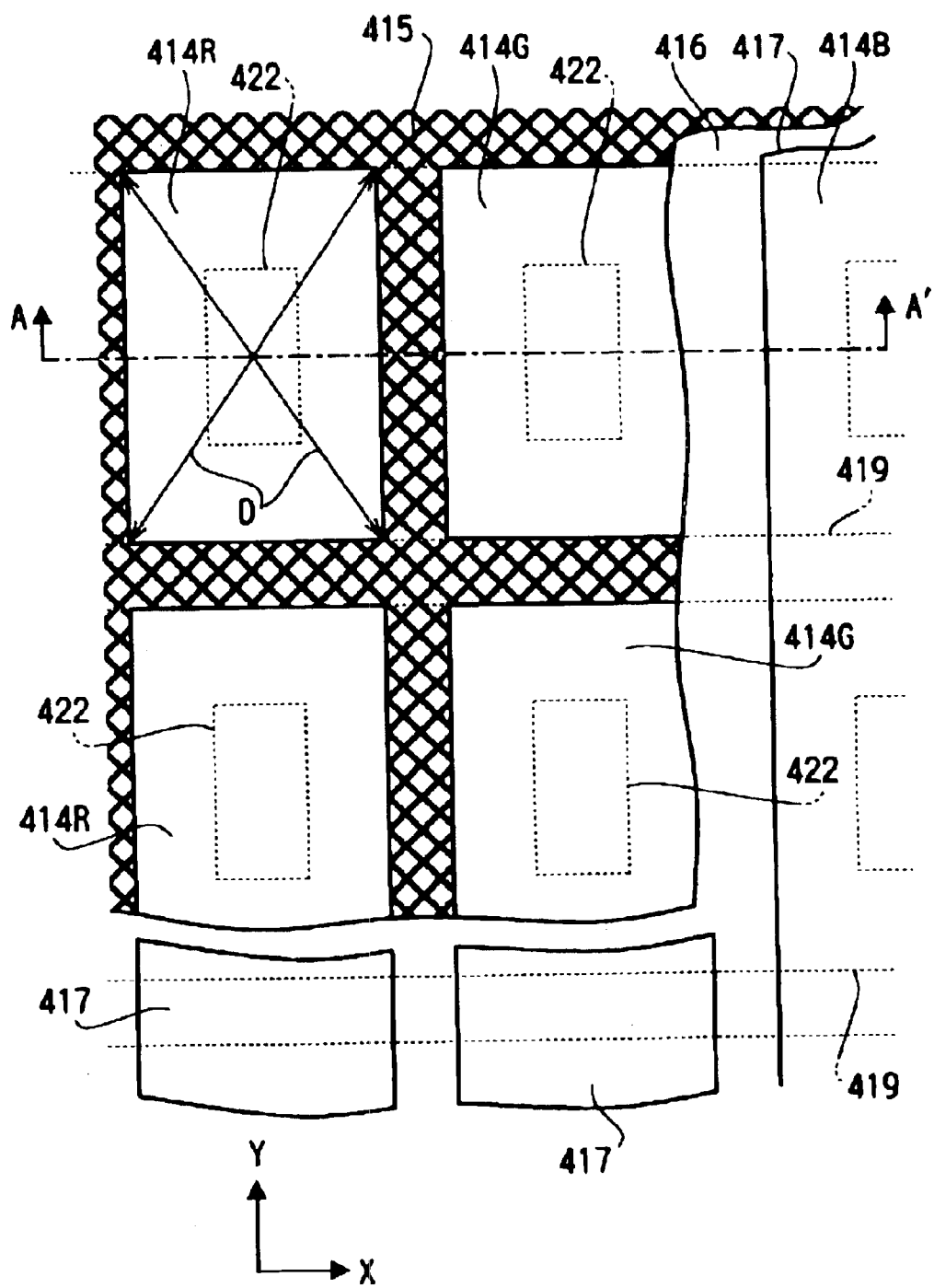
FIG. 30 is a partially broken plan view showing the planar structure of the liquid crystal device shown in FIG. 28.
Figure 31:
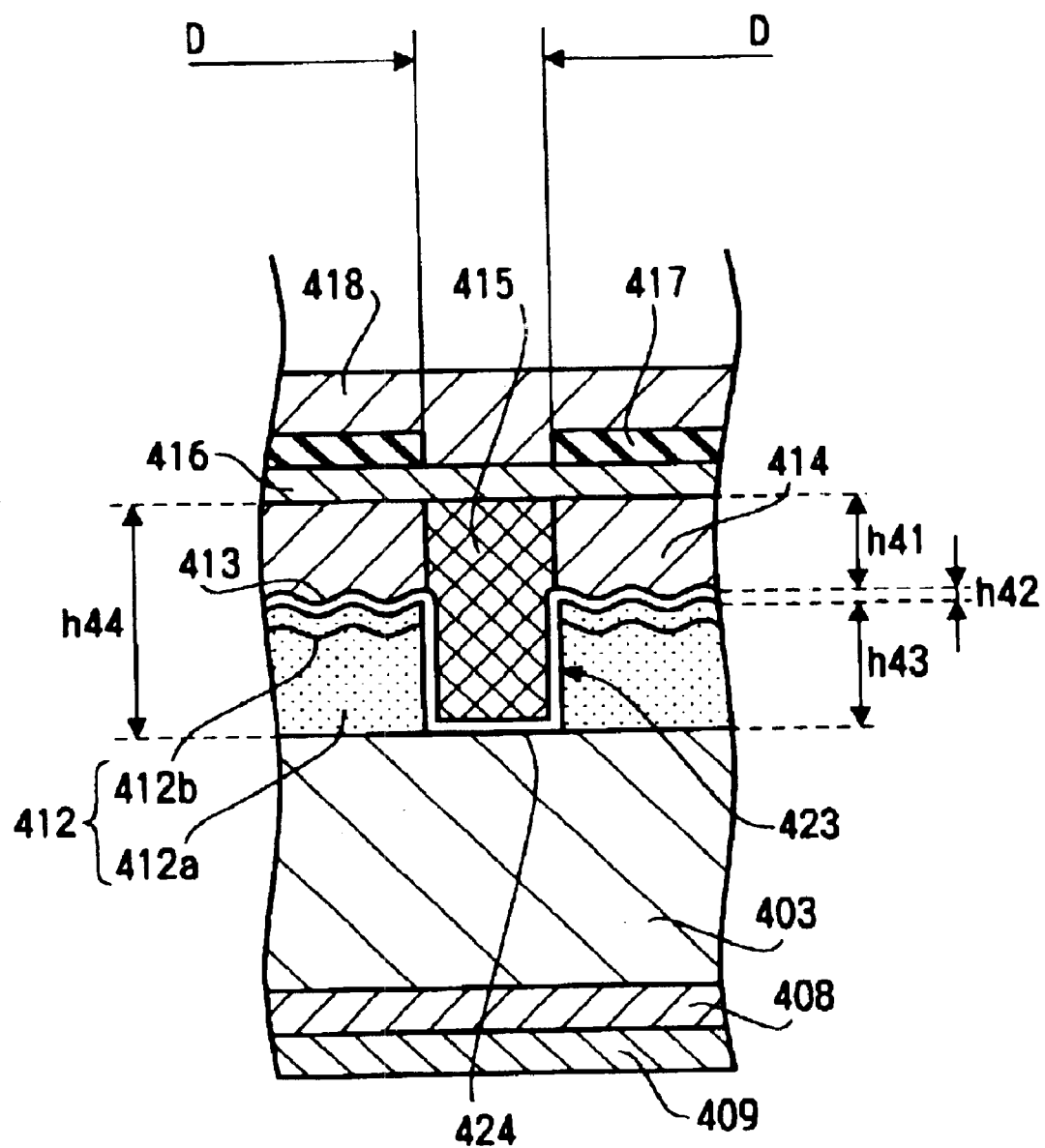
FIG. 31 is a sectional view showing the main part of the color filter substrate shown in FIG. 29.
Figure 32:
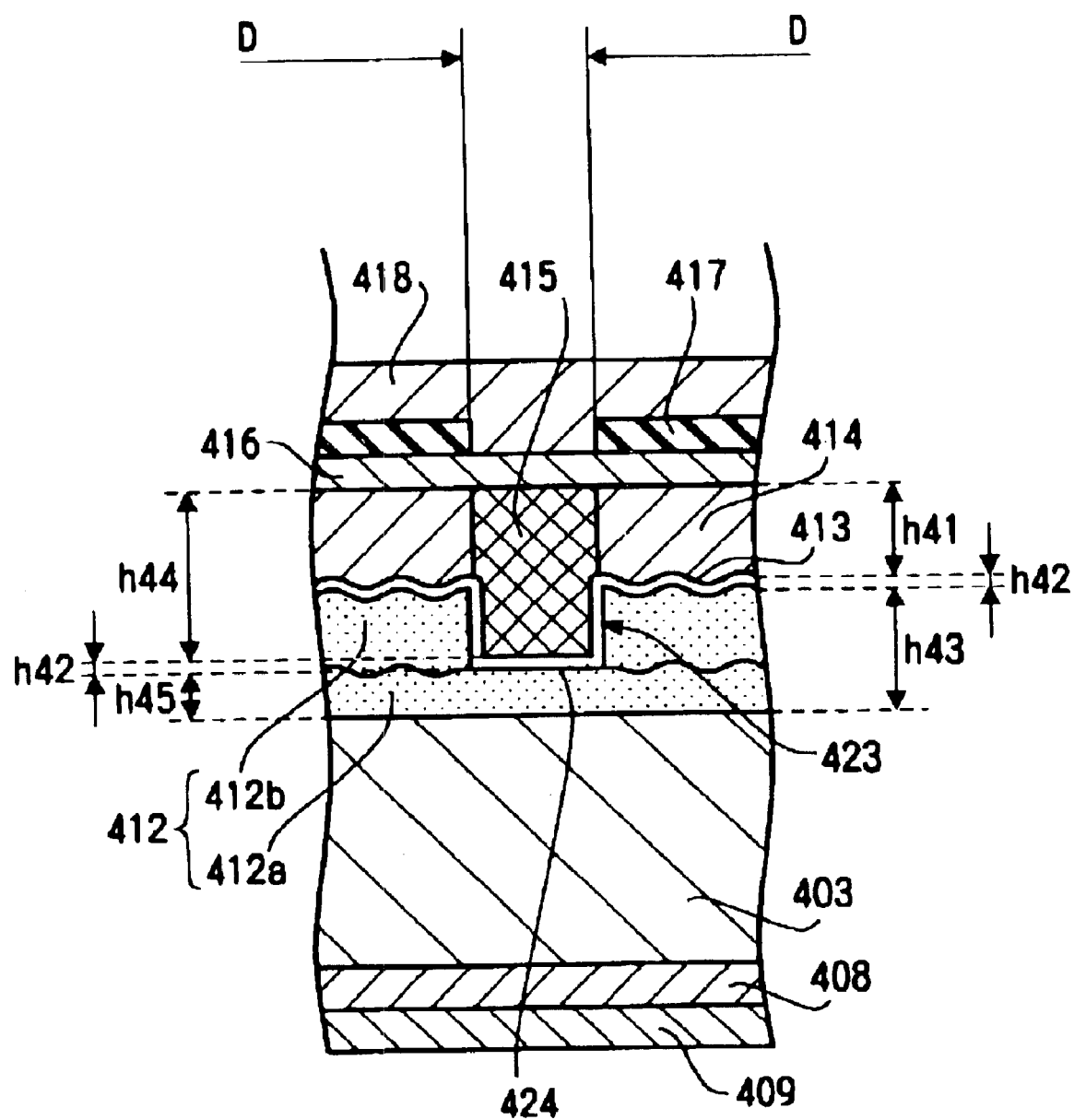
FIG. 32 is a sectional view showing the modification of the structure shown in FIG. 31.
Figure 33:
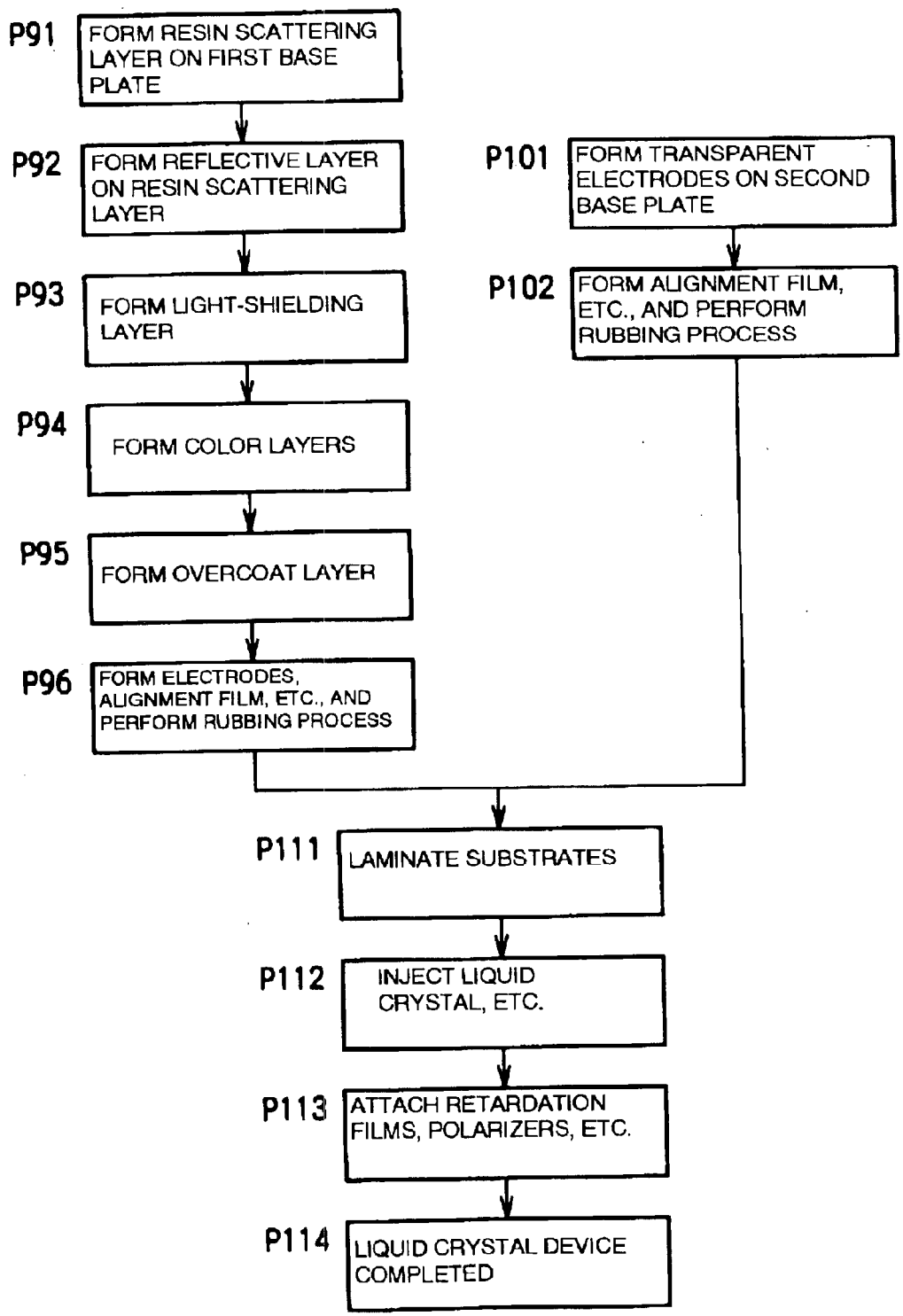
FIG. 33 is a flow chart showing a method for manufacturing the liquid crystal device shown in FIG. 28.

Next, another embodiment in which the present-invention is applied to a transflective passive-matrix liquid crystal device will be described. FIG. 28 is a sectional view of a liquid crystal panel included in a liquid crystal device according to another embodiment of the present invention. FIG. 29 is a sectional view of a color filter substrate included in the liquid crystal panel shown in FIG. 28. FIG. 30 is an enlarged view of a part of the liquid crystal panel. FIG. 28 corresponds to a sectional view of FIG. 30 cut along line A–A'. FIG. 31 is an enlarged sectional view of a part of a light-shielding layer from which a resin scattering layer, which serves as an underlayer, is completely removed. FIG. 32 is an enlarged sectional view of a part of the light-shielding layer from which the resin scattering layer, which serves as an underlayer, is partially removed. FIG. 33 is a flow chart showing a method for manufacturing the liquid crystal device according to the present embodiment.

A liquid crystal panel 402 shown in FIG. 28 is a transflective liquid crystal panel, and a liquid crystal device including the liquid crystal panel 402 is constructed similarly to the liquid crystal device 101 shown in FIG. 9. More specifically, the liquid crystal device is constructed by attaching the illuminating unit 131, which is provided as necessary, and the housing 132 to the liquid crystal panel 402.

As shown in FIG. 28, the liquid crystal panel 402 includes a color filter substrate 404 and an opposing substrate 406 which oppose each other and which are laminated with the sealing member 133 (see FIG. 9). The color filter substrate 404 includes a first base plate 403 which is a transparent plate composed of glass, synthetic resin, etc., and the opposing substrate 406 Includes a second base plate 405. In addition, a liquid crystal layer 407 is formed by injecting liquid crystal into a gap between the color filter substrate 404 and the opposing substrate 406. A retardation film 408 and a polarizer 409 are disposed on the outer surface of the first base plate 403, and a retardation film 410 and a polarizer 411 are disposed on the outer surface of the second base plate 405.

In the color filter substrate 404, an underlayer 412 is formed on the surface of the first base plate 403 which faces the liquid crystal layer 407 and a reflective layer 413 is formed on the surface of the underlayer 412. In addition, regions where the reflective layer 413 is formed on the surface of the underlayer 412 serve as reflective portions 425, and apertures 422 formed in the reflective layer 413 serve as transmissive portions.

As shown in FIG. 29, a green layer 414G, a blue layer 414B, and a red layer 414R are formed on the reflective layer 413 in a predetermined configuration pattern. In the following descriptions, these color layers may be generically denoted by reference numeral "414". A light-shielding layer 415 is formed so as to cover the boundary regions between the adjacent color layers 414.

In addition, an overcoat layer 416 is provided on the color layers 414 and the light-shielding layer 415 to protect them. In addition, transparent electrodes 417 composed of a transparent conductive material such as ITO are formed on the overcoat layer 416, and an alignment film 418 composed of polyimide resin, etc., is formed on the transparent electrodes 417.

With reference to FIG. 28, in the opposing substrate 406, transparent electrodes 419 are formed on the surface of the second base plate 405 which faces the liquid crystal layer 407, and an alignment film 420 is formed on the transparent electrodes 419. The electrodes 419 extend perpendicularly to the electrodes 417 on the first base plate 403 (that is, the X direction in FIG. 30).

The transparent electrodes 417 are arranged parallel to each other in a striped pattern, and the transparent electrodes 419 are arranged parallel to each other in a striped pattern such that the transparent electrodes 419 extend perpendicularly to the transparent electrodes 417. Areas where the transparent electrodes 417 on the first base plate 403 and the transparent electrodes 419 on the second base plate 405 intersect serve as display dots D.

The underlayer 412 in the color filter substrate 404 is composed of a resin material and includes a lower layer 412a and an upper layer 412b, as shown in FIG. 29. In the underlayer 412, small irregularities are formed in the surface of the lower layer 412a, and the upper layer 412b is formed by covering the lower layer 412a with a thin layer composed of the same material as the lower layer 412a. Accordingly, smooth irregularities are formed in the surface of the underlayer 412. These irregularities serve to scatter light which passes through the underlayer 412, so that the problem in that the displayed image cannot be viewed clearly can be solved.

The reflective layer 413 is preferably composed of an elemental metal such as aluminum or silver, and is formed on the underlayer 412. The surface of the reflective layer 413 also has small irregularities corresponding to those in the surface of the underlayer 412. Therefore, light reflected by the reflective layer 413 is also scattered, so that the problem in that the displayed image cannot be viewed clearly can be solved.

As shown in FIG. 30, for example, the reflective layer 413 has the apertures 422 having an approximately rectangular shape at the central regions of the display dots D, and the apertures 422 serve as the transmissive portions. Light emitted from the illuminating unit 131 (see FIG. 9) passes through the apertures 422 and is supplied to the liquid crystal layer 407. The shape of the apertures 422 is not limited to this example, and the apertures 422 may have other shapes such as a circle. In addition, the number of apertures 422 formed in the display dot D is not limited to one, and a plurality of apertures 422 may also be formed.

The color layers 414 are formed by applying a color resist composed of a photosensitive resin including a colorant such as a pigment and a dye and forming a pattern by using photolithography techniques. In this patterning process, portions for covering the apertures 422, which allow light which is emitted from the illuminating unit 131 and travels through the first base plate 403 to pass therethrough, and portions for covering the reflective layer 413 at regions around the apertures 422 are formed. When the color layers 414 corresponding to three colors (R, G, and B) are provided as in the present embodiment, the above-described patterning process is performed for each color.

Although the color layers 414 are arranged in an oblique mosaic pattern in FIG. 30, they may also be arranged in other various patterns including a striped pattern, a digital pattern, etc.

The light-shielding layer 415 is formed so as to cover the boundary regions between the display dots D, and serves to prevent light from passing through the boundary regions. The light-shielding layer 415 includes band-shaped portions which extend along the longitudinal direction of the transparent electrodes 417 formed on the first base plate 403 (that is, the Y direction in FIG. 30), and band-shaped portions which extend along the direction perpendicular to this direction (that is, the X direction in FIG. 30).

The light-shielding layer 415 is composed of a resin black obtained by dispersing chromium metal, carbon, or titanium, etc., in a photoresist or of a metallic material such as nickel. As shown in FIG. 31, the light-shielding layer 415 is formed on the reflective layer 413 so as to fill openings 423, which is formed in the underlayer 412 at the boundary regions between the adjacent display dots D. In addition, the height of the surface of the light-shielding layer 415 from the surface of the first base plate 403 which faces the liquid crystal layer 407 is set such that the surfaces of the adjacent color layers 414 and the surface of the light-shielding layer 415 level with each other. In addition, the light-shielding layer 415 is formed such that the upper portions thereof extend into the regions where the adjacent color layers 414 are formed.

For example, when h41 is the thickness of the adjacent color layers 414, h42 is the thickness of the reflective layer 413, and h43 is the thickness of the underlayer 412, if the light-shielding layer 415 is formed such that the sum of the thickness h44 of the light-shielding layer 415 and the thickness h42 of the reflective layer 413 is approximately the same as the sum of h41, h42, and h43, the planarity over the surfaces of the display dots D and the surface of the light-shielding layer 415 is ensured. Accordingly, the dispersion of the cell gap becomes small and a rubbing process can be performed easily. In addition, the contrast of an image displayed by the liquid crystal device increases.

In addition, since the light-shielding layer 415 is formed so as to fill the openings 423 in such a manner that the upper portions thereof extend into the regions where the adjacent color layers 414 are formed, light leakage through the color layers 414 can be more reliably prevented.

The concave areas in the underlayer 412 in which the light-shielding layer 415 is formed is not limited to the openings 423 shown in FIG. 31. Recesses 423 shown in FIG. 32 may be provided instead. In such a case, the underlayer 412 is not completely removed at regions under bottom surfaces 424 of the recesses 423. Also in this case, the height of the light-shielding layer 415 is reduced by the amount corresponding to the depth of the recesses 423.

For example, with reference to FIG. 32, when h45 is the thickness of the underlayer 412 at regions under the bottom surfaces 424 of the recesses 423, if the light-shielding layer 415 is formed such that the sum of the thickness h44 of the light-shielding layer 415 and the thickness h42 of the reflective layer is approximately the same as the sum of the thickness h41 of the color layers 414, the thickness h42 of the reflective layer, and the thickness h43 of the underlayer 412, the planarity over the surfaces of the display dots D and the surface of the light-shielding layer 415 is ensured. Accordingly, the dispersion of the cell gap becomes small and the rubbing process can be performed easily. As a result, the contrast of an image displayed by the liquid crystal device increases.

The display dots D are regions surrounded by the light-shielding layer 415, and each display dot D includes one of the color layers 414 corresponding to R, G, and B, the reflective layer 413, and the aperture 422. A single pixel is constructed of three display dots D including the color layers 414 corresponding to R, G, and B.

In the present embodiment, with reference to FIG. 28, a signal is supplied to the transparent electrodes 419 formed on the second base plate 405, and another signal is supplied to the transparent electrodes 417 formed on the first base plate 403. Accordingly, the liquid crystal is driven only at regions corresponding to the display dots D where the transparent electrodes 419 and the transparent electrodes 417 intersect.

In reflective display, external light enters the liquid crystal layer 407 from the side where the opposing substrate 406 is disposed, is modulated in units of a display dot D, passes through the color layers 414, and is reflected by the reflective layer 413. The reflected light passes through the opposing substrate 406 again and is emitted to the outside. According to the present embodiment, since the overcoat layer 416 is planar, a high-contrast image can be displayed.

In transmissive display, light emitted from the illuminating unit 131 (see FIG. 9) passes through the first base plate 403 and the apertures, that is, the transmissive portions 422, and enters the liquid crystal layer 407. The light is modulated by the liquid crystal layer 407 in units of a display dot D, passes through the transparent electrodes 419 and the second base plate 405, and is emitted to the outside. According to the present embodiment, since the overcoat layer 416 is planar, a high-contrast image can be displayed. The emitted light is colored in corresponding colors by the color layers 414 which cover the reflective layer 413 and the transmissive portions 422.

In the present embodiment, the underlayer 412 is formed such that the openings 423 are provided at the boundary regions between the adjacent display dots D, and the light-shielding layer 415 is formed so as to fill the openings 423. Thus, the height of the light-shielding layer 415 can be reduced by the amount corresponding to the depth of the openings 423, and the planarity over the surfaces of the display dots D and the surfaces of the boundary regions between the display dots D can be ensured. Accordingly, the planarity of the overcoat layer 416 can be ensured, so that the dispersion of the cell gap becomes small and the rubbing process can be performed easily. In addition, the contrast of an image displayed by the liquid crystal device can be increased.

In addition, since the light-shielding layer 415 is formed such that the upper portions thereof extend into the regions where the adjacent color layers 414 are formed, light leakage through the color layers can be more reliably prevented.

In the case in which the underlayer 412 is not completely removed at regions under the recesses 423, as shown in FIG. 32, the underlayer 412 can be constructed of a first insulating layer 412a and a second insulating layer 412b which is formed on the first insulating layer 412a. In this case, the recesses 423 having the depth corresponding to the thickness of the second insulating layer 412b are provided. Also in this case, the roughness of the top surface of the overcoat layer 416 can be reduced, so that the dispersion of the cell gap becomes small and the rubbing process can be performed easily. As a result, the contrast of an image displayed by the liquid crystal device can be increased.

Manufacturing Method of the Liquid Crystal Device

Next, a manufacturing method of the liquid crystal device according to the present embodiment will be described with reference to a flow chart shown in FIG. 33. First, in Step P91 shown in FIG. 33, the resin scattering layer 412, which serves as an underlayer, is formed on the first base plate 403. The underlayer 412 is etched by using a photoresist such that the openings 423 shown in FIG. 31 are formed in the underlayer 412 at the boundary regions between the display dots D in which the light-shielding layer 415 is to be formed.

This will be described in more detail below. A resin material is uniformly applied to the first base plate 403 by spin coating, and then a resist is applied. Then, the resist is exposed to light through a photomask having a predetermined pattern, and is developed. Then, a plurality of holes are formed in the underlayer 412 by etching.

Next, heat is applied to the underlayer 412 so that the holes deform and become smooth, and the lower layer 412a of the underlayer 412 having irregularities in the surface thereof is thus obtained. Then, the upper layer 412b of the underlayer 412 is formed by applying the resin material such that smooth irregularities are formed in the surface of the underlayer 412.

Then, a resist is applied to the underlayer 412, is exposed to light through a photomask having a predetermined pattern, and is developed. Then, the openings 423 are formed in the underlayer 412 by etching, so that the underlayer 412 is removed at regions where the light-shielding layer 415 is to be formed.

Next, in Step P92, a thin film of aluminum, etc., is formed on the underlayer 412 by using deposition techniques or sputtering techniques, and a pattern is formed by using photolithography techniques such that the approximately rectangular apertures 422 are formed at the central regions of the display dots D, as shown in FIG. 30, and the reflective layer 413 is formed at regions surrounding the apertures 422.

Next, in Step P93, a light-shielding material is applied to the underlayer 412 having the openings 423 and the reflective layer 413. Then, a pattern is formed by using photo-etching techniques such that the light-shielding layer 415 is formed so as to fill the openings 423 of the underlayer 412. The light-shielding material can be obtained by, for example, dispersing carbon black, etc., in a resin.

Next, in Step P94, a coloring material for one of the colors is applied to the reflective layer 413 and the apertures 422 by spin-coating, and then a resist is applied. The resist is exposed to light through a photomask having a predetermined pattern, and is developed. Then, etching is performed so as to form the color layers 414 corresponding to that color. The above-described process is repeated for the other two colors, so that the color layers 414 corresponding to R, G, and B are formed in a desired configuration pattern.

Next, in Step P95, the overcoat layer 416 is formed on the color layers 414. In the present embodiment, since the openings 423 are formed in the underlayer 412, the height of the light-shielding layer 415 can be reduced and the planarity of the surface of the overcoat layer 416 can be ensured. Accordingly, the dispersion of the cell gap becomes small and the rubbing process can be performed easily. As a result, the contrast of a displayed image can be increased.

Next, in Step P96, a material of the transparent electrodes 417, such as ITO, is applied to the overcoat layer 416 by using sputtering techniques, and a pattern is formed by using photolithography techniques such that the transparent electrodes 417 having a predetermined width are formed in a striped pattern along the Y direction, as shown in FIG. 30.

Next, the alignment film 418 is formed on the transparent electrodes 417, and is subjected to the rubbing process. Accordingly, the color filter substrate 404 is completed. Thus, the planarity of the surface of the alignment film 418 facing the liquid crystal layer 407 is also ensured and the dispersion of the cell gap becomes small, so that a high-quality image can be displayed.

With regard to the opposing substrate 406 shown in FIG. 28, a material of the transparent electrodes 419, such as ITO, is applied to the second base plate 405 by using sputtering techniques in Step P101 shown in FIG. 33. Then, a pattern is formed by using photolithography techniques such that the transparent electrodes 419 are formed in a striped pattern along the X direction, as shown in FIG. 30. Then, the alignment film 420 is formed on the transparent electrodes 419, and is subjected to the rubbing process. Accordingly, the opposing substrate 406 is completed.

Next, in Step P111, the spacers 129 (see FIG. 9) are dispersed over the opposing substrate 406 by dry dispersion, etc., and the color filter substrate 404 and the opposing substrate 406 are laminated with the scaling member 133. Then, in Step P112, liquid crystal is injected into the cell gap, that is, a gap between the substrates, through an opening formed in the sealing member 133. Then, the opening formed in the sealing member 133 is sealed with a sealant such as an ultraviolet curing resin.

Next, in Step P113, the retardation films 408 and 410, and the polarizers 409 and 411 are laminated on the outer surfaces of the first base plate 403 and the second base plate 405, respectively. Next, in Step PI 14, electric wirings are arranged as necessary and the illuminating unit 131 and the housing 132 shown in FIG. 9 are attached. Accordingly, the liquid crystal device is completed.

In the manufacturing method shown in FIG. 33, since the openings 423 are formed in the underlayer 412, the height of the light-shielding layer 415 can be reduced, as shown in FIG. 31. Thus, the planarity of the surface of the overcoat layer 416 can be ensured, so that the dispersion of the cell gap becomes small and the rubbing process can be performed easily. As a result, the contrast of a displayed image can be increased.

In addition, in the manufacturing method shown in FIG. 33, the underlayer 412 is completely removed at regions where the light-shielding layer 415 is formed, as shown in FIG. 31. Alternatively, however, the underlayer 412 may be constructed in two steps by forming the first insulating layer 412a in the first step and the second insulating layer 412b in the second step, and the recesses 423 having the depth corresponding to the thickness of the upper layer 412b may be provided, as shown in FIG. 32.

In this case, in the first step, the first insulating layer 412a is formed over the entire region of the base plate including the boundary regions between the display dots D in which the light-shielding layer 415 is to be formed, and irregularities are formed similarly to the lower layer 412a of the underlayer 412 shown in FIG. 31. In the second step, the second insulating layer 412b is formed so as to cover the regions excluding the boundary regions between the display dots D in which the light-shielding layer 415 is to be formed, that is, the regions corresponding to the display dots D, by an etching process using a photoresist.

When the underlayer 412 is completely removed at regions corresponding to the openings 423, as shown in FIG. 31, there is a possibility that the planarity over the surfaces of the boundary regions between the adjacent display dots D and the surfaces of the display dots D will be degraded instead of improving. In such a case, the planarity can be ensured by setting the thickness of the underlayer 412 at regions where the recesses 423 are provided to a desired value, as shown in FIG. 32. Accordingly, the dispersion of the cell gap becomes small and the rubbing process can be performed easily.

The recesses 423 may also be formed by using a halftone.

Seventh Embodiment

Figure 34:
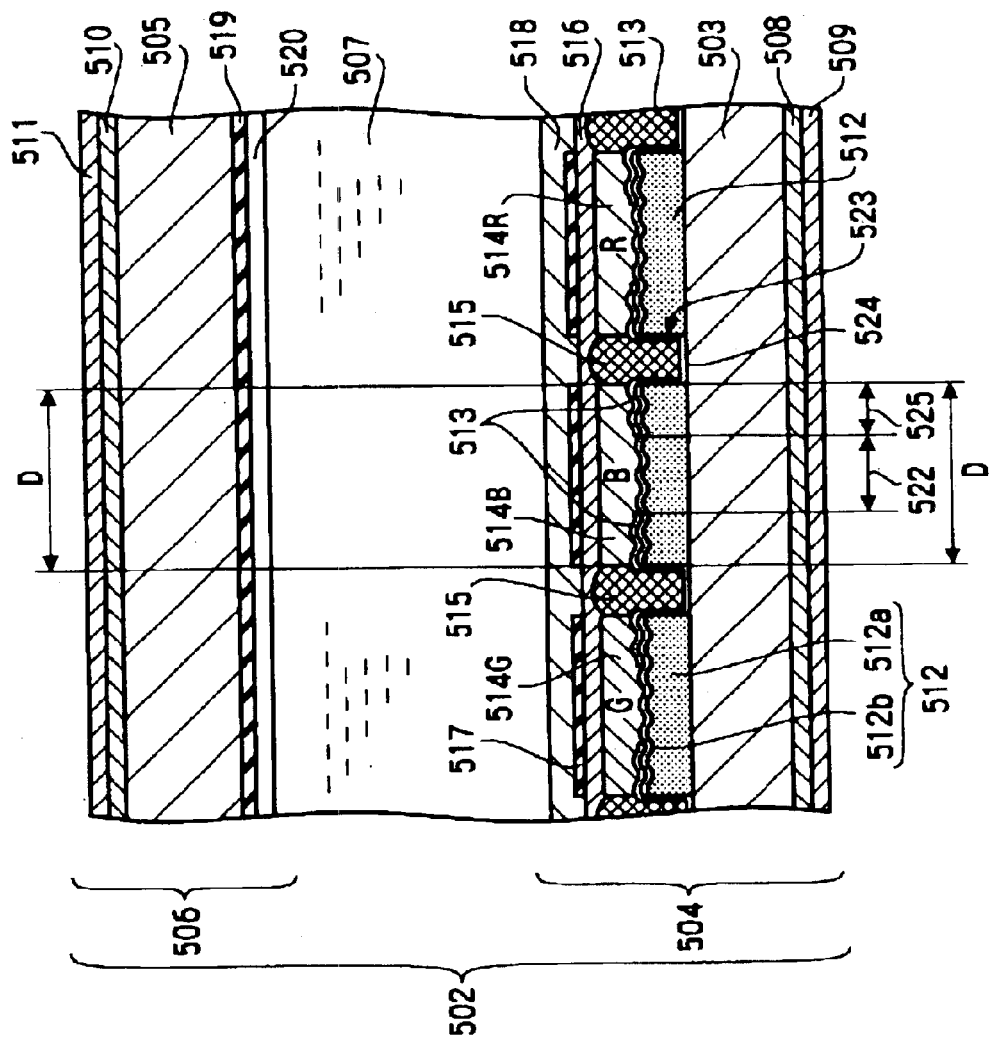
FIG. 34 is a sectional view showing the cross-sectional structure of the main part of a liquid crystal device according to another embodiment of the electrooptical device of the present invention.
Figure 35:
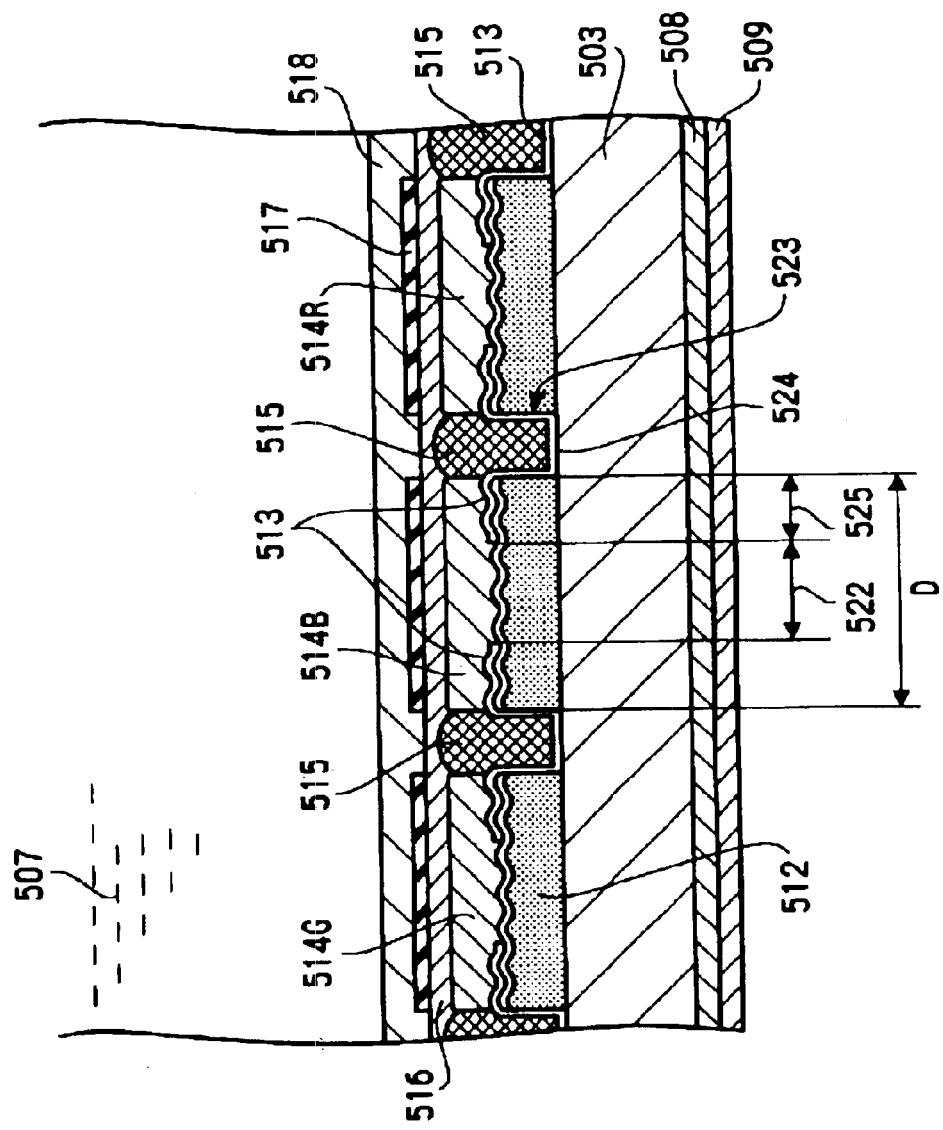
FIG. 35 is a sectional view showing the main part of a color filter substrate included in the liquid crystal device shown in FIG. 34.
Figure 36:
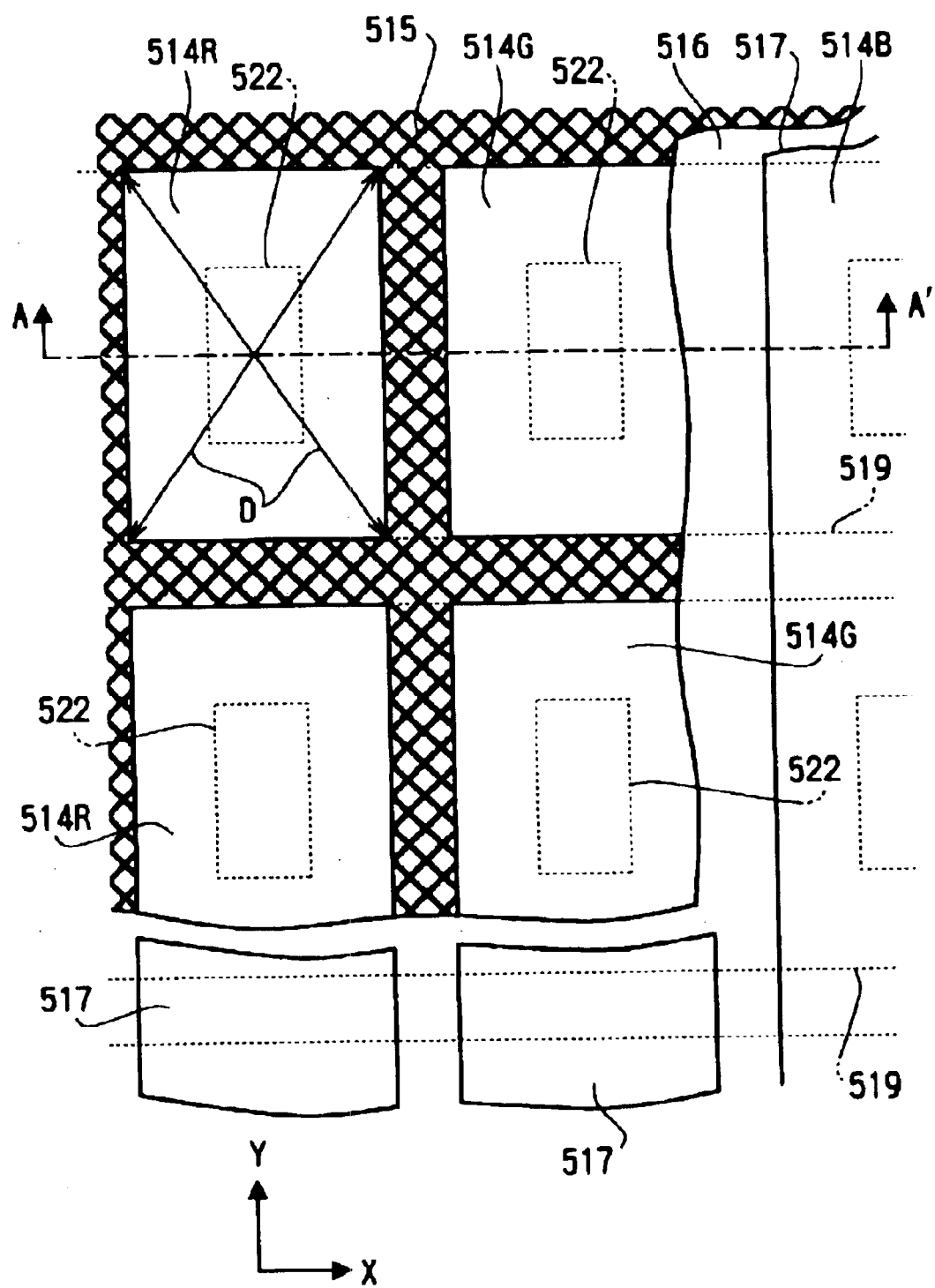
FIG. 36 is a partially broken plan view showing the planar structure of the liquid crystal device shown in FIG. 34.
Figure 37:
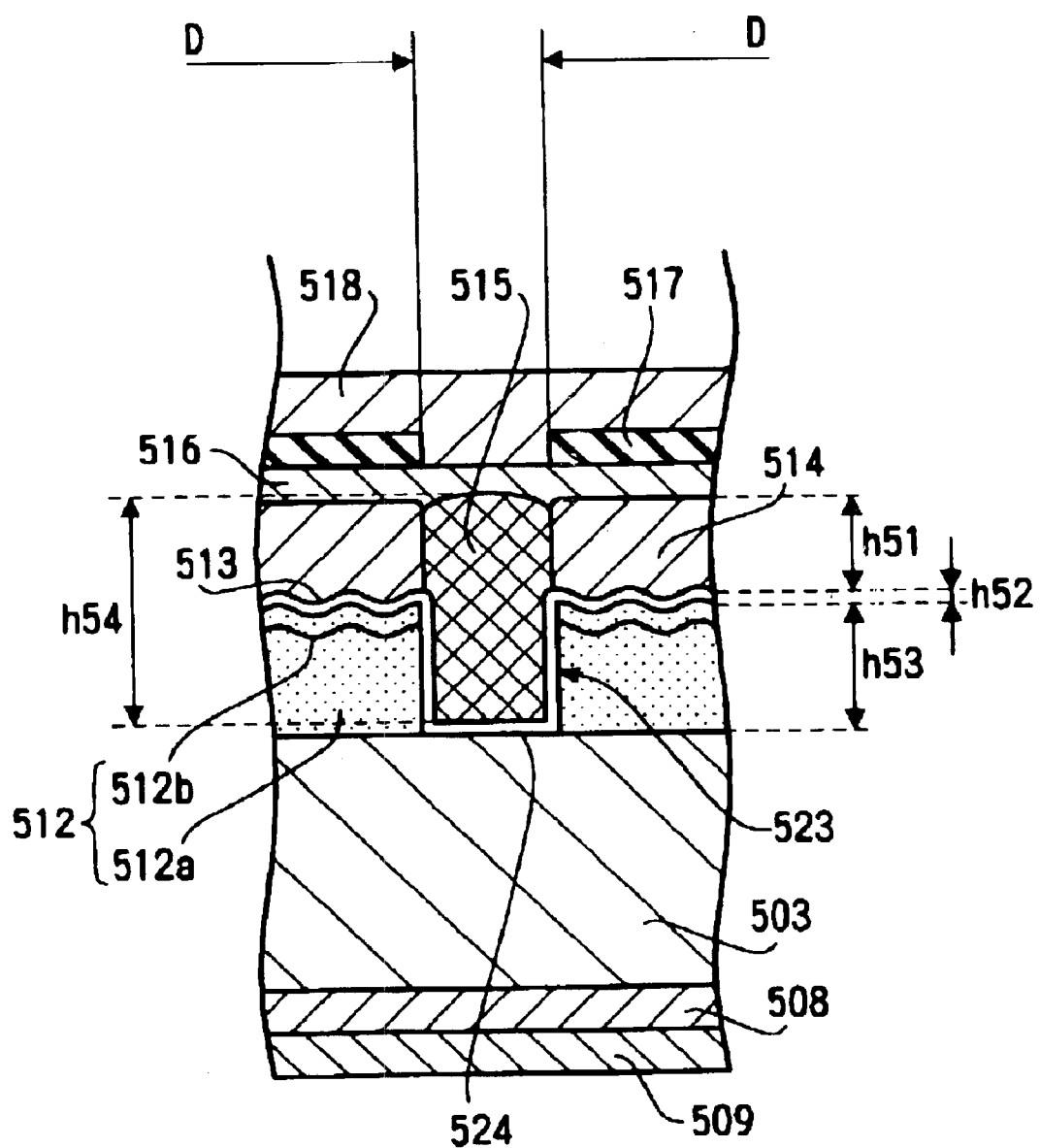
FIG. 37 is a sectional view showing the main part of the color filter substrate shown in FIG. 35.
Figure 38:
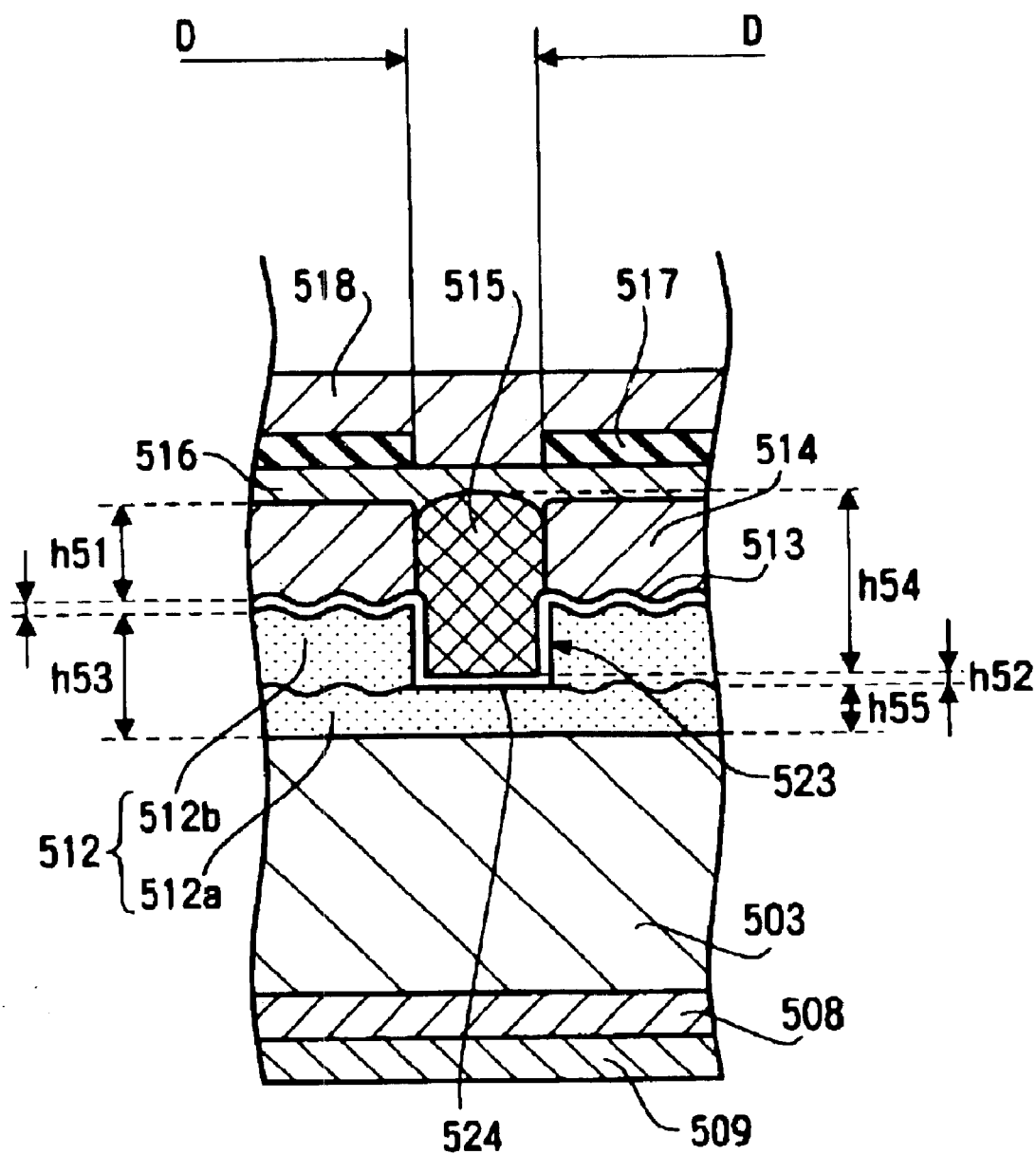
FIG. 38 is a sectional view showing the modification of the structure shown in FIG. 37.
Figure 39:
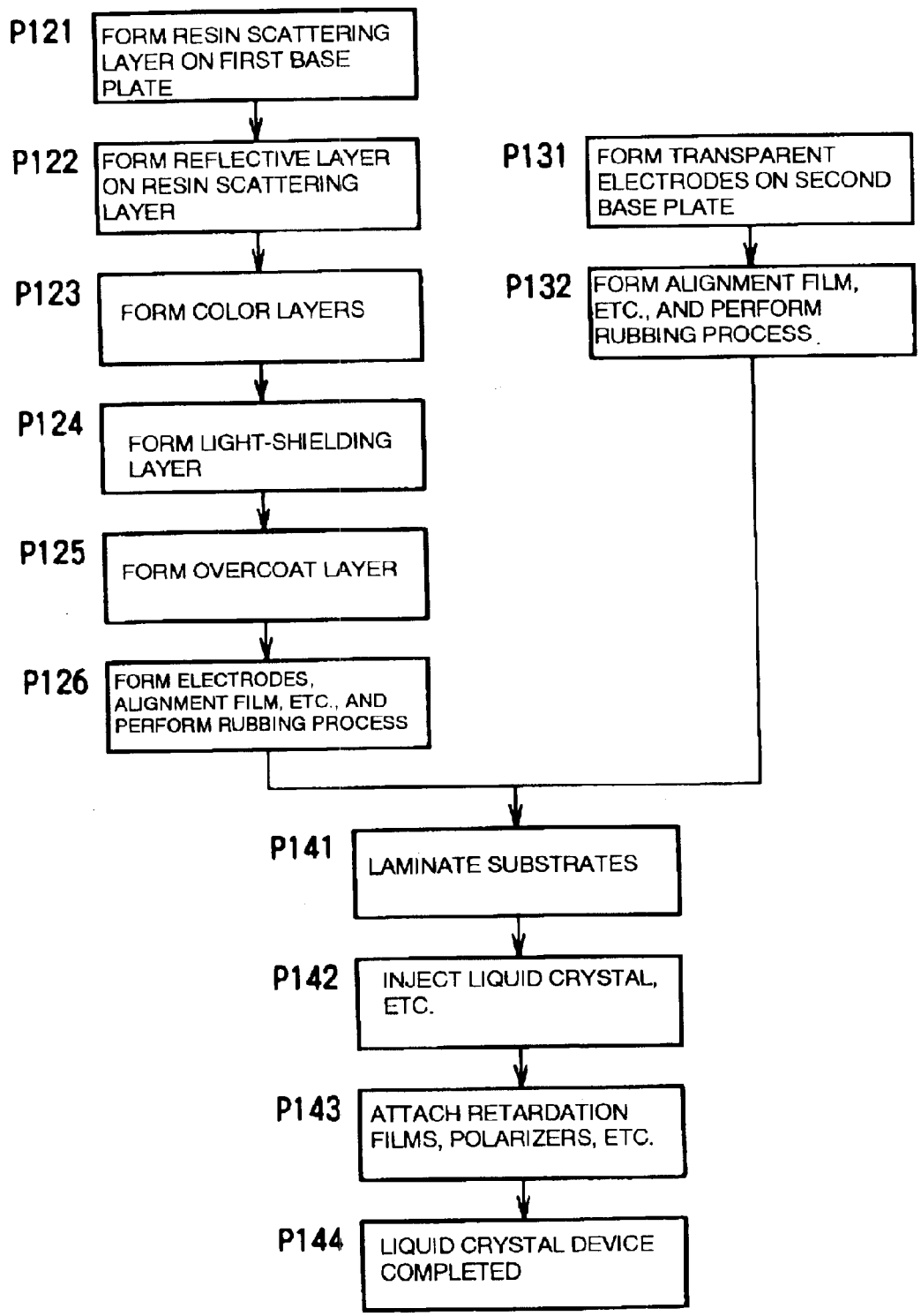
FIG. 39 is a flow chart showing a method for manufacturing the liquid crystal device shown in FIG. 34.

Next, another embodiment in which the present invention is applied to a transflective passive-matrix liquid crystal device will be described. FIG. 34 is a sectional view of a liquid crystal panel included in the liquid crystal device according to another embodiment of the present invention. FIG. 35 is a sectional view of a color filter substrate included in the liquid crystal panel shown in FIG. 34. FIG. 36 is an enlarged view of a part of the liquid crystal panel. FIG. 34 corresponds to a sectional view of FIG. 36 cut along line A–A'. FIG. 37 is an enlarged sectional view of a part of a light-shielding layer from which a resin scattering layer is completely removed. FIG. 38 is an enlarged sectional view of a part of the light-shielding layer from which the resin scattering layer is partially removed. FIG. 39 is a flow chart showing a method for manufacturing the liquid crystal device according to the present embodiment.

A liquid crystal panel 502 shown in FIG. 34 is a transflective liquid crystal panel, and a liquid crystal device including the liquid crystal panel 502 is constructed similarly to the liquid crystal device 101 shown in FIG. 9. More specifically, the liquid crystal device is constructed by attaching the illuminating unit 131, which is provided as necessary, and the housing 132 to the liquid crystal panel 502.

As shown in FIG. 34, the liquid crystal panel 502 includes a color filter substrate 504 and an opposing substrate 506 which oppose each other and which are laminated with the sealing member 133 (see FIG. 9). The color filter substrate 504 includes a first base plate 503 which is a transparent plate composed of glass, synthetic resin, etc., and the opposing substrate 506 includes a second base plate 505. In addition, a liquid crystal layer 507 is formed by injecting liquid crystal into a gap between the color filter substrate 504 and the opposing substrate 506. A retardation film 508 and a polarizer 509 are disposed on the outer surface of the first base plate 503, and a retardation film 510 and a polarizer 511 are disposed on the outer surface of the second base plate 505.

In the color filter substrate 504, an underlayer 512 is formed on the surface of the first base plate 503 which faces the liquid crystal layer 507 and a reflective layer 513 is formed on the surface of the underlayer 512. In addition, regions where the reflective layer 513 is formed on the surface of the underlayer 512 serve as reflective portions 525, and apertures 522 formed in the reflective layer 513 serve as transmissive portions.

As shown in FIG. 35, a green layer 514G, a blue layer 514B, and a red layer 514R are formed on the reflective layer 513 in a predetermined configuration pattern. In the following descriptions, these color layers may be generically denoted by reference numeral "514". A light-shielding layer 515 is formed so as to cover the boundary regions between the adjacent color layers 514.

In addition, an overcoat layer 516 is provided on the color layers 514 and the light-shielding layer 515 to protect them. In addition, transparent electrodes 517 composed of a transparent conductive material such as ITO are formed on the overcoat layer 516, and an alignment film 518 composed of polyimide resin, etc., is formed on the transparent electrodes 517.

With reference to FIG. 34, in the opposing substrate 506, transparent electrodes 519 are formed on the surface of the second base plate 505 which faces the liquid crystal layer 507, and an alignment film 520 is formed on the transparent electrodes 519. The electrodes 519 extend perpendicularly to the electrodes 517 on the first base plate 503 (that is, the X direction in FIG. 36). The transparent electrodes 517 are arranged parallel to each other in a striped pattern, and the transparent electrodes 519 are arranged parallel to each other in a striped pattern such that the transparent electrodes 519 extend perpendicularly to the transparent electrodes 517. Areas where the transparent electrodes 517 and the transparent electrodes 519 intersect serve as display dots D.

The underlayer 512 in the color filter substrate 504 includes a lower layer 512a and an upper layer 512b, and both of these layers are composed of a resin material. In the underlayer 512, small irregularities are formed in the surface of the lower layer 512a, and the upper layer 512b is formed by covering the lower layer 512a with a thin layer composed of the same material as the lower layer 512a. Accordingly, smooth irregularities are formed. These irregularities serve to scatter light which passes through the underlayer 512, so that the problem in that the image displayed by the liquid crystal device cannot be viewed clearly can be solved.

The reflective layer 513 is preferably composed of an elemental metal such as aluminum or silver and is formed on the underlayer 512. The surface of the reflective layer 513 also has small irregularities corresponding to those in the surface of the underlayer 512. Therefore, light reflected by the reflective layer 513 is also scattered, so that the problem in that the image displayed by the liquid crystal device cannot be viewed clearly can be solved.

As shown in FIG. 36, for example, the reflective layer 513 has the apertures 522 having an approximately rectangular shape at the central regions of the display dots D, and the apertures 522 serve as the transmissive portions. Light emitted from the illuminating unit 131 (see FIG. 9) passes through the apertures 522 and is supplied to the liquid crystal layer 507. The shape of the apertures 522 is not limited to this example, and the apertures 522 may have other shapes such as a circle. In addition, the number of apertures 522 formed in a single display dot D is not limited to one, and a plurality of apertures 522 may also be formed.

The color layers 514 are formed by applying a color resist composed of a photosensitive resin including a colorant such as a pigment and a dye and forming a pattern by using photolithography techniques. In this patterning process, portions for covering the apertures 522, which allow light which is emitted from the illuminating unit 131 and travels through the first base plate 503 to pass therethrough, and portions for covering the reflective layer 513 at regions around the apertures 522 are formed. When the color layers 514 corresponding to three colors (R, G, and B) are provided as in the present embodiment, the above-described patterning process is performed for each color.

The light-shielding layer 515 is formed so as to cover the boundary regions between the display dots D, and serves to prevent light from passing through the boundary regions. The light-shielding layer 415 includes band-shaped portions which extend along the longitudinal direction of the transparent electrodes 517 formed on the first base plate 503 (that is, the Y direction in FIG. 36), and band-shaped portions which extend along the direction perpendicular to this direction (that is, the X direction in FIG. 36).

The light-shielding layer 515 is composed of a resin black obtained by dispersing chromium metal, carbon, titanium, etc., in a photoresist, or of a metallic material such as nickel.

With reference to FIG. 37, openings 523 are formed in the underlayer 512, and bottom surfaces 524 of the openings 523 are positioned on the first base plate 503 with the reflective layer 513 therebetween. The light-shielding layer 515 is formed on the reflective layer 513 at regions corresponding to the openings 523 such that the light-shielding layer 515 is slightly higher than the adjacent color layers 514.

With reference to FIG. 37, for example, when h51 is the thickness of the adjacent color layers 514, h52 is the thickness of the reflective layer 513, and h53 is the thickness of the underlayer 512, the sum of the thickness h54 of the light-shielding layer 515 and the thickness h52 of the reflective layer 513 is set slightly larger than the sum of h51, h52, and h53.

Since the light-shielding layer 515 is formed last in the openings 523, which are formed between the adjacent color layers 514 in the structure including the underlayer 512 and the color layers 514 formed on the underlayer 512, the light-shielding layer 515 is slightly higher than the color layers 514. Accordingly, the openings 523 can be reliably shielded from light.

In addition, since the difference in height between the surface of the light-shielding layer 515 and the surface of the color layers 514 is small, the planarity over them is maintained. Therefore, the dispersion of the cell gap becomes small and the rubbing process can be performed easily. As a result, the contrast of an image displayed by the liquid crystal device increases.

The concave areas in the underlayer 512 in which the light-shielding layer 515 is formed is not limited to the above-described openings 523, and recesses 523 shown in FIG. 38, for example, may be provided instead. In such a case, the underlayer 512 is not completely removed at regions under the bottom surfaces 524 of the recesses 523. Also in this case, the height of the light-shielding layer 515 is reduced by the amount corresponding to the depth of the bottom surfaces 524 of the recesses 523.

For example, the light-shielding layer 515 is formed such that the sum of the thickness h55 of the underlayer 512 under the bottom surfaces 524, the thickness h52 of the reflective layer 513, and the thickness h54 of the light-shielding layer 515 is set slightly larger than the thickness h51 of the color layers 514, the thickness h52 of the reflective layer 513, and the thickness h53 of the underlayer 512.

Accordingly, the light-shielding layer 515 formed in the recesses 523 can reliably prevent light from passing therethrough. In addition, since the difference in height between the surface of the light-shielding layer 515 and the surface of the color layers 514 is small, the planarity between them is maintained. Therefore, the dispersion of the cell gap becomes small and the rubbing process can be performed easily. As a result, the contrast of an image displayed by the liquid crystal device increases.

The display dots D are regions surrounded by the light-shielding layer 515, and each display dot D includes one of the color layers 514 corresponding to R, G, and B, the reflective layer 513, and the aperture 522. A single pixel is constructed of three display dots D including the color layers 514 corresponding to R, G, and B.

In the present embodiment, a signal is supplied to the transparent electrodes 519 formed on the second base plate 505, and another signal is supplied to the transparent electrodes 517 formed on the first base plate 503. Accordingly, the liquid crystal is driven only at regions corresponding to the display dots D where the transparent electrodes 519 and the transparent electrodes 517 intersect.

In reflective display, external light enters the liquid crystal layer 507 from the side where the opposing substrate 506 is disposed, is modulated in units of a display dot D, passes through the color layers 514, and is reflected by the reflective layer 513. The reflected light passes through the opposing substrate 506 again and is emitted to the outside. Accordingly, an image is displayed by the emitted light.

In transmissive display, light emitted from the illuminating unit 131 shown in FIG. 9 passes through the first base plate 503 and the transmissive portions 522, and is supplied to the liquid crystal layer 507. The light is modulated by the liquid crystal layer 507 in units of a display dot D, passes through the transparent electrodes 519 and the second base plate 505, and is emitted to the outside. Accordingly, an image is displayed by the emitted light.

According to the present embodiment, since the overcoat layer 516 is planar, a high-contrast image can be displayed in both the reflective display and the transmissive display. The emitted light is colored in corresponding colors by the color layers 514 which cover the reflective layer 513 and the transmissive portions 522.

In the present embodiment, the underlayer 512 is formed such that the openings 523 are provided at the boundary regions between the adjacent display dots D, and the light-shielding layer 515 is formed so as to fill the openings 523. Thus, the height of the light-shielding layer 515 can be reduced by the amount corresponding to the depth of the openings 523, and the planarity over the surfaces of the display dots D and the surfaces of the boundary regions between the display dots D can be ensured. Accordingly, the planarity of the surface of the overcoat layer 516 can be ensured, so that the dispersion of the cell gap becomes small and the rubbing process can be performed easily. In addition, the contrast of an image displayed by the liquid crystal device can be increased.

In the case in which the underlayer 512 is not completely removed at regions under the recesses 523, as shown in FIG. 38, the underlayer 512 can be constructed of a first insulating layer 512a and a second insulating layer 512b which is formed on the first insulating layer 512a. In this case, the recesses 523 having the depth corresponding to the thickness of the second insulating layer 512b are provided. Also in this case, the roughness of the top surface of the overcoat layer 516 can be reduced, so that the dispersion of the cell gap becomes small and the rubbing process can be performed easily. As a result, the contrast of an image displayed by the liquid crystal device can be increased.

Manufacturing Method of the Liquid Crystal Device

Next, a manufacturing method of the liquid crystal device according to the present embodiment will be described with reference to a flow chart shown in FIG. 39. First, in Step P121, the resin scattering layer 512, which serves as an underlayer, is formed on the first base plate 503. As shown in FIG. 34, the underlayer 512 is etched by using a photoresist such that the openings 523 are formed in the underlayer 512 at the boundary regions between the display dots D in which the light-shielding layer 515 is to be formed.

This will be described in more detail below. A resin material is uniformly applied to the first base plate 503 by spin coating, and then a resist is applied. Then, the resist is exposed to light through a photomask having a predetermined pattern, and is developed. Then, a plurality of holes are formed in the underlayer 512 by etching the resin material.

Next, heat is applied to the underlayer 512 so that the holes deform and become smooth, and the lower layer 512a of the underlayer 512 having irregularities in the surface thereof is thus obtained. Then, the upper layer 512b of the underlayer 512 is formed by applying the resin material such that smooth irregularities are formed in the surface of the underlayer 512.

Then, a resist is applied to the underlayer 512, is exposed to light through a photomask having a predetermined pattern, and is developed. Then, the openings 523 are formed in the surface of the underlayer 512 by an etching process using the resist as a mask, so that the underlayer 512 is removed at regions where the light-shielding layer 515 is to be formed.

Next, in Step P122, a thin film of aluminum, etc., is formed on the underlayer 512 by using deposition techniques or sputtering techniques, and a pattern is formed by using photolithography techniques such that the approximately rectangular apertures 522 are formed at the central regions of the display dots D, as shown in FIG. 36, and the reflective layer 513 is formed at regions surrounding the apertures 522.

Next, in Step P123, a coloring material for one of the colors is applied to the reflective layer 513 and the apertures 522 by spin-coating, and then a resist is applied. The resist is exposed to light through a photomask having a predetermined pattern, and is developed. Then, the coloring material is etched by using the resist as a mask, so that the color layers 514 corresponding to that color is formed. The above-described process is repeated for the other two colors, so that the color layers 514 corresponding to R, G, and B are formed in a desired configuration pattern.

Next, in Step P124, a light-shielding material is applied to the underlayer 512 having the openings 523 and the reflective layer 513. Then, a pattern is formed by using photo-etching techniques such that the light-shielding layer 515 is formed so as to fill the openings 523 of the underlayer 512 in such a manner that the light-shielding layer 515 is slightly higher than the color layers 514. The light-shielding material can be obtained by, for example, dispersing a carbon black, etc., in a resin.

As described above, according to the present embodiment, the openings 523 are formed by the underlayer 512 and the color layers 514, and the light-shielding layer 515 is formed so as to fill the openings 523. Accordingly, the thickness of the light-shielding layer 515 can be increased and light can be more reliably prevented from passing through the light-shielding layer 515. In addition, the planarity over the light-shielding layer 515 and the color layers 514 can be ensured.

Next, in Step P125, the overcoat layer 516 is formed on the color layers 514. Then, in Step P126, a material of the transparent electrodes 517, such as ITO, is applied to the overcoat layer 516 by using sputtering techniques, and a pattern is formed by using photolithography techniques such that the transparent electrodes 517 having a predetermined width are formed in a striped pattern along the Y direction, as shown in FIG. 36.

Next, in Step P126, the alignment film 518 is formed on the transparent electrodes 517, and is subjected to the rubbing process. Accordingly, the color filter substrate 504 is completed.

With regard to the opposing substrate 506, a material of the transparent electrodes 519, such as ITO, is applied to the second base plate 505 by using sputtering techniques in Step P131. Then, a pattern is formed by using photolithography techniques such that the transparent electrodes 519 are formed in a striped pattern along the X direction, as shown in FIG. 36. Then, in Step P132, the alignment film 520 is formed on the transparent electrodes 519, and is subjected to the rubbing process. Accordingly, the opposing substrate 506 is completed.

Next, in Step P141, the spacers 129 (see FIG. 9) are dispersed over the opposing substrate 506 by dry dispersion, etc., and the color filter substrate 504 and the opposing substrate 506 are laminated with the sealing member 133. Then, in Step P142, liquid crystal is injected through an opening formed in the sealing member 133. Then, the opening formed in the sealing member 133 is sealed with a sealant such as an ultraviolet curing resin. Next, in Step P143, the retardation films 508 and 510, and the polarizers 509 and 511 are laminated on the outer surfaces of the first base plate 503 and the second base plate 505, respectively.

Next, in Step P144, electric wirings are arranged as necessary and auxiliary devices such as the illuminating unit 131 and the housing 132 shown in FIG. 9 are attached. Accordingly, the liquid crystal device 101 shown in FIG. 9 which includes the liquid crystal panel 502 shown in FIG. 34 is completed.

In the manufacturing method shown in FIG. 39, the openings 523 are formed in the underlayer 512 and the light-shielding layer 515 is formed so as to fill the openings 523. Therefore, the height of the light-shielding layer 515 can be reduced and the planarity of the surface of the surface of the overcoat layer 516 can be ensured. Accordingly, the dispersion of the cell gap becomes small and the rubbing process can be performed easily, so that the contrast can be increased.

According to the above descriptions, the openings 523 are formed such that the underlayer 512 is completely removed at regions where the light-shielding layer 515 is formed, as shown in FIG. 37. Alternatively, however, the underlayer 512 may be constructed in two steps by forming the first insulating layer 512a in the first step and the second insulating layer 512b in the second step, as shown in FIG. 38, and the recesses 523 can be formed at the time when the upper layer 512b is formed.

In this case, in the first step, the first insulating layer 512a is formed over the entire region of the base plate including the boundary regions between the display dots D in which the light-shielding layer 515 is to be formed, and irregularities are formed similarly to the lower layer 512a of the underlayer 512 shown in FIG. 37. In the second step, the second insulating layer 512b is formed so as to cover the regions excluding the boundary regions between the display dots D in which the light-shielding layer 515 is to be formed, that is, the regions corresponding to the display dots D, by an etching process using a photoresist.

When the underlayer 512 is completely removed at regions corresponding to the openings 523, as shown in FIG. 37, there is a possibility that the planarity over the surfaces of the boundary regions between the adjacent display dots D and the surfaces of the display dots V will be degraded instead of improved. In such a case, the planarity can be ensured by setting the thickness of the underlayer 512 at regions where the recesses 523 are provided to a desired value, as shown in FIG. 38. Accordingly, the the dispersion of cell gap becomes small and the rubbing process can be performed easily.

The recesses 523 may also be formed by using a halftone.

Eighth Embodiment

Figure 40:
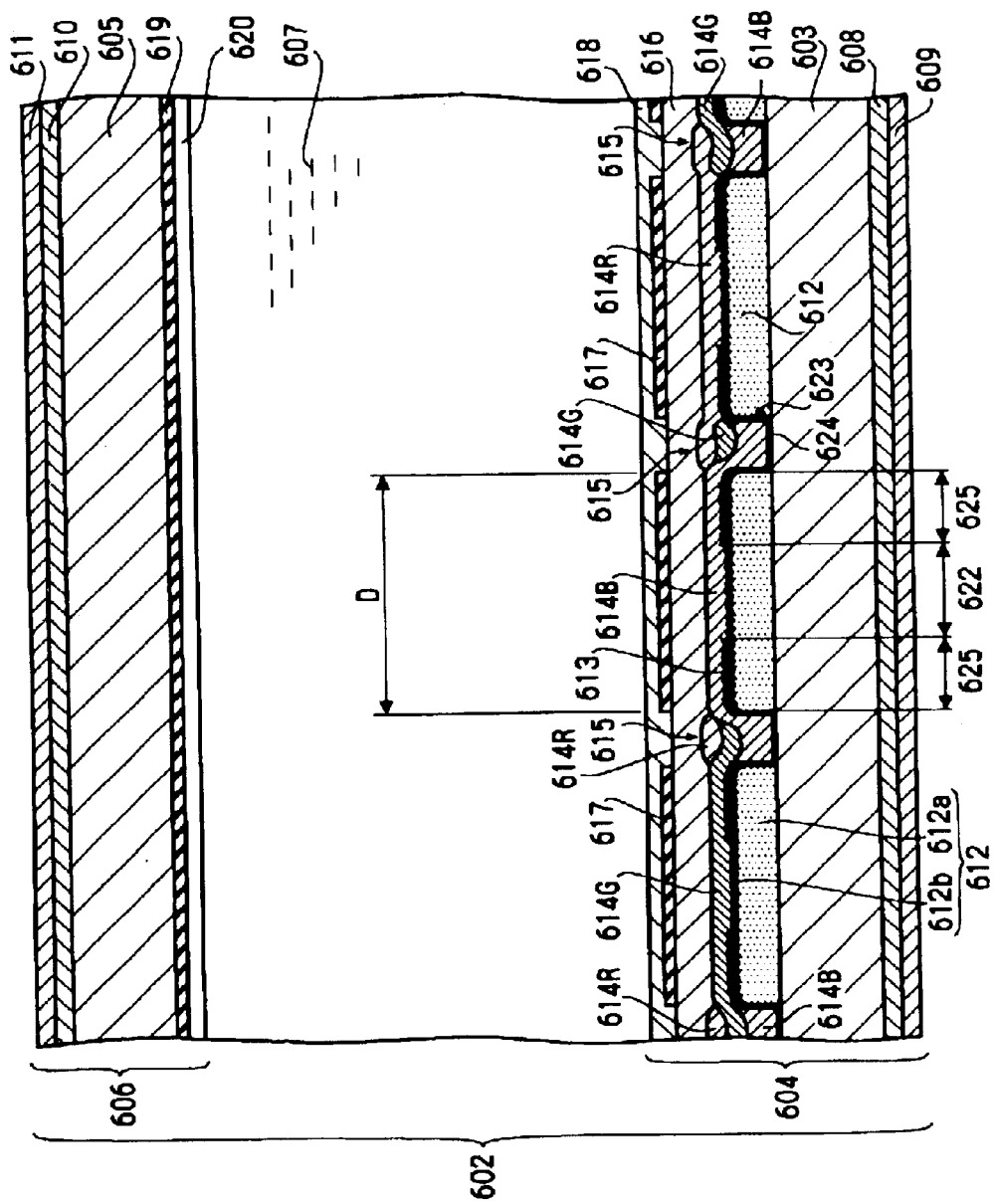
FIG. 40 is a sectional view showing the cross-sectional structure of the main part of a liquid crystal device according to another embodiment of the electrooptical device of the present invention.
Figure 41:
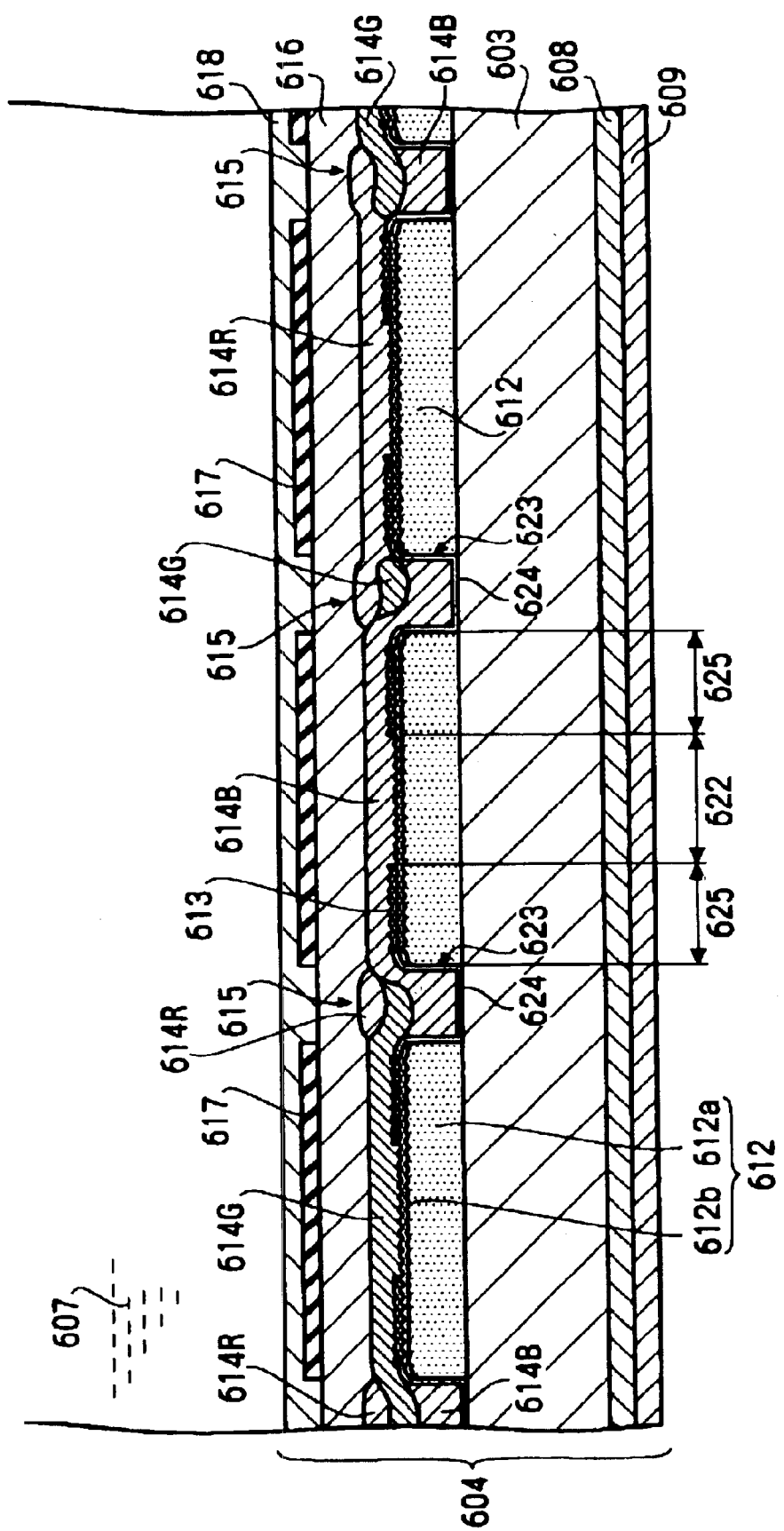
FIG. 41 is a sectional view showing the main part of a color filter substrate included in the liquid crystal device shown in FIG. 40.
Figure 42:
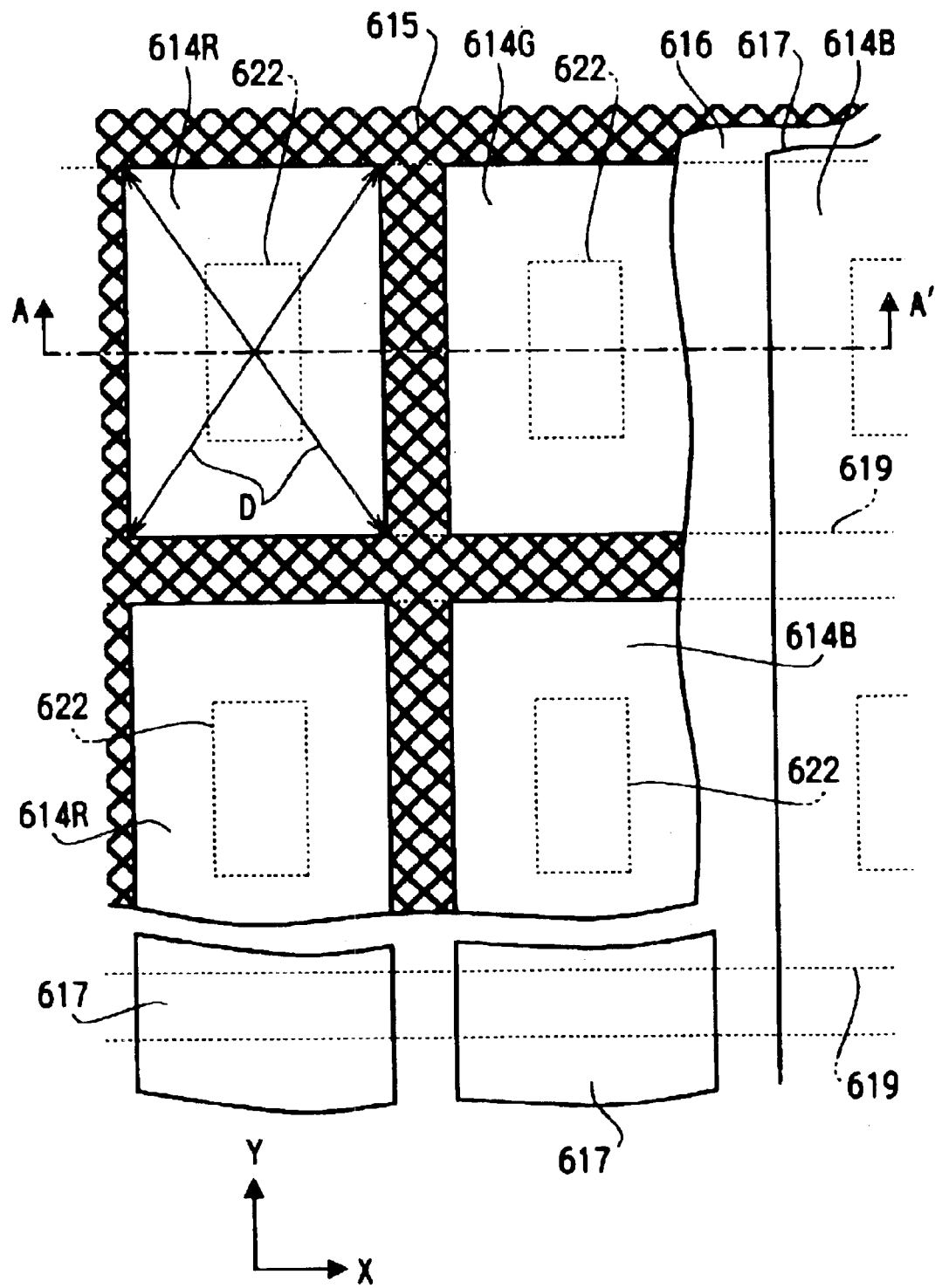
FIG. 42 is a partially broken plan view showing the planar structure of the liquid crystal device shown in FIG. 40.
Figure 43:
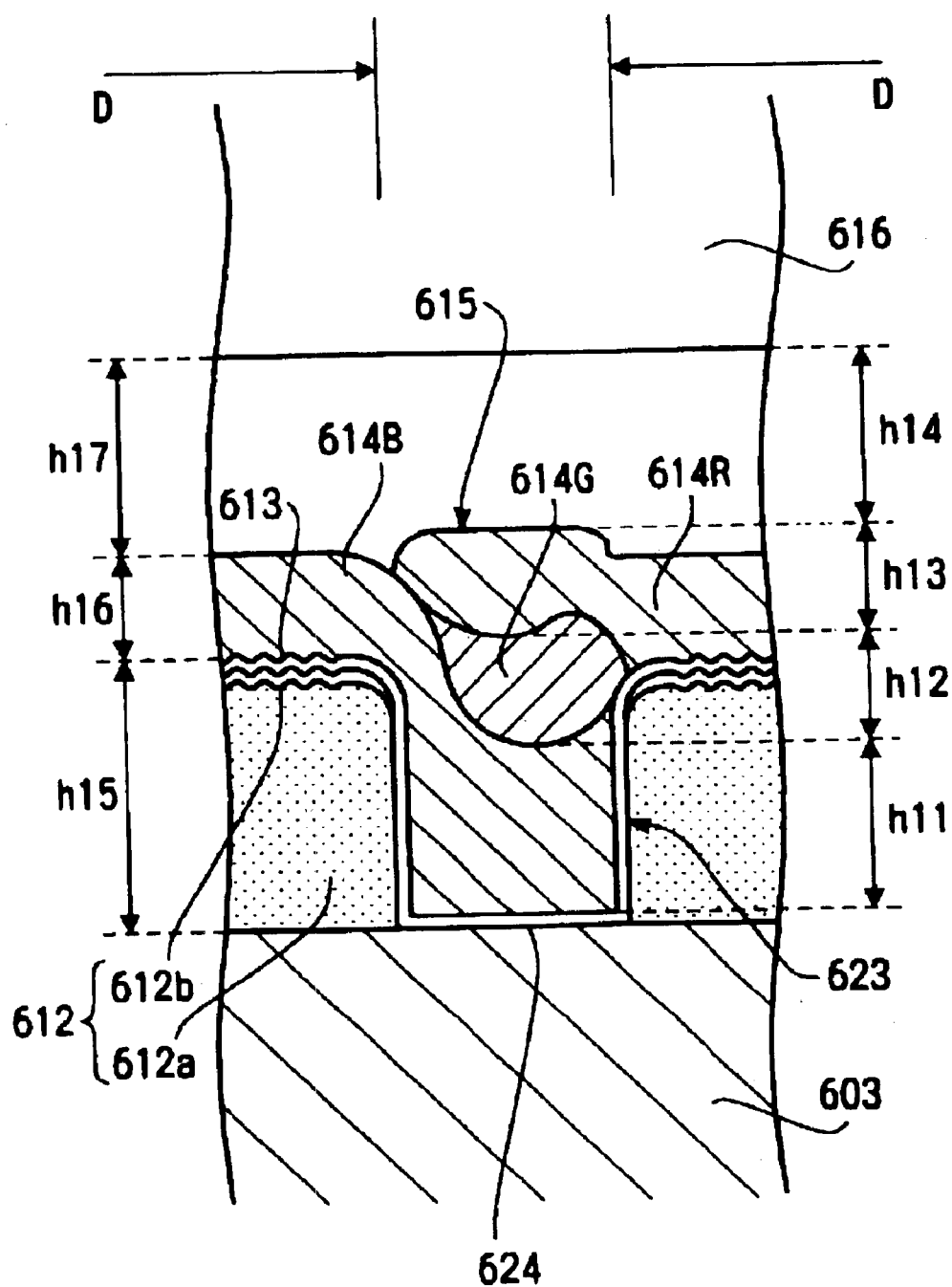
FIG. 43 is a sectional view showing the main part of the color filter substrate shown in FIG. 41.
Figure 44:
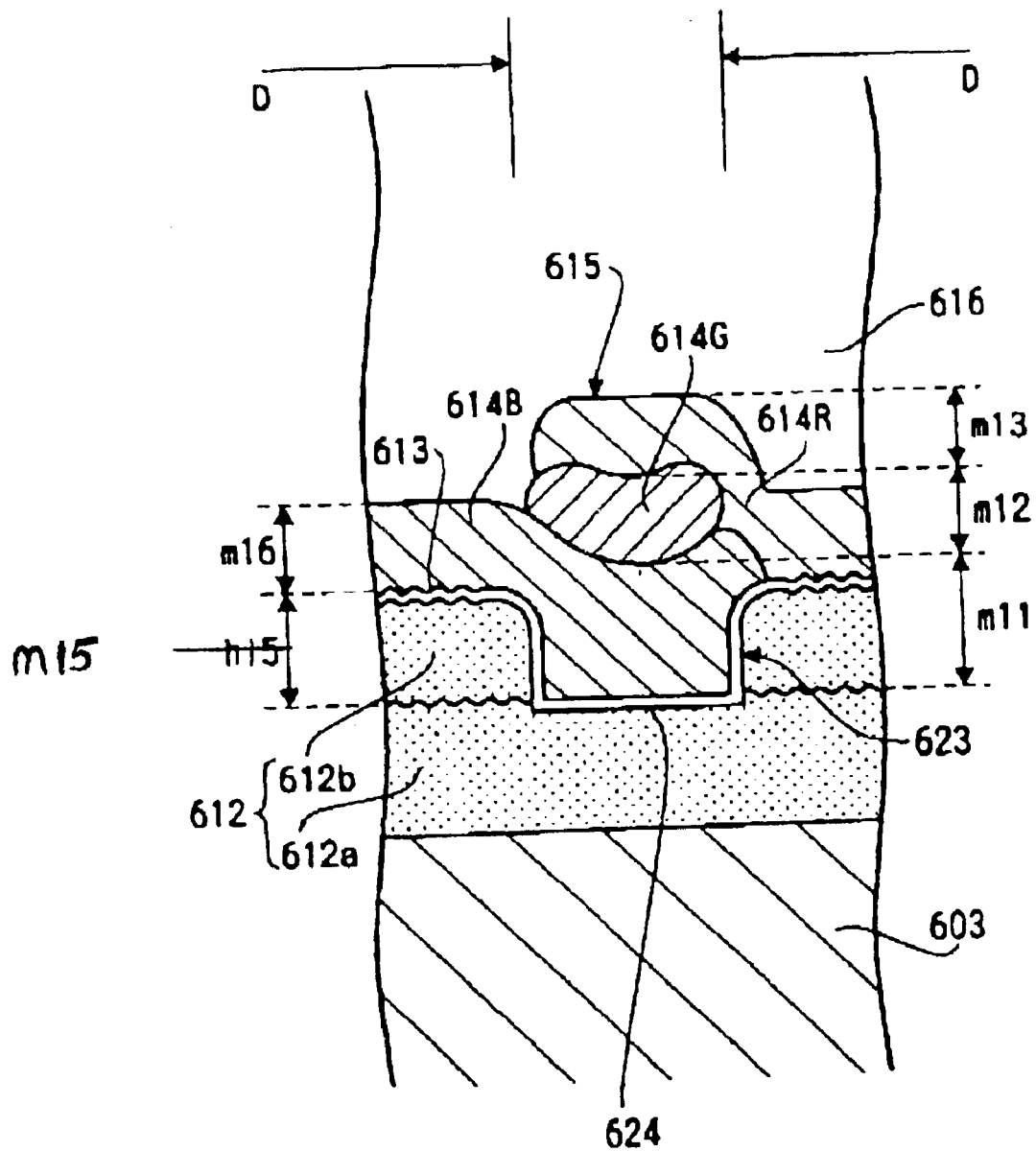
FIG. 44 is a sectional view showing the modification of the structure shown in FIG. 43.
Figure 45:
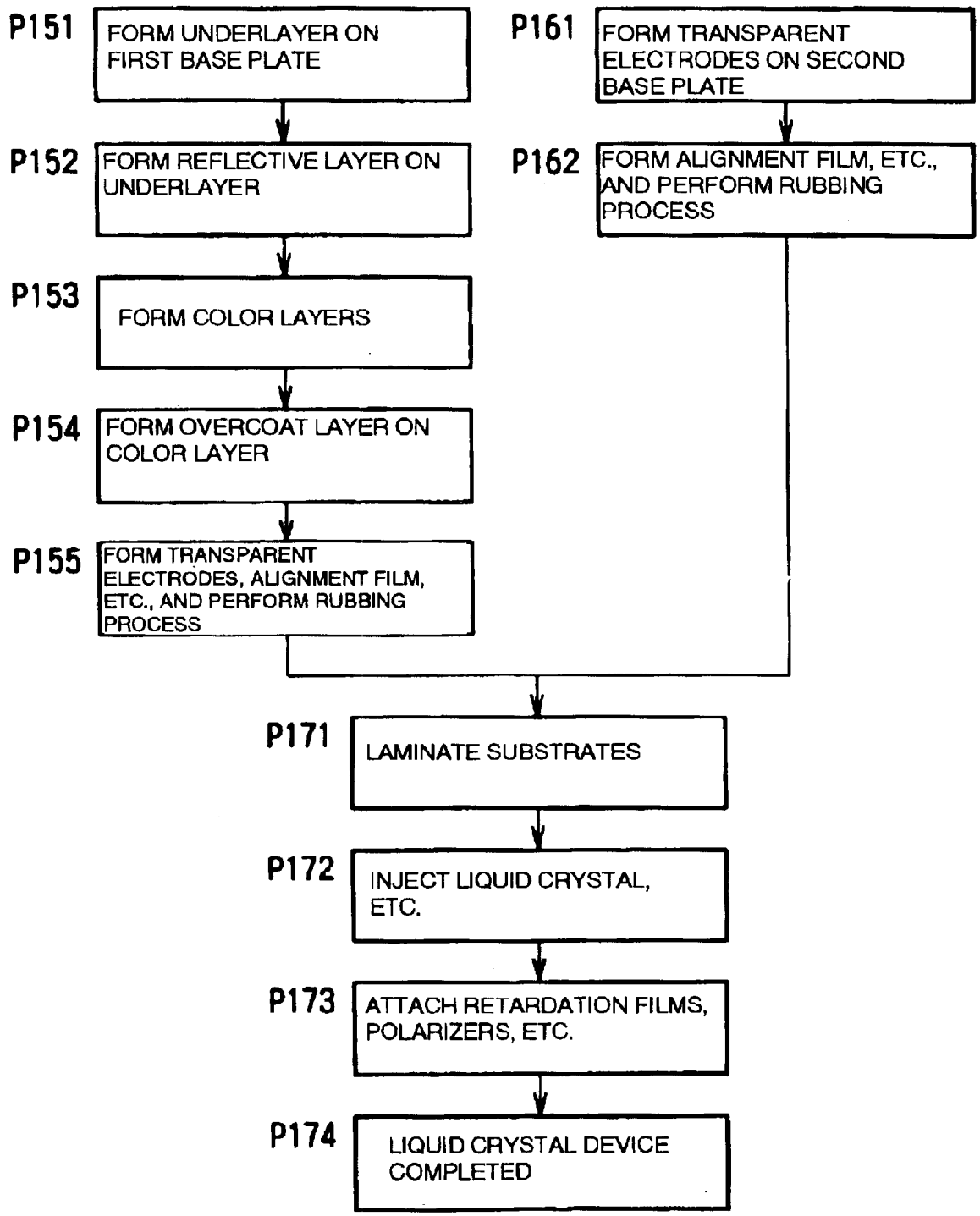
FIG. 45 is a flow chart showing a method for manufacturing the liquid crystal device shown in FIG. 40.

Next, another embodiment in which the present invention is applied to a transflective passive-matrix liquid crystal device will be described. FIG. 40 is a sectional view of a liquid crystal panel included in the liquid crystal device according to another embodiment of the present invention. FIG. 41 is a sectional view of a color filter substrate included in the liquid crystal panel shown in FIG. 40. FIG. 42 is an enlarged view of a part of the liquid crystal panel. FIG. 40 corresponds to a sectional view of FIG. 42 cut along line A–A'. FIG. 43 is an enlarged sectional view of a part of a light-shielding layer from which an underlayer is completely removed. FIG. 44 is an enlarged sectional view of a part of the light-shielding layer from which the underlayer is partially removed. FIG. 45 is a flow chart showing a method for manufacturing the liquid crystal device according to the present embodiment.

A liquid crystal panel 602 shown in FIG. 40 is a transflective liquid crystal panel, and a liquid crystal device including the liquid crystal panel 602 is constructed similarly to the liquid crystal device 101 shown in FIG. 9. More specifically, the liquid crystal device is constructed by attaching the illuminating unit 131, which is provided as necessary, and the housing 132 to the liquid crystal panel 602.

As shown in FIG. 40, the liquid crystal panel 602 includes a color filter substrate 604 and an opposing substrate 606 which oppose each other and which are laminated with the sealing member 133 (see FIG. 9). The color filter substrate 604 includes a first base plate 603 which is a transparent plate composed of glass, synthetic resin, etc., and the opposing substrate 606 includes a second base plate 605. In addition, a liquid crystal layer 607 is formed by injecting liquid crystal into a gap between the color filter substrate 604 and the opposing substrate 606. A retardation film 608 and a polarizer 609 are disposed on the outer surface of the first base plate 603, and a retardation film 110 and a polarizer 111 are disposed on the outer surface of the second base plate 605.

In the color filter substrate 604, an underlayer 612 is formed on the surface of the first base plate 603 which faces the liquid crystal layer 607 and a reflective layer 613 is formed on the surface of the underlayer 612. In addition, regions where the reflective layer 613 is formed on the surface of the underlayer 612 serve as reflective portions 625, and apertures 622 formed in the reflective layer 613 serve as transmissive portions.

A green layer 614G, a blue layer 614B, and a red layer 614R are formed on the reflective layer 613 in a predetermined configuration pattern. In the following descriptions, these color layers may be generically denoted by reference numeral "614". A light-shielding layer 615 is formed so as to cover the boundary regions between the adjacent color layers 614.

In addition, an overcoat layer 616 is provided on the color layers 614 and the light-shielding layer 615 to protect them. In addition, transparent electrodes 617 composed of a transparent conductive material such as ITO are formed on the overcoat layer 616, and an alignment film 618 composed of polyimide resin, etc., is formed on the transparent electrodes 617.

With reference to FIG. 40, in the opposing substrate 606, transparent electrodes 619 are formed on the surface of the second base plate 605 which faces the liquid crystal layer 607 in such a manner that the transparent electrodes 619 extend perpendicularly to the transparent electrodes 617 on the first base plate 603 (that is, in the X direction in FIG. 42). In addition, an alignment film 620 is formed on the transparent electrodes 619.

The transparent electrodes 617 are arranged parallel to each other in a striped pattern, and the transparent electrodes 619 are arranged parallel to each other in a striped pattern such that the transparent electrodes 619 extend perpendicularly to the transparent electrodes 617. Areas where the transparent electrodes 617 on the first base plate 603 and the transparent electrodes 619 on the second base plate 605 intersect serve as display dots D.

As shown in FIG. 41, the underlayer 612 in the color filter substrate 604 includes a lower layer 612a and an upper layer 612b, and both of these layers are composed of a resin material. In the underlayer 612, small irregularities are formed in the surface of the lower layer 612a, and the upper layer 612b is formed by covering the lower layer 612a with a thin layer composed of the same material as the lower layer 612a. Accordingly, smooth irregularities are formed. Due to these irregularities, light which passes through the underlayer 612 can be scattered, so that the problem in that the imaged displayed by the liquid crystal device cannot be viewed clearly can be solved.

The reflective layer 613 is preferably composed of an elemental metal such as aluminum or silver and is formed on the underlayer 612. The surface of the reflective layer 613 also has small irregularities corresponding to those in the surface of the underlayer 612. Therefore, light reflected by the reflective layer 613 is also scattered, so that the problem in that the image displayed by the liquid crystal device cannot be viewed clearly can be solved.

As shown in FIG. 42, for example, the reflective layer 613 has the apertures 622 having an approximately rectangular shape at the central regions of the display dots D, and the apertures 622 serve as the transmissive portions. Light emitted from the illuminating unit 131 passes through the apertures 622 and is supplied to the liquid crystal layer 607. The shape of the apertures 622 is not limited to this example, and the apertures 622 may have other shapes such as a circle. In addition, the number of apertures 622 formed in a single display dot D is not limited to one, and a plurality of apertures 622 may also be formed.

The color layers 614 are formed by applying a color resist composed of a photosensitive resin including a colorant such as a pigment and a dye and forming a pattern by using photolithography techniques. In this patterning process, portions for covering the apertures 622, which allow light which is emitted from the illuminating unit 131 and travels through the first base plate 603 to pass therethrough, and portions for covering the reflective layer 613 at regions around the apertures 622 are formed. When the color layers 614 corresponding to three colors (R, G, and B) are provided as in the present embodiment, the above-described patterning process is performed for each color. Accordingly, the color layers 614 can be formed such that they overlap one another at regions corresponding to the light-shielding layer 615.

Although the color layers 614 are arranged in an oblique mosaic pattern in FIG. 42, they may also be arranged in other various patterns including a striped pattern, a digital pattern, etc.

The light-shielding layer 615 is formed so as to cover the boundary regions between the display dots D, and serves to prevent light from passing through the boundary regions. The light-shielding layer 615 includes band-shaped portions which extend along the longitudinal direction of the transparent electrodes 617 formed on the first base plate 603 (that is, the Y direction in FIG. 42), and band-shaped portions which extend along the direction perpendicular to this direction (that is, the X direction in FIG. 42).

As shown in FIG. 41, the light-shielding layer 615 is formed so as to cover the regions between the adjacent color layers 614. Openings 623 are formed in the underlayer 612 at regions corresponding to the light-shielding layer 615, and bottom surfaces 624 of the openings 623 are positioned on the first base plate 603 with the reflective layer 613 therebetween.

With reference to FIG. 43, the color layer 614B, which is adjacent to the light-shielding layer 615, the color layer 614G, and an extending portion of the color layer 614R are laminated in the opening 623 in that order from the bottom surface 624. The thicknesses of the color layers 614B, 614G, and 614R in the opening 623 are h11, h12, and h13, respectively.

When the thickness h11 of the color layer 614B formed at the bottom in FIG. 43 is in the range of 0.7 $\mu$m to 2.0 $\mu$m, light-shielding effect obtained by the blue-based color layer, for example, the blue layer 614B, increases. In addition, by laminating the color layers corresponding to other colors in combination, the planarity over the surfaces of the display dots D and the surfaces of the boundary regions between the display dots D (that is, the surface of the light-shielding layer 615) can be ensured.

With reference to FIG. 43, the case is considered in which h11 is set to approximately 1.7 $\mu$m, h12 is set to approximately 1.0 $\mu$m, h13 is set to approximately 0.9 $\mu$m, and the thickness h14 of the overcoat layer 616 which is formed on the color layer 614R disposed at the top among the laminated color layers is set to approximately 1.8 $\mu$m. The thickness h15 of the underlayer 612 is approximately 2.4 $\mu$m, the thickness h16 of the color layer 614B at the display dots D is approximately 1.0 $\mu$m, and the thickness h17 of the overcoat layer 616 at the display dots D is approximately 2.0 $\mu$m. Therefore, the top surface of the overcoat layer 616 at the region where the light-shielding layer 615 is formed and the top surface of the overcoat layer 616 at the display dot D corresponding to the color layer 614B level with each other, so that the planarity of the top surface of the overcoat layer 616 can be ensured.

When the color layer 614B is disposed at the bottom in the opening 623 as described above, the color layer 614B can be formed such that it is the thickest among the color layers 614, and the thickness of the color layer 614B can be set to approximately 1.7 $\mu$m.

In addition, as shown in FIG. 41, in the boundary region between the color layer 614G and the color layer 614B, the color layer 614B, which is adjacent to the boundary region, an extending portion of the color layer 614G, and the color layer 614R are laminated in the opening 623 in that order from the bottom surface 624. Accordingly, the light-shielding layer 615 is formed.

In addition, as shown in FIG. 41, in the boundary region between the color layer 614R and the color layer 614G, the color layer 614B, an extending portion of the color layer 614G, and the color layer 614R, which is adjacent to the boundary region, are laminated in the opening 623 in that order from the bottom surface 624. Accordingly, the light-shielding layer 615 is formed.

The concave areas in the underlayer 612 in which the light-shielding layer 615 is formed is not limited to the above-described openings 623, and recesses 623 shown in FIG. 44, for example, may be provided instead. In such a case, the underlayer 612 is not completely removed at regions under the bottom surfaces 624 of the recesses 623. Also in this case, the height of the light-shielding layer 615 is reduced by the amount corresponding to the depth m15 of the bottom surfaces 624 of the recesses 623. Therefore, the roughness of the top surface of the overcoat layer 616 can be reduced, so that the dispersion of the cell gap becomes small and the rubbing process can be performed easily. As a result, the contrast of an image displayed by the liquid crystal device increases.

In addition, when the thickness m11 of the color layer 614B formed at the bottom in FIG. 44 is in the range of 0.7 $\mu$m to 2.0 $\mu$m, light-shielding effect obtained by the blue-based color layer, for example, the blue layer 614B, increases. In addition, by laminating the color layers corresponding to other colors in combination, the roughness over the surfaces of the display dots D and the surfaces of the boundary regions between the display dots D can be reduced.

More preferably, with reference to FIG. 44, the thickness m11 of the color layer 614B is set to approximately 1.1 $\mu$m, the thickness m12 of the color layer 614G is set to approximately 1.0 $\mu$m, and the thickness m13 of the color layer 614R is set to approximately 0.9 $\mu$m. In this case, when the depth m15 of the bottom surfaces 624 of the recesses 623 is approximately 1.3 $\mu$m, the roughness of the overcoat layer 616 can be further reduced. Therefore, the cell gap becomes uniform and the rubbing process can be performed easily. As a result, the contrast of an image displayed by the liquid crystal device increases.

The display dots D are regions surrounded by the light-shielding layer 615, and each display dot D includes one of the color layers 614 corresponding to R, G, and B, the reflective layer 613, and the aperture 622. A single pixel is constructed of three display dots D including the color layers 614 corresponding to R, G, and B.

In the present embodiment, a signal is supplied to the transparent electrodes 619 formed on the second base plate 605, and another signal is supplied to the transparent electrodes 617 formed on the first base plate 603. Accordingly, the liquid crystal is driven only at regions corresponding to the display dots D where the transparent electrodes 619 and the transparent electrodes 617 intersect.

In reflective display, external light enters the liquid crystal layer 607 from the side where the opposing substrate 606 is disposed, is modulated in units of a display dot D, passes through the color layers 614, and is reflected by the reflective layer 613. The reflected light passes through the opposing substrate 606 again and is emitted to the outside. Accordingly, an image is displayed by the emitted light.

In transmissive display, light emitted from the illuminating unit 131 (see FIG. 9) passes through the first base plate 603 and the transmissive portions 622, and is supplied to the liquid crystal layer 607. The light is modulated by the liquid crystal layer 607 in units of a display dot D, passes through the transparent electrodes 619 and the second base plate 605, and is emitted to the outside. Accordingly, an image is displayed by the emitted light.

In both the reflective mode and transmissive mode, since the overcoat layer 616 is planar according to the present embodiment, a high-contrast image can be displayed by the liquid crystal device. The emitted light is colored in corresponding colors by the color layers 614 which cover the reflective layer 613 and the transmissive portions 622.

In the present embodiment, the underlayer 612 is formed such that the recesses 623 (FIG. 44) or the openings 623 (FIG. 43) are provided at the boundary regions between the adjacent display dots D. Thus, the height of the light-shielding layer 615 constructed of the color layers 614 can be reduced, and the planarity over the surfaces of the display dots D and the surfaces of the boundary regions between the display dots D can be ensured.

In addition, in the present embodiment, the blue-based color layer, for example, the blue layer 614B is formed first on the bottom surfaces 624 of the recesses 623 (FIG. 44) or the bottom surfaces 624 of the openings 623 (FIG. 43). Therefore, the blue layer, which has a relatively small mean transmission factor in the visible light range, is thicker than the color layers 614 corresponding to other colors such as a green-based color, for example, green, and a red-based color, for example, red. Accordingly, the light-shielding effect can be increased and the overall height of the light-shielding layer 615 can be reduced. Therefore, the contrast of an image displayed by the liquid crystal device can be increased.

In addition, when the blue layer 614B having a thickness of approximately 1.7 $\mu$m is formed on the bottom surfaces 624 of the openings 623, and the green layer 614G having a thickness of approximately 1.0 $\mu$m or the red layer 614R having a thickness of approximately 0.9 $\mu$m is formed on the blue layer 614B, the planarity over the top surfaces of the display dots D and the top surfaces of the boundary regions between the display dots D, for example, the planarity of the overcoat layer 616, can be more reliably ensured. Therefore, the dispersion of the cell gap becomes small and the rubbing process can be performed easily. As a result, the contrast of an image displayed by the liquid crystal device can be increased.

According to the above descriptions, the openings 623 are formed such that the underlayer 612 is completely removed at regions where the light-shielding layer 615 is formed, as shown in FIG. 43. Alternatively, however, the underlayer 612 may be constructed in two steps by forming the first insulating layer 612a in the first step and the second insulating layer 612b in the second step, as shown in FIG. 44, and the recesses 623 can be formed at the time when the upper layer 612b is formed.

In this case, in the first step, the first insulating layer 612a is formed over the entire region of the base plate including the boundary regions between the display dots D in which the light-shielding layer 615 is to be formed, and irregularities are formed similarly to the lower layer 612a of the underlayer 612 shown in FIG. 43. In the second step, the second insulating layer 612b is formed so as to cover the regions excluding the boundary regions between the display dots D in which the light-shielding layer 615 is to be formed, that is, the regions corresponding to the display dots D, by an etching process using a photoresist.

Also in this case, the planarity of the top surface of the overcoat layer 616 can be ensured, so that the dispersion of the cell gap becomes small and the rubbing process can be performed easily. As a result, the contrast of an image displayed by the liquid crystal device can be increased.

Manufacturing Method of the Liquid Crystal Device

Next, a manufacturing method of the liquid crystal device according to the present embodiment will be described with reference to a flow chart shown in FIG. 45. First, in Step P151, the underlayer 612 is formed on the first base plate 603. As shown in FIG. 40, the underlayer 612 is etched by using a photoresist such that the openings 623 are formed in the underlayer 612 at the boundary regions between the display dots D in which the light-shielding layer 615 is to be formed.

This will be described in more detail below. A resin material is uniformly applied to the first base plate 603 by spin coating, and then a resist is applied. Then, the resist is exposed to light through a photomask having a predetermined pattern, and is developed. Then, a plurality of holes is formed in the underlayer 612 by etching the resin material by using the resist as a mask. Next, heat is applied to the underlayer 612 so that the holes deform and become smooth, and the lower layer 612a of the underlayer 612 having irregularities in the surface thereof is thus obtained. Then, the upper layer 612b of the underlayer 612 is formed by applying the resin material such that smooth irregularities are formed in the surface of the underlayer 612.

Next, a resist is applied to the underlayer 612, is exposed to light through a photomask having a predetermined pattern, and is developed. Then, the openings 623 are formed in the underlayer 612 by an etching process using the resist as a mask. Accordingly, the underlayer 612 which is removed at regions where the light-shielding layer 615 is to be provided is formed on the first base plate 603.

Next, in Step P152, a thin film of aluminum, etc., is formed on the underlayer 612 by using deposition techniques or sputtering techniques, and a pattern is formed by using photolithography techniques such that the approximately rectangular apertures 622 are formed at the central regions of the display dots D, as shown in FIG. 42, and the reflective layer 613 is formed at regions surrounding the apertures 622.

Next, in Step P153, a coloring material for a blue-based color, for example, blue, is applied to the reflective layer 613 and the apertures 622 by spin-coating, and then a resist is applied. The resist is exposed to light through a photomask having a predetermined pattern, and is developed. Then, the color material is etched by using the resist as a mask, so that the blue layer 614B is formed. The above-described process is repeated for the other two colors, so that the green-based color layer, for example, the green layer 614G and the red-based color layer, for example, the red layer 614R are formed successively.

Accordingly, one of the blue layer 614B, the green layer 614G, and the red layer 614R is formed in each of the display dots D. As shown in FIG. 41, in the light-shielding layer 615, the blue layer 614B, the green layer 614G, and the red layer 614R are laminated in that order from the bottom, and the blue layer 614B is the thickest among them. Since the blue layer 614B is formed at the bottom and is the thickest among the color layers 614, the light-shielding effect can be increased and the overall height of the light-shielding layer 615 can be reduced.

Next, in Step P154, the overcoat layer 616 is formed on the color layers 614. In the present embodiment, since the openings 623 are formed in the underlayer 612, the height of the light-shielding layer 615 can be reduced and the planarity of the surface of the overcoat layer 616 can be ensured. Accordingly, the dispersion of the cell gap becomes small and the rubbing process can be performed easily. As a result, the contrast of an image displayed by the liquid crystal device can be increased.

Next, in Step P155, a material of the transparent electrodes 617, such as ITO, is applied to the overcoat layer 616 by using sputtering techniques, and a pattern is formed by using photolithography techniques such that the transparent electrodes 617 having a predetermined width are formed in a striped pattern along the Y direction, as shown in FIG. 42. Next, the alignment film 618 is formed on the transparent electrodes 617 and is subjected to the rubbing process. Accordingly, the color filter substrate 604 is completed.

With regard to the opposing substrate 606, a material of the transparent electrodes 619, such as ITO, is applied to the second base plate 605 by using sputtering techniques in Step P161. Then, a pattern is formed by using photolithography techniques such that the transparent electrodes 619 are formed in a striped pattern along the X direction, as shown in FIG. 42. Then, in Step P162, the alignment film 620 is formed on the transparent electrodes 619, and is subjected to the rubbing process. Accordingly, the opposing substrate 606 is completed.

Next, in Step P171, the spacers 129 (see FIG. 9) are dispersed over the opposing substrate 606 by dry dispersion, etc., and the color filter substrate 604 and the opposing substrate 606 are laminated with the sealing member 133. Then, in Step P172, liquid crystal is injected through an opening formed in the sealing member 133. Then, the opening formed in the sealing member 133 is sealed with a sealant such as an ultraviolet curing resin.

Next, in Step P173, the retardation films 108 and 110, and the polarizers 109 and 111 are laminated on the outer surfaces of the first base plate 603 and the second base plate 605, respectively. Next, in Step P174, electric wirings are arranged as necessary and the illuminating unit 131 and the housing 132 shown in FIG. 9 are attached. Accordingly, the liquid crystal device is completed.

In the manufacturing method shown in FIG. 45, the light-shielding layer 615 is formed by laminating the color layers 614 corresponding to each color, and the blue-based color layer, for example, the blue layer 614B is formed at the bottom and is the thickest among them. Accordingly, the light-shielding effect can be increased and the overall thickness of the light-shielding layer 615 can be reduced.

Since the openings 623 are formed in the underlayer 612, the height of the light-shielding layer 615 can be reduced. Thus, the planarity of the surface of the overcoat layer 616 can be ensured, so that the dispersion of the cell gap becomes small and the rubbing process can be performed easily. As a result, the contrast of a displayed image can be increased.

In the manufacturing method shown in FIG. 45, the openings 623 are formed such that the underlayer 612 is completely removed at regions where the light-shielding layer 615 is formed, as shown in FIG. 43. Alternatively, however, the underlayer 612 may be constructed in two steps by forming the first insulating layer 612a in the first step and the second insulating layer 612b in the second step, as shown in FIG. 44, and the recesses 623 can be formed by forming the upper layer 612b.

In this case, in the first step, the first insulating layer 612a is formed over the entire region of the base plate including the boundary regions between the display dots D in which the light-shielding layer 615 is to be formed, and irregularities are formed similarly to the lower layer 612a of the underlayer 612 shown in FIG. 43. In the second step, the second insulating layer 612b is formed so as to cover the regions excluding the boundary regions between the display dots D in which the light-shielding layer 615 is to be formed, that is, the regions corresponding to the display dots D, by an etching process using a photoresist.

Accordingly, the process of etching the underlayer 612 using a photoresist can be emitted in the first step for forming the underlayer 612, so that the cost can be reduced and the manufacturing speed can be increased. In addition, when the underlayer 612 is completely removed as in the openings 623, there is a possibility that the planarity over the surfaces of the boundary regions between the adjacent display dots D and the surfaces of the display dots D will be degraded. Also in such a case, the planarity can be ensured by forming the underlayer 612 at a desired thickness, so that the cell gap becomes uniform and the rubbing process can be performed easily. Differently from the above description, the process of forming the recesses 623 in the underlayer 612 at regions corresponding to the light-shielding 615 can also be performed at the first step.

The recesses 623 may also be formed by using a halftone.

Ninth Embodiment

Next, another embodiment in which the present invention is applied to a transflective liquid crystal device using Thin Film Diodes (TFD), which are two-terminal switching devices, as switching devices will be described below.

Figure 46:
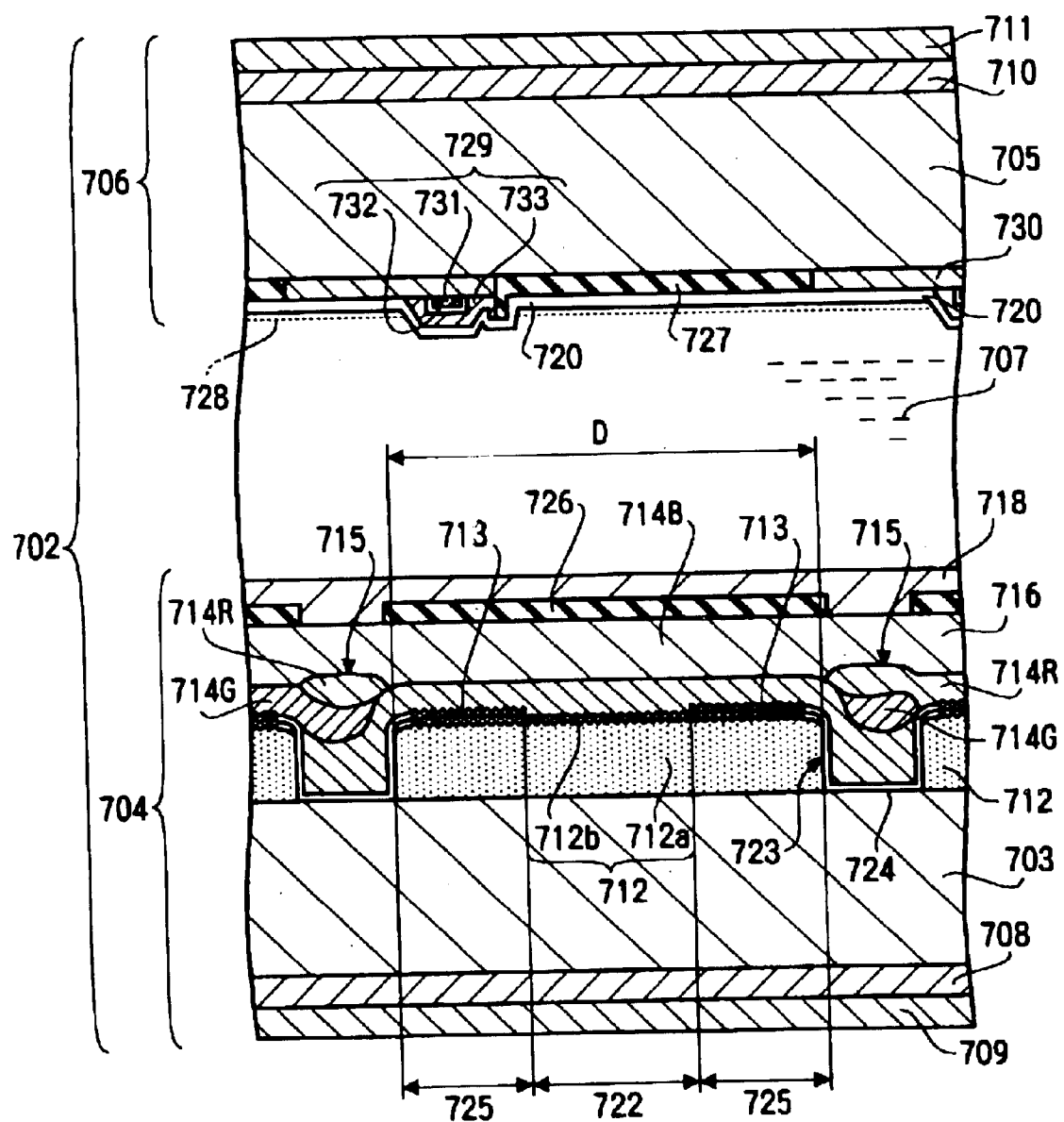
FIG. 46 is a sectional view showing the cross-sectional structure of the main part of a liquid crystal device according to another embodiment of the electrooptical device of the present invention.
Figure 47:
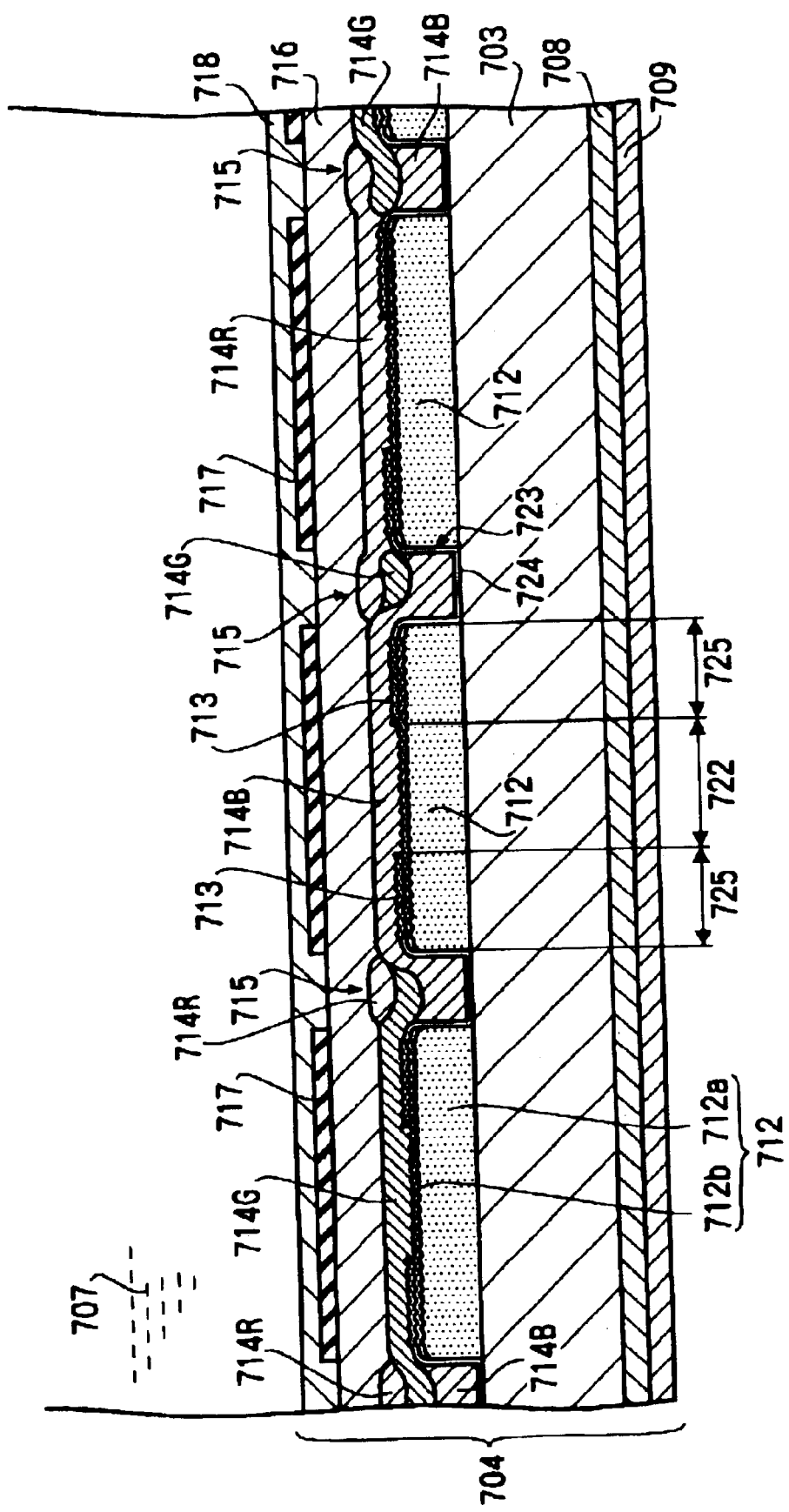
FIG. 47 is a sectional view showing the main part of a color filter substrate included in the liquid crystal device shown in FIG. 46.
Figure 48:
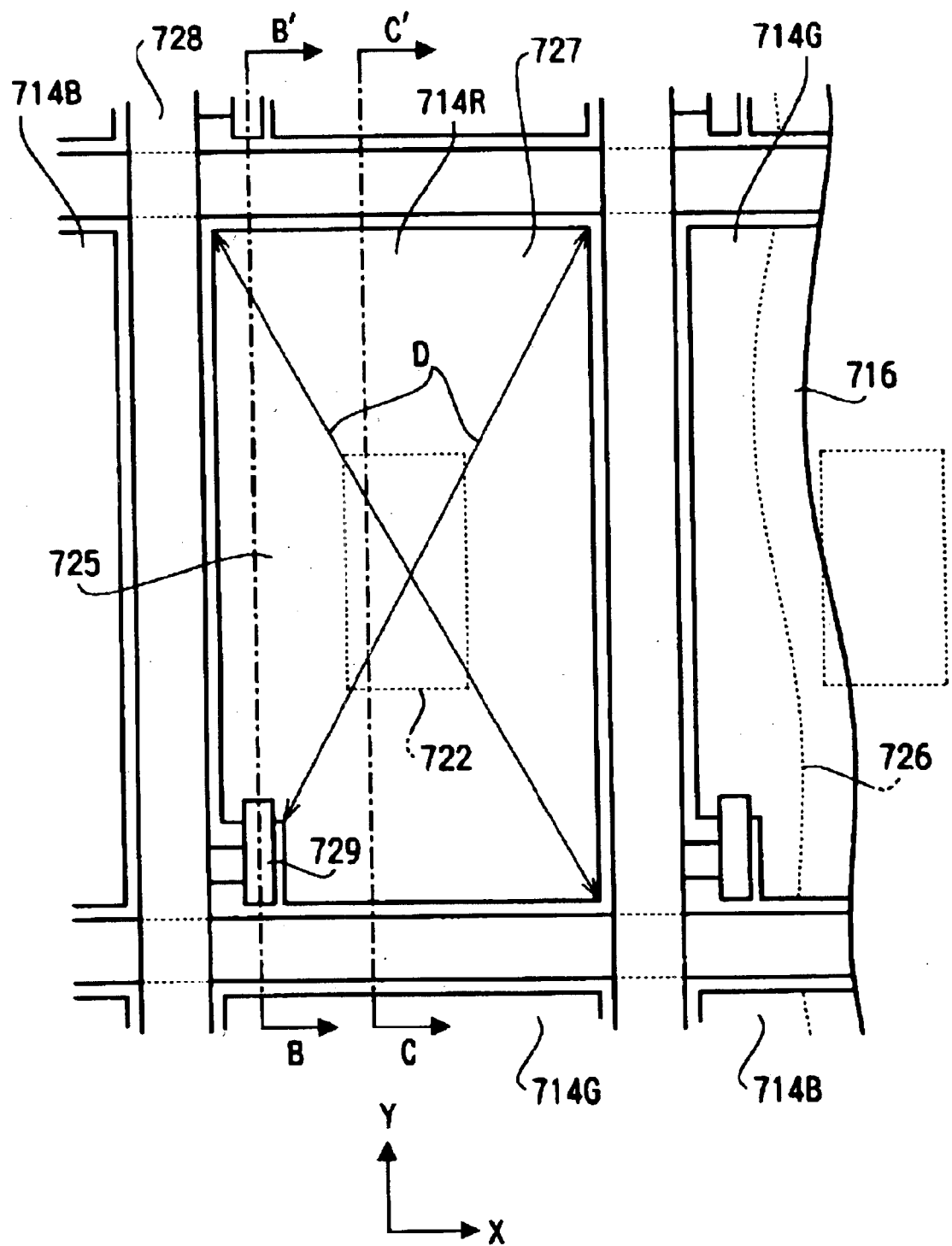
FIG. 48 is a partially broken plan view showing the planar structure of the liquid crystal device shown in FIG. 46.
Figure 49:
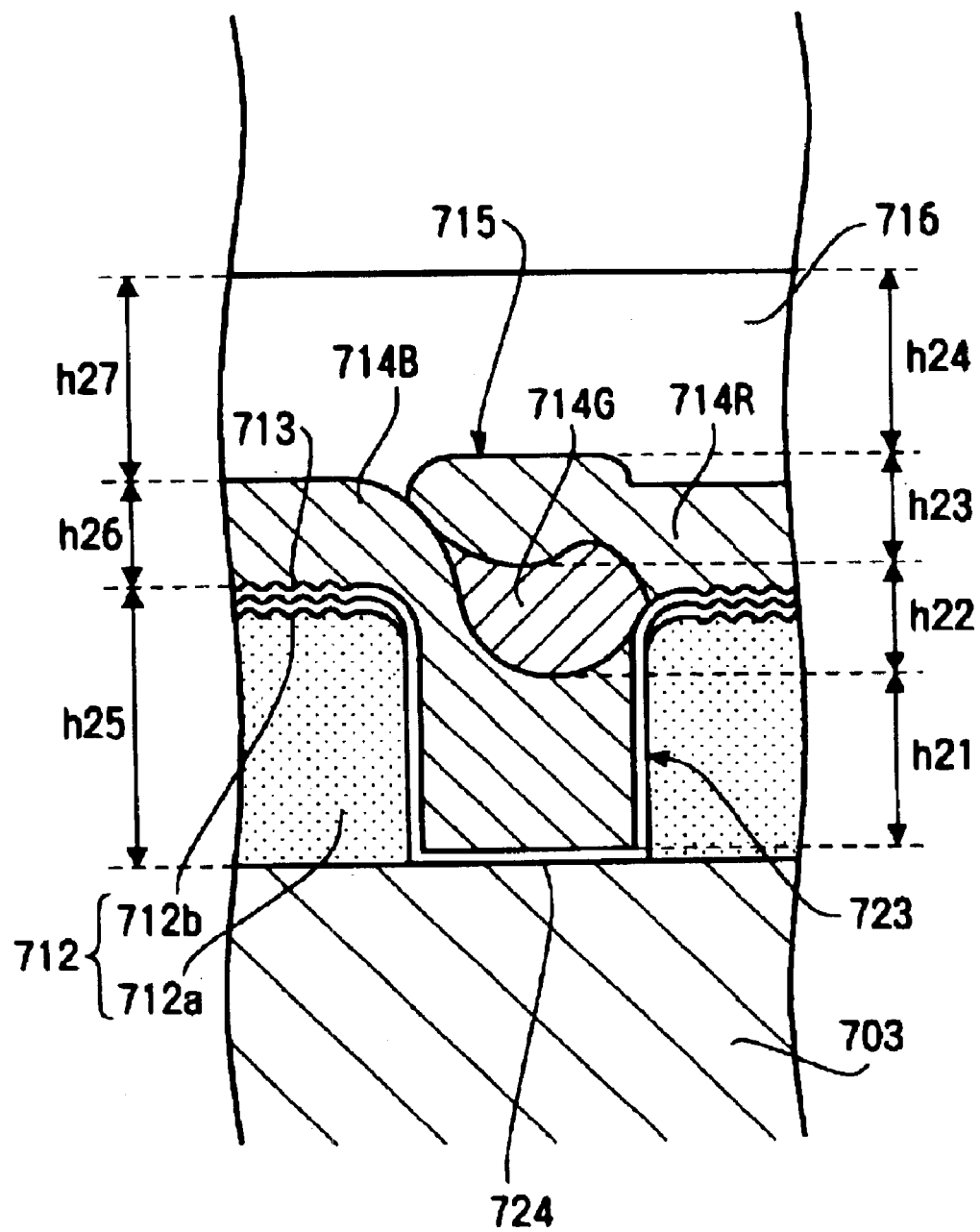
FIG. 49 is a sectional view showing the main part of the color filter substrate shown in FIG. 47.
Figure 50:
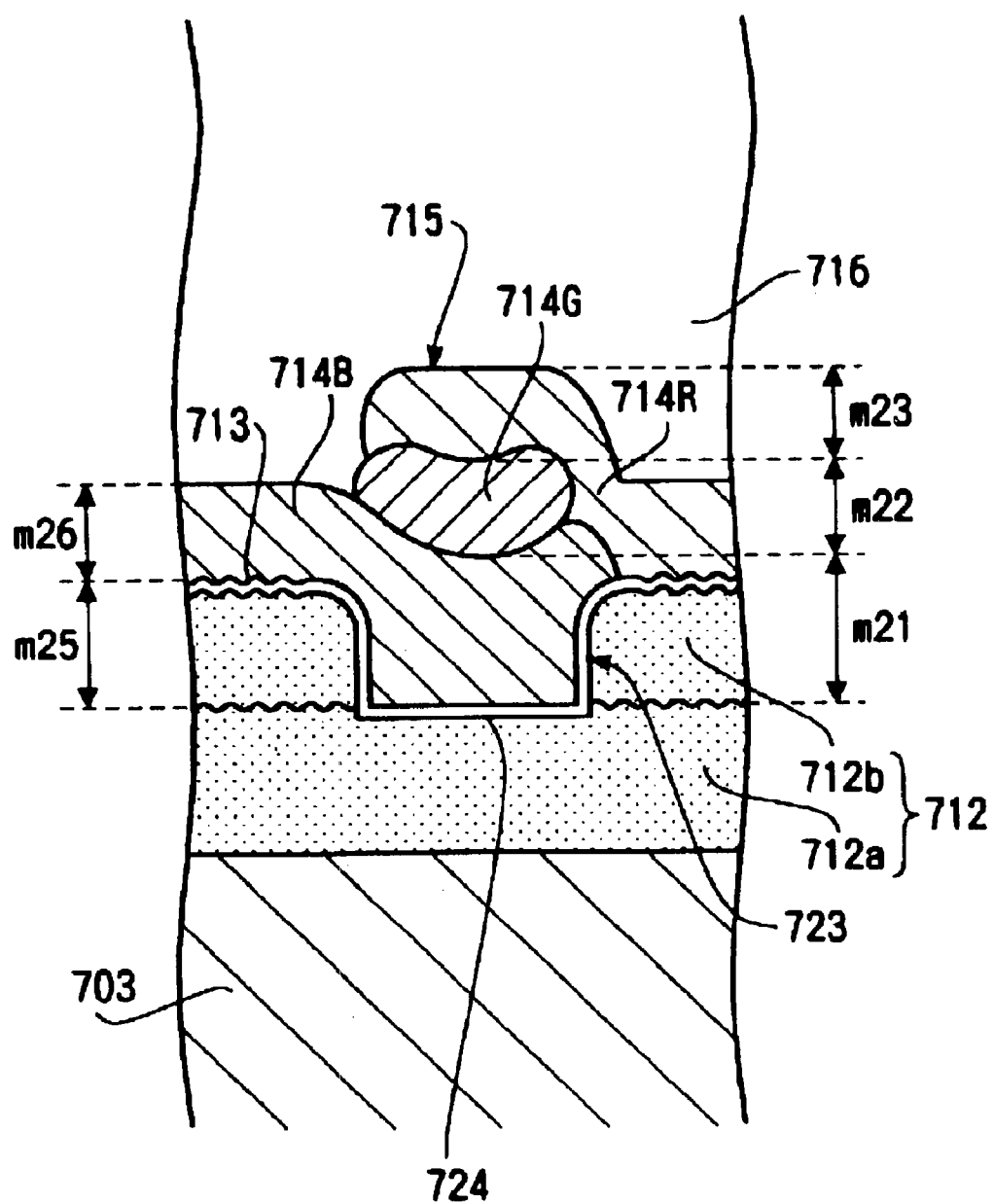
FIG. 50 is a sectional view showing the modification of the structure shown in FIG. 49.
Figure 51:
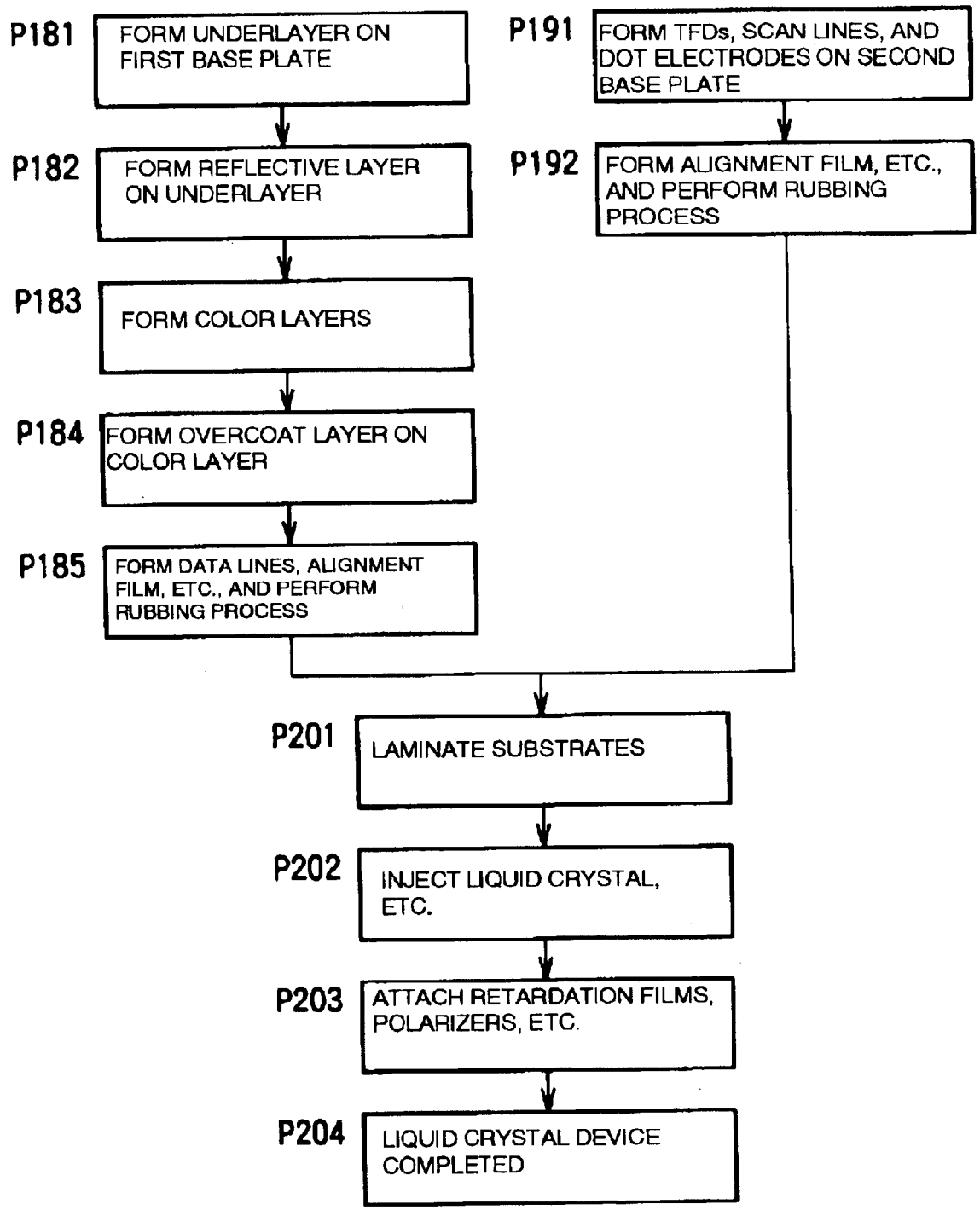
FIG. 51 is a flow chart showing a method for manufacturing the liquid crystal device shown in FIG. 46.

FIG. 46 is a sectional view of a part including a first base plate included in a liquid crystal device according to another embodiment of the present invention. FIG. 47 is a sectional view of a part including a first base plate included in the liquid crystal panel shown in FIG. 46. FIG. 48 is an enlarged view of a part of the liquid crystal panel. FIG. 46 corresponds to a sectional view of FIG. 48 cut along lines B–B' and C–C'. FIG. 49 is an enlarged sectional view of a part of a light-shielding layer from which an underlayer is completely removed. FIG. 50 is an enlarged sectional view of a part of the light-shielding layer from which the underlayer is partially removed. FIG. 51 is a flow chart showing a method for manufacturing the liquid crystal device according to the present embodiment.

A liquid-crystal panel 702 shown in FIG. 46 is a transflective liquid crystal panel, and a liquid crystal device including the liquid crystal panel 702 is constructed similarly to the liquid crystal device 101 shown in FIG. 9. More specifically, the liquid crystal device is constructed by attaching the illuminating unit 131, which is provided as necessary, and the housing 132 to the liquid crystal panel 702.

The liquid crystal panel 702 includes a color filter substrate 704 and an opposing substrate 706 which oppose each other and which are laminated with the sealing member 133 (see FIG. 9). The color filter substrate 704 includes a first base plate 703 which is a transparent plate composed of glass, synthetic resin, etc., and the opposing substrate 706 includes a second base plate 705. In addition, a liquid crystal layer 707 is formed by injecting liquid crystal into a gap between the color filter substrate 704 and the opposing substrate 706. A retardation film 708 and a polarizer 709 are disposed on the outer surface of the first base plate 703, and a retardation film 710 and a polarizer 711 are disposed on the outer surface of the second base plate 705.

In the color filter substrate 704, an underlayer 712 is formed on the surface of the first base plate 703 which faces the liquid crystal layer 707 and a reflective layer 713 is formed on the surface of the underlayer 712. In addition, regions where the reflective layer 713 is formed on the surface of the underlayer 712 serve as reflective portions 725, and apertures 722 formed in the reflective layer 713 serve as transmissive portions.

A green layer 714G, a blue layer 714B, and a red layer 714R are formed on the reflective layer 713 in a predetermined configuration pattern. In the following descriptions, these color layers may be generically denoted by reference numeral "714". A light-shielding layer 715 is formed so as to cover the boundary regions between the adjacent color layers 714.

In addition, an overcoat layer 716 is provided on the color layers 714 and the light-shielding layer 715 to protect them. In addition, data lines 726 composed of a transparent conductive material such as ITO are formed on the overcoat layer 716, and an alignment film 718 composed of polyimide resin, etc., is formed on transparent electrodes 717.

In addition, with reference to FIG. 46, in the opposing substrate 706, pixel electrodes 727 which are arranged in a matrix pattern, band-shaped scan lines 728 which extend along the boundary regions between the pixel electrodes 727 in a direction such that the scan lines 728 intersect the data lines 726 (that is, in the Y direction in FIG. 48 ), and TFDs 729 which are connected to the pixel electrodes 727 and the scan lines 728 are formed on the surface of the second base plate 705 which faces the liquid crystal layer 707. In addition, an alignment film 720 is formed on top.

The data lines 726 are band-shaped and extend in a predetermined direction (for example, in the X direction in FIG. 48), and are arranged parallel to each other in a striped pattern. Areas where the data lines 726 and the pixel electrodes 727 overlap serve as display dots D.

The underlayer 712 includes a lower layer 712a and an upper layer 712b, and both of these layers are composed of a resin material. In the underlayer 712, small irregularities are formed in the surface of the lower layer 712a, and the upper layer 712b is formed by covering the lower layer 712a with a thin layer composed of the same material as the lower layer 712a. Accordingly, smooth irregularities are formed. Due to these irregularities, light which passes through the underlayer 712 can be scattered, so that the problem in that the image displayed by the liquid crystal device cannot be viewed clearly can be solved.

The reflective layer 713 is preferably composed of an elemental metal such as aluminum or silver and is formed on the top surface of the underlayer 712. The surface of the reflective layer 713 also has small irregularities corresponding to those in the surface of the underlayer 712. Therefore, light reflected by the reflective layer 713 is also scattered, so that the problem in that the imaged displayed by the liquid crystal device cannot be viewed clearly can be solved.

As shown in FIG. 48, for example, the reflective layer 713 has the apertures 722 having an approximately rectangular shape at the central regions of the display dots D, and the apertures 722 serve as the transmissive portions. Light emitted from the illuminating unit 131 (see FIG. 9) passes through the apertures 722 and is supplied to the liquid crystal layer 707. The shape of the apertures 722 is not limited to this example, and the apertures 722 may have other shapes such as a circle. In addition, the number of apertures 722 formed in a single display dot D is not limited to one, and a plurality of apertures 722 may also be formed.

The color layers 714 are formed by applying a color resist composed of a photosensitive resin including a colorant such as a pigment and a dye and forming a pattern by using photolithography techniques. In this patterning process, portions for covering the apertures 722, which allow light which is emitted from the illuminating unit 131 and travels through the first base plate 703 to pass therethrough, and portions for covering the reflective layer 713 at regions around the apertures 722 are formed. When the color layers 714 corresponding to three colors (R, G, and B) are provided as in the present embodiment, the above-described patterning process is performed for each color. Accordingly, the color layers 714 can be formed such that they overlap one another at regions corresponding to the light-shielding layer 715.

The light-shielding layer 715 is formed so as to cover the boundary regions between the display dots D, and serves to prevent light from passing through the boundary regions. The light-shielding layer 715 includes band-shaped portions which extend along the longitudinal direction of the scan lines 728 on the second base plate 705 (that is, the Y direction in FIG. 48), and band-shaped portions which extend along the direction perpendicular to this direction (that is, the X direction in FIG. 48).

As shown in FIG. 47, the light-shielding layer 715 is formed so as to cover the regions between the adjacent color layers 714. Openings 723 are formed in the underlayer 712 at regions corresponding to the light-shielding layer 715, and bottom surfaces 724 of the openings 723 are positioned on the first base plate 703 with the reflective layer 713 therebetween.

With reference to FIG. 49, the color layer 714B, which is adjacent to the light-shielding layer 715, the color layer 714G, and an extending portion of the color layer 714R are laminated in the opening 723 in that order from the bottom surface 724. The thicknesses of the color layers 714B, 714G, and 714R in the opening 723 are h21, h22, and h23, respectively.

When the thickness h21 of the color layer 714B formed at the bottom is in the range of 0.7 $\mu$m to 2.0 $\mu$m, light-shielding effect obtained by the blue-based color layer, for example, the blue layer 714B, increases. In addition, by laminating the color layers corresponding to other colors in combination, the planarity over the surfaces of the display dots D and the surfaces of the boundary regions between the display dots D can be ensured.

With reference to FIG., 49, the case is considered in which h21 is set to approximately 1.7 $\mu$m, h22 is set to approximately 1.0 $\mu$m, h23 is set to approximately 0.9 $\mu$m, and the thickness h24 of the overcoat layer 716 which is formed on the color layer 714R disposed at the top among the laminated color layers is set to approximately 1.8 $\mu$m. The thickness h25 of the underlayer 712 is approximately 2.4 $\mu$m, the thickness h26 of the color layer 714B at the display dots D is approximately 1.0 $\mu$m, and the thickness h27 of the overcoat layer 216 at the display dots D is approximately 2.0 $\mu$m. Therefore, the top surface of the overcoat layer 716 at the region where the light-shielding layer 715 is formed and the top surface of the overcoat layer 716 at the display dot D corresponding to the color layer 714B level with each other, so that the planarity of the top surface of the overcoat layer 716 can be ensured. When the color layer 714B is disposed at the bottom in the opening 723 as described above, the thickness of the color layer 714B can be set to approximately 1.7 $\mu$m.

In addition, with reference to FIG. 47, in the boundary region between the color layer 714G and the color layer 714B, the color layer 714B, which is adjacent to the boundary region, an extending portion of the color layer 714G, which is also adjacent to the boundary region, and the color layer 714R are laminated in the opening 723 in that order from the bottom surface 724. Accordingly, the light-shielding layer 715 is formed.

In addition, in the boundary region between the color layer 714R and the color layer 714G, the color layer 714B, an extending portion of the color layer 714G, which is adjacent to the boundary region, and the color layer 714R, which is also adjacent to the boundary region, are laminated in the opening 723 in that order from the bottom surface 724. Accordingly, the light-shielding layer 715 is formed.

The concave areas in the underlayer 712 in which the light-shielding layer 715 is formed is not limited to the above-described openings 723, and recesses 723 shown in FIG. 50, for example, may be provided instead. In such a case, the underlayer 712 is not completely removed at regions under the bottom surfaces 724 of the recesses 723. Also in this case, the height of the light-shielding layer 715 is reduced by the amount corresponding to the depth m25 of the bottom surfaces 724 of the recesses 723. Therefore, the roughness of the top surface of the overcoat layer 716 can be reduced, so that the dispersion of the cell gap becomes small and the rubbing process can be performed easily. As a result, the contrast of an image displayed by the liquid crystal device increases.

In addition, when the thickness m21 of the color layer 714B formed at the bottom in FIG. 50 is in the range of 0.7 $\mu$m to 2.0 $\mu$m, light-shielding effect obtained by the blue-based color layer, for example, the blue layer 714B, increases. In addition, by laminating the color layers corresponding to other colors in combination, the roughness over the surfaces of the display dots D and the surfaces of the boundary regions between the dots D can be reduced.

More preferably, with reference to FIG. 50, the thickness m21 of the color layer 714B is set to approximately 1.1 $\mu$m, the thickness m22 of the color layer 714G is set to approximately 1.0 $\mu$m, and the thickness m23 of the color layer 714R is set to approximately 0.9 $\mu$m. In this case, when the depth m25 of the bottom surfaces 724 of the recesses 723 is approximately 1.3 $\mu$m, the roughness of the overcoat layer 716 can be further reduced.

Although the color layers 714 are arranged in an oblique mosaic pattern in FIG. 48, they may also be arranged in other various patterns including a striped pattern, a digital pattern, etc.

The display dots D are regions surrounded by the light-shielding layer 715, and each display dot D includes one of the color layers 714 corresponding to R, G, and B, the reflective layer 713, and the aperture 722. A single pixel is constructed of three display dots D including the color layers 714 corresponding to R, G, and B.

The pixel electrodes 727 shown in FIG. 46 are composed of a transparent conductive material such as ITO, and are connected to the scan lines 728 which are adjacent to the pixel electrodes 727 with the TFDs 729. The TFDs 729 are arranged on an underlayer 730 which is formed on the surface of the second base plate 705. In addition, the TFDs 729 are constructed of a first metal layer 731, an insulating film 732 formed on the surface of the first metal layer 731, and a second metal layer 733 formed on the insulating film 732.

The first metal layer 731 is preferably constructed of, for example, a tantalum film, a tantalum alloy film, etc., whose thickness is about 100 to 500 nm, and is connected to the scan lines 728. The insulating film 732 is preferably constructed of, for example, tantalum oxide film whose thickness is about 10 to 35 nm. In addition, the second metal layer 733 is preferably constructed of, for example, a metal film composed of chromium (Cr), etc., whose thickness is about 50 to 300 nm, and is connected to the pixel electrodes 727.

In the present embodiment, a scan signal is supplied to each of the scan lines 728 formed on the second base plate 705, and a data signal is supplied to each of the data lines 726 formed on the first base plate 703. Accordingly, the liquid crystal is driven only at regions where the pixel electrodes 727 and the data lines 726 oppose each other.

In reflective display, external light travels through the second base plate 705 and the pixel electrodes 727, enters the liquid crystal layer 707, is modulated by the liquid crystal layer 707 in units of a display dot D, and is reflected by the reflective layer 713. The reflected light passes through the pixel electrodes 727 and the second base plate 705, and is emitted to the outside.

In transmissive display, light emitted from the illuminating unit 131 (see FIG. 9) passes through the first base plate 703 and the transmissive portions 722, and enters the liquid crystal layer 707. The light is modulated by the liquid crystal layer 707 in units of a display dot D, passes through the pixel electrodes 727 and the second base plate 705, and is emitted to the outside. Accordingly, an image is displayed by the emitted light.

In both the reflective mode and transmissive mode, since the overcoat layer 716 is planar according to the present embodiment, a high-contrast image can be displayed by the liquid crystal device. The emitted light is colored in corresponding colors by the color layers 714 which cover the reflective layer 713 and the transmissive portions 722.

In the present embodiment, the underlayer 712 is formed such that the recesses 723 (FIG. 50) or the openings 723 (FIG. 49) are provided at the boundary regions between the adjacent display dots D. Accordingly, the height of the light-shielding layer 715 constructed of the color layers 714 can be reduced, so that and the planarity over the surfaces of the display dots D and the surfaces of the boundary regions between the display dots D can be ensured.

In addition, the blue-based color layer, for example, the blue layer 714B is formed first on the bottom surfaces 724 of the recesses 723 or the bottom surfaces 724 of the openings 723. Therefore, the blue layer, which has a relatively small mean transmission factor in the visible light range, is thicker than the color layers 714 corresponding to other colors such as a green-based color, for example, green, and a red-based color, for example, red. Accordingly, the light-shielding effect can be increased and the overall height of the light-shielding layer 715 can be reduced. Therefore, the contrast of an image displayed by the liquid crystal device can be increased.

In addition, when the blue layer 714B having a thickness of approximately 1.7 $\mu$m is formed on the bottom surfaces 724 of the openings 723, the green layer 714G having a thickness of approximately 1.0 $\mu$m is formed on the blue layer 714B, and the red layer 714R having a thickness of approximately 0.9 $\mu$m is formed on the green layer 714G, the planarity over the top surfaces of the display dots D and the top surfaces of the boundary regions between the display dots D, that is, the planarity of the overcoat layer 716, can be more reliably ensured. Therefore, the dispersion of the cell gap becomes small and the rubbing process can be performed easily. As a result, the contrast of an image displayed by the liquid crystal device can be increased.

According to the above descriptions, the openings 723 are formed such that the underlayer 712 is completely removed at regions where the light-shielding layer 715 is formed, as shown in FIG. 49. Alternatively, however, the underlayer 712 may be constructed in two steps by forming the first insulating layer 712a in the first step and the second insulating layer 712b in the second step, as shown in FIG. 50, and the recesses 723 can be formed at the time when the upper layer 712b is formed.

In this case, in the first step, the first insulating layer 712a is formed over the entire region of the base plate including the boundary regions between the display dots D in which the light-shielding layer 715 is to be formed, and irregularities are formed similarly to the lower layer 712a of the underlayer 712 shown in FIG. 49. In the second step, the second insulating layer 712b is formed so as to cover the regions excluding the boundary regions between the display dots D in which the light-shielding layer 715 is to be formed, that is, the regions corresponding to the display dots D, by an etching process using a photoresist.

Also in this case, the planarity of the top surface of the overcoat layer 716 can be ensured, so that the dispersion of the cell gap becomes small and the rubbing process can be performed easily. As a result, the contrast of an image displayed by the liquid crystal device can be increased. In addition, since the liquid crystal device of the present embodiment is a TFD active matrix liquid crystal device, the display is bright and is easy to view, and power consumption and manufacturing cost can be reduced.

Manufacturing Method of the Liquid Crystal Device

Next, a manufacturing method of the liquid crystal device according to the present embodiment will be described with reference to a flow chart shown in FIG. 51. First, in Step P181, the underlayer 712 is formed on the first base plate 703. In addition, the underlayer 712 is etched by using a photoresist such that the openings 723 are formed in the underlayer 712 at the boundary regions between the display dots D in which the light-shielding layer 715 is to be formed.

This will be described in more detail below. A resin material is uniformly applied to the first base plate 703 by spin coating, and then a resist is applied. Then, the resist is exposed to light through a photomask having a predetermined pattern, and is developed. Then, a plurality of holes is formed in the underlayer 712 by etching the resin material by using the resist as a mask. Next, heat is applied to the underlayer 712 so that the holes deform and become smooth, and the lower layer 712a of the underlayer 712 having irregularities in the surface thereof is thus obtained. Then, the upper layer 712b of the underlayer 712 is formed by applying the resin material such that smooth irregularities are formed in the surface of the underlayer 712.

Next, a resist is applied to the underlayer 712, is exposed to light through a photomask having a predetermined pattern, and is developed. Then, the openings 723 are formed in the underlayer 712 by an etching process using the resist as a mask. Accordingly, the underlayer 712 which is removed at regions where the light-shielding layer 715 is to be provided is formed on the first base plate 703.

Next, in Step P182, a thin film of aluminum, etc., is formed on the underlayer 712 by using deposition techniques or sputtering techniques, and a pattern is formed by using photolithography techniques such that the approximately rectangular apertures 722 are formed at the central regions of the display dots D, as shown in FIG. 48, and the reflective layer 713 is formed at regions surrounding the apertures 722.

Next, in Step P183, a coloring material for a blue-based color, for example, blue, is applied to the reflective layer 713 and the apertures 722 by spin-coating, and then a resist is applied. The resist is exposed to light through a photomask having a predetermined pattern, and is developed. Then, the color material is etched by using the resist as a mask, so that the blue layer 714B is formed. The above-described process is repeated for the other two colors, so that the green-based color layer, for example, the green layer 714G and the red-based color layer, for example, the red layer 714R are formed successively.

Accordingly, one of the blue layer 714B, the green layer 714G, and the red layer 714R is formed in each of the display dots D. As shown in FIG. 46, in the light-shielding layer 715, the blue layer 714B, the green layer 714G, and the red layer 714R are laminated in that order from the bottom, and the blue layer 714G is the thickest among them. Since the blue layer 714B is formed at the bottom and is the thickest among the color layers 714, the light-shielding effect can be increased and the overall height of the light-shielding layer 715 can be reduced.

Next, in Step P184, the overcoat layer 716 is formed on the color layers 714. Since the recesses 723 are formed in the underlayer 712, the height of the light-shielding layer 715 can be reduced and the planarity of the surface of the overcoat layer 716 can be ensured. Accordingly, the dispersion of the cell gap becomes small and the rubbing process can be performed easily. As a result, the contrast of an image displayed by the liquid crystal device can be increased.

Next, in Step P185, a material of the data lines 726, such as ITO, is applied to the overcoat layer 716 by using sputtering techniques, and a pattern is formed by using photolithography techniques such that the data lines 726 having a predetermined width are formed in a striped pattern along the X direction, as shown in FIG. 48. Then, the alignment film 718 is formed on the data lines 726, and is subjected to the rubbing process. Accordingly, the color filter substrate 704 is completed.

In addition, with respect to the opposing substrate 706, in Step P191, the TFDs 729, the scan lines 728, and the pixel electrodes 727 are formed on the second base plate 705. The process of the forming TFDs 729 will be described in detail below. First, the underlayer 730 is formed by applying tantalum oxide, etc., to the second base plate 705 at a uniform thickness. Then, tantalum, etc., is applied to the underlayer 730 at a uniform thickness by sputtering, and the scan lines 728 and the first metal layer 731 are formed at the same time by using photolithography techniques. The scan lines 728 are connected to the first metal layer 731 with bridges.

Then, the insulating film 732 is formed by applying tantalum oxide, etc., to the first metal layer 731 at a uniform thickness. Then, chromium (Cr) is applied to the insulating film 732 at a uniform thickness by sputtering, etc., and the second metal layer 733 is formed by using photolithography techniques.

Next, the underlayer 730 is removed at the regions where the pixel electrodes 727 are to be formed. Then, an ITO film having a uniform thickness is formed by sputtering, etc., and the pixel electrodes 727 having a predetermined shape corresponding to the size of a single display dot are formed by using photo lithography techniques such that portions of the pixel electrodes 727 overlap the second metal layer 733. Accordingly, the TFDs 729 and the pixel electrodes 727 are formed.

Next, in Step P192, the alignment film 720 is formed on the TFDs 729 and the pixel electrodes 727, and is subjected to the rubbing process. Accordingly, the opposing substrate 706 is completed.

Next, in Step P201, the spacers 129 (see FIG. 9) are dispersed over the alignment film 720 on the second base plate 705 by dry dispersion, etc., and the color filter substrate 704 and the opposing substrate 706 are laminated with the sealing member 133. Then, in Step P202, liquid crystal is injected through an opening formed in the sealing member 133. Then, the opening formed in the sealing member is sealed with a sealant such as an ultraviolet curing resin.

Next, in Step P203, the retardation films 708 and 710, and the polarizers 709 and 711 are laminated on the outer surfaces of the first base plate 703 and the second base plate 705, respectively. Next, in Step P204, electric wirings are arranged as necessary and the illuminating unit 131 and the housing 132 shown in FIG. 9 are attached Accordingly, the liquid crystal device is completed.

In the manufacturing method shown in FIG. 51, the light-shielding layer 715 is formed by laminating the color layers 714, and the blue-based color layer, for example, the blue layer 714B, is formed at the bottom. Accordingly, the blue layer 714 is the thickest among the color layers 714, so that the light-shielding effect can be increased. In addition, the overall thickness of the light-shielding layer 715 can be reduced.

Since the recesses 723 are formed in the underlayer 712, the height of the light-shielding layer, 715 can be reduced. Thus, the planarity of the surface of the overcoat layer 716 can be ensured, so that the dispersion of the cell gap becomes small and the rubbing process can be performed easily. As a result, the contrast of a displayed image can be increased.

In the manufacturing method shown in FIG. 51, the underlayer 712 is completely removed at the openings 723, that is, at the regions where the light-shielding layer 715 is formed, as shown in FIG. 49. Alternatively, however, the underlayer 712 may be constructed in two steps by forming the first insulating layer 712a in the first step and the second insulating layer 712b in the second step, as shown in FIG. 50, and the recesses 723 can be formed at the time when the upper layer 712b is formed.

In this case, in the first step, the first insulating layer 712a is formed over the entire region of the base plate including the boundary regions between the display dots D in which the light-shielding layer 715 is to be formed, and irregularities are formed similarly to the lower layer 712a of the underlayer 712 shown in FIG. 49. In the second step in which the second insulating layer 712b is formed, the underlayer 712 is formed so as to cover the regions excluding the boundary regions between the display dots D in which the light-shielding layer 715 is to be formed, that is, the regions corresponding to the display dots D, by an etching process using a photoresist.

Accordingly, the process of etching the underlayer 712 using a photoresist can be emitted in the first step for forming the underlayer 712, so that the cost can be reduced and the manufacturing speed can be increased. In addition, when the underlayer 712 is completely removed as in the openings 723, there is a possibility that the planarity over the surfaces of the boundary regions between the adjacent display dots D and the surfaces of the display dots D will be degraded instead of improving. As so in such a case, the planarity can be ensured by forming the underlayer 712 at a desired thickness, so that the dispersion of the cell gap becomes small and the rubbing process can be performed easily. Differently from the above description, the process of forming the recesses 723 in the underlayer 712 at regions corresponding to the light-shielding 715 can also be performed at the first step.

The recesses 723 may also be formed by using a halftone.

Tenth Embodiment

Next, an embodiment in which the present invention is applied to a transflective liquid crystal device using Thin Film Transistors (TFT), which are three-terminal switching devices, as switching devices will be described below.

Figure 52:
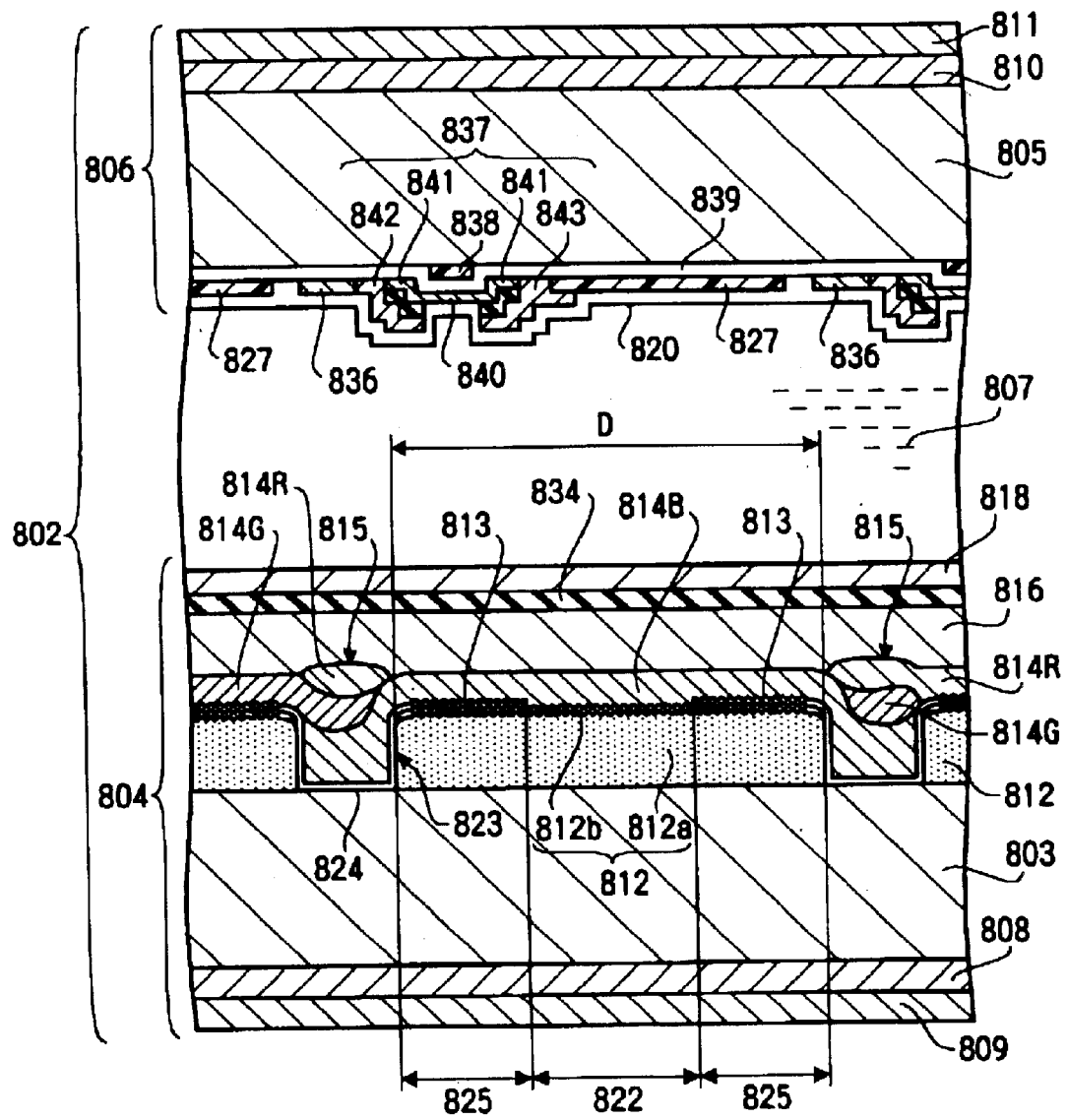
FIG. 52 is a sectional view showing the cross-sectional structure of the main part of a liquid crystal device according to another embodiment of the electrooptical device of the present invention.
Figure 53:
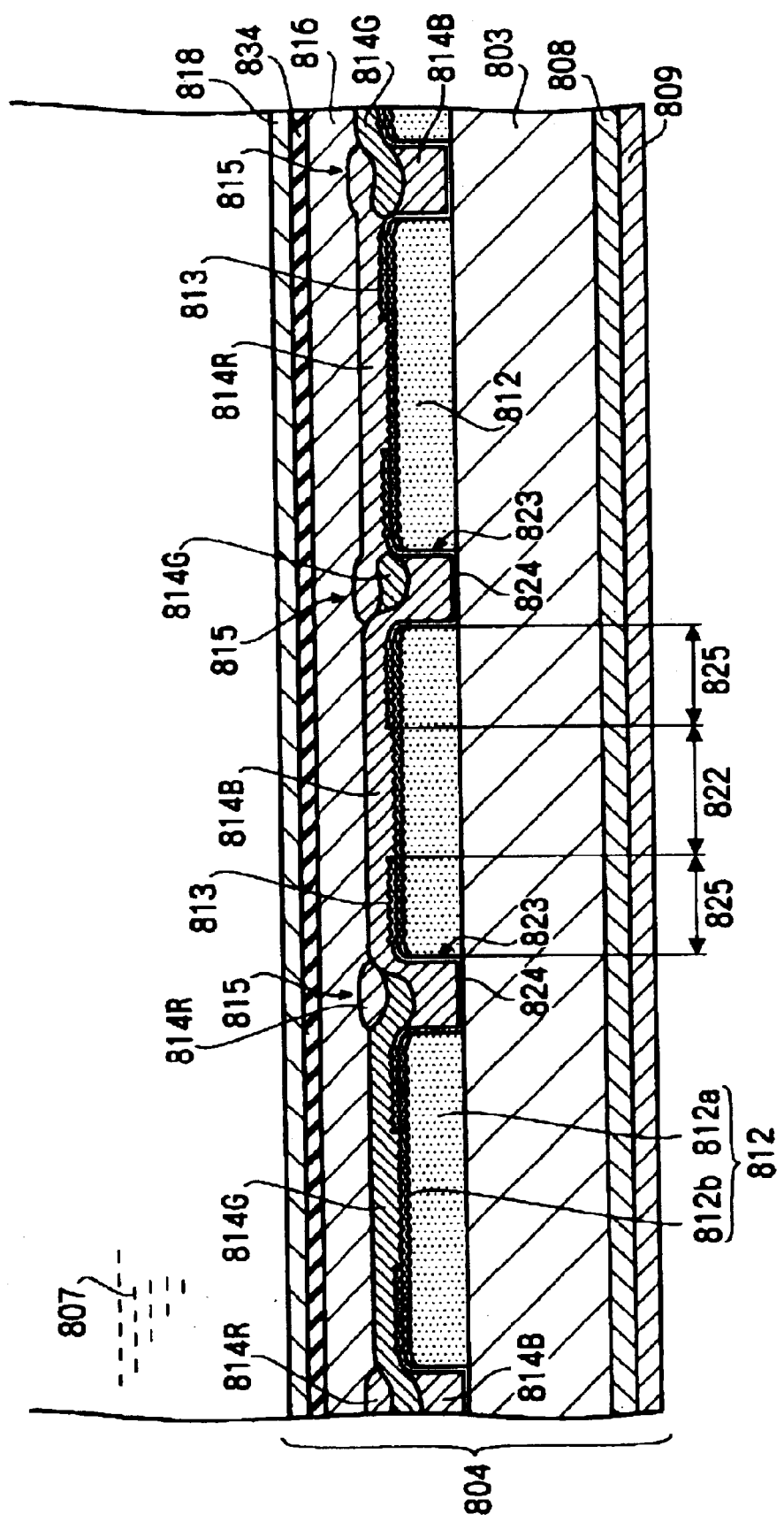
FIG. 53 is a sectional view showing the main part of a color filter substrate included in the liquid crystal device shown in FIG. 52.
Figure 54:
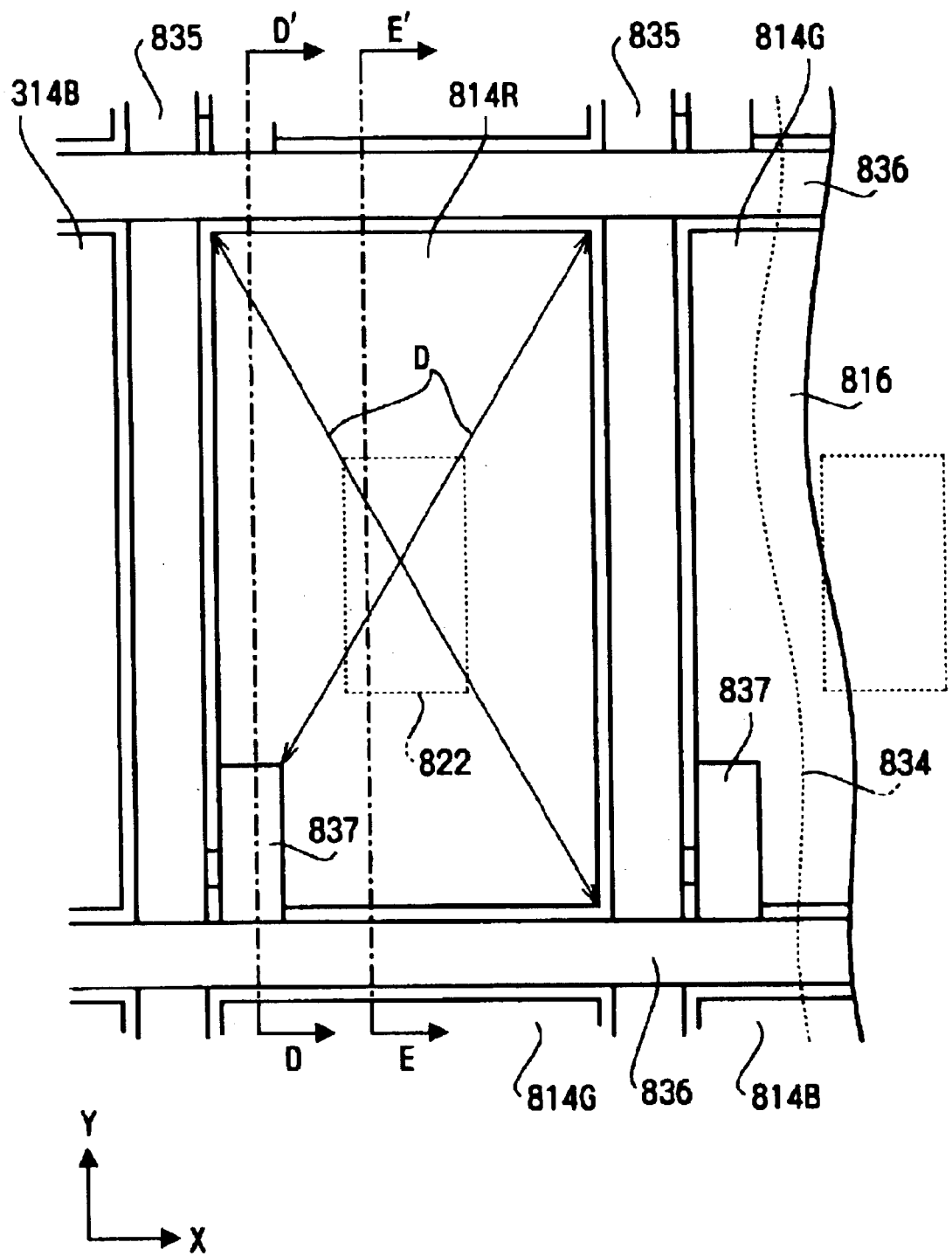
FIG. 54 is a partially broken plan view showing the planar structure of the liquid crystal device shown in FIG. 52.
Figure 55:
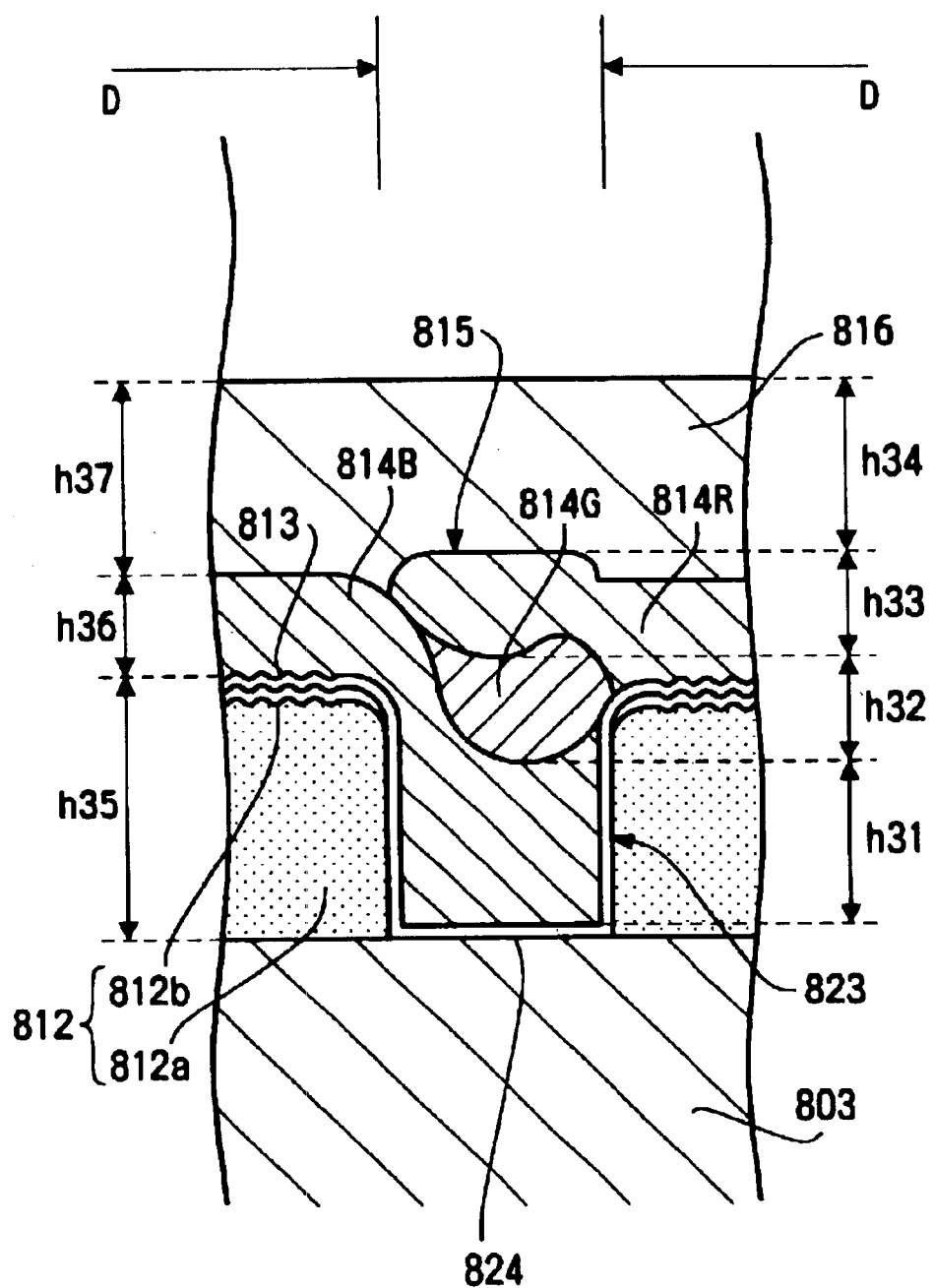
FIG. 55 is a sectional view showing the main part of the color filter substrate shown in FIG. 53.
Figure 56:
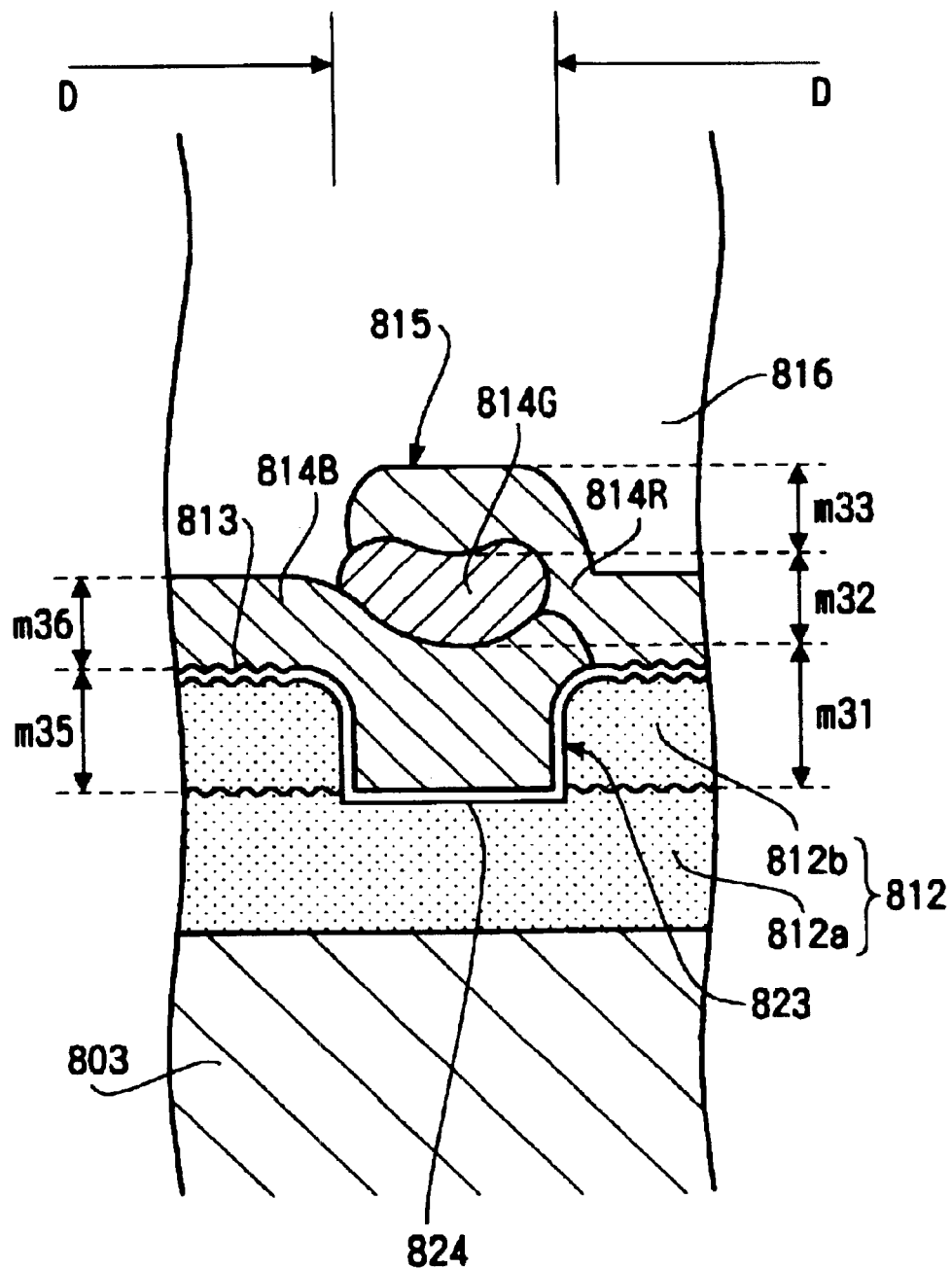
FIG. 56 is a sectional view showing the modification of the structure shown in FIG. 55.
Figure 57:
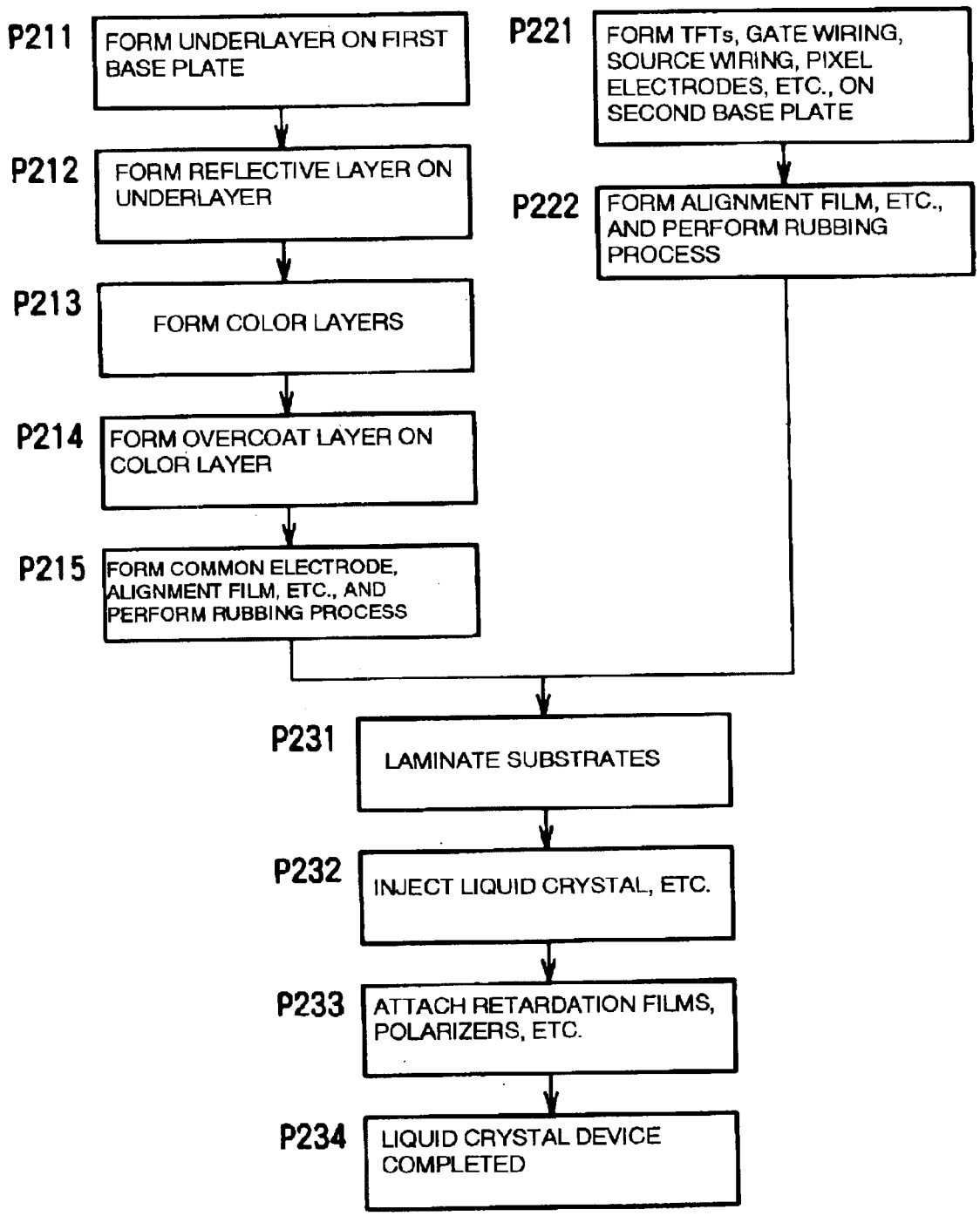
FIG. 57 is a flow chart showing a method for manufacturing the liquid crystal device shown in FIG. 52.

FIG. 52 is a sectional view of a liquid crystal panel included in a liquid crystal device according to another embodiment of the present invention. FIG. 53 is a sectional view of a color filter substrate included in the liquid crystal panel shown in FIG. 52. FIG. 54 is an enlarged view of a art of the liquid crystal panel. FIG. 52 corresponds to a sectional view of FIG. 54 cut along lines D–D' and E–E'. FIG. 55 is an enlarged sectional view of a part of a light-shielding layer from which an underlayer is completely removed. FIG. 56 is an enlarged sectional view of a part of the light-shielding layer from which the underlayer is partially removed. FIG. 57 is a flow chart showing a method for manufacturing the liquid crystal device according to the present embodiment.

A liquid crystal panel 802 shown in FIG. 52 is a transflective liquid crystal panel, and a liquid crystal device including the liquid crystal panel 802 is constructed similarly to the liquid crystal device 101 shown in FIG. 9. More specifically, the liquid crystal device is constructed by attaching the illuminating unit 131, which is provided as necessary, and the housing 132 to the liquid crystal panel 802.

The liquid crystal panel 802 includes a color filter substrate 804 and an opposing substrate 806 which oppose each other and which are laminated with the sealing member 133 (see FIG. 9). The color filter substrate 804 includes a first base plate 803 which is a transparent plate composed of glass, synthetic resin, etc., and the opposing substrate 806 includes a second base plate 805. In addition, a liquid crystal layer 807 is formed by injecting liquid crystal into a gap between the color filter substrate 804 and the opposing substrate 806. A retardation film 808 and a polarizer 809 are disposed on the outer surface of the first base plate 803, and a retardation film 810 and a polarizer 811 are disposed on the outer surface of the second base plate 805.

In the color filter substrate 804, an underlayer 812 is formed on the surface of the first base plate 803 which faces the liquid crystal layer 807 and a reflective layer 813 is formed on the surface of the underlayer 812. In addition, regions where the reflective layer 813 is formed on the surface of the underlayer 812 serve as reflective portions 825, and apertures 822 formed in the reflective layer 813 serve as transmissive portions.

A green layer 814G, a blue layer 814B, and a red layer 814R are formed on the reflective layer 813 in a predetermined configuration pattern. In the following descriptions, these color layers may be generically denoted by reference numeral "814". A light-shielding layer 815 is formed so as to cover the boundary regions between the adjacent color layers 814.

In addition, an overcoat layer 816 is provided on the color layers 814 and the light-shielding layer 815 to protect them. In addition, a common electrode 834 composed of a transparent conductive material such as ITO are formed on the overcoat layer 816, and an alignment film 818 composed of polyimide resin, etc., is formed on the common electrode 834.

Next, in the opposing substrate 806, pixel electrodes 827 which are arranged in a matrix pattern and gate wiring 835 and source wiring 836 which perpendicularly intersect each other at the boundary regions between the pixel electrodes 827 are formed on the surface of the second base plate 805 which faces the liquid crystal layer 807. In addition, TFTs 837 are disposed near the intersecting points of the gate wiring 835 and the source wiring 836, and an alignment film 820 is formed on top of them. The gate wiring 835 extend in the Y direction and the source wiring 836 extend in the X direction in FIG. 54.

The common electrode 834 is a planar electrode formed on the overcoat layer 816 over the entire region thereof, and areas surrounded by the gate wiring 835 and the source wiring 836 serve as display dots D.

The underlayer 812 includes a lower layer 812a and an upper layer 812b, and both of these layers are composed of a resin material. In the underlayer 812, small irregularities are formed in the surface of the lower layer 812a, and the upper layer 812b is formed by covering the lower layer 812a with a thin layer composed of the same material as the lower layer 812a. Accordingly, smooth irregularities are formed. Due to these irregularities, light which passes through the underlayer 812 can be scattered, so that the problem in that the imaged displayed by the liquid crystal device cannot be viewed clearly can be solved.

The reflective layer 813 is preferably composed of an elemental metal such as aluminum or silver and is formed on the top surface of the underlayer 812. The surface of the reflective layer 813 also has small irregularities corresponding to those in the surface of the underlayer 812. Therefore, light reflected by the reflective layer 813 is also scattered, so that the problem in that the imaged displayed by the liquid crystal device cannot be viewed clearly can be solved.

As shown in FIG. 54, the reflective layer 813 has the apertures 822 having an approximately rectangular shape at the central regions of the display dots D, and the apertures 822 serve as the transmissive portions. Light emitted from the illuminating unit 131 (see FIG. 9) passes through the apertures .822 and is supplied to the liquid crystal layer 807. The shape of the apertures 822 is not limited to this example, and the apertures 822 may have other shapes such as a circle. In addition, the number of apertures 822 formed in a single display dot D is not limited to one, and a plurality of apertures 822 may also be formed.

The color layers 814 are formed by applying a color resist composed of a photosensitive resin including a colorant such as a pigment and a dye and forming a pattern by using photolithography techniques. In this patterning process, portions for covering the apertures 822, which allow light which is emitted from the illuminating unit 131 and travels through the first base plate 803 to pass therethrough, and portions for covering the reflective layer 813 at regions around the apertures 822 are formed. When the color layers 814 corresponding to three colors (R, G, and B) are provided as in the present embodiment, the above-described patterning process is performed for each color. Accordingly, the color layers 814 can be formed such that they overlap one another at regions corresponding to the light-shielding layer 815.

The light-shielding layer 815 is formed so as to cover the boundary regions between the display dots D, and serves to prevent light from passing through the boundary regions. The light-shielding layer 815 includes band-shaped portions which extend along the longitudinal direction of the gate wiring 835 on the second base plate 805 (that is, the Y direction in FIG. 54), and band-shaped portions which extend along the direction perpendicular to this direction (that is, the X direction in FIG. 54).

As shown in FIG. 55, in a region between the color layer 814B and the color layer 814R, for example, the light-shielding layer 815 is formed so as to fill an opening 823 formed in the underlayer 812 at this region. A bottom surface 824 of the opening 823 is positioned on the first base plate 803 with the reflective layer, 813 therebetween.

The color layer 814B, which is adjacent to the light-shielding layer 815, the color layer 814G, and an extending portion of the color layer 814R are laminated in the opening 823 in that order from the bottom surface 824. The thicknesses of the color layers 814B, 814G, and 814R in the opening 823 are h31, h32, and h33, respectively.

When the thickness h31 of the color layer 814B formed at the bottom is in the range of 0.7 $\mu$m to 2.0 $\mu$m, light-shielding effect obtained by the blue-based color layer, for example, the blue layer 814B, increases. In addition, by laminating the color layers corresponding to other colors in combination, the planarity over the surfaces of the display dots D and the surfaces of the boundary regions between the display dots D can be ensured.

With reference to FIG. 55, the case is considered in which h31 is set to approximately 1.7 $\mu$m, h32 is set to approximately 1.0 $\mu$m, h33 is set to approximately 0.9 $\mu$m, and the thickness h34 of the overcoat layer 816 which is formed on the color layer 814R disposed at the top among the laminated color layers is set to approximately 1.8 $\mu$m. The thickness h35 of the underlayer 812 is approximately 2.4

µm, the thickness h36 of the color layer 814B at the display dots D is approximately 1.0 µm, and the thickness h37 of the overcoat layer 816 at the display dots D is approximately 2.0 µm. Therefore, the top surface of the overcoat layer 816 at the region where the light-shielding layer 815 is formed and the top surface of the overcoat layer 816 at the region where the display dot D of the color layer 814B level with each other, so that the planarity of the top surface of the overcoat layer 816 can ensured.

When the color layer 814B is disposed at the bottom of the opening 823 as described above, the thickness of the color layer 814B can be set to approximately 1.7 µm.

In addition, as shown in FIG. 53, in the boundary region between the color layer 814G and the color layer 814B, the color layer 814B, which is adjacent to the boundary region, an extending portion of the color layer 814G, which is also adjacent to the boundary region, and the color layer 814R are laminated in the opening 823 in that order from the bottom surface 824. Accordingly, the light-shielding layer 815 is formed.

In addition, in the boundary region between the color layer 814R and the color layer 814G, the color layer 814B, an extending portion of the color layer 814G, which is adjacent to the boundary region, and the color layer 814R, which is also adjacent to the boundary region, are laminated in the opening 823 in that order from the bottom surface 824. Accordingly, the light-shielding layer 815 is formed.

The light-shielding layer 815 is not limited to the above-described structure, and the underlayer 812 may be formed such that it is not completely removed at regions under the bottom surfaces 824 of the recesses 823, as shown in FIG. 56. Also in this case, the height of the light-shielding layer 815 is reduced by the amount corresponding to the depth m35 of the bottom surfaces 824 of the recesses 823, and the roughness of the top surface of the overcoat layer 816 can be reduced. Accordingly, the dispersion of the cell gap becomes small and the rubbing process can be performed easily, so that the contrast of an image displayed by the liquid crystal device increases.

In addition, when the thickness m31 of the color layer 814B formed at the bottom in FIG. 56 is in the range of 0.7 µm to 2.0 µm, light-shielding effect obtained by the blue-based color layer, for example, the blue layer 814B, increases. In addition, by laminating the color layers corresponding to other colors in combination, the roughness over the surfaces of the display dots D and the surfaces of the boundary regions between the display dots D can be reduced.

More preferably, with reference to FIG. 56, the thickness m31 of the color layer 814B is set to approximately 1.1 µm, the thickness m32 of the color layer 814G is set to approximately 1.0 µm, and the thickness m33 of the color layer 814R is set to approximately 0.9 µm. In this case, when the depth m35 of the bottom surfaces 824 of the recesses 823 is approximately 1.3 µm, the roughness of the overcoat layer 816 can be further reduced.

Although the color layers 814 are arranged in an oblique mosaic pattern in FIG. 54, they may also be arranged in other various patterns including a striped pattern, a digital pattern, etc.

The display dots D are regions surrounded by the light-shielding layer 815, and each display dot D includes one of the color layers 814 corresponding to R, G, and B, the reflective layer 813, and the aperture 822. A single pixel is constructed of three display dots D including the color layers 814 corresponding to R, G, and B.

Each of the TFTs 837 is constructed of a gate electrode 838 formed on the second base plate 805, a gate insulating film 839 which is formed on the gate electrode 838 and extends over the entire surface of the second base plate 805, a semiconductor layer 840 which faces the gate electrode 838 with the gate insulating film 839 therebetween, a source electrode 842 which is connected to one side of the semiconductor layer 840 with a contact electrode 841, and a drain electrode 843 which is connected to the other side of the semiconductor layer 840 with another contact electrode 841.

The gate electrodes 838 are connected to the gate wiring 835, and the source electrodes 842 are connected to the source wiring 836. The gate wiring 835 extend along the second base plate 805 in the vertical direction (that is, the Y direction in FIG. 54), and are arranged parallel to each other with a constant interval. In addition, the source wiring 836 extend along the second base plate 805 in the horizontal (that is, the X direction in FIG. 54) so as to intersect the gate wiring 835 with the gate insulating film 839 being disposed between the source wiring 836 and the gate wiring 835, and are arranged parallel to each other with a constant interval.

The pixel electrodes 827 are formed so as to cover the rectangular areas sectioned by the gate wiring 835 and the source wiring 836 excluding the regions corresponding to the TFTs 837, and are composed of, for example, a transparent conductive material such as ITO.

The gate wiring 835 and the gate electrodes 838 are preferably composed of, for example, chromium, or tantalum, etc., and the gate insulating film 839 is preferably composed of, for example, silicon nitride (SiNX), or silicon oxide (SiOX), etc. The source electrodes 842 and the source wiring 836 which are formed integrally with each other and the drain electrodes 843 are preferably composed of, for example, titanium, molybdenum, or aluminum, etc.

In the present embodiment, a signal is supplied to the common electrode 834 formed on the first base plate 803, and another signal is supplied to the gate wiring 835 and the source wiring 836 formed on the second base plate 805. Accordingly, the pixel electrodes 827 are selected in units of a display dot D, and a voltage is applied to the liquid crystal only at regions between the selected pixel electrodes 827 and the common electrode 834, so that the orientation of liquid crystal is controlled so as to modulate the reflected light and the transmitted light.

In reflective display, external light travels through the second base plate 805 and the pixel electrodes 827, enters the liquid crystal layer 807, is modulated by the liquid crystal layer 807 in units of a display dot D, and is reflected by the reflective layer 813. The reflected light passes through the pixel electrodes 827 and the second base plate 805 again, and is emitted to the outside. Accordingly, an image is displayed by the emitted light.

In transmissive display, light emitted from the illuminating unit 131 (see FIG. 9) passes through the first base plate 803 and the transmissive portions 822, and enters the liquid crystal layer 807. The light is modulated by the liquid crystal layer 807 in units of a display dot D, passes through the pixel electrodes 827 and the second base plate 805, and is emitted to the outside. Accordingly, an image is displayed by the emitted light.

In both the reflective display and transmissive display, since the overcoat layer 816 is planar according to the present embodiment, a high-contrast image can be displayed by the liquid crystal device. The emitted light is colored in corresponding colors by the color layers 814 which cover the reflective layer 813 and the transmissive portions 822.

In the present embodiment, the underlayer 812 is formed such that the recesses 823 (FIG. 56) or the openings 823 (FIG. 55) are provided at the boundary regions between the adjacent display dots D. Accordingly, the height of the light-shielding layer 815 can be reduced and the planarity over the surfaces of the display dots D and the surfaces of the boundary regions between the display dots D can be ensured.

In addition, the blue-based color layer, for example, the blue layer 814B is formed first on the bottom surfaces 824 of the recesses 823 or the bottom surfaces 824 of the openings 823. Therefore, the blue layer, which has a relatively small mean transmission factor in the visible light range, is thicker than the color layers 814 corresponding to other colors such as a green-based color, for example, green, and a red-based color, for example, red. Accordingly, the light-shielding effect can be increased and the overall height of the light-shielding layer 815 can be reduced. Therefore, the contrast of an image displayed by the liquid crystal device increases.

In addition, when the blue layer 814B having a thickness of approximately 1.7 $\mu$m is formed on the bottom surfaces 824 of the openings 823, the green layer 814G having a thickness of approximately 1.0 $\mu$m is formed on the blue layer 814B, and the red layer 814R having a thickness of approximately 0.9 $\mu$m is formed on the green layer 814G, the planarity of the overcoat layer 816 over the display dots D and the boundary regions between the display dots D can be more reliably ensured. Therefore, the dispersion of the cell gap is improved and the rubbing process can be performed easily, and the contrast of a displayed image can be increased.

In addition, even when the underlayer 812 is not completely removed at regions under the recesses 823, as shown in FIG. 56, the height of the light-shielding layer 815 can be reduced, so that the roughness of the top surface of the overcoat layer 816 can be reduced. Accordingly, the dispersion of the cell gap is resolved and the rubbing process can be performed easily, so that the contrast of a displayed image can be increased.

In addition, since the liquid crystal device of the present embodiment is a TFT active matrix liquid crystal device, the display is bright and is easy to view. In addition, the contrast can be further increased.

Manufacturing Method of the Liquid Crystal Device

Next, a manufacturing method of the liquid crystal device according to the present embodiment will be described with reference to a flow chart shown in FIG. 57. First, in Step P211, the underlayer 812 is formed on the first base plate 803. As shown in FIG. 52, the underlayer 812 is etched by using a photoresist such that the openings 823 are formed in the underlayer 812 at the boundary regions between the display dots D in which the light-shielding layer 815 is to be formed.

This will be described in more detail below. A resin material is uniformly applied to the first base plate 803 by spin coating, and then a resist is applied. Then, the resist is exposed to light through a photomask having a predetermined pattern, and is developed. Then, a plurality of holes is formed in the underlayer 812 by etching the resin material by using the resist as a mask.

Next, heat is applied to the underlayer 812 so that the holes deform and become smooth, and the lower layer 812a of the underlayer 812 having irregularities in the surface thereof is thus obtained. Then, the upper layer 812b of the underlayer 812 is formed by applying the resin material such that smooth irregularities are formed in the surface of the underlayer 812.

Next, a resist is applied to the underlayer 812, is exposed to light through a photomask having a predetermined pattern, and is developed. Then, the openings 823 are formed in the underlayer 812 in an etching process using the resist as a mask. Accordingly, the underlayer 812 which is removed at regions where the light-shielding layer 815 is to be provided is formed on the first base plate 803.

Next, in Step P212, a thin film of aluminum, etc., is formed on the underlayer 812 by using deposition techniques or sputtering techniques, and a pattern is formed by using photolithography techniques such that the approximately rectangular apertures 822 are formed at the central regions of the display dots D, as shown in FIG. 54, and the reflective layer 813 is formed at regions surrounding the apertures 822.

Next, in Step P213, a coloring material for a blue-based color, for example, blue, is applied to the reflective layer 813 and the apertures 822 by spin-coating, and then a resist is applied. The resist is exposed to light through a photomask having a predetermined pattern, and is developed. Then, the color material is etched by using the resist as a mask, so that the blue layer 814B is formed. The above-described process is repeated for the other two colors, so that the green-based color layer, for example, the green layer 814G and the red-based color layer, for example, the red layer 814R are formed successively.

Accordingly, one of the blue layer 814B, the green layer 814G, and the red layer 814R is formed in each of the display dots D. As shown in FIG. 53, in the light-shielding layer 815, the blue layer 814B, the green layer 814G, and the red layer 814R are laminated in that order from the bottom, and the blue layer 814B is the thickest among them.

Since the blue layer 814B is formed at the bottom and is the thickest among the color layers 814, the light-shielding effect can be increased and the overall height of the light-shielding layer 815 can be reduced.

Next, in Step P214, the overcoat layer 816 is formed on the color layers 814. In the present embodiment, since the recesses 823 are formed in the underlayer 812, the height of the light-shielding layer 815 can be reduced and the planarity of the surface of the overcoat layer 816 can be ensured. Accordingly, the dispersion of the cell gap becomes small and the rubbing process can be performed easily, so that the contrast of an image displayed by the liquid crystal device can be increased.

Next, in Step P215, a material of the common electrode 834, such as ITO, is applied to the overcoat layer 816 by using sputtering techniques, and a patterning process is performed by using photolithography techniques so as to form the common electrode 834 on the overcoat layer 816. Then, the alignment film 818 is formed on the common electrode 834, and is subjected to the rubbing process. Accordingly, the color filter substrate 804 is completed.

With respect to the opposing substrate 806, the TFTs 837, the gate wiring 835, the source wiring 836, and the pixel electrodes 827 are formed on the second base plate 805 in Step P221.

The process of forming the TFTs 837 will be described in detail below. First, the gate wiring 835 and the gate electrodes 838, which are integral with each other, are formed by applying chromium, or tantalum, etc., on the second base plate 805 at a uniform thickness by sputtering and performing a patterning process by using photolithography techniques. Then, the gate insulating film 839 preferably composed of silicon nitride is formed by, for example, plasma chemical vapor deposition (CVD) method.

Next, an a-Si layer for forming the semiconductor layer 840 and an n+ type a-Si layer for forming the contact electrodes 841 are formed in that order. Then, the n+ type a-Si layer and the a-Si layer are subjected to a patterning process so as to form the semiconductor layer 840 and the contact electrodes 841. In addition, ITO, etc., is applied to the gate insulating film 839 by sputtering at regions where the pixel electrodes 827 are to be formed, and a patterning process is performed by using photolithography techniques so as to form the pixel electrodes 827.

In addition, titanium, molybdenum, or aluminum, etc., is applied to the second base plate 805 over the entire surface thereof by sputtering, and a patterning process is performed so as to form the source electrodes 842, the drain electrodes 843, and the source wiring 836. Accordingly, the TFTs 837 and the pixel electrodes 827 are formed.

Next, in Step P222, the alignment film 820 is formed on the pixel electrodes 827 and is subjected to the rubbing process. Accordingly, the opposing substrate 806 is completed.

Next, in Step P231, the spacers 129 (see FIG. 9) are dispersed over the alignment film 820 of the opposing substrate 804 by dry dispersion, etc., and the color filter substrate 804 and the opposing substrate 806 are laminated with the sealing member 133. Then, in Step P232, liquid crystal is injected through an opening formed in the sealing member 133. Then, the opening formed in the sealing member 133 is sealed with a sealant such as an ultraviolet curing resin.

Next, in Step P233, the retardation films 808 and 810, and the polarizers 809 and 811 are laminated on the outer surfaces of the first base plate 803 and the second base plate 805, respectively. Next, in Step P234, electric wirings are arranged as necessary and the illuminating unit 131 and the housing 132 shown in FIG. 9 are attached. Accordingly, the liquid crystal device is completed.

In the manufacturing method shown in FIG. 57, the light-shielding layer 815 is formed by laminating the color layers 814 corresponding to the three colors, and the blue-based color layer, for example, the blue layer 814B, is formed at the bottom. Accordingly, the blue layer 814B is the thickest among the color layers 814, so that the light-shielding effect can be increased. In addition, the overall thickness of the light-shielding layer 815 can be reduced.

Since the recesses 823 are formed in the underlayer 812, the height of the light-shielding layer 815 can be reduced. Thus, the planarity of the surface of the overcoat layer 816 can be ensured, so that the dispersion of the cell gap becomes small and the rubbing process can be performed easily. As a result, the contrast of a displayed image can be increased.

In the manufacturing method shown in FIG. 57, the underlayer 812 is completely removed at the openings 823, in which the light-shielding layer 815 is formed, as shown in FIG. 55. Alternatively, however, the underlayer 812 may be constructed in two steps in Step P211 by forming the first insulating layer 812a in the first step and the second insulating layer 812b in the second step, as shown in FIG. 56, and the recesses 823 can be formed by forming the upper layer 812b.

In this case, in the first step, the first insulating layer 812a is formed over the entire region of the base plate including the boundary regions between the display dots D in which the light-shielding layer 815 is to be formed, and irregularities are formed similarly to the lower layer 812a of the underlayer 812 shown in FIG. 55. In the second step, the second insulating layer 812b is formed so as to cover the regions excluding the boundary regions between the display dots D in which the light-shielding layer 815 is to be formed, that is, the regions corresponding to the display dots D, by an etching process using a photoresist.

Accordingly, the process of etching the underlayer 812 using a photoresist can be omitted in the first step for forming the underlayer 812, so that the cost can be reduced and the manufacturing speed can be increased. In addition, when the underlayer 812 is completely removed as, in the openings 823, there is a possibility that the planarity over the surfaces of the boundary regions between the adjacent display dots D and the surfaces of the display dots D will be degraded instead of improving. As so in such a case, the planarity can be ensured by forming the underlayer 812 at a desired thickness, so that the dispersion of the cell gap becomes small and the rubbing process can be performed easily. Differently from the above description, the process of forming the recesses 823 in the underlayer 812 at regions corresponding to the light-shielding 815 can also be performed at the first step.

The recesses 823 may also be formed by using a halftone.

Eleventh Embodiment

Next, an embodiment in which the present invention is applied to a reflective passive-matrix liquid crystal device will be described.

Figure 58:
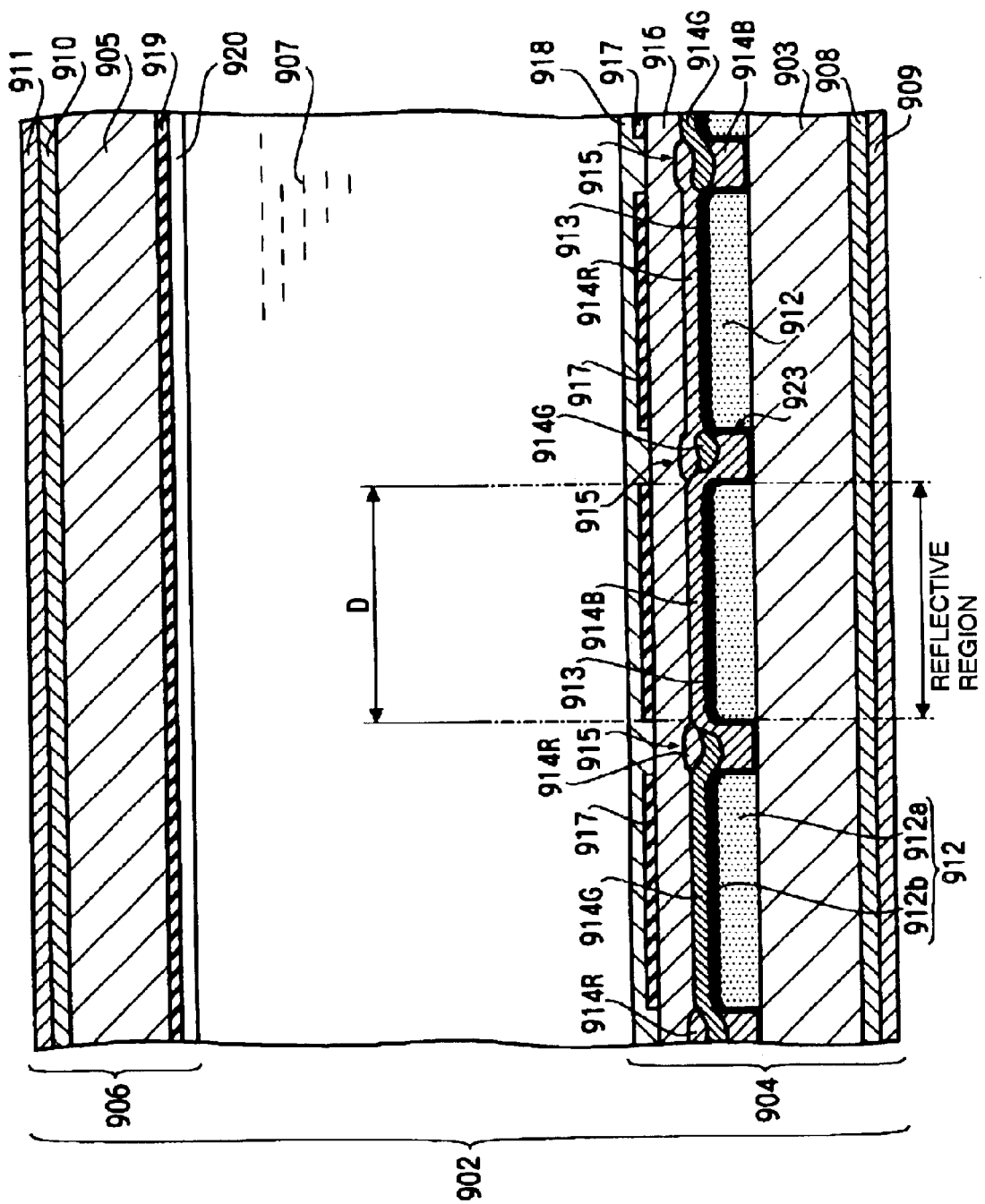
FIG. 58 is a sectional view showing the cross-sectional structure of the main part of a liquid crystal device according to another embodiment of the electrooptical device of the present invention.
Figure 59:
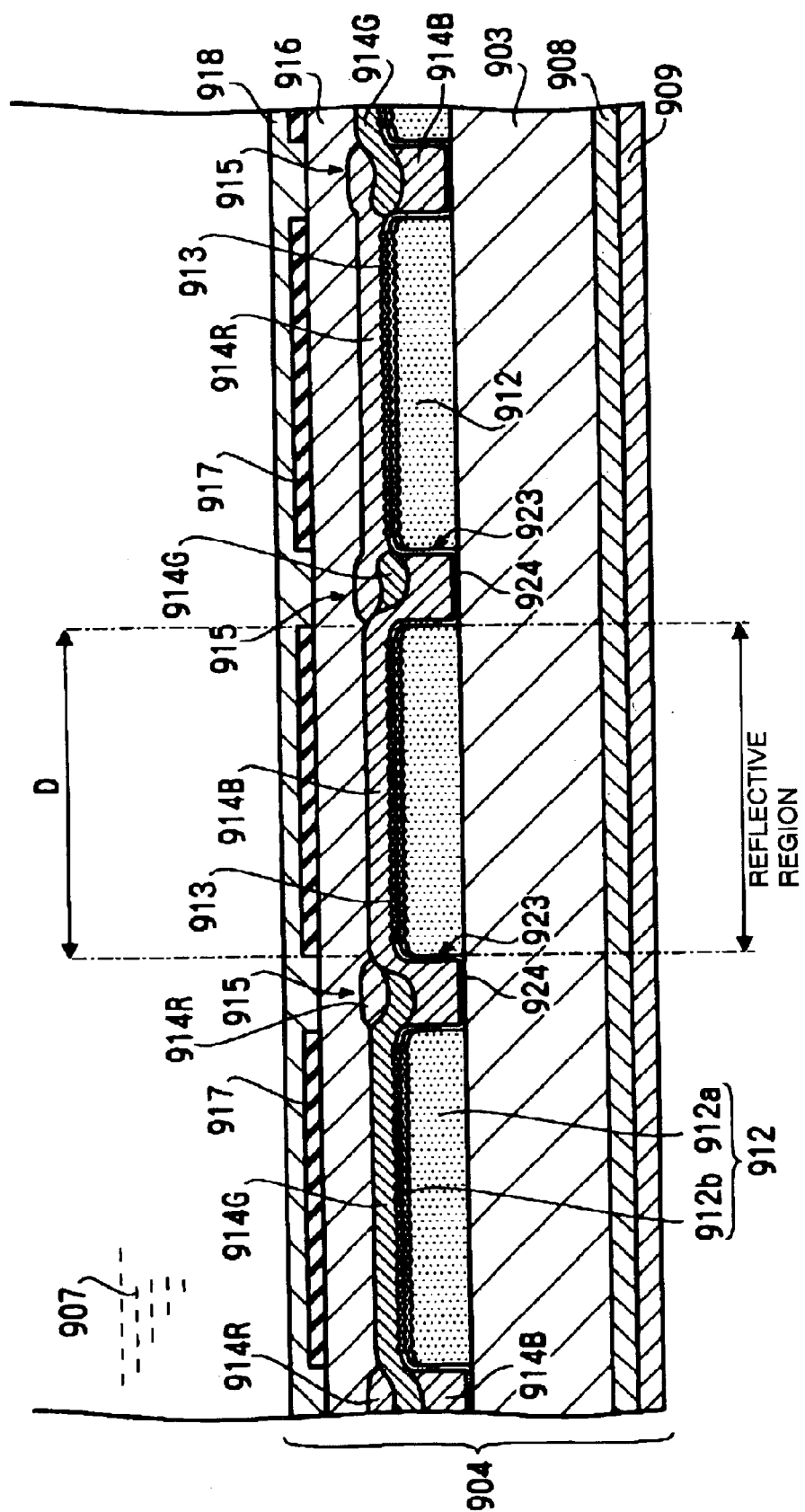
FIG. 59 is a sectional view showing the main part of a color filter substrate included in the liquid crystal device shown in FIG. 58.
Figure 60:
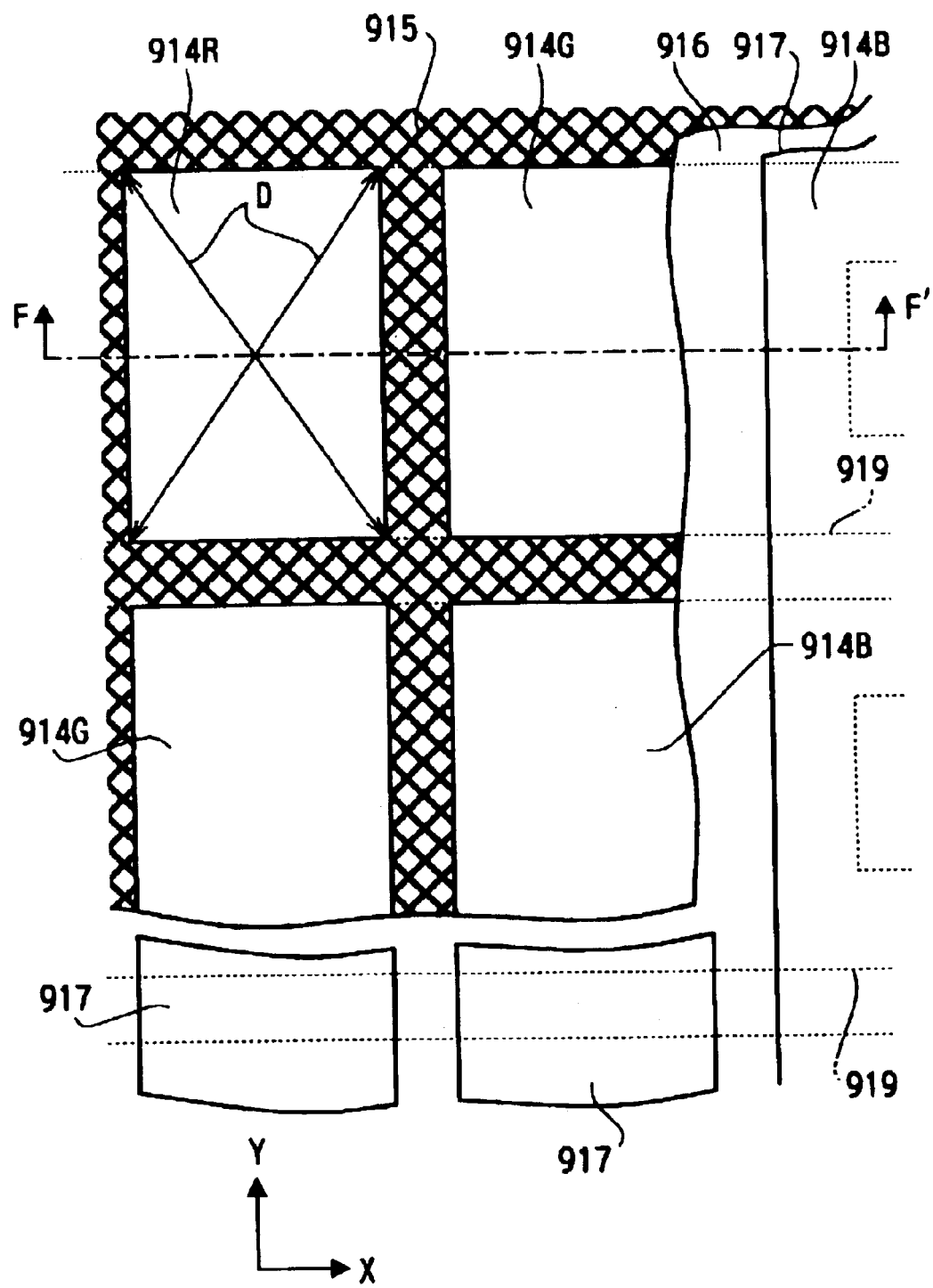
FIG. 60 is a partially broken plan view showing the planar structure of the liquid crystal device shown in FIG. 58.
Figure 61:
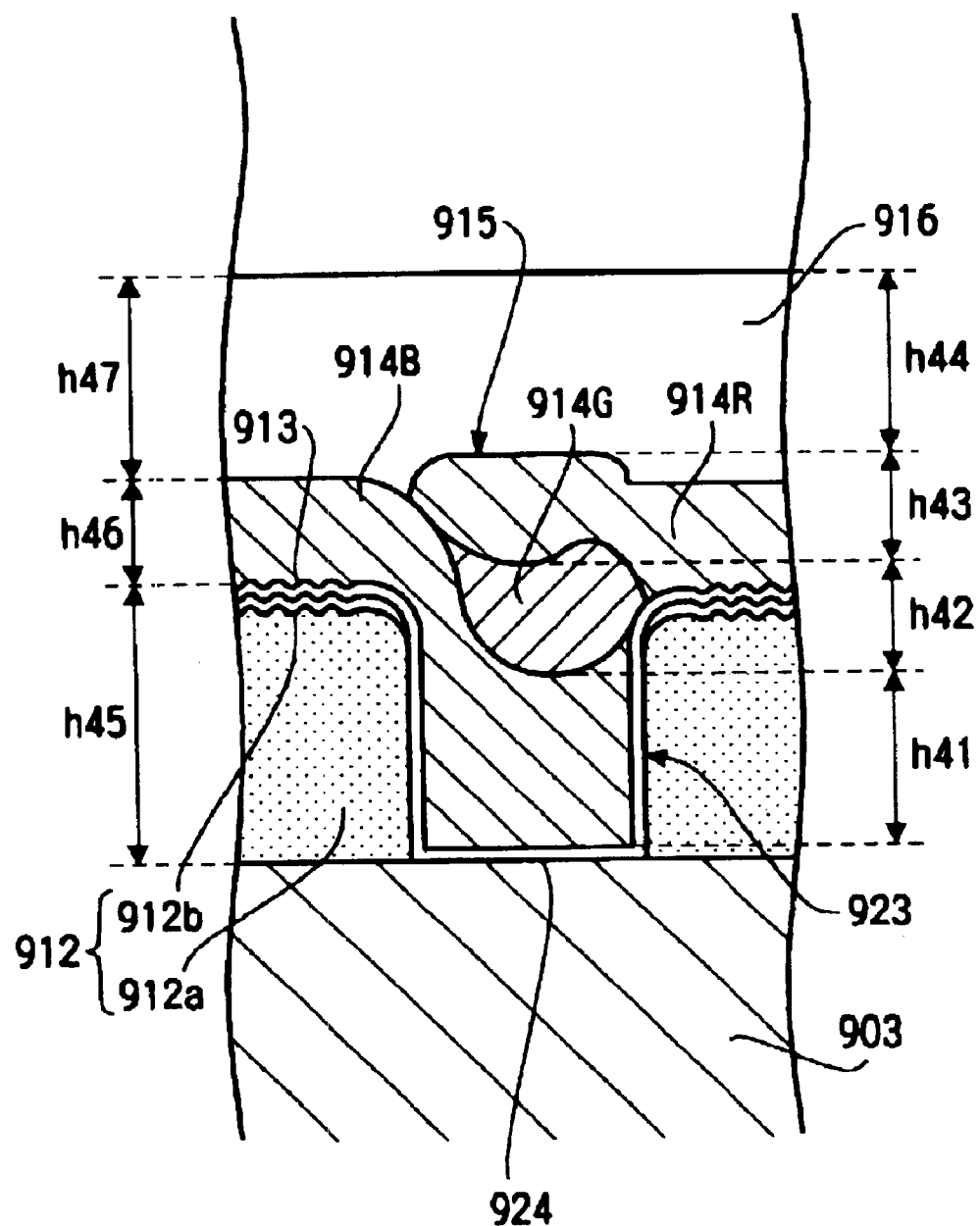
FIG. 61 is a sectional view showing the main part of the color filter substrate shown in FIG. 59.
Figure 62:
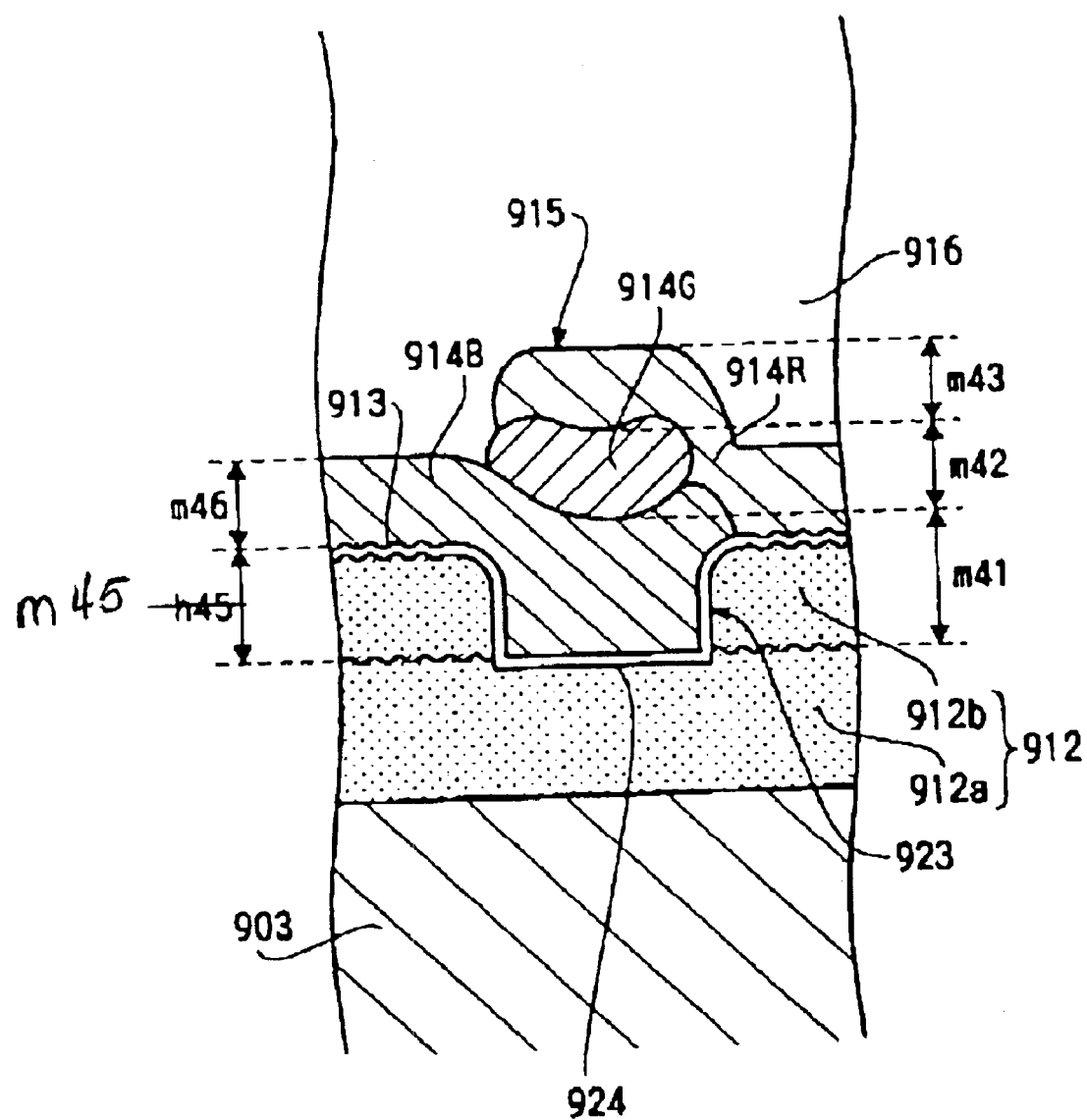
FIG. 62 is a sectional view showing the modification of the structure shown in FIG. 59.
Figure 63:
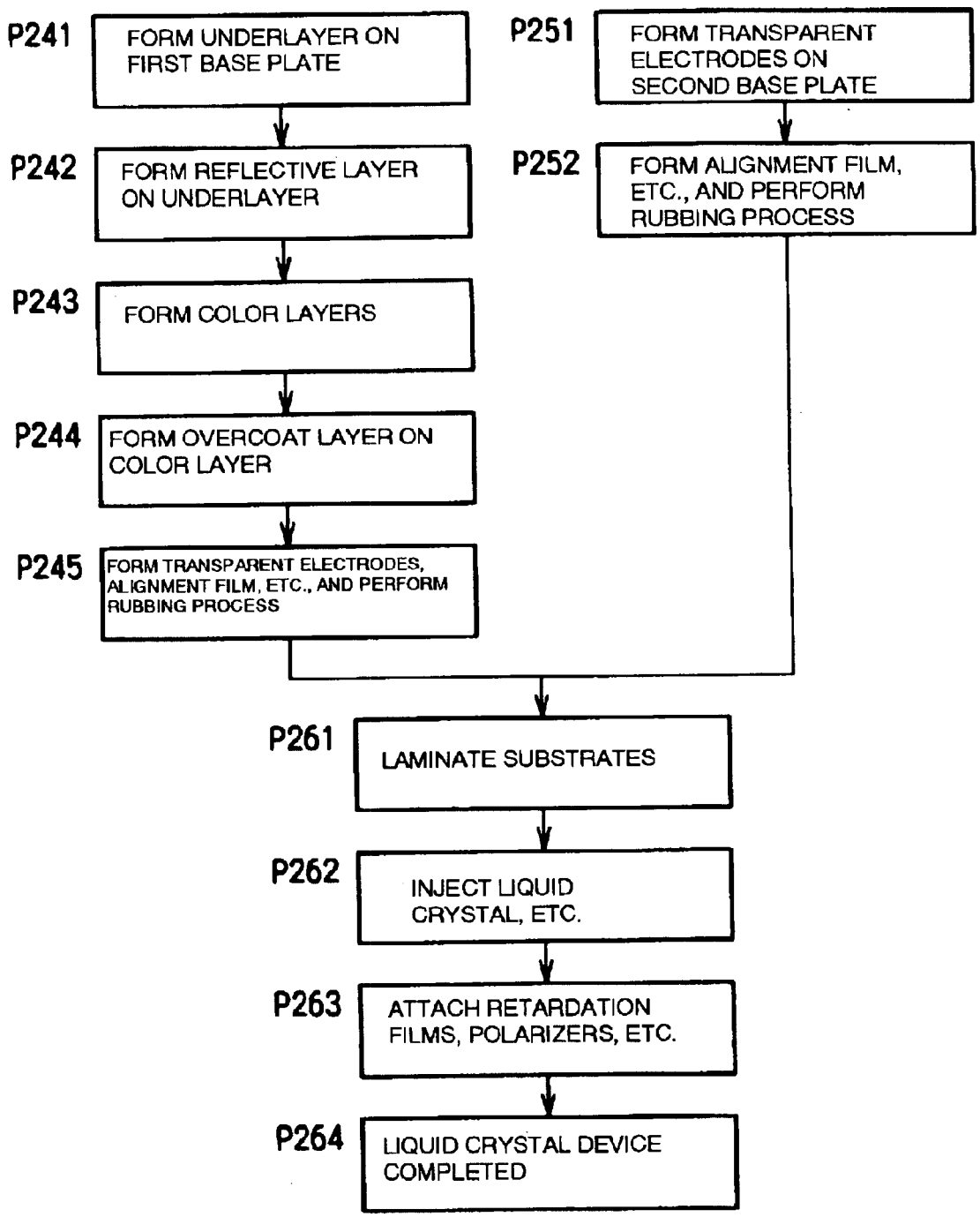
FIG. 63 is a flow chart showing a method for manufacturing the liquid crystal device shown in FIG. 58.

FIG. 58 is a sectional view of a liquid crystal panel included in the liquid crystal device according to another embodiment of the present invention. FIG. 59 is a sectional view of a color filter substrate included in the liquid crystal panel shown in FIG. 58. FIG. 60 is an enlarged view of a part of the liquid crystal panel. FIG. 58 corresponds to a sectional view of FIG. 60 cut along line F–F'. FIG. 61 is an enlarged sectional view of a part of a light-shielding layer from which an underlayer is completely removed. FIG. 62 is an enlarged sectional view of a part of the light-shielding layer from which the underlayer is partially removed. FIG. 63 is a flow chart showing a method for manufacturing the liquid crystal device according to the present embodiment.

A liquid crystal panel 902 shown in FIG. 58 is a reflective liquid crystal panel, and a liquid crystal device including the liquid crystal panel 902 is constructed similarly to the liquid crystal device 101 shown in FIG. 9. More specifically, the liquid crystal device is constructed by attaching the illuminating unit 131, which is provided as necessary, and the housing 132 to the liquid crystal panel 902.

The liquid crystal panel 902 includes a color filter substrate 904 and an opposing substrate 906 which oppose each other and which are laminated with the sealing member 133 (see FIG. 9). The color filter substrate 904 includes a first base plate 903 which is a transparent plate composed of glass, synthetic resin, etc., and the opposing substrate 906 includes a second base plate 905. In addition, a liquid crystal layer 907 is formed by injecting liquid crystal into a gap between the color filter substrate 904 and the opposing substrate 906. A retardation film 908 and a polarizer 909 are disposed on the outer surface of the first base plate 903, and a retardation film 910 and a polarizer 911 are disposed on the outer surface of the second base plate 905.

In the color filter substrate 904, an underlayer 912 is formed on the surface of the first base plate 903 which faces the liquid crystal layer 907 and a reflective layer 913 is formed on the surface of the underlayer 912. A green layer 914G, a blue layer 914B, and a red layer 914R are formed on the reflective layer 913 in a predetermined configuration pattern. In the following descriptions, these color layers may be generically denoted by reference numeral "914". A light-shielding layer 915 constructed by laminating the color layers 914 is formed so as to cover the boundary regions between the adjacent color layers 914.

In addition, an overcoat layer 916 is provided on the color layers 914 and the light-shielding layer 915 to protect them.

In addition, transparent electrodes 917 composed of a transparent conductive material such as ITO are formed on the overcoat layer 916, and an alignment film 918 composed of polyimide resin, etc., is formed on the transparent electrodes 917.

With reference to FIG. 58, in the opposing substrate 906, transparent electrodes 919 are formed on the surface of the second base plate 905 which faces the liquid crystal layer 907 in such a manner that the transparent electrodes 919 extend perpendicularly to the transparent electrodes 917 of the color filter substrate 904 (that is, the X direction in FIG. 60). In addition, an alignment film 920 is formed on the transparent electrodes 919. The transparent electrodes 917 are arranged parallel to each other in a striped pattern such that the transparent electrodes 917 extend perpendicularly to the transparent electrodes 919 (that is, in the Y direction in FIG. 60). Areas where the transparent electrodes 917 of the color filter substrate 904 and the transparent electrodes 919 of the opposing substrate 906 intersect serve as display dots D.

The underlayer 912 in the color filter substrate 904 includes a lower layer 912a and an upper layer 912b, and both of these layers are composed of a resin material. In the underlayer 912, small irregularities are formed in the surface of the lower layer 912a, and the upper layer 912b is formed by covering the lower layer 912a with a thin layer composed of the same material as the lower layer 912a. Accordingly, smooth irregularities are formed. Due to these irregularities, light which passes through the underlayer 912 is scattered, so that the problem in that the imaged displayed by the liquid crystal device cannot be viewed clearly can be solved.

The reflective layer 913 is preferably composed of an elemental metal such as aluminum or silver and is formed on the underlayer 912. The surface of the reflective layer 913 also has small irregularities corresponding to those in the surface of the underlayer 912. Due to these irregularities, light reflected by the reflective layer 913 is also scattered, so that the problem in that the image displayed by the liquid crystal device cannot be viewed clearly can be solved.

The color layers 914 are formed by applying a color resist composed of a photosensitive resin including a colorant such as a pigment and a dye and forming a pattern such that the color layers 914 cover the reflective layer 913 by using photolithography techniques. The color layers 914 serve as color filters of the three primary colors, and the color layer 914 included in a single display dot D corresponds one of the three colors, that is, R, G, and B. In addition, the light-shielding layer 915 is constructed by laminating the color layers 914 corresponding to each color.

Although the color layers 914 are arranged in an oblique mosaic pattern in FIG. 60, they may also be arranged in other various patterns including a striped pattern, a digital pattern, etc. The light-shielding layer 915 prevents light from passing through the boundary regions between the display dots D. The light-shielding layer 915 includes band-shaped portions which extend along the longitudinal direction of the transparent electrodes 917 of the color filter substrate 904 (that is, the Y direction in FIG. 60), and band-shaped portions which extend along the direction perpendicular to this direction (that is, the X direction in FIG. 60).

As shown in FIG. 61, in a region between the color layer 914B and the color layer 914R, for example, the light-shielding layer 915 is formed so as to fill an opening 923 formed in the underlayer 912 at this region. A bottom surface 924 of the opening 923 is positioned on the first base plate 903 with the reflective layer 913 therebetween.

The color layer 914B, which is adjacent to the light-shielding layer 915, the color layer 914G, and an extending portion of the color layer 914R are laminated in the opening 923 in that order from the bottom surface 924. The thicknesses of the color layers 914B, 914G, and 914R in the opening 923 are h41, h42, and h43, respectively.

When the thickness h41 of the color layer 914B formed at the bottom in FIG. 61 is in the range of 0.7 μm to 2.0 μm, light-shielding effect obtained by the blue-based color layer, for example, the blue layer 914B, increases. In addition, by laminating the color layers of other colors in combination, the planarity over the surfaces of the display dots D and the surfaces of the surfaces of the boundary regions between the display dots D can be ensured.

With reference to FIG. 61, the case is considered in which h41 is set to approximately 1.7 μm, h42 is set to approximately 1.0 μm, h43 is set to approximately 0.9 μm, and the thickness h44 of the overcoat layer 916 which is formed on the color layer 914R disposed at the top among the laminated color layers is set to approximately 1.8 μm. The thickness h45 of the underlayer 912 is approximately 2.4 μm, the thickness h46 of the color layer 914B at the display dots D is approximately 1.0 μm, and the thickness h47 of the overcoat layer 916 at the display dots D is approximately 2.0 μm Therefore, the height of the top surface of the overcoat layer 916 from the first base plate 903 at the region where the light-shielding layer 915 is formed and the height of the top surface of the overcoat layer 916 from the first base plate 903 at the display dot D corresponding to the color layer 914B are the same, so that the planarity can be ensured.

When the color layer 914B is disposed at the bottom of the opening 923 as described above, the color layer 914B can be formed such that it is the thickest among the color layers 914, and the thickness of the color layer 914B can be set to approximately 1.7 μm.

In addition, as shown in FIG. 59, in the boundary region between the color layer 914G and the color layer 914B, the color layer 914B, which is adjacent to the boundary region, an extending portion of the color layer 914G, and the color layer 914G are laminated in the opening 923 in that order from the bottom surface 924. Accordingly, the light-shielding layer 915 is formed.

In addition, as shown in FIG. 59, in the boundary region between the color layer 914R and the color layer 914G, the color layer 914B, an extending portion of the color layer 914G, and the color layer 914G, which is adjacent to the boundary region, are laminated in the opening 923 in that order from the bottom surface 924. Accordingly, the light-shielding layer 915 is formed.

The light-shielding layer 915 is not limited to the above-described structure, and the underlayer 912 may be formed such that it is not completely removed at regions under the bottom surfaces 924 of the recesses 923, as shown in FIG. 62. Also in this case, the height of the laminate of the color layers 914 is reduced by the amount corresponding to the depth m45 of the bottom surfaces 924 of the recesses 923, and the roughness of the top surface of the overcoat layer 916 can be reduced. Accordingly, the dispersion of the cell gap becomes small and the rubbing process can be performed easily. As a result, the contrast of an image displayed by the liquid crystal device increases.

In addition, when the thickness m41 of the color layer 914B formed at the bottom in FIG. 62 is in the range of 0.7 μm to 2.0 μm, light-shielding effect obtained by the blue-based color layer, for example, the blue layer 914B, increases. In addition, by laminating the color layers corresponding to other colors in combination, the roughness over the surfaces of the display dots D and the surfaces of the boundary regions between the display dots D can be reduced.

More preferably, with reference to FIG. 62, the thickness m41 of the color layer 914B is set to approximately 1.1 μm, the thickness m42 of the color layer 914G is set to approximately 1.0 μm, and the thickness m43 of the color layer 914R is set to approximately 0.9 μm. In this case, when the depth m45 of the bottom surfaces 924 of the recesses 923 is approximately 1.3 μm, the roughness of the overcoat layer 916 can be further reduced. Therefore, the dispersion of the cell gap becomes small and the rubbing process can be performed easily. As a result, the contrast of an image displayed by the liquid crystal device increases.

The display dots D are regions surrounded by the light-shielding layer 915, and each display dot D includes a single color layer 914 corresponding to one of the three primary colors, R, G, or B and the reflective layer 913. A single pixel is constructed of three display dots D: a display dot D including the color layer 914R, a display dot D including the color layer 914G, and a display dot D including the color layer 914B.

In the present embodiment, a signal is supplied to the transparent electrodes 919 formed on the second base plate 905, and another signal is supplied to the transparent electrodes 917 formed on the first base plate 903. Accordingly, the liquid crystal is driven only at regions corresponding to the display dots D where the transparent electrodes 919 and the transparent electrodes 917 intersect.

External light enters the liquid crystal layer 907 from the side where the opposing substrate is disposed, is modulated in units of a display dot D, passes through the color layers 914, and is reflected by the reflective layer 913. The reflected light passes through the opposing substrate 906 again and is emitted to the outside. Since the overcoat layer 916 is planar, a high-contrast image can be displayed. The emitted light is colored in corresponding colors by the color layers 914 which cover the reflective layer 913.

In the present embodiment, the underlayer 912 is formed such that the recesses 923 or the openings 923 are provided at the boundary regions between the adjacent display dots D. Accordingly, the height of the light-shielding layer 915 can be reduced, and the planarity of the overcoat layer 916 of the color filter substrate 904 can be ensured.

In addition, the blue-based color layer, for example, the blue layer 914B is formed first on the bottom surfaces 924 of the recesses 923 or the bottom surfaces 924 of the openings 923. Therefore, the blue layer, which has a relatively small mean transmission factor in the visible light range, is thicker than the color layers 914 corresponding to other colors such as a green-based color, for example, green, and a red-based color, for example, red. Accordingly, the light-shielding effect can be increased and the overall height of the light-shielding layer 915 can be reduced. Therefore, the contrast of an image displayed by the liquid crystal device can be increased.

In addition, when the blue layer 914B having a thickness of approximately 1.7 μm is formed on the bottom surfaces 924 of the openings 923, the green layer 914G having a thickness of approximately 1.0 μm is formed on the blue layer 914B, and the red layer 914R having a thickness of approximately 0.9 μm is formed on the green layer 914G, the planarity of the overcoat layer 916 over the display dots D and the boundary regions between the display dots D can be more reliably ensured. Therefore, the dispersion of the cell gap is improved and the rubbing process can be performed easily, and the contrast of a displayed image can be increased.

In the case in which the underlayer 912 is not completely removed at regions under the recesses 923, as shown in FIG. 62, and the underlayer 912 is constructed of a first insulating layer 912a and a second insulating layer 912b which is formed on the first insulating layer 912a such that the recesses 923 are formed. Also in this case, the roughness of the top surface of the overcoat layer 916 can be reduced, so that the dispersion of the cell gap is improved and the rubbing process can be performed easily. Accordingly, the contrast of a displayed image can be increased.

Manufacturing Method of the Liquid Crystal Device

Next, a manufacturing method of the liquid crystal device according to the present embodiment will be described with reference to a flow chart shown in FIG. 63. First, in Step P241, the underlayer 912 is formed on the first base plate 903. As shown in FIG. 59, the underlayer 912 is etched by using a photoresist such that the openings 923 are formed in the underlayer 912 at the boundary regions between the display dots D in which the light-shielding layer 915 is to be formed.

This will be described in more detail below. A resin material is uniformly applied to the first base plate 903 by spin coating, and then a resist is applied. Then, the resist is exposed to light through a photomask having a predetermined pattern, and is developed. Then, a plurality of holes are formed in the underlayer 9 12 by etching. Next, heat is applied to the underlayer 912 so that the holes deform and become smooth, and the lower layer 912a of the underlayer 912 having irregularities in the surface thereof is thus obtained. Then, the upper layer 912b of the underlayer 912 is formed by applying the resin material such that smooth irregularities are formed in the surface of the underlayer 912.

Next, a resist is applied to the underlayer 912, is exposed to light through a photomask having a predetermined pattern, and is developed. Then, the openings 923 are formed in the underlayer 912 by an etching process. Accordingly, the underlayer 912 which is removed at regions where the light-shielding layer 915 is to be provided is formed on the first base plate 903.

Next, in Step P242, a thin film is formed on the underlayer 912 by using deposition techniques or sputtering techniques, and a pattern is formed by using photolithography techniques such that the reflective layer 913 is formed at regions corresponding to the display dots D and the light-shielding layer 915, as shown in FIG. 59.

Next, in Step P243, a coloring material for one of the colors is applied to the reflective layer by spin-coating, and then a resist is applied. The resist is exposed to light through a photomask having a predetermined pattern, and is developed. Then, the color material is etched so that the blue-based color layer, for example, the blue layer 914B, the green-based color layer, for example, the green layer 914G, and the red-based color layer, for example, the red layer 914R, are formed successively.

Accordingly, one of the blue layer 914B, the green layer 914G, and the red layer 914R is formed in each of the display dots D. As shown in FIG. 59, in the light-shielding layer 915, the blue layer 914B, the green layer 914G, and the red layer 914R are laminated in that order from the bottom, and the blue layer 914B is the thickest among them.

Since the blue layer 914B is formed at the bottom and is the thickest among the color layers 914 as described above, the light-shielding effect can be increased and the overall height of the light-shielding layer 915 can be reduced.

In addition, since the recesses 923 are formed in the underlayer 912, the height of the light-shielding layer 915 can be reduced and the planarity of the surface of the overcoat layer 916 can be ensured. Accordingly, the dispersion of the cell gap becomes small and the rubbing process can be performed easily, so that the contrast can be increased.

Next, in Step P244, the overcoat layer 916 is formed on the color layers 914. Then, in Step P245, a material of the transparent electrodes 917, such as ITO, is applied to the overcoat layer 916 by using sputtering techniques, and a pattern is formed by using photolithography techniques such that the transparent electrodes 917 having a predetermined width are formed in a striped pattern along the Y direction, as shown in FIG. 60.

Then, the alignment film 918 is formed on top, and the rubbing process is performed. Accordingly, the color filter substrate 904 is completed. Thus, the planarity of the surface of the alignment film 918 facing the liquid crystal layer 907 is also ensured and the dispersion of the cell gap is resolved, so that a high-quality image can be displayed.

In addition, in Step P251, a material of the transparent electrodes 919, such as ITO, is applied to the second base plate 905 by using sputtering techniques, and a pattern is formed by using photolithography techniques such that the transparent electrodes 919 are formed in a striped pattern along the X direction, as shown in FIG. 60. Then, in Step P252, the alignment film 920 is formed on the transparent electrodes 919, and is subjected to the rubbing process. Accordingly, the opposing substrate 906 is completed.

Next, in Step P261, the spacers 129 (see FIG. 9) are dispersed over the opposing substrate 906 by dry dispersion, etc., and the color filter substrate 904 and the opposing substrate 906 are laminated with the sealing member 133.

Then, in Step P262, liquid crystal is injected through an opening formed in the sealing member 133. Then, the opening formed in the sealing member 133 is sealed with a sealant such as an ultraviolet curing resin. Next, in Step P263, the retardation films 908 and 910, and the polarizers 909 and 911 are laminated on the outer surfaces of the first base plate 903 and the second base plate 905, respectively. Next, in Step P264, electric wirings are arranged as necessary and the illuminating unit 131 and the housing 132 shown in FIG. 9 are attached. Accordingly, the liquid crystal device is completed.

In the manufacturing method according to the present embodiment, the light-shielding layer 915 is formed by laminating the color layers 914, and the blue layer 914B is formed at the bottom. Accordingly, the blue layer 914B is formed such that it is the thickest among the color layers 914, so that the light-shielding effect can be increased. In addition, the overall thickness of the light-shielding layer 915 can be reduced.

Since the openings 923 are formed in the underlayer 912, the height of the light-shielding layer 915 can be reduced. Thus, the planarity of the surface of the overcoat layer 916 can be ensured, so that the dispersion of the cell gap becomes small and the rubbing process can be performed easily. As a result, the contrast of a displayed image can be increased.

In the manufacturing method according to the present embodiment, the openings 923 are formed such that the underlayer 912 is completely removed at regions where the light-shielding layer 915 is formed, as shown in FIG. 61. Alternatively, however, the underlayer 912 may be constructed in two steps in Step P241 in FIG. 63 by forming the first insulating layer 912a in the first step and the second insulating layer 912b in the second step, and the recesses 923 may be provided, as shown in FIG. 62.

In this case, in the first step, the first insulating layer 912a is formed over the entire region of the base plate including the boundary regions between the display dots D in which the light-shielding layer 915 is to be formed, and irregularities are formed similarly to the lower layer 912a of the underlayer 912 shown in FIG. 61. In the second step, the second insulating layer 912b is formed so as to cover the regions excluding the boundary regions between the display dots D in which the light-shielding layer 915 is to be formed, that is, the regions corresponding to the display dots D, by an etching process using a photoresist.

Accordingly, the process of etching underlayer 912 using a photoresist can be emitted in the first step for forming the underlayer 912, so that the cost can be reduced and the manufacturing speed can be increased. In addition, when the underlayer 912 is completely removed as in the openings 923, there is a possibility that the planarity over the surfaces of the boundary regions between the adjacent display dots D and the surfaces of the display dots D will be degraded instead of improving. As so in such a case, the planarity can be ensured by forming the underlayer 912 at a desired thickness, so that the dispersion of the cell gap becomes small and the rubbing process can be performed easily. Differently from the above description, the process of forming the recesses 923 in the underlayer 912 at regions corresponding to the light-shielding 915 can also be performed at the first step.

The recesses 923 may also be formed by using a halftone.

Electronic Apparatus

An electronic apparatus according to the present invention will now be described by the following embodiments.

First Embodiment of Electronic Apparatus

Figure 64:
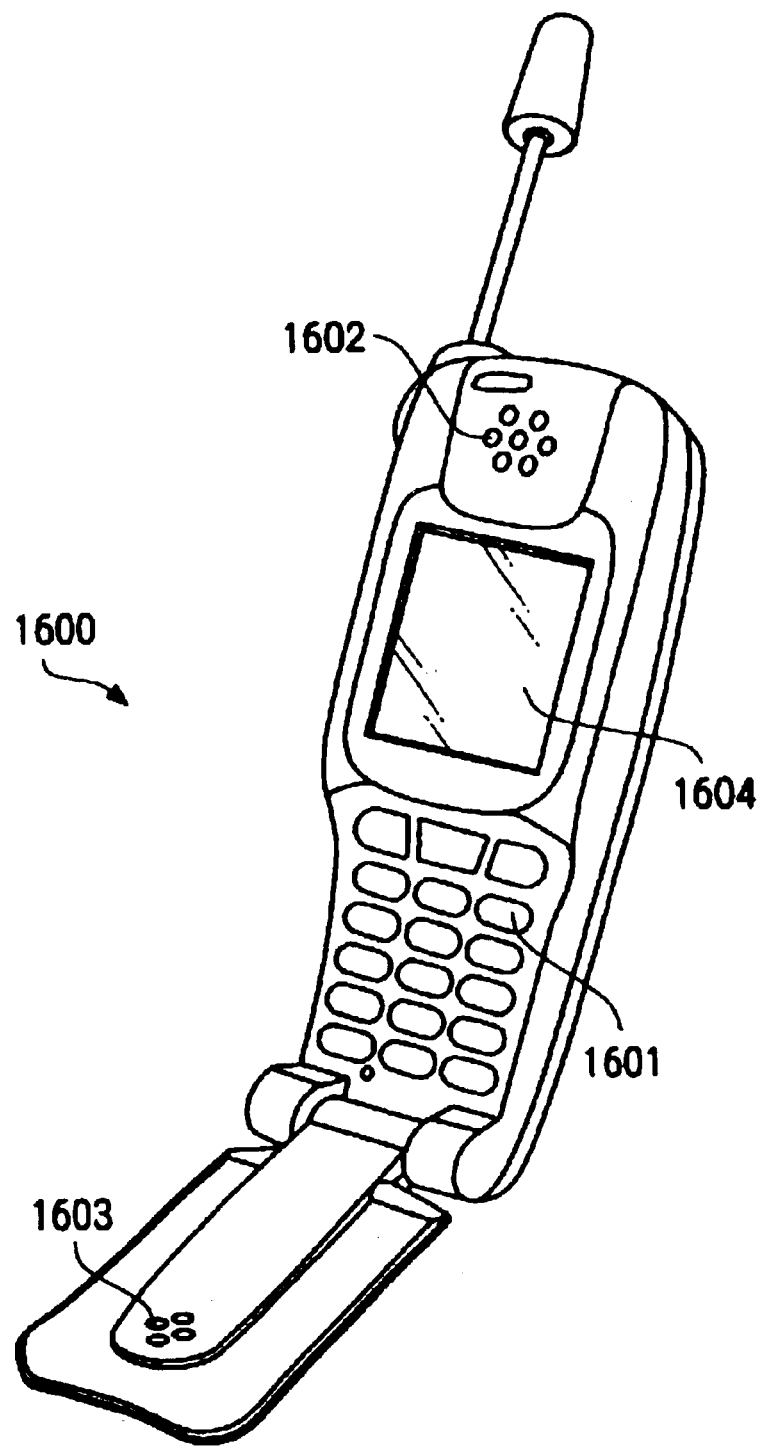
FIG. 64 is a perspective view showing a cellular phone according to an embodiment of an electronic apparatus of the present invention.

FIG. 64 shows a cellular phone that is an embodiment of the electronic apparatus according to the present invention. The cellular phone 1600 includes a plurality of operating keys 1601, an earpiece 1602, a mouthpiece 1603, and a display unit 1604. The display unit 1604 includes the liquid crystal device according to the present invention, for example, as shown in FIGS. 3, 7, and 9.

Second Embodiment of Electronic Apparatus

Figure 65:
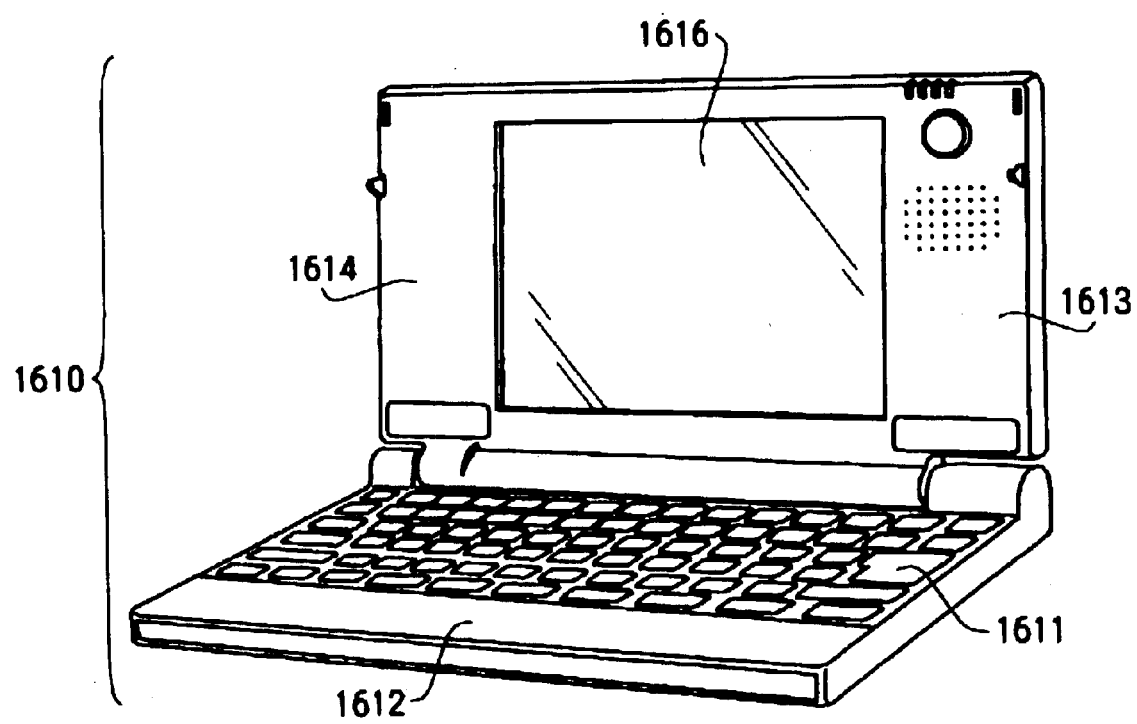
FIG. 65 is a perspective view showing a portable computer according to another embodiment of the electronic apparatus of the present invention.

FIG. 65 shows a portable personal computer, namely a notebook personal computer that is an embodiment of the electronic apparatus according to the present invention. The personal computer 1610 includes a body 1612 provided with a keyboard 1611, and a display unit 1613. The display unit 1613 includes a liquid crystal device 1616 mounted in an outer frame 1614. This liquid crystal device 1616 is the liquid crystal device according to the present invention, for example, as shown in FIGS. 3, 7, and 9.

Third Embodiment of Electronic Apparatus

Figure 66:
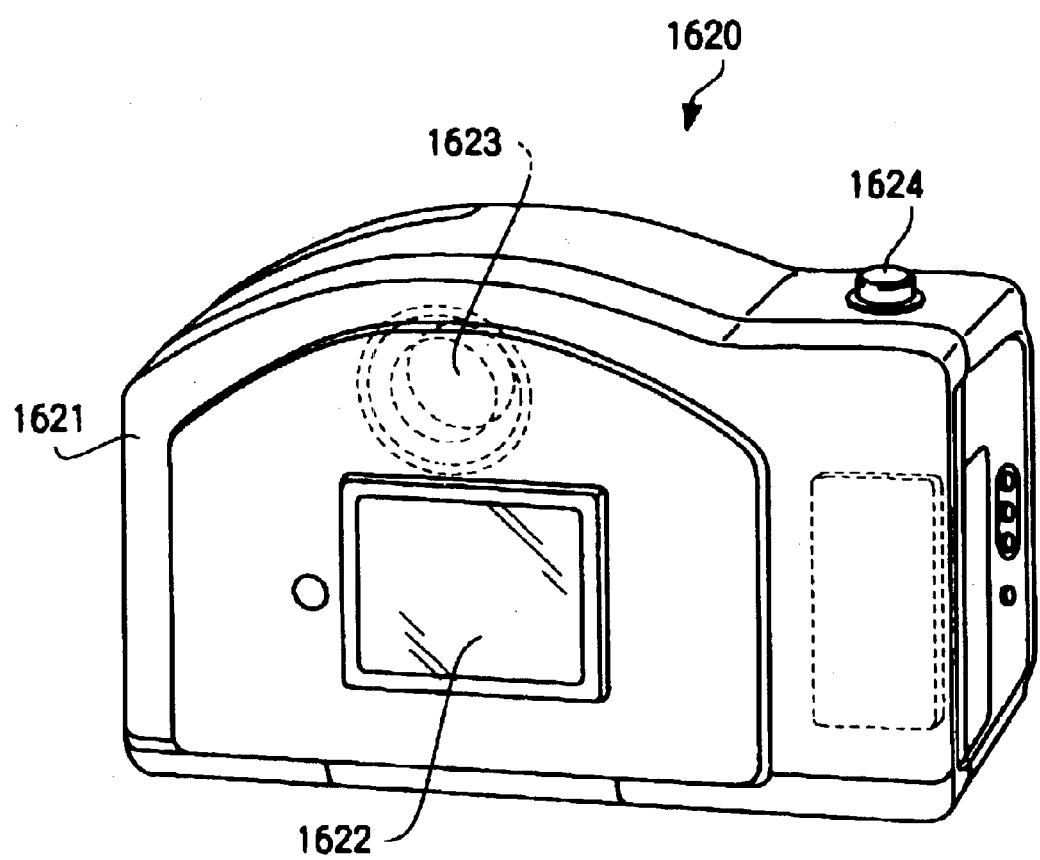
FIG. 66 is a perspective view of a digital camera according to another embodiment of the electronic apparatus of the present invention.

FIG. 66 shows a digital still camera that is an embodiment of the electronic apparatus according to the present invention. A traditional camera sensitizes a film by an optical image from an object, whereas a digital still camera generates image signals by photovoltaic conversion of an optical image from an object in an imaging device such as a charge-coupled device (CCD).

This digital still camera 1620 has a display unit 1622 on a back face of a frame 1621. The display unit 1622 displays an image based on image signals from the CCD. For example, the display unit 1622 can display the object when the display unit 1622 functions as a finder. The frame 1621 is provided with a photo-detecting unit 1623 including optical lenses and the CCD on the front face (the reverse face to the structure shown in FIG. 66). The display unit 1622 is the liquid crystal device according to the present invention, for example, as shown in FIGS. 3, 7, and 9. An operator confirms an object appearing in the display unit 1622 to release a shutter 1624 for photographing.

Fourth Embodiment of Electronic Apparatus

Figure 67:
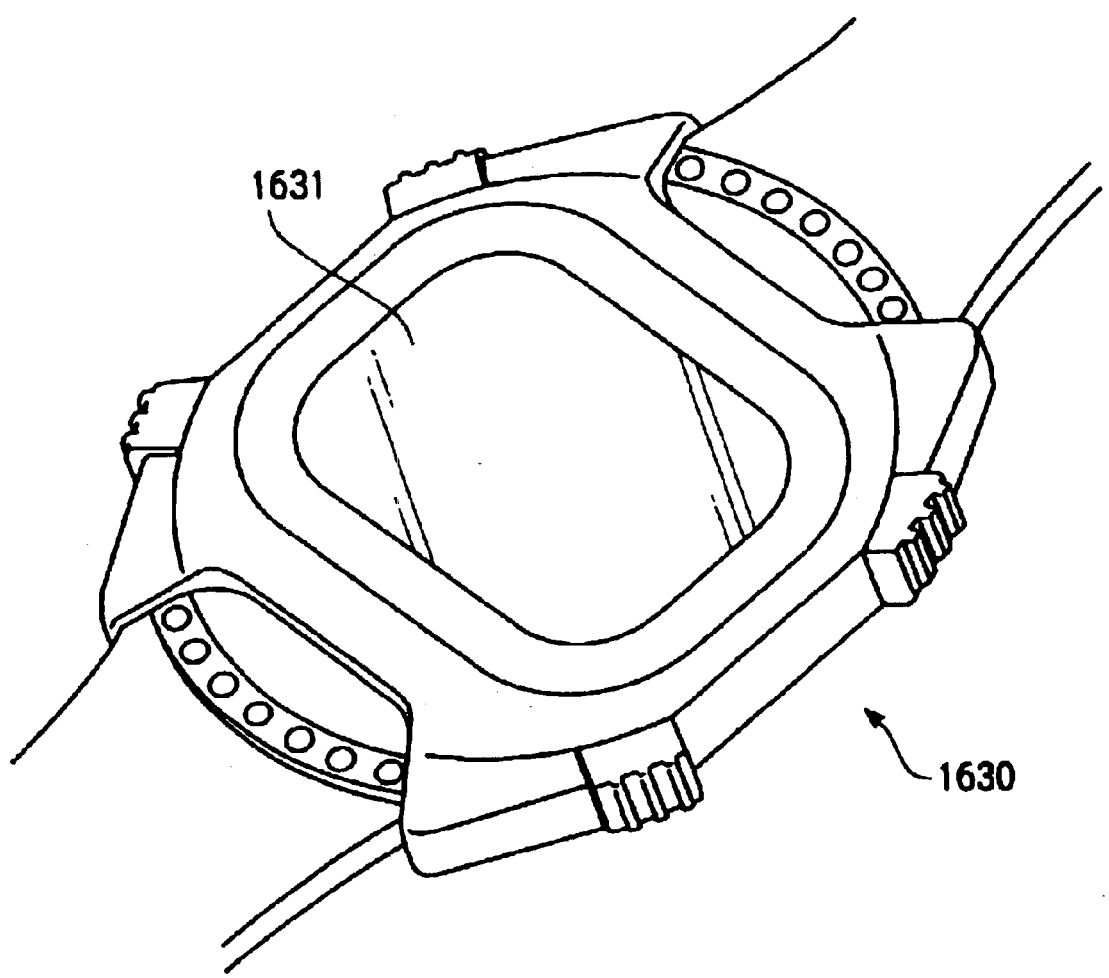
FIG. 67 is a perspective view of a wristwatch according to another embodiment of the electronic apparatus of the present invention.

FIG. 67 shows a wristwatch that is an embodiment of the electronic apparatus according to the present invention. The wristwatch 1630 has a display unit including a liquid crystal device 1631 in the front center of the body. This liquid crystal device 1631 is the liquid crystal device according to the present invention, for example, as shown in FIGS. 3, 7, and 9.

Fifth Embodiment of Electronic Apparatus

Figure 68:
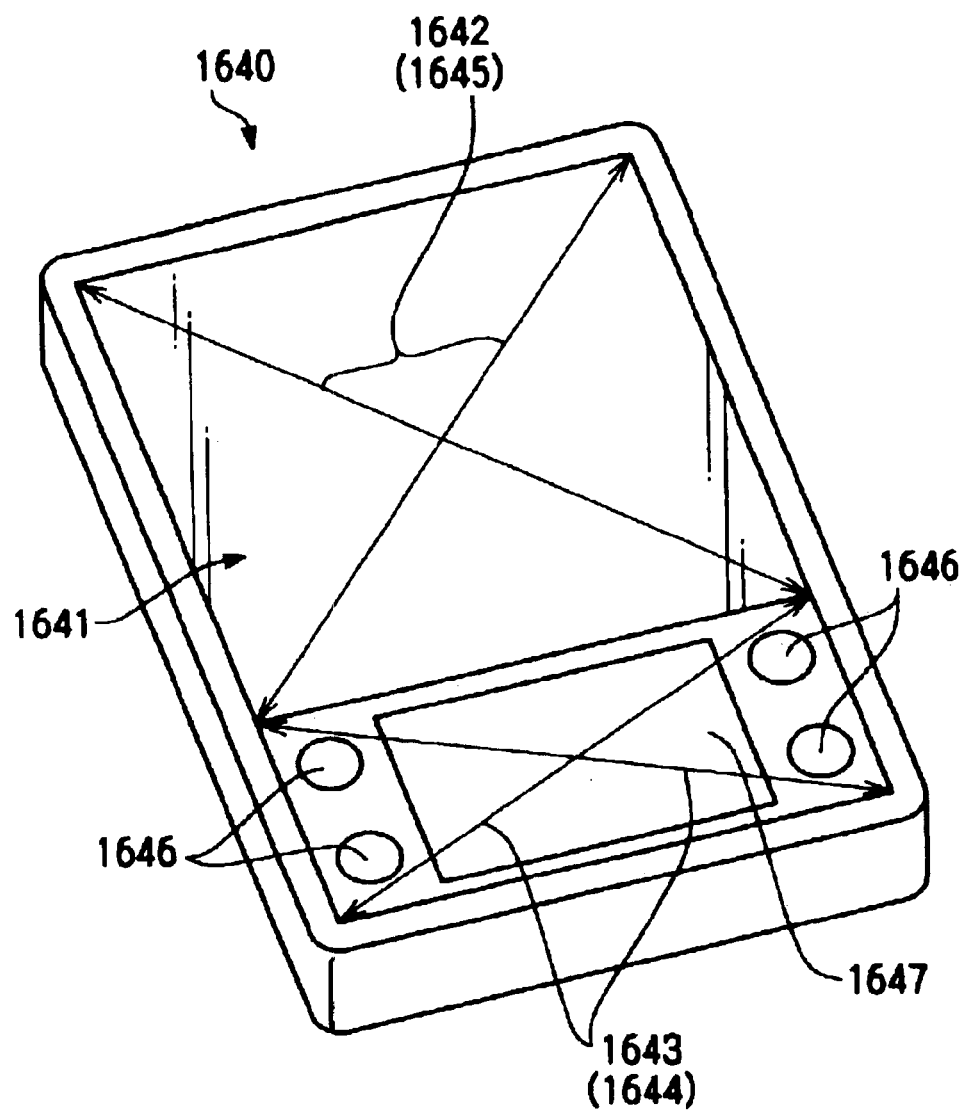
FIG. 68 is a perspective view of an information apparatus according to another embodiment of the electronic apparatus of the present invention.

FIG. 68 shows an information apparatus that is an embodiment of the electronic apparatus according to the present invention. The information apparatus 1640 has touch panels and a liquid crystal device 1641. The information apparatus 1640 includes a display region 1642 composed of the display screen of the liquid crystal device 1641 and a first input region 1643 lying below the display region 1642. The first input region 1643 is provided with an input sheet 1644.

The liquid crystal device 1641 has a structure of a stack of a rectangular liquid crystal panel and a rectangular touch panel. The touch panel functions as an input panel. The touch panel is larger than and protrudes from the liquid crystal panel.

The display region 1642 and the first input region 1643 have touch panels, and the display region 1642 functions as a second input region 1645, like the first input region 1643. The touch panel has a second face at the liquid crystal panel and a first face (the reverse to the second face). To a position corresponding to the first input region 1643 in the first face, the input sheet 1644 is bonded.

A frame is printed on the input sheet 1644 for identifying icons 1646 and a handwriting-recognition region 1647. In the first input region 1643, a load is applied to the first face of the touch panel with an input means such as a finger or a pen through the input sheet 1644 for selecting the icons 1646 and inputting data such as characters in the handwriting-recognition region 1647.

In the second input region 1645, images on the liquid crystal panel can be observed. Furthermore, an input-mode screen is displayed on the liquid crystal panel and a load is applied to the first face of the touch panel with a finger or pen to determine an appropriate position in the input-mode screen for data input.

Sixth Embodiment of Electronic Apparatus

Figure 69:
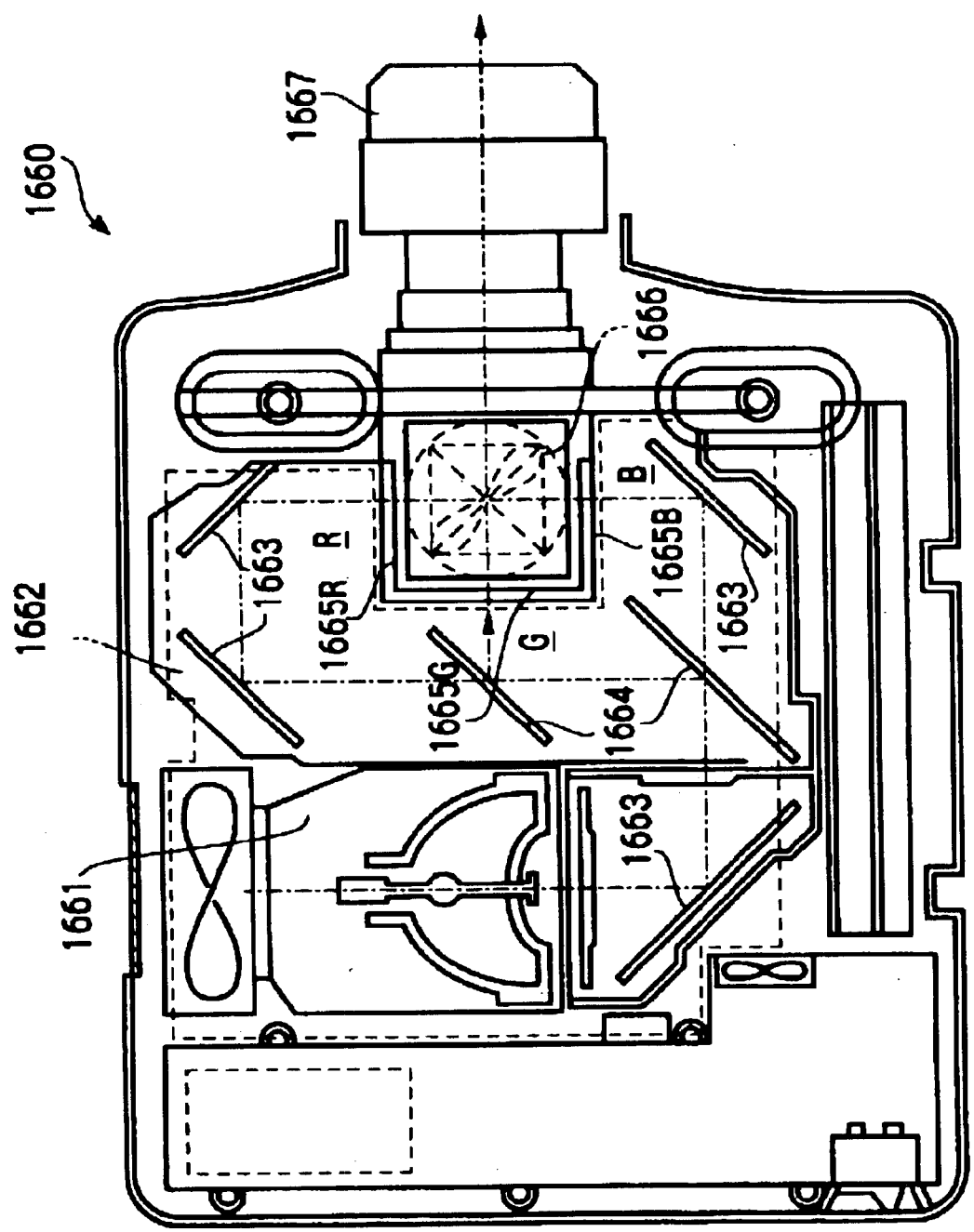
FIG. 69 is a perspective view of a projector according to another embodiment of the electronic apparatus of the present invention.

FIG. 69 shows a projector that is an embodiment of the electronic apparatus according to the present invention. The projector 1660 has a lamp unit 1661 including a white light source such as a halogen lamp in its interior. Projection light emerging from the lamp unit 1661 is separated into three primary colors by four mirrors 1663 and two dichroic mirrors 1664 disposed in a light guide 1662, and the three primary color light beams are incident on liquid crystal devices 1665R, 1665B, and 1665G that function as light valves corresponding to the respective primary colors.

The liquid crystal devices 1665R, 1665B, and 1665G are the liquid crystal devices according to the present invention, for example, as shown in FIGS. 3, 7, and 9. These liquid crystal devices are driven by R, G, and B primary signals supplied from a liquid crystal driving IC. The light beams modulated in the liquid crystal devices are incident on a dichroic prism 1666 from three directions. In the dichroic prism 1666, the R and B light beams are refracted by 90° whereas the G light beam travels straight. Color images are combined and the combined light is projected on a screen or the like as a color image through a projection lens 1667.

Other Embodiments

Other examples of electronic apparatuses according to the present invention includes liquid crystal television sets, view-finder type videotape recorders (camcorder), monitoring videotape recorders, automobile navigation systems, pagers, electronic notebooks, calculators, word processors, workstations, television phones, and POS terminals. The above-mentioned display device can be used as display units of these electronic apparatuses.

The electrooptical devices according to the present invention is not limited to the liquid crystal device and may be electroluminescent devices such as organic electroluminescent devices and inorganic electroluminescent devices, light-emitting diode (LED) display devices, electrophoretic display devices, plasma display devices, field emission display (FED) devices, thin cathode-ray tubes, compact television sets including liquid crystal shutters, and apparatuses including digital micromirror devices (PMD).

The present invention has been described with preferred embodiments. However, the present invention is not limited to these embodiments and can include any modification within the scope of the technical concept of the present invention.

What is claimed is:

1. A substrate for an electrooptical device, comprising:
a base having a plurality of display dots;
an underlayer provided on the base;
a reflective layer provided on the underlayer; and
a color layer provided on the reflective layer,
wherein the underlayer is provided continuously throughout regions corresponding to the display dots but is not provided at regions between the display dots.

2. A substrate for an electrooptical device according to claim 1, wherein a planar shape of the underlayer is approximately the same as the planar shape of the display dots.

3. A method for manufacturing a substrate for an electrooptical device comprising the steps of:
forming an underlayer on a base in which a plurality of display dots is formed;
forming a reflective layer on the underlayer; and
forming a color on the reflective layer,
wherein the color layer is formed at regions corresponding to the display dots but is not formed at regions between the display dots and the underlayer extends continuously throughout each region corresponding to the display dots.

4. A substrate for an electrooptical device, comprising:
a base in which a plurality of display dots is formed;
an underlayer being provided on the base and including recesses or openings at regions between the adjacent display dots, and having irregularly arranged convexities or concavities;
a reflective layer provided on the underlayer; and
a color layer provided on the reflective layer, and disposed so as to get into the recesses or the openings,
wherein the underlayer separates the color layer from the base.

5. A substrate for an electrooptical device according to claim 4, wherein the reflective layer includes an aperture.

6. A substrate for an electrooptical device according to claim 4, further comprising a protecting layer provided on the color layer.

7. A substrate for an electrooptical device according to and claim 4, wherein the bottom of the openings contains the region where the underlayer has been removed.

8. A substrate for an electrooptical device according to claim 4, wherein the reflective layer includes an aperture.

9. A substrate for an electrooptical device according to claim 4, wherein the color layer includes a blue-based color portion, a green-based color portion, and a red-based color portion, and wherein the blue-based color portion, the green-based color portion, and the red-based color portion are laminated on the base at the regions between the adjacent display dots in the order of the blue-based color portion, the green-based color portion, and the red-based color portion.

10. A substrate for an electrooptical device according to claim 9, wherein the thickness of the blue-based color portion is in the range of 0.7 μm to 2.0 μm, the thickness of the green-based color portion is in the range of 0.8 μm to 1.2 μm, and the thickness of the red-based color portion is in the range of 0.7 μm to 1.1 μm.

11. A substrate for an electrooptical device according to claim 4, wherein the thickness of the underlayer at regions under bottom surfaces of the recesses is smaller than the thickness of the underlayer at other regions.

12. A substrate for an electrooptical device according to claim 4, wherein the underlayer, at regions under bottom surfaces of the recesses, is formed with a first insulating layer being provided on the base and the underlayer, at other regions, is formed with the first insulating layer and a second insulating layer being laminated on the first insulating layer.

13. A substrate for an electrooptical device according to claim 4, wherein the underlayer, at regions under bottom surfaces of the recesses, is formed with a first resin layer being provided on the base and the underlayer, at other regions, is formed with the first resin layer and a second resin layer being laminated on the first resin layer.

14. A substrate for an electrooptical device according to claim 4, wherein the color layer includes at least a first color portion corresponding to a first color and a second color portion corresponding to a second color, and wherein the first color portion and the second color portion are formed so that they overlap each other at the regions between the adjacent display dots.

15. A substrate for an electrooptical device according to claim 14, wherein the first color portion and the second color portion are provided in correspondence with the adjacent display dots, respectively.

16. A substrate for an electrooptical device according to claim 14, wherein a mean transmission factor in the visible light wavelength range of the first color portion is less than the mean transmission factor in the visible light wavelength range of the second color portion, and wherein the first color portion and the second color portion are laminated on the base in the order of the first color portion and the second color portion.

17. A substrate for an electrooptical device according to claim 14, wherein a mean transmission factor in a wavelength range of 400 nm to 700 nm of the first color portion is less than a mean transmission factor in the wavelength range of 400 nm to 700 of the second color portion, and wherein the first color portion and the second color portion are laminated on the base in the order of the first color portion and the second color portion.

18. A substrate for an electrooptical device according to claim 14, wherein the thickness of the first color portion is in the range of 0.7 μm to 2.0 μm.

19. A substrate for an electrooptical device according to claim 4, wherein the color layer includes a blue-based color portion, and a green-based or red-based color portion, and wherein the blue-based color portion, and the green-based or red-based color portion are laminated on the base at the regions between the adjacent display dots in the order of the blue-based color portion, and the green-based or red-based color portion.

20. An electrooptical device comprising:

a first base and a second base which face each other;

an electrooptical material disposed between the first base and the second base;

first electrodes provided on the first base;

second electrodes provided on the second base;

a plurality of display dots disposed at regions where the first electrodes and the second electrodes overlap each other;

an underlayer being provided on the first base with recesses or openings at regions between the adjacent display dots, and having irregularly arranged convexities or concavities;

a reflective layer provided on the underlayer; and a color layer disposed so as to get into the recesses or the openings, wherein the underlayer separates the color layer from the first base.

21. An electrooptical device according to claim 20, wherein the color layer includes a blue-based color portion, a green-based color portion, and a red-based color portion, and wherein the blue-based color portion, the green-based color portion, and the red-based color portion are laminated on the base at the regions between the adjacent display dots in the order of the blue-based color portion, the green-based color portion, and the red-based color portion.

22. An electrooptical device according to claim 20, wherein the underlayer, at regions under bottom surfaces of the recesses, is formed with a first insulating layer being provided on the base and the underlayer, at other regions, is formed with the first insulating layer and a second insulating layer being laminated on the first insulating layer.

23. An electrooptical device according to claim 20, wherein the color layer includes at least a first color portion corresponding to a first color and a second color portion corresponding to a second color, and wherein the first color portion and the second color portion are formed so that they overlap each other at the regions between the adjacent display dots.

24. An electrooptical device according to claim 23, wherein a mean transmission factor in the visible light wavelength range of the first color portion is less than a mean transmission factor in the visible light wavelength range of the second color portion, and wherein the first color portion and the second color portion are laminated on the base in the order of the first color portion and the second color portion.

25. An electrooptical device according to claim 20, wherein the color layer includes a blue-based color portion, and a green-based or red-based color portion, and wherein the blue-based color portion, and the green-based or red-based color portion are laminated on the base at the regions between the adjacent display dots in the order of the blue-based color portion, and the green-based or red-based color portion.

26. An electronic apparatus comprising an electrooptical device according to claim 20.

27. A method for manufacturing a substrate for an electrooptical device comprising the steps of:

forming an underlayer on a base in which a plurality of display dots is formed;

forming a reflective layer on the underlayer; and forming a color layer on the base, wherein the underlayer is formed such that the underlayer is provided with recesses or openings at regions between the adjacent display dots, and has irregularly arranged convexities or concavities, wherein the color layer is formed so as to get into the recesses or the openings, and wherein the underlayer separates the color layer from the base.

28. A method for manufacturing a substrate for an electrooptical device according to claim 27, wherein the color layer includes a blue-based color portion, a green-based color portion, and a red-based color portion, and wherein the blue-based color portion, the green-based color portion, and the red-based color portion are laminated on the base at the regions between the adjacent display dots in the order of the blue-based color portion, the green-based color portion, and the red-based color portion.

29. A method for manufacturing a substrate for an electrooptical device according to claim 27, wherein the color layer includes at least a first color portion corresponding to a first color and a second color portion corresponding to a second color, and wherein the first color portion and the second color portion are formed so that they overlap each other at the regions between the adjacent display dots.

30. A method for manufacturing a substrate for an electrooptical device according to claim 28, wherein the color layer includes a blue-based color portion, and a green-based or red-based color portion, and wherein the blue-based color portion, and the green-based or red-based color portion are laminated on the base at the regions between the adjacent display dots in the order of the blue-based color portion, and the green-based or red-based color portion.

31. The substrate for an electrooptical device according to claim 1, wherein the color layer includes a black, red, green or blue colored layer.

32. The electrooptical device according to claim 20, wherein the color layer includes a black, red, green or blue colored layer.

33. The method for manufacturing a substrate for an electrooptical device according to claim 27, wherein the color layer includes a black, red, green or blue colored layer.

34. A substrate for an electrooptical device, comprising:

a base;

a reflective layer provided over the base;

a color layer provided over the reflective layer, the color layer including different color dots for each pixel, adjacent dots being separated from each other by an inter-dot area; and an underlayer provided at areas corresponding to the dots of the color layer but not at areas corresponding to the inter-dot areas, the underlayer entirely partitioning the base from the reflective layer and the color layer in the areas corresponding to the dots of the color layer.

35. A substrate for an electrooptical device, comprising:

a base;

a color layer provided over the base, the color layer including different color dots for each pixel, adjacent dots being separated from each other by an inter-dot area;

an underlayer including sections disposed between the base and the dots of the color layer, adjacent sections of the underlayer being isolated from each other by areas that correspond to inter-dot areas of the color layer; and a reflective layer provided between the underlayer and the color filter layer at dot regions and between adjacent sections of the underlayer at the areas corresponding to the inter-dot areas.

* * * * *

UNITED STATES PATENT AND TRADEMARK OFFICE
CERTIFICATE OF CORRECTION

PATENT NO. : 6,867,831 B2
APPLICATION NO. : 10/308890
DATED : March 15, 2005
INVENTOR(S) : Keiji Takizawa et al.

It is certified that error appears in the above-identified patent and that said Letters Patent is hereby corrected as shown below:

On the Title Page, Item (30) Foreign Application Priority Data, Line 4, "2002-323980" should be --2002-323982--

Column 10, Line 6, "secluded" should be --included--

Column 15, Line 19, after "composed" insert --of--

Column 15, Line 23, "stripe" should be --striped--

Column 15, Line 50, "Fig.;" should be --Fig.--

Column 15, Line 65, "comers" should be --corners--

Column 18, Line 46, "pan" should be --part--

Column 23, Line 52, "12" should be --112--

Column 24, Line 18, "arc" should be --are--

Column 25, Line 35, "imaged" should be --image--

Column 25, Line 43, "imaged" should be --image--

Column 27, Line 18, "layer." should be --layer--

Column 29, Line 41, "scaled" should be --sealed--

Column 31, Line 15, "arc" should be --are--

Column 31, Line 35, "imaged" should be --image--

Column 31, Line 43, "imaged" should be --image--

Column 32, Line 39, "223." should be --323.--

Column 35, Line 35, "vapor deposition" should be --Vapor Deposition--

Column 36, Line 1, "arc" should be --are--

UNITED STATES PATENT AND TRADEMARK OFFICE
CERTIFICATE OF CORRECTION

PATENT NO.        : 6,867,831 B2
APPLICATION NO. : 10/308890
DATED             : March 15, 2005
INVENTOR(S)      : Keiji Takizawa et al.

It is certified that error appears in the above-identified patent and that said Letters Patent is hereby corrected as shown below:

Column 37, Line 3, "Includes" should be --includes--

Column 41, Line 38, "scaling" should be --sealing--

Column 41, Line 47, "PI 14," should be --P114,--

Column 47, Line 41, delete "of the surface", second occurrence

Column 48, Line 3, "V" should be --D--

Column 48, Line 7, delete "the", second occurrence

Column 49, Line 29, "imaged" should be --image--

Column 56, Line 35, "imaged" should be --image--

Column 59, Line 17, delete "and"

Column 60, Line 60, "714G" should be --714B--

Column 61, Line 17, "the forming" should be --forming the--

Column 61, Line 45, "(sce" should be --(see--

Column 61, Line 58, "attached" should be --attached.--

Column 61, Line 64, "714", first occurrence, should be --714B--

Column 62, Line 55, "art" should be --part--

Column 63, Line 64, "imaged" should be --image--

Column 64, Line 5, "imaged" should be --image--

Column 64, line 12, ".822" should be --822--

Column 71, Line 30, "imaged" should be --image--

Column 71, Line 46, after "corresponds" insert --to--

UNITED STATES PATENT AND TRADEMARK OFFICE
CERTIFICATE OF CORRECTION

PATENT NO. : 6,867,831 B2
APPLICATION NO. : 10/308890
DATED : March 15, 2005
INVENTOR(S) : Keiji Takizawa et al.

It is certified that error appears in the above-identified patent and that said Letters Patent is hereby corrected as shown below:

Column 72, Line 13, delete "of the surfaces"

Column 72, Line 25, "µm" should be --µm.--

Column 74, Line 26, "9 12" should be --912--

Column 75, Line 46, before "formed" insert --is--

Column 78, Line 8, "is" should be --are--

Column 78, Lines 29-31, Replace Claim 2 with the following
   --The substrate for an electrooptical device according to Claim 1, wherein a planar shape of the underlayer is approximately the same as a planar shape of the display dots.--

Column 78, Line 37, Claim 3, after "color" insert --layer--

Column 78, Lines 56-58, Replace Claim 6 with the following
   --The substrate for an electrooptical device according to Claim 4, further comprising a protecting layer provided on the color layer.--

Column 78, Line 60, Claim 7, after "to" delete "and"

Columns 78 and 79, Lines 64-67 and 1-6, Replace Claim 9 with the following
   --The substrate for an electrooptical device according to Claim 4, wherein the color layer includes a blue-based color portion, a green-based color portion, and a red-based color portion;
   the blue-based color portion, the green-based color portion, and the red-based color portion are laminated on the base at regions between the adjacent display dots; and
   the blue-based color portion is disposed on the base, the green-based color portion is disposed on the blue-based color portion, and the red-based color portion is disposed on the green-based color portion.--

Column 79, Lines 29-35, Replace claim 14 with the following
   --The substrate for an electrooptical device according to Claim 4, wherein the color layer includes at least a first color portion corresponding to a first color and a second color portion corresponding to a second color, and
   wherein the first color portion and the second color portion are formed to overlap at the regions between the adjacent display dots.--

UNITED STATES PATENT AND TRADEMARK OFFICE
CERTIFICATE OF CORRECTION

PATENT NO. : 6,867,831 B2
APPLICATION NO. : 10/308890
DATED : March 15, 2005
INVENTOR(S) : Keiji Takizawa et al.

It is certified that error appears in the above-identified patent and that said Letters Patent is hereby corrected as shown below:

Column 79, Line 52, Claim 17, after "700" insert --nm--

Column 79, Lines 60-67, Replace claim 19 with the following
--The substrate for an electrooptical device according to Claim 4, wherein the color layer includes a blue-based color portion and a green-based or red-based color portion, and
wherein the blue-based color portion is laminated on the base and the green-based or red-based color portion is laminated on the blue-based color portion; and said color portions disposed at regions between adjacent display dots.--

Column 80, Lines 53-60, Replace claim 25 with the following
--The electrooptical device according to Claim 20, wherein the color layer includes a blue-based color portion, and a green-based or red-based color portion, and
wherein the blue-based color portion is laminated on the base and the green-based or red-based color portion is laminated on the blue-based color portion; said color portions disposed at regions between adjacent display dots.--

Column 81, Lines 11-20, Replace claim 28 with the following
--The method for manufacturing a substrate for an electrooptical device according to Claim 27, wherein the color layer includes a blue-based color portion, a green-based color portion, and a red-based color portion, and
wherein the blue-based color portion is laminated on the base, the green-based color portion is laminated on the blue-based color portion, and the red-based color portion is laminated on the green based color portion; and the color portions disposed at regions between adjacent display dots.--

Column 81, Lines 21-28, Replace claim 29 with the following
--The method for manufacturing a substrate for an electrooptical device according to Claim 27, wherein the color layer includes at least a first color portion corresponding to a first color and a second color portion corresponding to a second color, and
wherein the first color portion and the second color portion are formed to overlap at the regions between the adjacent display dots.--

UNITED STATES PATENT AND TRADEMARK OFFICE
CERTIFICATE OF CORRECTION

PATENT NO.         : 6,867,831 B2
APPLICATION NO. : 10/308890
DATED                : March 15, 2005
INVENTOR(S)       : Keiji Takizawa et al.

It is certified that error appears in the above-identified patent and that said Letters Patent is hereby corrected as shown below:

Column 81, Lines 29-37, Replace claim 30 with the following
   --The method for manufacturing a substrate for an electrooptical device according to Claim 27, wherein the color layer includes a blue-based color portion and a green-based or red-based color portion, and
   wherein the blue-based color portion is laminated on the base and the green-based or red-based color portion is laminated on the blue-based color portion; and the color portions are disposed at regions between adjacent display dots.--

Signed and Sealed this

Twenty-fifth Day of March, 2008

JON W. DUDAS
*Director of the United States Patent and Trademark Office*